(12) United States Patent
Sugimoto et al.

(10) Patent No.: US 8,081,371 B2
(45) Date of Patent: Dec. 20, 2011

(54) SPATIAL LIGHT MODULATOR AND DISPLAY APPARATUS

(75) Inventors: Naoya Sugimoto, Tokyo (JP); Yoshihiro Maeda, Tokyo (JP); Fusao Ishii, Menlo Park, CA (US)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 145 days.

(21) Appl. No.: 12/586,268

(22) Filed: Sep. 18, 2009

(65) Prior Publication Data

US 2010/0214646 A1 Aug. 26, 2010

Related U.S. Application Data

(63) Continuation-in-part of application No. 12/004,607, filed on Dec. 24, 2007, now Pat. No. 7,646,528, which is a continuation-in-part of application No. 11/121,543, filed on May 4, 2005, now Pat. No. 7,268,932, which is a continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 61/192,528, filed on Sep. 18, 2008.

(51) Int. Cl.
*G02B 26/00* (2006.01)
*G02B 26/08* (2006.01)

(52) U.S. Cl. ............... 359/290; 359/223.1; 359/237

(58) Field of Classification Search .......... 359/290–292, 359/295, 223–225, 245, 260–263, 298, 198, 359/301–303, 317–318, 237, 242
See application file for complete search history.

(56) References Cited

U.S. PATENT DOCUMENTS

| | | | |
|---|---|---|---|
| 4,229,732 A | 10/1980 | Hartstein et al. | |
| 4,571,603 A | 2/1986 | Hornbeck et al. | |
| 4,969,730 A | 11/1990 | van den Brandt | |
| 5,061,049 A | 10/1991 | Hornbeck | |
| 5,096,279 A | 3/1992 | Hornbeck | |
| 5,214,420 A | 5/1993 | Thompson et al. | |
| 5,285,407 A | 2/1994 | Gale et al. | |
| 5,452,024 A | 9/1995 | Sampsell | |
| 5,612,713 A | 3/1997 | Bhuva et al. | |
| 5,673,139 A | 9/1997 | Johnson | |
| 5,686,939 A | 11/1997 | Millward et al. | |
| 5,903,383 A * | 5/1999 | Bernstein et al. | ........... 359/298 |
| 6,128,121 A | 10/2000 | Choi et al. | |
| 6,388,661 B1 | 5/2002 | Richards | |
| 6,538,800 B2 | 3/2003 | Huibers | |
| 6,552,840 B2 | 4/2003 | Knipe | |
| 6,556,739 B1 | 4/2003 | Kruglick et al. | |
| 6,571,029 B1 | 5/2003 | Kruglick et al. | |
| 6,778,304 B1 | 8/2004 | Muller | |

(Continued)

*Primary Examiner* — Dwayne Pinkney
(74) *Attorney, Agent, or Firm* — Bo-In Lin

(57) ABSTRACT

The present invention provides an image projection system comprising a spatial light modulator (SLM) comprises a plurality of pixel elements, wherein each of the pixel elements further comprises a deflectable mirror, and at least a first electrode and a second electrode for controlling the deflectable mirror to deflect to different tilt angles to reflect and modulate an illumination light for displaying an image; and a controller for applying a voltage to the second electrode wherein the voltage applied in an initial operation period is different from the voltage applied in an image display period.

26 Claims, 81 Drawing Sheets

Mirror Cell structure

U.S. PATENT DOCUMENTS

| | | |
|---|---|---|
| 6,809,977 B1 | 10/2004 | Richards |
| 6,856,447 B2 | 2/2005 | Richards et al. |
| 6,888,521 B1 | 5/2005 | Richards |
| 6,999,224 B2 | 2/2006 | Huibers |
| 7,012,592 B2 | 3/2006 | Richards |
| 7,019,884 B2 | 3/2006 | Kirch et al. |
| 7,027,205 B2 | 4/2006 | Richards |
| 7,304,782 B2 | 12/2007 | Kimura et al. |
| 7,436,575 B2 | 10/2008 | Mochizuki et al. |
| 2002/0051096 A1* | 5/2002 | Yamazaki et al. ............ 348/771 |
| 2003/0011863 A1 | 1/2003 | Muller |
| 2004/0040828 A1* | 3/2004 | Ivanciw et al. ............... 200/600 |
| 2004/0058532 A1* | 3/2004 | Miles et al. ................... 438/689 |
| 2004/0263945 A1* | 12/2004 | Nanjyo et al. ................ 359/291 |
| 2006/0066931 A1 | 3/2006 | Ogikubo et al. |
| 2006/0279496 A1 | 12/2006 | Ogikubo et al. |
| 2007/0007849 A1 | 1/2007 | Ogikubo et al. |
| 2007/0041078 A1 | 2/2007 | Pan |
| 2007/0126759 A1 | 6/2007 | Hwang |
| 2007/0229204 A1 | 10/2007 | Ogikubo et al. |
| 2007/0258124 A1 | 11/2007 | Chen et al. |
| 2007/0258130 A1 | 11/2007 | Chen et al. |
| 2007/0258312 A1 | 11/2007 | Richards |
| 2008/0204845 A1* | 8/2008 | Maeda et al. ................ 359/224 |

* cited by examiner

Fig.4 Mirror Cell structure

| Combination No. | pixel pitch | transistor | capacitor |
|---|---|---|---|
| G1 | 8 μm | withstand. voltage 12V; 2 pcs. | aluminum capacitor; 2 pcs. |
| G2 | 8 μm | withstand. voltage 12V; 1 pc. | poly-capacitor; 1 pc. |
| G3 | 8 μm | withstand. voltage 24V; 1 pcs. | aluminum capacitor; 1 pc. |
| G4 | 6 μm | withstand. voltage 6V; 2 pcs. | aluminum capacitor; 2 pcs. |
| G5 | 6 μm | withstand. voltage 6V; 1 pc. | poly-capacitor; 1 pc. |
| G6 | 6 μm | withstand. voltage 12V; 1 pc. | aluminum capacitor; 1 pc. |

Fig. 5A

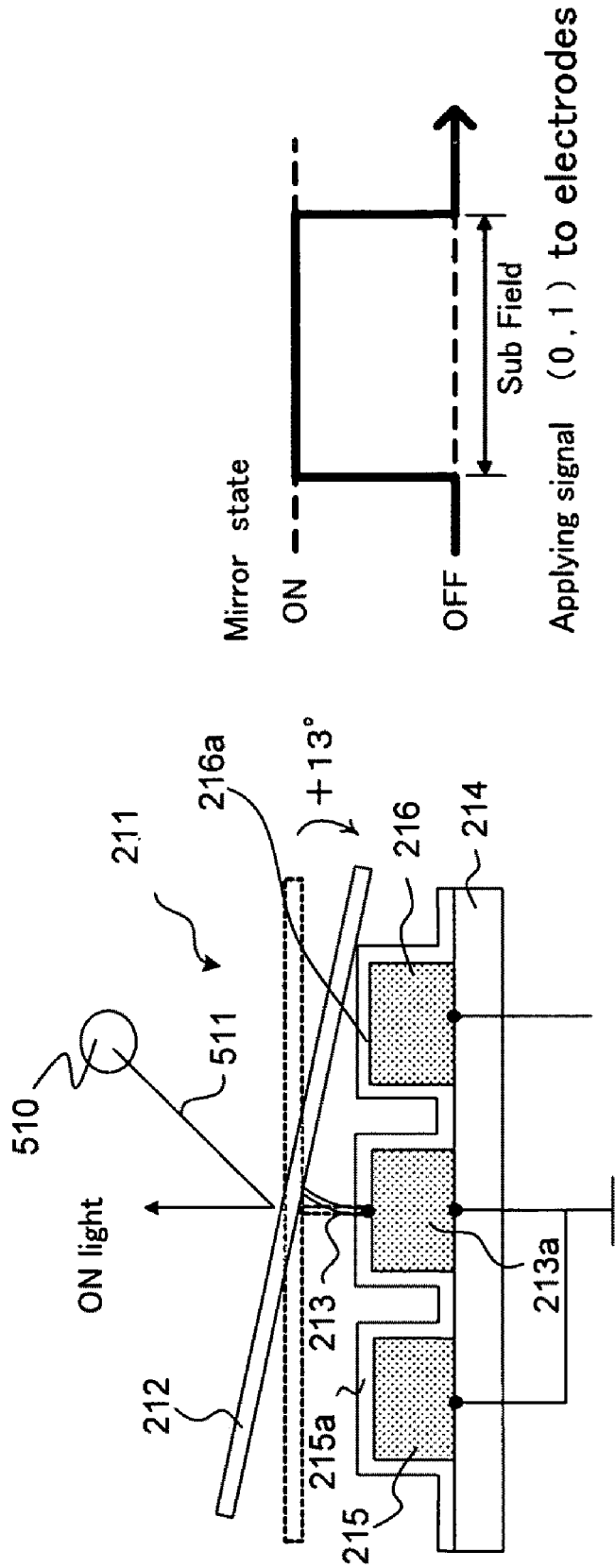

| frame sequence color sequential | | length of one timeslot (ts) | | | gray scale |
| --- | --- | --- | --- | --- | --- |
| | | 8bit | 10bit | 12bit | |
| one frame | 60Hz 16.66667 mesc | 255 | 1024 | 4095 | μ sec |
| subfield (one color period) (shortest) | 30% 5.00 mesc | 19.61 | 4.88 | 1.22 | μ sec |
| subfield (one color period) (longest) | 60% 10.00 mesc | 39.22 | 9.77 | 2.44 | μ sec |

Fig. 16

|  |  | the least quantity of light |  |
|---|---|---|---|
|  | quantity of light | 1st subframe | 1.56 |
|  |  | 2nd subframe | 3.13 |
| PWM 1ltimeslot | 100 | 3rd subframe | 6.25 |
| OSC 1ltimeslot | 12.5 | 4th subframe | 12.50 |

1st subframe — 601

| The Number of 'H' timeslot | Amount of light | STEP No. | OSC 5timeslot | PWM 33timeslot |
|---|---|---|---|---|
| 146 | 12860.9375 | n     | 1 1 1 1 1 1 ⋯ | 1 1 1 0 |
| 146 | 12859.3750 | n-1   | 1 1 1 1 1 1 ⋯ | 1 1 0 0 |
| 146 | 12857.8125 | n-2   | 1 1 1 1 1 1 ⋯ | 1 1 1 0 |
| 146 | 12856.2500 | n-3   | 1 1 1 1 1 1 ⋯ | 1 1 0 0 |
| 146 | 12854.6875 | n-4   | 1 1 1 1 1 1 ⋯ | 1 1 1 0 |
| 146 | 12853.1250 | n-5   | 1 1 1 1 1 1 ⋯ | 1 1 0 0 |
| 146 | 12851.5625 | n-6   | 1 1 1 1 1 1 ⋯ | 1 1 1 0 |
| 146 | 12850.0000 | n-7   | 1 1 1 1 1 1 ⋯ | 1 1 0 0 |
| 145 | 12848.4375 | n-8   | 1 1 1 1 1 1 ⋯ | 1 1 1 0 |
| 145 | 12846.8750 | n-9   | 1 1 1 1 1 1 ⋯ | 1 1 0 0 |
| 145 | 12845.3125 | n-10  | 1 1 1 1 1 1 ⋯ | 1 1 1 0 |
| 145 | 12843.7500 | n-11  | 1 1 1 1 1 1 ⋯ | 1 1 0 0 |
| 146 | 12842.1875 | n-12  | 1 1 1 1 1 1 ⋯ | 1 1 1 0 |
| 146 | 12840.6250 | n-13  | 1 1 1 1 1 1 ⋯ | 1 1 0 0 |
| 143 | 12839.0625 | n-14  | 1 1 1 1 1 1 ⋯ | 1 1 1 0 |
| 143 | 12837.5000 | n-15  | 1 1 1 1 1 1 ⋯ | 1 1 0 0 |

602 — 701 — 702

700

2nd subframe

| STEP No. | OSC 5timeslot | PWM 33timeslot |
|---|---|---|
| n     | 1 1 1 1 1 1 ⋯ | 1 1 1 0 |
| n-1   | 1 1 1 1 1 1 ⋯ | 1 1 1 0 |
| n-2   | 1 1 1 1 1 1 ⋯ | 1 1 0 0 |
| n-3   | 1 1 1 1 1 1 ⋯ | 1 1 0 0 |
| n-4   | 1 1 1 1 1 1 ⋯ | 1 1 1 0 |
| n-5   | 1 1 1 1 1 1 ⋯ | 1 1 1 0 |
| n-6   | 1 1 1 1 1 1 ⋯ | 1 1 0 0 |
| n-7   | 1 1 1 1 1 1 ⋯ | 1 1 0 0 |
| n-8   | 1 1 1 1 1 1 ⋯ | 1 1 1 0 |
| n-9   | 1 1 1 1 1 1 ⋯ | 1 1 1 0 |
| n-10  | 1 1 1 1 1 1 ⋯ | 1 1 0 0 |
| n-11  | 1 1 1 1 1 1 ⋯ | 1 1 0 0 |
| n-12  | 1 1 1 1 1 1 ⋯ | 1 1 1 0 |
| n-13  | 1 1 1 1 1 1 ⋯ | 1 1 1 0 |
| n-14  | 1 1 1 1 1 1 ⋯ | 1 1 0 0 |
| n-15  | 1 1 1 1 1 1 ⋯ | 1 1 0 0 |

|  | quantity of light |
|---|---|
| PWM 1ltimeslot | 100 |
| OSC 1ltimeslot | 40 |

| Data No. | OSC 3 timeslot | | | PWM 6timeslot | | | | | | amount of light |
|---|---|---|---|---|---|---|---|---|---|---|
| 27 | 1 | 1 | 1 | 1 | 1 | 1 | 1 | 1 | 1 | 720 |
| 26 | 0 | 1 | 1 | 1 | 1 | 1 | 1 | 1 | 1 | 680 |
| 25 | 0 | 0 | 1 | 1 | 1 | 1 | 1 | 1 | 1 | 640 |
| 24 | 0 | 0 | 0 | 1 | 1 | 1 | 1 | 1 | 1 | 600 |
| 23 | 1 | 1 | 1 | 1 | 1 | 1 | 1 | 1 | 0 | 620 |
| 22 | 0 | 1 | 1 | 1 | 1 | 1 | 1 | 1 | 0 | 580 |
| 21 | 0 | 0 | 1 | 1 | 1 | 1 | 1 | 1 | 0 | 540 |
| 20 | 0 | 0 | 0 | 1 | 1 | 1 | 1 | 1 | 0 | 500 |
| 19 | 1 | 1 | 1 | 1 | 1 | 1 | 1 | 0 | 0 | 520 |
| 18 | 0 | 1 | 1 | 1 | 1 | 1 | 1 | 0 | 0 | 480 |
| 17 | 0 | 0 | 1 | 1 | 1 | 1 | 1 | 0 | 0 | 440 |
| 16 | 0 | 0 | 0 | 1 | 1 | 1 | 1 | 0 | 0 | 400 |
| 15 | 1 | 1 | 1 | 1 | 1 | 1 | 0 | 0 | 0 | 420 |
| 14 | 0 | 1 | 1 | 1 | 1 | 1 | 0 | 0 | 0 | 380 |
| 13 | 0 | 0 | 1 | 1 | 1 | 1 | 0 | 0 | 0 | 340 |
| 12 | 0 | 0 | 0 | 1 | 1 | 1 | 0 | 0 | 0 | 300 |
| 11 | 1 | 1 | 1 | 1 | 1 | 0 | 0 | 0 | 0 | 320 |
| 10 | 0 | 1 | 1 | 1 | 1 | 0 | 0 | 0 | 0 | 280 |
| 9 | 0 | 0 | 1 | 1 | 1 | 0 | 0 | 0 | 0 | 240 |
| 8 | 0 | 0 | 0 | 1 | 1 | 0 | 0 | 0 | 0 | 200 |
| 7 | 1 | 1 | 1 | 1 | 0 | 0 | 0 | 0 | 0 | 220 |
| 6 | 0 | 1 | 1 | 1 | 0 | 0 | 0 | 0 | 0 | 180 |
| 5 | 0 | 0 | 1 | 1 | 0 | 0 | 0 | 0 | 0 | 140 |
| 4 | 0 | 0 | 0 | 1 | 0 | 0 | 0 | 0 | 0 | 100 |
| 3 | 1 | 1 | 1 | 0 | 0 | 0 | 0 | 0 | 0 | 120 |
| 2 | 0 | 1 | 1 | 0 | 0 | 0 | 0 | 0 | 0 | 80 |
| 1 | 0 | 0 | 1 | 0 | 0 | 0 | 0 | 0 | 0 | 40 |
| 0 | 0 | 0 | 0 | 0 | 0 | 0 | 0 | 0 | 0 | 0 |

| Data No. | OSC 3 timeslot | | | PWM 6timeslot | | | | | | amount of light |
|---|---|---|---|---|---|---|---|---|---|---|
| 27 | 1 | 1 | 1 | 1 | 1 | 1 | 1 | 1 | 1 | 720 |
| 26 | 0 | 1 | 1 | 1 | 1 | 1 | 1 | 1 | 1 | 680 |
| 25 | 0 | 0 | 1 | 1 | 1 | 1 | 1 | 1 | 1 | 640 |
| 23 | 1 | 1 | 1 | 1 | 1 | 1 | 1 | 1 | 0 | 620 |
| 24 | 0 | 0 | 0 | 1 | 1 | 1 | 1 | 1 | 1 | 600 |
| 22 | 0 | 1 | 1 | 1 | 1 | 1 | 1 | 1 | 0 | 580 |
| 21 | 0 | 0 | 1 | 1 | 1 | 1 | 1 | 1 | 0 | 540 |
| 19 | 1 | 1 | 1 | 1 | 1 | 1 | 1 | 0 | 0 | 520 |
| 20 | 0 | 0 | 0 | 1 | 1 | 1 | 1 | 1 | 0 | 500 |
| 18 | 0 | 1 | 1 | 1 | 1 | 1 | 1 | 0 | 0 | 480 |
| 17 | 0 | 0 | 1 | 1 | 1 | 1 | 1 | 0 | 0 | 440 |
| 15 | 1 | 1 | 1 | 1 | 1 | 1 | 0 | 0 | 0 | 420 |
| 16 | 0 | 0 | 0 | 1 | 1 | 1 | 1 | 0 | 0 | 400 |
| 14 | 0 | 1 | 1 | 1 | 1 | 1 | 0 | 0 | 0 | 380 |
| 13 | 0 | 0 | 1 | 1 | 1 | 1 | 0 | 0 | 0 | 340 |
| 11 | 1 | 1 | 1 | 1 | 1 | 0 | 0 | 0 | 0 | 320 |
| 12 | 0 | 0 | 0 | 1 | 1 | 1 | 0 | 0 | 0 | 300 |
| 10 | 0 | 1 | 1 | 1 | 1 | 0 | 0 | 0 | 0 | 280 |
| 9 | 0 | 0 | 1 | 1 | 1 | 0 | 0 | 0 | 0 | 240 |
| 7 | 1 | 1 | 1 | 1 | 0 | 0 | 0 | 0 | 0 | 220 |
| 8 | 0 | 0 | 0 | 1 | 1 | 0 | 0 | 0 | 0 | 200 |
| 6 | 0 | 1 | 1 | 1 | 0 | 0 | 0 | 0 | 0 | 180 |
| 5 | 0 | 0 | 1 | 1 | 0 | 0 | 0 | 0 | 0 | 140 |
| 3 | 1 | 1 | 1 | 0 | 0 | 0 | 0 | 0 | 0 | 120 |
| 4 | 0 | 0 | 0 | 1 | 0 | 0 | 0 | 0 | 0 | 100 |
| 2 | 0 | 1 | 1 | 0 | 0 | 0 | 0 | 0 | 0 | 80 |
| 1 | 0 | 0 | 1 | 0 | 0 | 0 | 0 | 0 | 0 | 40 |
| 0 | 0 | 0 | 0 | 0 | 0 | 0 | 0 | 0 | 0 | 0 |

700B

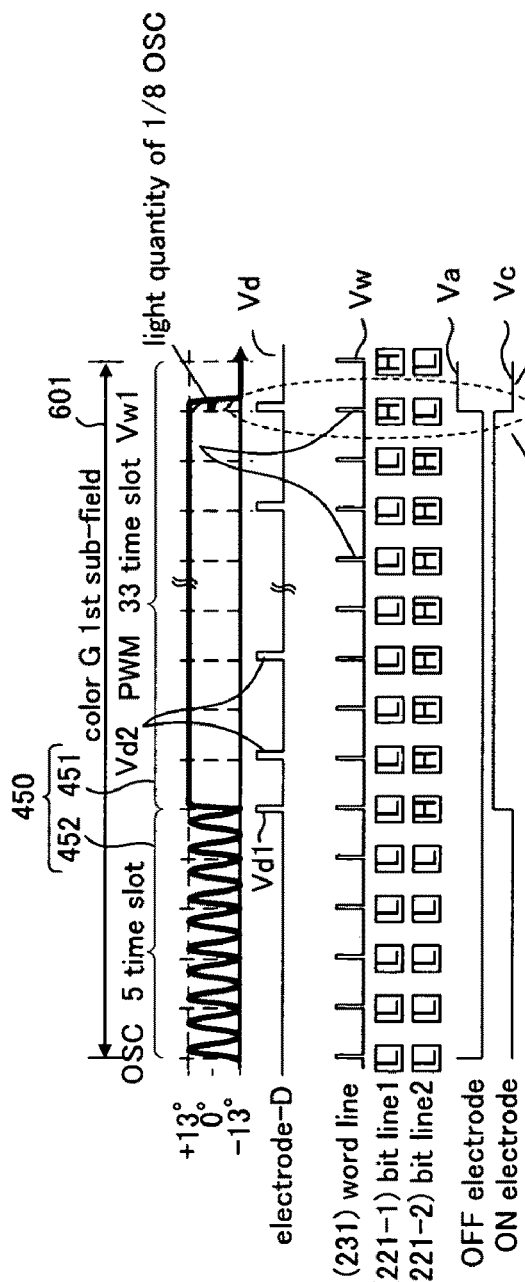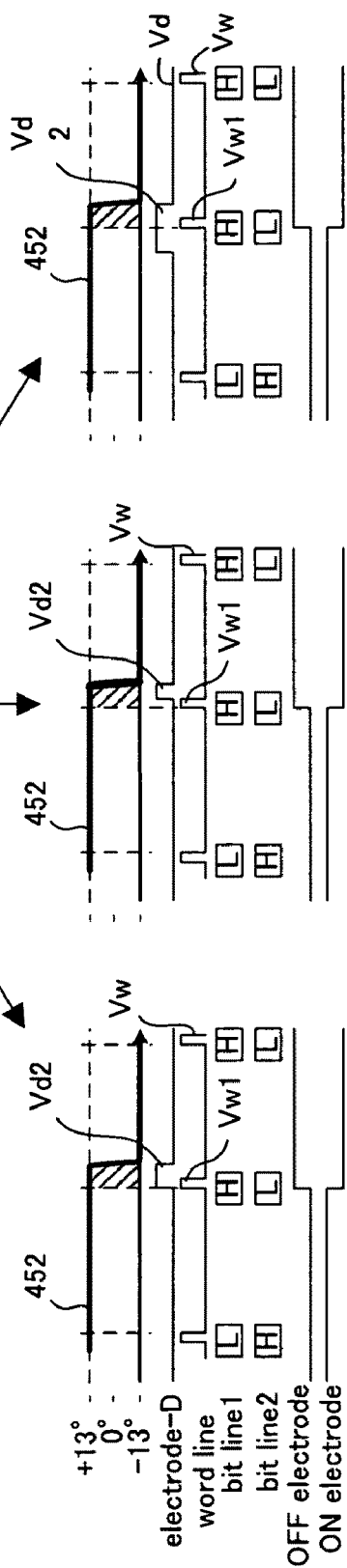
Fig. 49

SPATIAL LIGHT MODULATOR AND DISPLAY APPARATUS

CROSS REFERENCE TO RELATED APPLICATIONS

This application is a Non-Provisional Application of Application 61/192,528 and claims the Priority Date of Sep. 18, 2008. This Application is also a Continuation-in Part (CIP) Application of a Non-provisional application Ser. No. 12/004,607 filed on Dec. 24, 2007 now U.S. Pat. No. 7,646, 528. application Ser. No. 12/004,607 is a Continuation-in Part (CIP) Application of a U.S. patent application Ser. No. 11/121,543 filed on May 4, 2005, now issued into U.S. Pat. No. 7,268,932. The application Ser. No. 11/121,543 is a Continuation in part (CIP) Application of three previously filed Applications. These three Applications are Ser. No. 10/698, 620 filed on Nov. 1, 2003 now abandoned; Ser. No. 10/699, 140 filed on Nov. 1, 2003, now issued into U.S. Pat. No. 6,862,127; and Ser. No. 10/699,143 filed on Nov. 1, 2003 now issued into U.S. Pat. No. 6,903,860 by one of the Applicants of this Patent Application. The disclosures made in these Patent Applications are hereby incorporated by reference in this Patent Application.

BACKGROUND OF THE INVENTION

1. Field of the Invention

The present invention relates to an image display system and more particularly, this invention is related to a technique to a projection apparatus implemented with a spatial light modulator.

2. Description of the Related Art

After the dominance of CRT technology in the display industry for over 100 years, Flat Panel Displays (hereafter FPD) and Projection Displays have gained popularity because the FDP display implements a more compact image projecting system while projecting images on a larger display screen. Of several types of projection displays, projection displays using micro-displays are gaining recognition among the consumers because of their high picture quality and a lower cost than FPDs. There are two types of micro-displays used for projection displays on the market, i.e., micro-LCDs (Liquid Crystal Displays) and micromirror technology. Because the micromirror devices display images with an unpolarized light, the images projected by the micromirror device have a brightness superior to that of micro-LCDs, which use polarized light.

Even though there have been significant advances made in recent years in the technologies of implementing electromechanical micromirror devices as spatial light modulators (SLM), there are still limitations and difficulties when they are employed to display high quality images. Specifically, when the display images are digitally controlled, the quality of the images is adversely affected because the images are not displayed with a sufficient number of gray scale gradations.

Electromechanical micromirror devices have drawn considerable interest because of their application as spatial light modulators (SLMs). A spatial light modulator requires an array of a relatively large number of micromirrors and each of these micromirrors are controlled for modulating and projecting a display pixel. Depending on the resolution requirements of the displayed images, the number of required micromirrors ranges from 60,000 to several million for each SLM. Referring to FIG. 1A for a digital video system 1 includes a display screen 2 disclosed in a relevant U.S. Pat. No. 5,214,420. A light source 10 is used to generate light beams to project illumination for the display images on the display screen 2. The light 9 projected from the light source is further concentrated and directed toward lens 12 by way of mirror 11. Lenses 12, 13 and 14 form a beam columnator operative to columnate the light 9 into a column of light 8. A spatial light modulator 15 is controlled by a computer through data transmitted over data cable 18 to selectively redirect a portion of the light from path 7 toward lens 5 to display on screen 2. FIG. 1B shows a SLM 15 that has a surface 16 that includes an array of switchable reflective elements 17, 27, 37, and 47, each of these reflective elements is attached to a hinge 30. When the element 17 is in an ON position, a portion of the light from path 7 is reflected and redirected along path 6 to lens 5 where it is enlarged or spread along path 4 to impinge on the display screen 2 to form an illuminated pixel 3. When the element 17 is in an OFF position, the light is reflected away from the display screen 2 and, hence, pixel 3 is dark.

The on-and-off states of the micromirror control scheme as that implemented in the U.S. Pat. No. 5,214,420, and in most conventional display systems, impose a limitation on the quality of the display. Specifically, applying the conventional configuration of a control circuit limits the gray scale gradations produced in a conventional system (PWM between ON and OFF states) limited by the LSB (least significant bit, or the least pulse width). Due to the ON-OFF states implemented in the conventional systems, there is no way of providing a shorter pulse width than the duration represented by the LSB. The least intensity of light, which determines the gray scale, is the light reflected during the least pulse width. The limited levels of gray scale lead to a degradation of the display image.

Specifically, FIG. 1C exemplifies, as related disclosures, a circuit diagram for controlling a micromirror according to U.S. Pat. No. 5,285,407. The control circuit includes memory cell 32. Various transistors are referred to as "M*" where "*" designates a transistor number and each transistor is an insulated gate field effect transistor. Transistors M5, and M7 are p-channel transistors; transistors, M6, M8, and M9 are n-channel transistors. The capacitances, C1 and C2, represent the capacitive loads in the memory cell 32. The memory cell 32 includes an access switch transistor M9 and a latch 32a based on a Static Random Access switch Memory (SRAM) design. All access transistors M9 on a Row line receive a DATA signal from a different Bit-line 31a. The particular memory cell 32 is accessed for writing a bit to the cell by turning on the appropriate row select transistor M9, using the ROW signal functioning as a Word-line. Latch 32a consists of two cross-coupled inverters, M5/M6 and M7/M8, which permit two stable states, that include a state 1 when Node A is high and Node B is low, and a state 2 when Node A is low and Node B is high.

FIG. 1A shows the operations of the switching between the dual states, as illustrated by the control circuit, to position the micromirrors in an ON or an OFF angular orientation. The brightness, i.e., the gray scales of a digitally controlled image system is determined by the length of time the micromirror stays in an ON position. The length of time a micromirror is in an ON position is controlled by a multiple bit word. As a simple illustration, FIG. 1D shows the "binary time intervals" when controlling micromirrors with a four-bit word. As shown in FIG. 1D, the time durations have relative values of 1, 2, 4, 8, which in turn define the relative brightness for each of the four bits where "1" is the least significant bit and "8" is the most significant bit. According to the control mechanism as shown, the minimum controllable differences between gray scales for showing different levels of brightness is a represented by the "least significant bit" that maintains the micromirror at an ON position.

For example, assuming n bits of gray scales, one time frame is divided into 2"−1 equal time periods. For a 16.7-millisecond frame period and n-bit intensity values, the time period is 16.7/(2"−1) milliseconds.

Having established these times for each pixel of each frame, pixel intensities are quantified such that black is a 0 time period, the intensity level represented by the LSB is 1 time period, and the maximum brightness is 2"−1 time periods. Each pixel's quantified intensity determines its ON-time during a time frame. Thus, during a time frame, each pixel with a quantified value of more than 0 is ON for the number of time periods that correspond to its intensity. The viewer's eye integrates the pixel brightness so that the image appears the same as if it were generated with analogous levels of light.

For controlling deflectable mirror devices, the PWM applies data to be formatted into "bit-planes", with each bit-plane corresponding to a bit weight of the intensity of light. Thus, if the brightness of each pixel is represented by an n-bit value, each frame of data has n bit-planes. Then, each bit-plane has a 0 or 1 value for each display element. According to the PWM control scheme as described in the preceding paragraphs, each bit-plane is separately loaded and the display elements are controlled on the basis of bit-plane values corresponding to the value of each bit within one frame. Specifically, the bit-plane according to the LSB of each pixel is displayed for 1 time period.

In a mirror device configured to control the tilting of a mirror in the ON and OFF directions using address electrodes placed on either side of a cantilever (i.e., a hinge), an initiating voltage (that is, an initiating Coulomb force) for shifting the mirror from a stationary state to the ON or OFF state needs to be higher than the voltage required to shift the mirror between the ON and OFF state.

This is because elastic energy is not accumulated in the hinge in the horizontal stationary state of the mirror since the hinge is not deflected, whereas in the tilting state of the mirror, the hinge is deflected. Therefore, the elastic energy accumulated in the deflected hinge is released to contribute to driving of the mirror to shift from one tilted state to the other.

Therefore, an initiation voltage to be applied to the address electrode needs to be set high enough to generate the above described initiating Coulomb force.

However, if a larger number of pixels is packaged in a chip of a certain size to increase the definition of an image, the size of each pixel becomes proportionately smaller, and thus reducing the size of the transistor of a memory cell controlling the address electrode(s) and equipped within the aforementioned pixel, lowering the withstanding voltage and making it very difficult to secure a voltage to generate the necessary magnitude of the Coulomb force. Therefore a reduction in the initiating voltage is desirable.

Further, if the initiating voltage is high, there is a greater probability of the occurrence of stiction, a phenomenon in which the mirror becomes inoperable by being stuck to the address electrode, and there is also the technical problem of the mirror jumping greatly at the end of a shift, as a result of the speed of collision increasing when the mirror shifts to the address electrode on the ON or OFF side.

In the conventional techniques put forth by US Patent Application 20070007849, US Patent Application 20060066931, US Patent Application 20070258124, U.S. Pat. Nos. 5,903,383, 6,556,739, 6,571,029, Japanese Patent Application 2008015174, U.S. Pat. Nos. 6,778,304, and 5,096,279, only a voltage application pattern timing to an electrode(s) has been disclosed, not a specific configuration of connecting memory to the address electrode.

Specifically, in a countermeasure against the above described problems in which the electric potentials of the address electrode connected to memory are changed, the memory access speed needs to be increased, the difficulty of which increases with the number of pixels.

Further, the conventional techniques disclosed in the patents and patent applications listed above do not provide a single electrode with a countermeasure to stiction or to the above described jumping of the mirror, thus requiring separate electrodes for the above described countermeasures as well as requiring a reduced initiating voltage, all of which creates unnecessarily increases the complexity of the structure of a pixel.

SUMMARY OF THE INVENTION

An aspect of the present invention is to provide an image projection system with new and improved configuration to implement control processes to achieve a reduction in the initiating voltage for controlling and operating a deflectable mirror. The new and improved configurations and control processes further prevent stiction of the deflectable mirror to the electrodes functioning as stoppers and further prevent the deflectable mirror from jumping. The improvements in mirror operations can be achieved without requiring a more complicate control process of applying the control voltages to an address electrode or requiring a more complex mirror element structure.

A first exemplary embodiment of the present invention provides an image projection system comprising: a spatial light modulator (SLM) comprises a plurality of pixel elements, wherein each of the pixel elements further comprises a deflectable mirror, and at least a first electrode and a second electrode for controlling said deflectable mirror to deflect to different tilt angles to reflect and modulate an illumination light for displaying an image; and a controller for applying a voltage to the second electrode wherein said voltage applied in an initial operation period is different from said voltage applied in an image display period.

A second exemplary embodiment of the present invention provides the image projection system according to the first exemplary embodiment, wherein said deflectable mirror is configured to deflect along an oscillation axis and the second electrode is disposed farther away from the oscillation axis than the first electrode.

A third exemplary embodiment of the present invention provides the image projection system according to the first exemplary embodiment, wherein the second electrode is disposed farther away from the deflectable mirror than the first electrode when the deflectable mirror is operated at a horizontal angular position.

A fourth exemplary embodiment of the present invention provides the image projection system according to the first exemplary embodiment, wherein the controller applying said voltage to the second electrode according to an equation: $|Vi|>|Va|$, where "Vi" is the voltage applied during the initial operation period of the deflectable mirror and "Va" is the voltage applied during the image display period.

A fifth exemplary embodiment of the present invention provides the image projection system according to the first exemplary embodiment wherein the controller further controls a period for applying said voltage to the second electrode according to an equation: $|Ti|>|Ta|$, where "Ti" is the initial operation period of the deflectable mirror and "Ta" is the image display period of the deflectable mirror.

A sixth exemplary embodiment of the present invention provides the image projection system according to the first exemplary embodiment wherein the controller further applies said voltage with a ramp waveform to the second electrode.

A seventh exemplary embodiment of the present invention provides the image projection system according to the first exemplary embodiment, wherein the controller further applies said voltages to said first and second electrodes according to following equations:

$$|V1|<|V2|, \text{ if } S1>S2, \text{ while}$$

$$|V1|>|V2|, \text{ if } S1<S2,$$

where "S1" is an area size of the first electrode, "S2" is an area size of the second electrode, "V1" is a voltage applied to the first electrode and "V2" is a voltage applied to the second electrode during the initial operation period.

An eighth exemplary embodiment of the present invention provides the image projection system according to the first exemplary embodiment, wherein the controller applies said voltages to said first and second electrodes to generate Coulomb forces applied to the deflectable mirror according to an equation: C1<C2, where "C1" is the Coulomb force generated from the first electrode to the deflectable mirror when said first electrode is operated at a horizontal position and "C2" is the Coulomb force generated from the second electrode to the deflectable mirror when said deflectable mirror is operated at said horizontal position during the initial operation period.

A ninth exemplary embodiment of the present invention provides the image projection system according to the first exemplary embodiment further comprising a light source to emit an illuminating light to the spatial light modulator, wherein the light source is controlled to not emit said illumination light during the initial operation period.

A tenth exemplary embodiment of the present invention provides the image projection system according to the first exemplary embodiment wherein the first electrode is connected to a memory, and the second electrode is connected to a common line wherein said common line is connected to provide signals to a plurality of the pixel elements.

An eleventh exemplary embodiment of the present invention provides a n image projection system comprising a spatial light modulator (SLM) comprises a plurality of pixel elements, wherein each pixel comprises a deflectable mirror, each of said pixel elements further comprises at least a first electrode and a second electrode for controlling said deflectable mirror to deflect to different tilt angles to reflect and modulate an illumination light for displaying an image; and a controller for applying a voltage to the second electrode wherein said controller applies a different voltage when said deflectable mirror is operated at a stationary state and when the mirror is operated at a transition state.

A twelfth exemplary embodiment of the present invention provides the image projection system according to the eleventh exemplary embodiment, wherein said deflectable mirror is configured to deflect along an oscillation axis and the second electrode is disposed farther away from the oscillation axis than the first electrode.

A thirteenth exemplary embodiment of the present invention provides the image projection system according to the eleventh exemplary embodiment, wherein the second electrode is disposed farther away from the deflectable mirror than the first electrode when the deflectable mirror is operated at a horizontal angular position.

A fifteenth exemplary embodiment of the present invention provides the image projection system according to the eleventh exemplary embodiment, wherein the controller further applies said voltage with a ramp waveform to the second electrode when the deflectable mirror is operated in the transition state.

A sixteenth exemplary embodiment of the present invention provides the image projection system according to the eleventh exemplary embodiment, wherein the controller applies said voltage to the second electrode when the deflectable mirror is operated in the transition state to control a length of time of operating said deflectable mirror in the transition state.

A seventeenth exemplary embodiment of the present invention provides the image projection system according to the eleventh exemplary embodiment, wherein the controller further applies said voltage to the second electrode when the deflectable mirror is operated in the stationary state to control the deflectable mirror wherein said voltage applied to the second electrode is independent from a voltage applied to the first electrode.

An eighteenth exemplary embodiment of the present invention provides the image projection system according to the eleventh exemplary embodiment, wherein the controller applies said voltages to said first and second electrodes according to the following equations:

$$|V1|<|Vosc| \text{ if } S1>S2, \text{ and}$$

$$|V1|>|Vosc| \text{ if } S1<S2,$$

where "S1" is an area size of the first electrode, "S2" is an area size of the second electrode, "V 1" is the voltage applied to the first electrode, and "Vosc" is the voltage applied to the second electrode for operating said deflectable mirror in an intermediate oscillation state.

A nineteenth exemplary embodiment of the present invention provides the image projection system according to the eleventh exemplary embodiment, wherein the controller applies said voltages to said first and second electrodes according to the following equations:

$$|V1|\geq|Vh| \text{ if } S1>S2, \text{ and}$$

$$|V1|<|Vh| \text{ if } S1<S2,$$

where "S1" is an area size of the first electrode, "S2" is an area size of the second electrode, "V1" is the voltage applied to the first electrode, and "Vh" is the voltage applied to the second electrode to control the deflectable mirror to operate in the stationary state independent from the voltage applied to the first electrode.

A twentieth exemplary embodiment of the present invention provides the image projection system according to the eleventh exemplary embodiment, wherein the first electrode is connected to a memory, and the second electrode is connected to a common line wherein said common line is connected to provide signals to a plurality of the pixel elements.

A twenty-first exemplary embodiment of the present invention provides an image projection system comprising: a spatial light modulator (SLM) comprises a plurality of pixel elements, wherein each pixel comprises a deflectable mirror, each of said pixel elements further comprises at least a first electrode and a second electrode for controlling said deflectable mirror to deflect to different tilt angles to reflect and modulate an illumination light for displaying an image; and a controller for applying a voltage to the first and second electrodes to generate a greater Coulomb force from the second electrode than the Coulomb force from the first electrode A twenty-second exemplary embodiment of the present invention provides the image projection system according to the twenty first embodiment, wherein said deflectable mirror is configured to deflect along an oscillation axis and the second electrode is disposed farther away from the oscillation axis than the first electrode.

A twenty-third exemplary embodiment of the present invention provides the image projection system according to the twenty first embodiment, wherein the second electrode is disposed farther away from the deflectable mirror than the first electrode when the deflectable mirror is operated at a horizontal angular position.

A twenty-fourth exemplary embodiment of the present invention provides the image projection system according to the twenty first embodiment, wherein the controller applies said voltage to the second electrode when the deflectable mirror is operated in the transition state to control a length of time of operating said deflectable mirror in the transition state.

A twenty-fifth exemplary embodiment of the present invention provides the image projection system according to the twenty first embodiment, wherein the controller further applies said voltage with a ramp waveform to the second electrode.

A twenty-sixth exemplary embodiment of the present invention provides an image projection system according to the twenty first embodiment, wherein the first electrode is connected to a memory, and the second electrode is connected to a common line wherein said common line is connected to provide signals to a plurality of the pixel elements.

BRIEF DESCRIPTION OF THE DRAWINGS

The present invention is described in detail below with reference to the following Figures.

FIG. 5A is a table showing an exemplary specification of the structure of a spatial light modulation element constituting a display system according to a preferred embodiment of the present invention.

FIG. 7A is a cross-sectional diagram showing the ON state of a micromirror.

FIG. 7B is a timing diagram showing the intensity of light projected in the ON state of a micromirror.

FIG. 16 is a table showing exemplary specifications of the frame, subfield and time slot of a spatial light modulator according to a preferred embodiment of the present invention.

FIG. 27A is a diagram showing a specific exemplary setup of a gamma table used for a spatial light modulator according to a preferred embodiment of the present invention;

FIG. 28A is a diagram showing an exemplary modification of the structure of a gamma table used for a spatial light modulator according to a preferred embodiment of the present invention.

FIG. 49 is a timing diagram showing an exemplary timing diagram shown in FIG. 17A with a part of the chart enlarged.

DESCRIPTION OF THE PREFERRED EMBODIMENTS

The following is a description, in detail, of the preferred embodiment of the present invention with reference to the accompanying drawings.

Figure 1A:
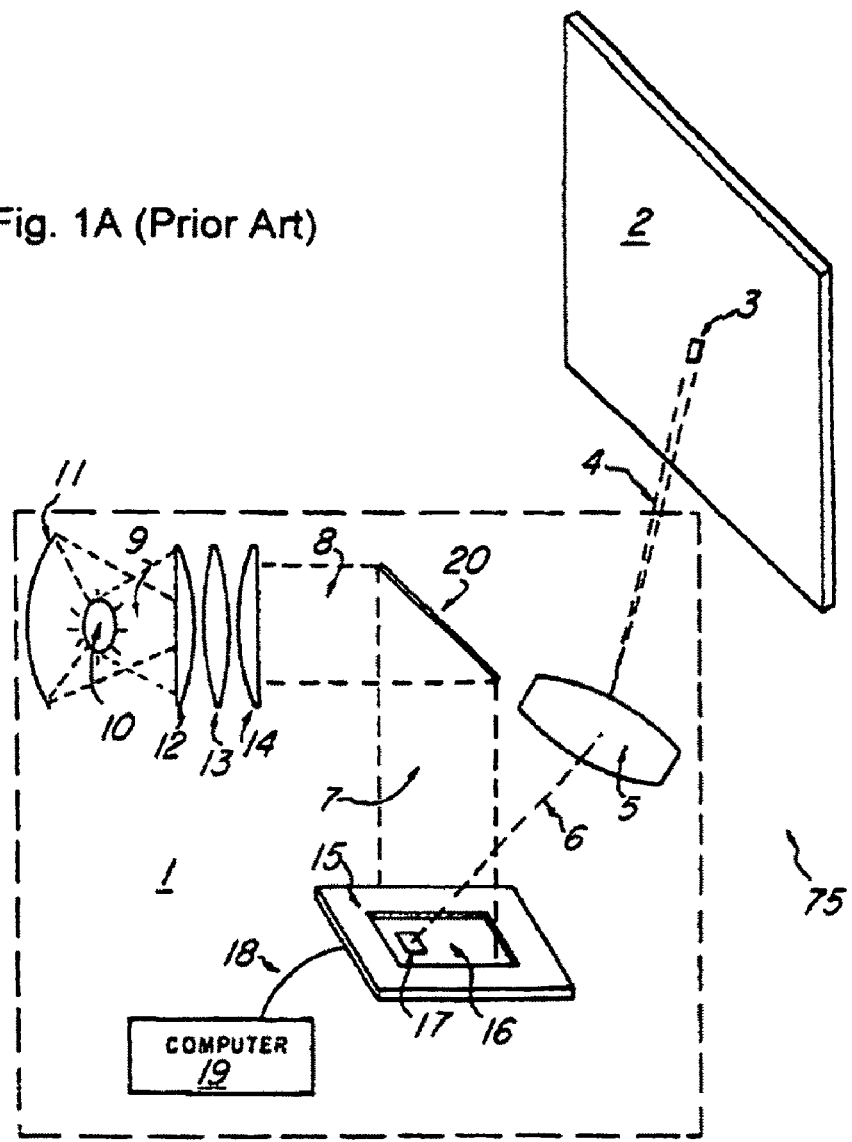
FIG. 1A illustrates the basic principle of a projection display using a micromirror device, as disclosed in a prior art patent.
Figure 1B:
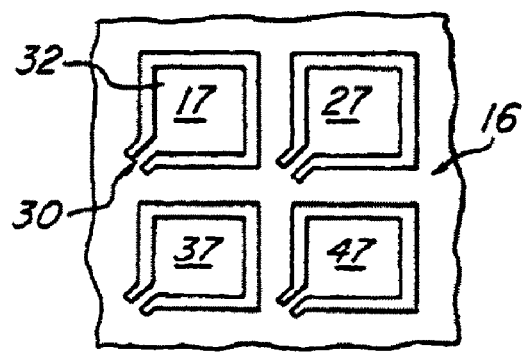
FIG. 1B is a top view diagram showing the configuration of mirror elements of a portion of a micromirror array of a projection apparatus disclosed in a prior art patent.
Figure 1C:
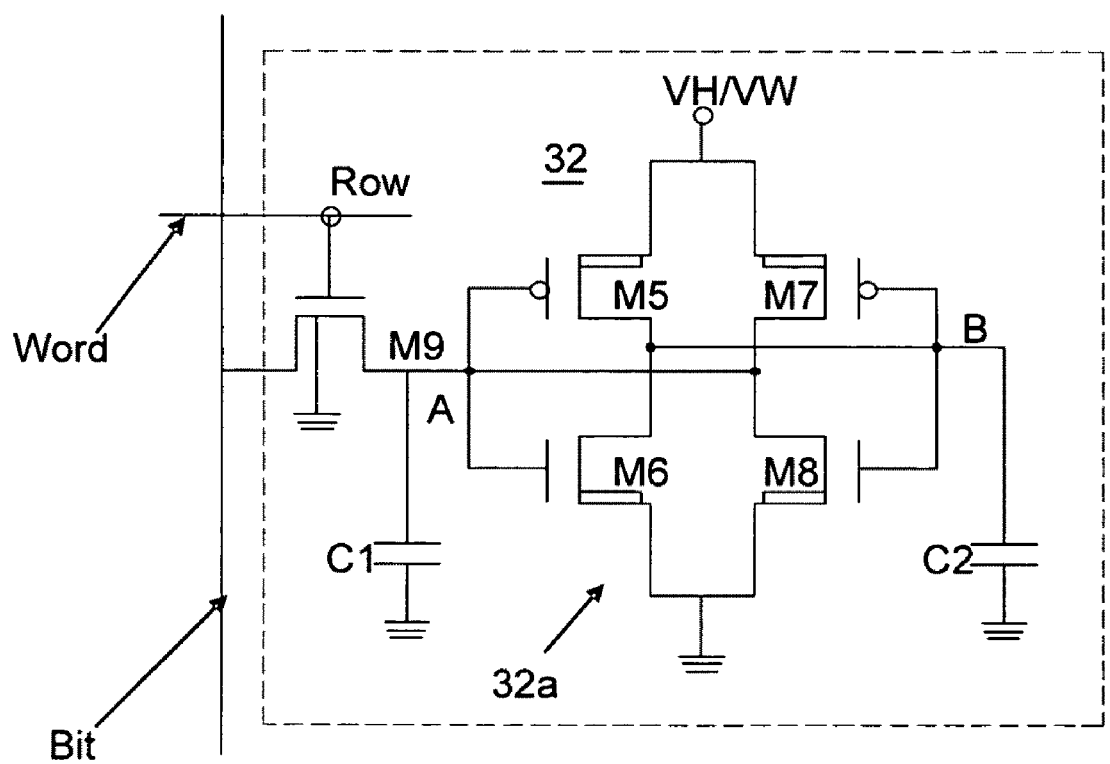
FIG. 1C is a circuit diagram showing the configuration of a drive circuit of mirror elements of a projection apparatus disclosed in a prior art patent.
Figure 1D:
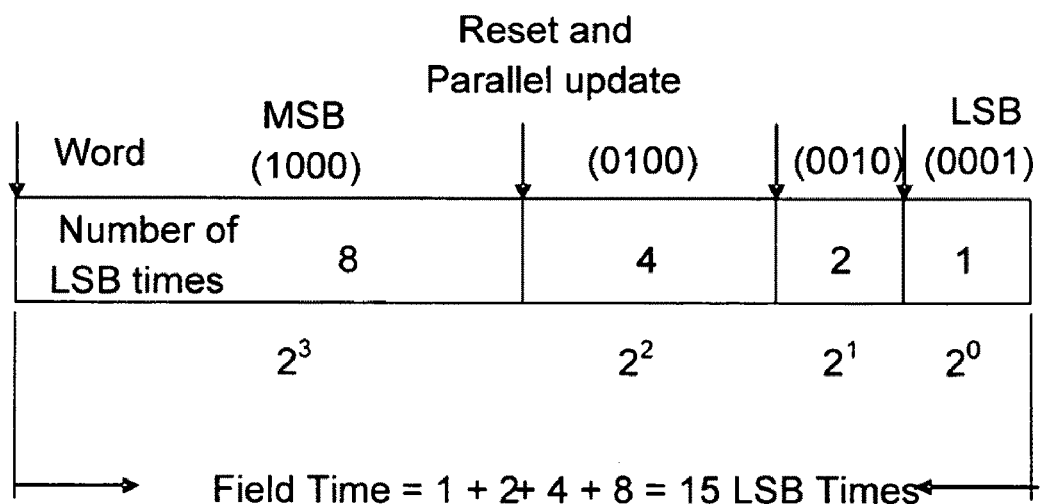
FIG. 1D shows the scheme of Binary Pulse Width Modulation (Binary PWM) of conventional digital micromirrors for generating a grayscale.
Figure 2:
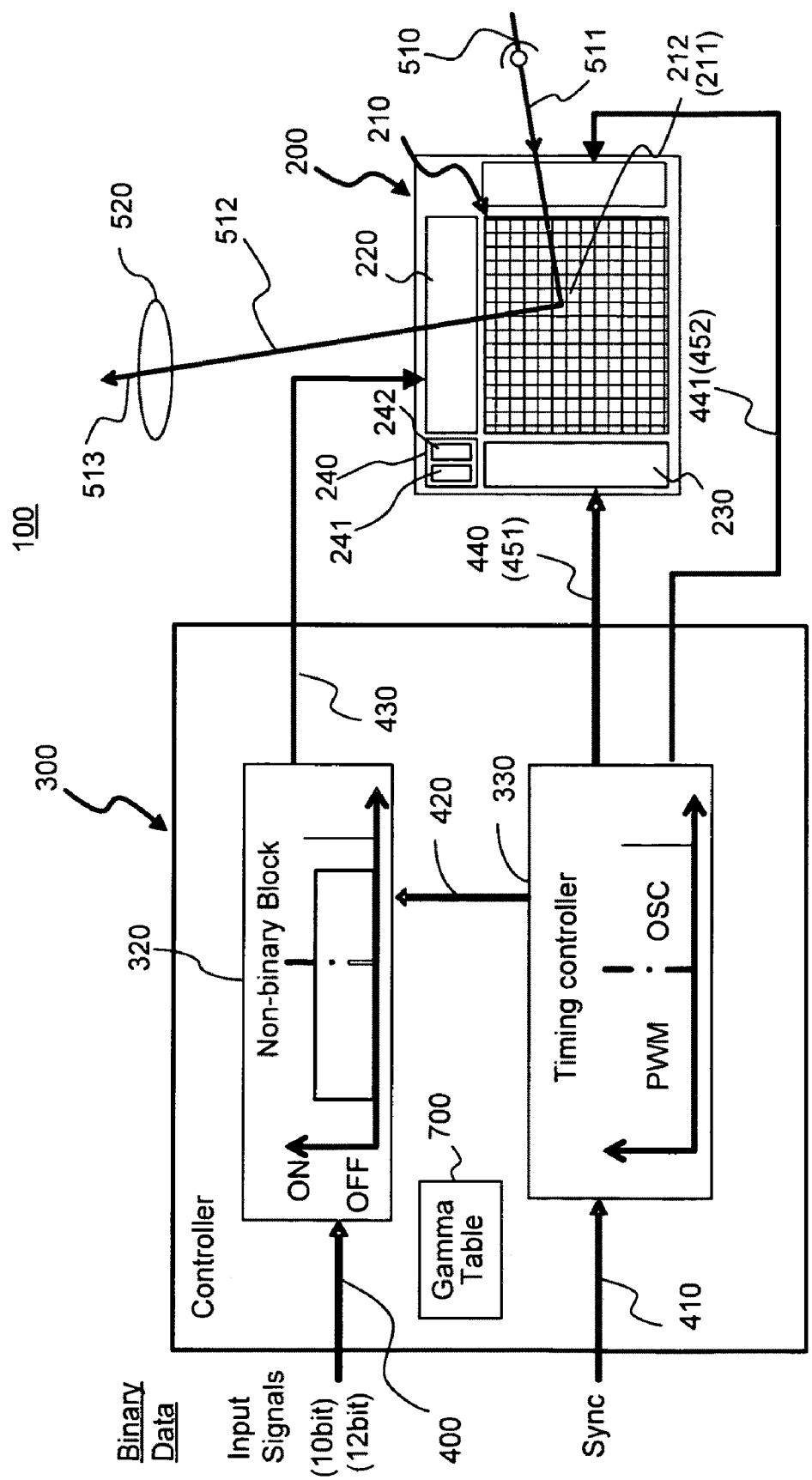
FIG. 2 is a functional block diagram showing an exemplary configuration of a display system according to a preferred embodiment of the present invention.
Figure 3:
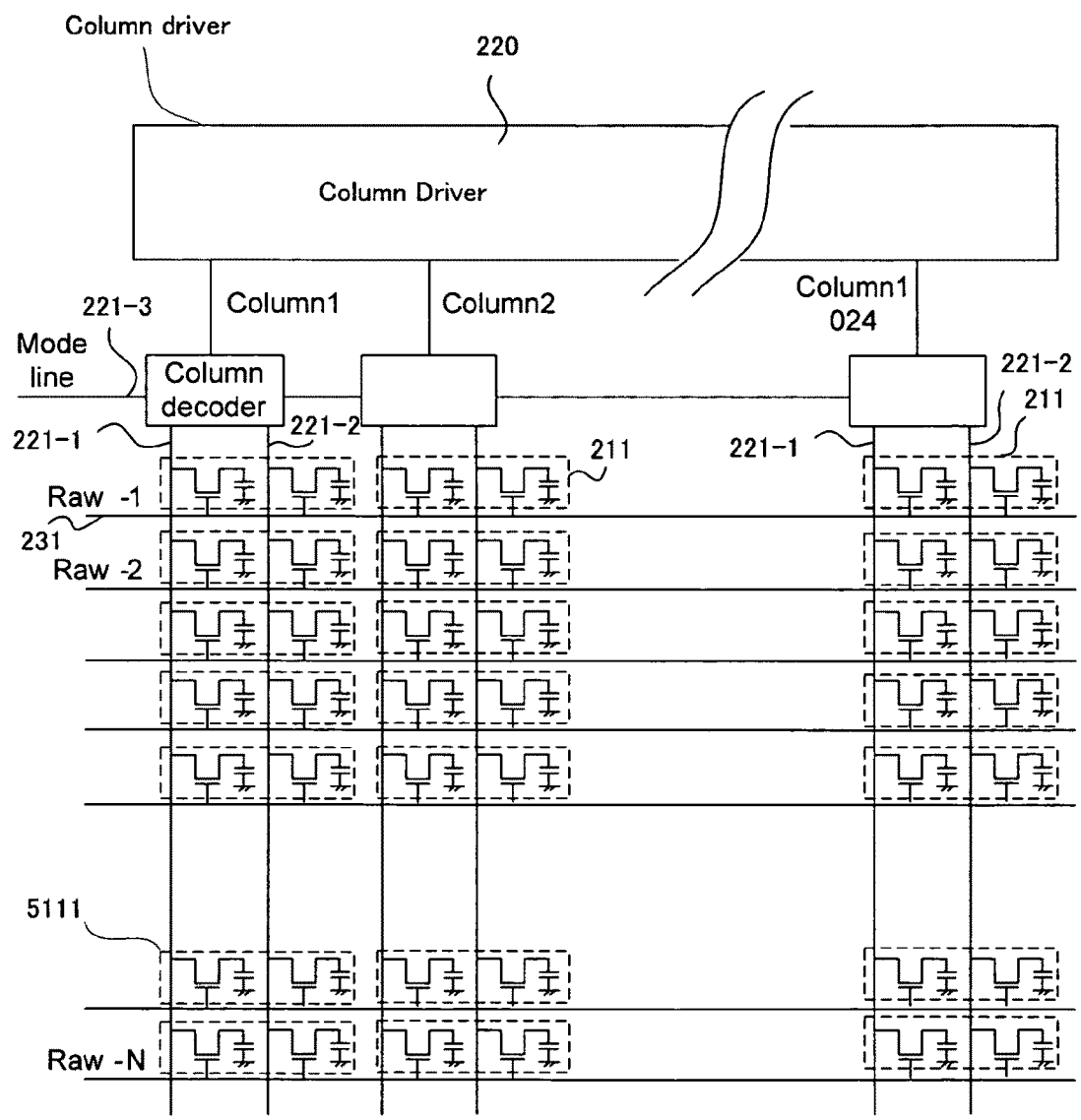
FIG. 3 is a diagram showing an exemplary configuration of a spatial light modulation element constituting a display system according to a preferred embodiment of the present invention.
Figure 4:
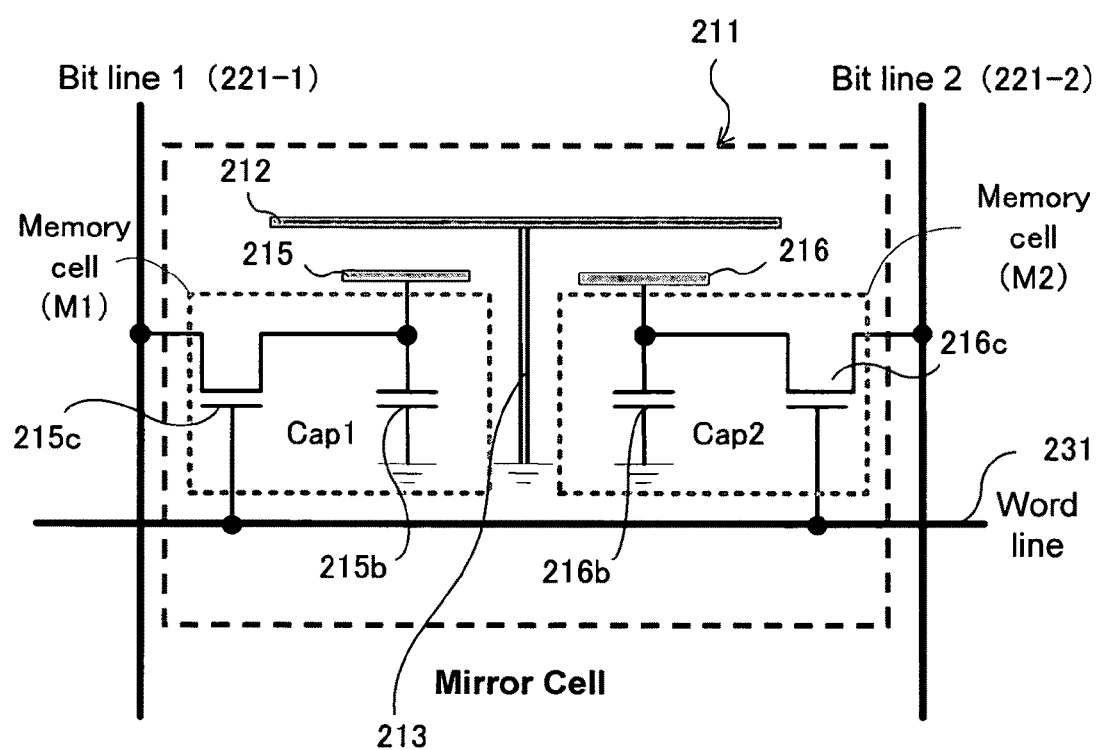
FIG. 4 is a conceptual diagram showing the configuration of an individual pixel unit constituting a spatial light modulator according to a preferred embodiment of the present invention.

FIG. 2 is a functional block diagram showing an exemplary configuration of a display system according to a preferred embodiment of the present invention. FIG. 3 is a block diagram showing an exemplary configuration of a spatial light modulation element implemented in a display system according to a preferred embodiment of the present invention. FIG. 4 is a functional circuit diagram showing an exemplary configuration of a pixel unit 211 implemented in a spatial light modulator according to the present embodiment.

The projection apparatus 100 according to the present embodiment comprises a spatial light modulator 200, a control apparatus 300, a light source 510 and a projection optical system 520.

Figure 5:
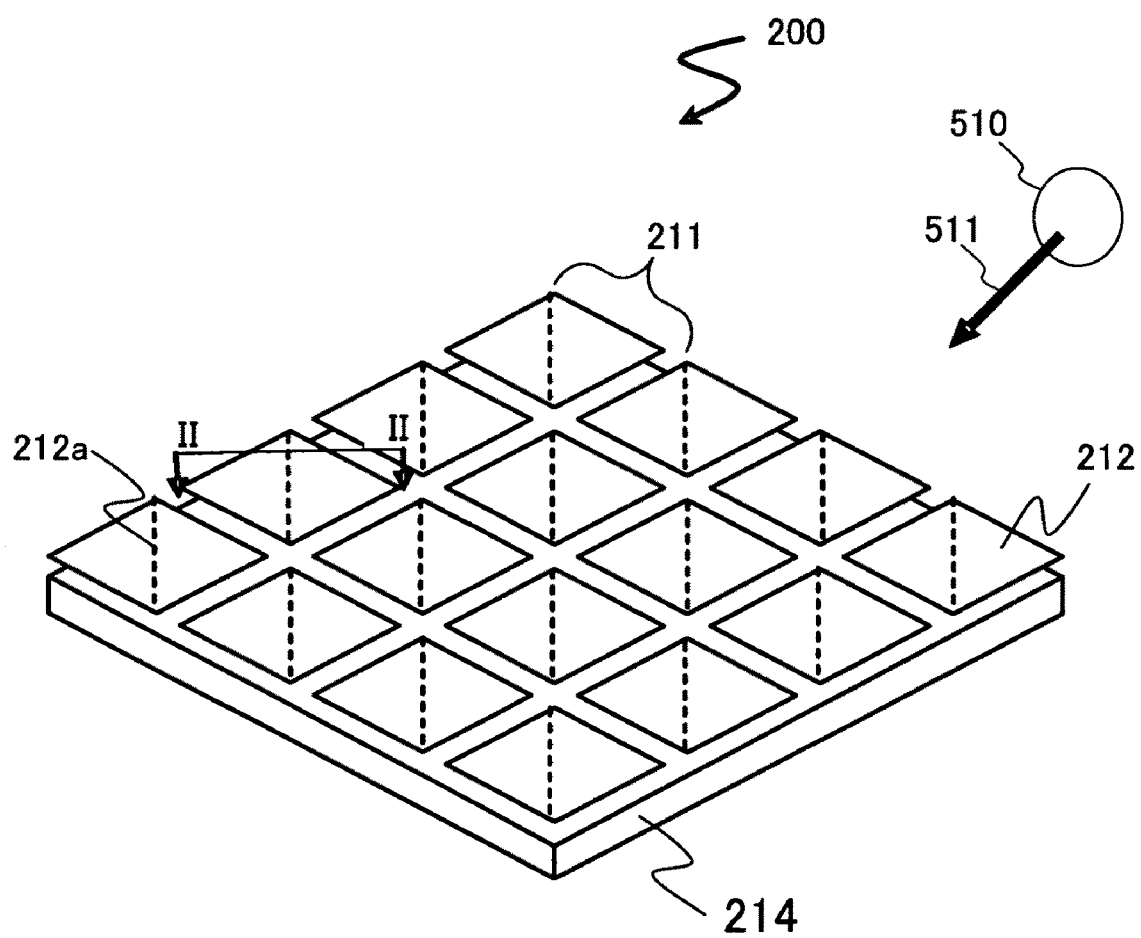
FIG. 5 is a top view for showing a diagonal perspective view of a mirror device comprised of, in two dimensions on a device substrate, a plurality of mirror elements, each controlling the reflecting direction of an incident light by the deflection of a mirror.

FIG. 5 is a top view diagram showing a diagonal perspective of a spatial light modulator in which multiple mirror elements (i.e., pixel units), which control the reflecting direction of incident light by the deflection of the mirrors, are arrayed in two dimensions on a device substrate.

As shown in FIG. 5, the spatial light modulator 200 is configured by arraying pixel units 211, each of which comprises an address electrode (not shown in the drawing), an elastic hinge (not shown in the drawing), and a square mirror 212 supported by the elastic hinge, in a two-dimensional array on a substrate 214.

The mirror 212 of one pixel unit 211 is controlled by applying a voltage to an address electrode placed on the substrate 214.

Meanwhile, the pitch (i.e., the interval) between adjacent mirrors 212 is preferably set anywhere between 4 μm and 14 μm, or more preferably between 5 μm and 10 μm, in consideration of the number of pixels ranging from a super high definition television (i.e., a full HD TV) (e.g., 2048 by 4096 pixels) to a non-full HD TV, and of the sizes of mirror devices. Specifically, the pitch is defined as the distance between the deflection axes of adjacent mirrors 212.

Specifically, the area size of a mirror 212 may be anywhere between 16 square micrometers ($\mu m^2$) and 196 $\mu m^2$, more preferably anywhere between 25 $\mu m^2$ and 100 $\mu m^2$.

FIG. 5A is a table showing an exemplary specification of the structural elements of a spatial light modulation element constituting a display system according to a preferred embodiment of the present invention.

The relationship between the pixel pitch and the transistor and capacitor of a pixel includes the combinations shown in FIG. 5A to show the relative ranges of size. The withstanding voltage of a transistor is proportional to the size as that listed in Table 5A. As for the capacitor, in a comparison between an aluminum capacitor, in which the plate is made of aluminum, and a poly-capacitor, in which the plate is made of polysilicon, the latter has a larger capacitance for the same plate area size.

Referring to the combination number G1 shown in FIG. 5A, if one piece of dynamic random access memory (DRAM) is comprised for each of the ON and OFF zones of a mirror 212 with an 8-μm pixel pitch, two transistors possessing a 12-volt withstanding voltage will occupy the MOS substrate of the pixel zone. Therefore, the capacitors (i.e., OFF capacitor 215b and ON capacitor 216b) of the memory (i.e., memory cells M1 and M2) are exemplarily configured to place two aluminum capacitors between the transistors (i.e., gate transistors 215c and 216c) and the MEMS unit (i.e., mirror 212, hinge 213 and address electrodes (i.e., OFF electrode 215 and ON electrode 216)).

The combination number G2 shown in FIG. 5A is an exemplary configuration comprising one piece of DRAM memory in only the OFF zone of an 8 μm pixel pitch mirror and placing one transistor having a 12-volt withstanding voltage and one capacitor for a piece of memory on the substrate in the pixel zone. This circuit configuration is described later for FIG. 34. Compared to the configuration of G1, the configuration of G2 has the advantages of reducing the number of masks used in the photolithography process and reducing the number of transistors by half thus improving the production yield.

The configuration of the combination number G3 shown in FIG. 5A is the result of changing, from that of G2, the withstanding voltage of the transistor to 24 volts and using an aluminum capacitor. The increase in the withstanding voltage of the transistor can further strengthen a hinge that may be required as a countermeasure to achieve the purpose of antistiction.

The respective configurations of the other combination numbers G4, G5 and G6 which are shown in FIG. 5A are obtained by reducing the sizes of the respective configurations of the above described G1, G2 and G3.

Note that the form of the mirror 212 or the pitch between the adjacent mirrors is arbitrary.

In FIG. 5, the dotted line shows the deflection axis 212a for deflecting the mirror 212. An incident light 511 emitted from a coherent light source 510 is incident along a perpendicular or diagonal direction relative to the deflection axis 212a of the mirror 212. The light source 510 may be implemented with a laser light source to emit a coherent characteristic.

The following are descriptions of the configuration and operation of one pixel unit 211 with reference to the cross-sectional diagram, along the line II-II, of the pixel unit 211 of the spatial light modulator 200 shown in FIG. 5.

FIG. 4 is an outline diagram of the cross-section, along the line II-II, of one mirror element of the spatial light modulator shown in FIG. 5.

As shown in FIGS. 3, 4 and other figures, the spatial light modulator 200 according to the present embodiment comprises the pixel array 210, bit line driver unit 220 and word line driver unit 230.

In the pixel array 210, pixel units 211 are positioned in a grid where individual bit lines 221 extending vertically from the bit line driver unit 220 cross individual word lines 231 extending horizontally from the word line driver unit 230.

As shown in FIG. 4, each pixel unit 211 comprises a mirror 212 which tilts freely while supported on the substrate 214 by a hinge 213.

An OFF electrode 215 (and an OFF stopper 215a) and the ON electrode 216 (and an ON stopper 216a) are positioned symmetrically across the hinge 213 that comprises a hinge electrode 213a on the substrate 214.

When a predetermined voltage is applied to the OFF electrode 215, it attracts the mirror 212 with a Coulomb force and tilts the mirror 212 so that it abuts the OFF stopper 215a. This causes the incident light 511 to be reflected to the light path of an OFF position, which is not aligned with the optical axis of the projection optical system 130.

When a predetermined voltage is applied to the ON electrode 216, it attracts the mirror 212 with a Coulomb force and tilts the mirror 212 so that it abuts the ON stopper 216a. This causes the incident light 311 to be reflected to the light path of an ON position, which is aligned with the optical axis of the projection optical system 130.

An OFF capacitor 215b is connected to the OFF electrode 215 and to the bit line 221-1 by way of a gate transistor 215c that is constituted by a field effect transistor (FET) and the like.

Further, an ON capacitor 216b is connected to the ON electrode 216, and to the bit line 221-2 by way of a gate transistor 216c, which is constituted by a field effect transistor (FET) and the like. Opening and closing of the gate transistor 215c and gate transistor 216c are controlled through the word line 231.

Specifically, one horizontal row of pixel units 211 that are lined up with an arbitrary word line 231 are simultaneously selected, and the charging and discharging of capacitance to and from the OFF capacitor 215b and ON capacitor 216b are controlled by way of the bit lines 221-1 and 221-2, and thereby the individual ON/OFF controls of the micromirrors 212 of the respective pixel units 211 of one horizontal row are carried out.

In other words, the OFF capacitor 215b and gate transistor 215c on the side of the OFF electrode 215 constitute a memory cell M1 that is a so called DRAM structure.

Likewise, the ON capacitor 216b and gate transistor 216c on the side of the ON electrode 216 constitute a DRAM-structured memory cell M2.

With this configuration, the tilting operation of the mirror 212 is controlled in accordance with the presence and absence of writing data to the respective memory cells of the OFF electrode 215 and ON electrode 216.

As shown in FIG. 2, the light source 510 illuminates the spatial light modulator 200 with the incident light 511, which is reflected by the individual micromirrors 212 as a reflection light 512. The reflection light 512 then passes through a projection optical system 520 and is projected, as projection light 513.

A control apparatus 300, according to the present embodiment, controlling the spatial light modulator 200 uses the ON/OFF states (i.e., an ON/OFF modulation) and oscillating state (i.e., an oscillation modulation) of the mirror 212, thereby attaining an intermediate gray scale.

A non-binary block 320 generates non-binary data 430 used for controlling the mirror 212 by converting an externally inputted binary video signal 400 into non-binary data. In this event, one LSB is different between the period of ON/OFF states of the mirror 212 and the period of intermediate oscillating state.

A timing control unit 330 generates, on the basis of a synchronous signal 410 (Sync), a drive timing 420, which is used for the non-binary block 320, and also generates a PWM drive timing 440 and an OSC drive timing 441, both of which are used for the mirror 212.

Figure 6:
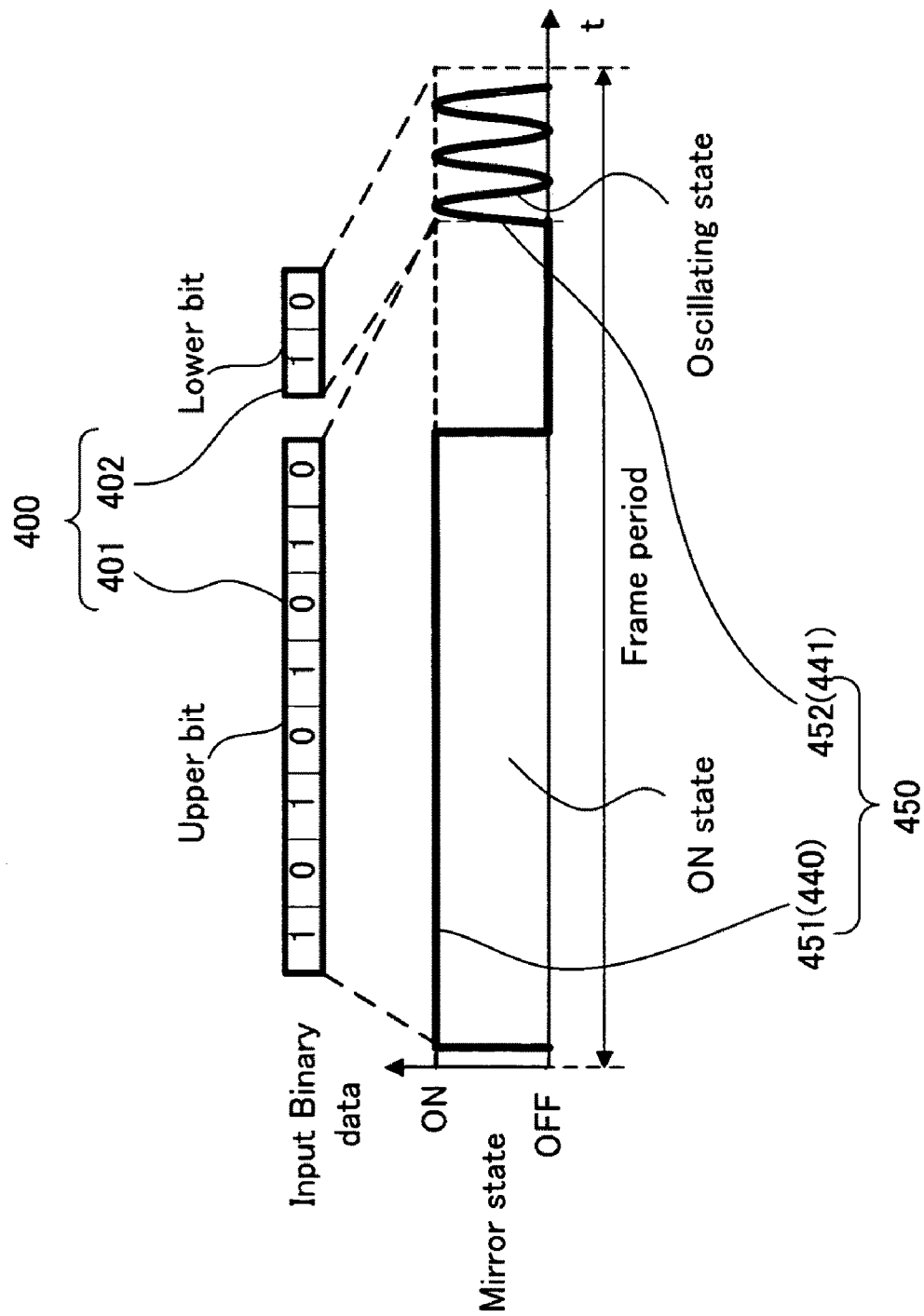
FIG. 6 is a timing diagram showing an exemplary mirror control profile used in a display system according to a preferred embodiment of the present invention.

As shown in FIG. 6, the present embodiment is configured such that a desired number of bits of the upper bits 401 of the binary video signal 400 is assigned to the ON/OFF control pattern 451 of a mirror control profile 450 and the remaining lower bits 402 is assigned to an oscillation control pattern 452. Further, according to the present embodiment, the control is such that the ON/OFF (positioning) state is controlled by the PWM drive timing 440 from the timing control unit 330 and the non-binary data 430, while the oscillating state is controlled by the PWM drive timing 440 and OSC drive timing 441 from the timing control unit 330 and the non-binary data 430.

Next is a description of the basic control of the mirror 212 of the spatial light modulator 200 according to the present embodiment.

Note that "Vx (1, 0)" indicates an application of a predetermined voltage Vx to the OFF electrode 215 and no application of voltage to the ON electrode 216 in the following description. Similarly, "Vx (0, 1)" indicates no application of voltage to the OFF electrode 215 and an application of a voltage Vx to the ON electrode 216.

"Vx (0, 0)" indicates no application of voltage to either the OFF electrode 215 or ON electrode 216. "Vx (1, 1) indicates the application of a voltage Vx to both the OFF electrode 215 and ON electrode 216.

FIGS. 7A, 7B, 7C, 7D, 7E and 7F show the configuration of the pixel unit 211 comprising the mirror 212, hinge 213, OFF electrode 215 and ON electrode 216, and a basic example in which the mirror 212 is controlled under an ON/OFF state and under an oscillating state.

FIG. 7A shows the mirror 212 tilted from the neutral state to the ON state by being attracted to the ON electrode 216 as a result of applying a predetermined voltage (i.e., Vx (0, 1)) to only the ON electrode 216. In the ON state of the mirror 212, the reflection light 512, by way of the mirror 212, is captured by the projection optical system 520 and projected as a projection light 513. FIG. 7B shows the intensity of light projected in the ON state.

Figure 7D:
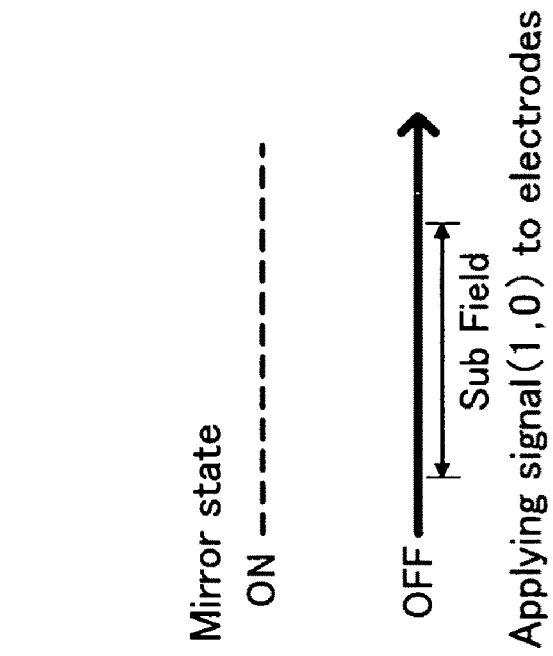
FIG. 7D is a timing diagram showing the intensity of light projected in the OFF state of a micromirror.
Figure 7C:
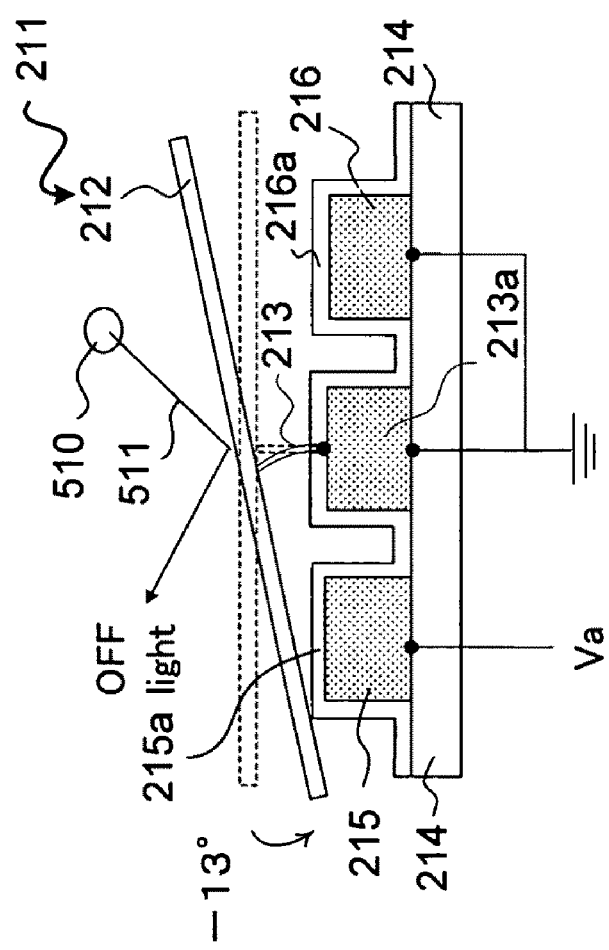
FIG. 7C is a cross-sectional diagram showing the OFF state of a micromirror.

FIG. 7C shows the mirror 212 tilted from the neutral state to the OFF state by being attracted to the OFF electrode 215 as a result of applying a predetermined voltage (i.e., Vx (1, 0)) to only the OFF electrode 215. In the OFF state of the mirror 212, the reflection light 512 is deflected from the projection optical system 520, and therefore does not constitute a projection light 513. The far right side of FIG. 7B shows the intensity of light projected in the OFF state. FIG. 7D shows the intensity of light projected in the OFF state.

Figures 7E, 7F:
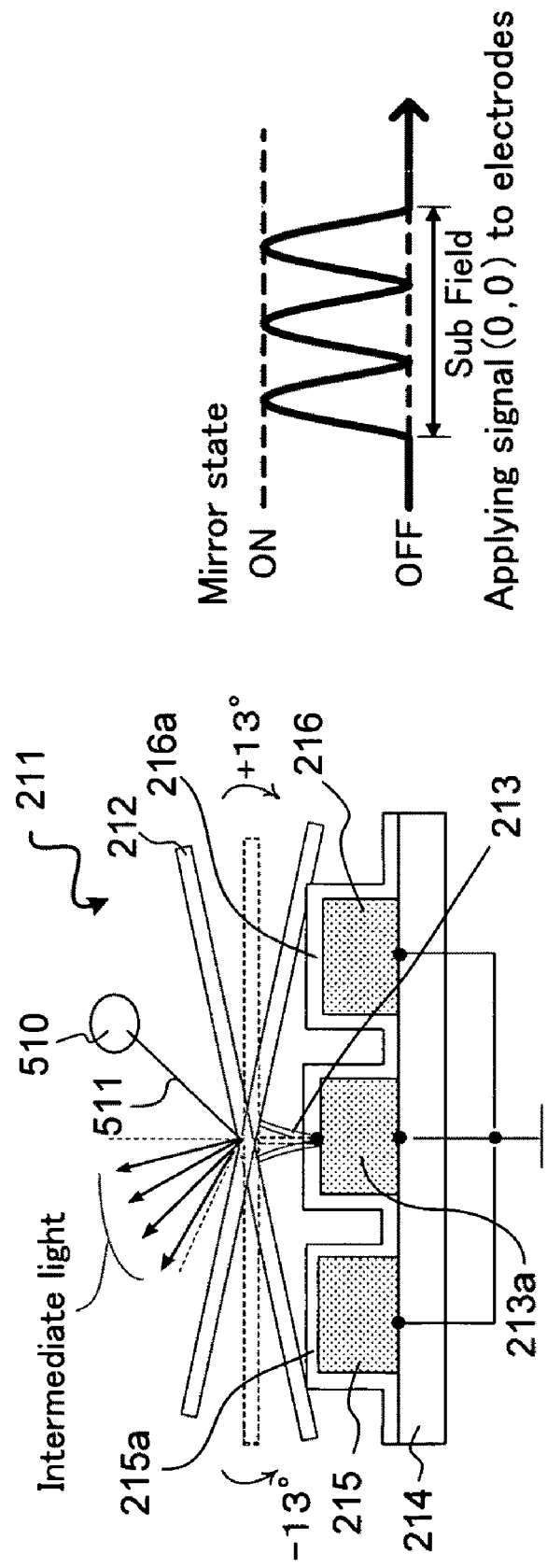
FIG. 7E is a cross-sectional diagram showing the oscillating state of a micromirror.
FIG. 7F is a timing diagram showing the intensity of light projected in the oscillating state of a micromirror.

FIG. 7E exemplifies a case of the mirror 212 performing a free oscillation in the maximum amplitude of A0 between a tilted position (i.e., a Full ON) in contact with the ON electrode 216 and another tilted position (i.e., a Full OFF) in contact with the OFF electrode 215 (at Vx (0, 0)).

An incident light 511 is illuminated on the mirror 212 at a prescribed angle, and the intensity of light resulting from the incident light 511 reflecting in the ON direction and a portion of the light (i.e. the intensity of light of the reflection light 512) reflecting in a direction that is between the ON direction and OFF direction are incident to the projection optical system 520 so as to be projected as projection light 513. FIG. 7F shows the intensity of light projected in an oscillating state.

That is, in the ON state of the mirror 212 shown in FIG. 7A, the flux of light of the reflected reflection light 512 is directed in the ON direction so as to be captured almost entirely by the projection optical system 520 and projected as the projection light 513.

In the OFF state of the mirror 212 shown in FIG. 7C, the reflection light 512 is directed in an OFF direction away from the projection optical system 520, and thus a light projected as a projection light 513 does not exist.

In the oscillating state of the mirror 212 shown in FIG. 7E, a portion of the light flux of the reflection light 512, diffraction light, diffusion light and the like are captured by the projection optical system 520 and projected as a projection light 513.

Note that the examples shown in FIGS. 7A, 7B, 7C, 7D, 7E and 7F described above have been described for a case of applying the voltage Vx represented by a binary value of "0" or "1" to each of the OFF electrode 215 and ON electrode 216. Alternatively, a more minute control of the tilting angle of the mirror 212 is available by increasing the steps of the magnitude of Coulomb force generated between the mirror 212 and the OFF electrode 215 or ON electrode 216 by increasing the steps of the voltage values Vx to multiple values.

Also note that the examples shown in FIGS. 7A, 7B, 7C, 7D, 7E and 7F described above have been described for a case of setting the mirror 212 (i.e., the hinge electrode 213a) at the ground potential. Alternatively, a more minute control of the tilting angle of the mirror 212 may also be achieved by applying an offset voltage thereto.

The present embodiment is configured to apply the voltages, i.e., Vx (0, 1), Vx (1, 0) and Vx (0, 0), at appropriate timings in the midst of the tilting of the mirror 212 between the ON and OFF states so as to generate a free oscillation in an amplitude that is smaller than the maximum amplitude between the ON and OFF states, thereby accomplishing a more minute gray scale.

The following shows a method for displaying a video image using the projection apparatus 100 according to the present embodiment shown in the above described FIG. 2.

Non-binary data 430, a PWM drive timing 440 and an OSC drive timing 441 are generated when a binary video signal 400 and a synchronous signal 410 are inputted into the control apparatus 300.

The non-binary block 320 and timing control unit 330 calculate, for each mirror of the SLM constituting a pixel of the video image of a frame, the period of time for controlling each mirror 212 under an ON state and under an oscillating state or the number of oscillations within one frame of a video image, in accordance with the binary video signal 400 and the drive timing 420 generated by the timing control unit 330 from the synchronous signal 410. The non-binary block 320 and timing control unit 330 also generate non-binary data 430, a PWM drive timing 440 and an OSC drive timing 441.

Specifically, the non-binary block 320 and timing control unit 330 that are comprised in the control apparatus 300 use the ratio of the intensity of a projection light 513 obtained by oscillating a predetermined mirror 212 in an oscillation time T to the intensity of a projection light 513 obtained by controlling the mirror 212 under an ON state during the oscillation time T, and calculate the period of time for controlling the mirror 212 under an ON state, the period of time for controlling the mirror 212 under the oscillating state or the number of oscillations during the period.

The non-binary block 320 and timing control unit 330 carry out the ON/OFF control and oscillation control for each of the mirrors 212 constituting one frame of video image using non-binary data 430, PWM drive timing 440 and OSC drive timing 441, all of which are generated on the basis of the calculated value of the time or the number of times of oscillation.

Figure 8:
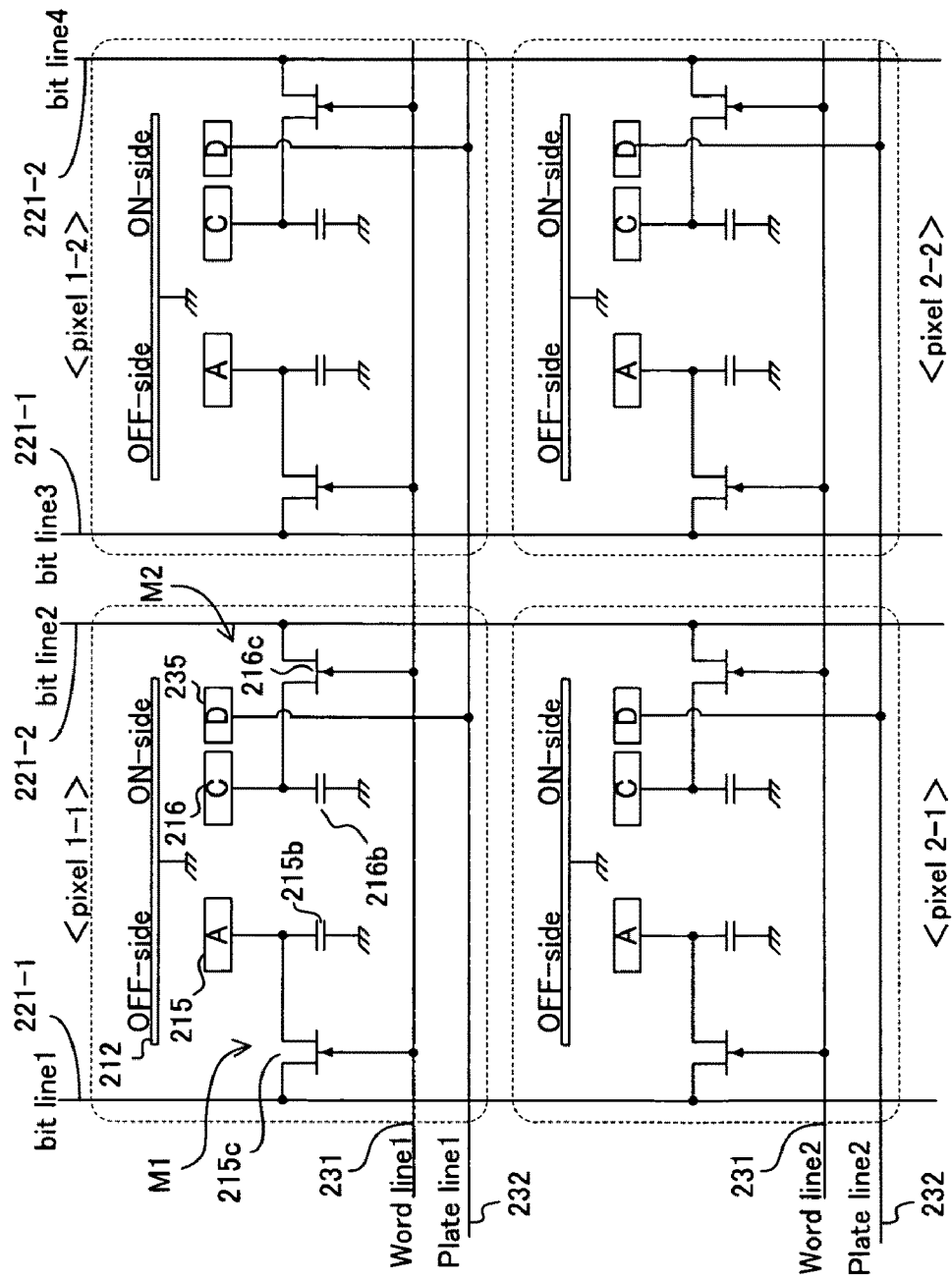
FIG. 8 is a functional circuit diagram showing an exemplary configuration of a pixel unit constituting the pixel array of a spatial light modulator according to a preferred embodiment of the present invention.

Next is a description of the pixel unit 211 that constitutes the pixel array 210 of the spatial light modulator 200 according to the present embodiment, with reference to FIG. 8, with the above described configuration in mind.

In contrast to the pixel unit 211 according to the configuration shown in the above described FIG. 4, in which one pixel is equipped with one mirror, two electrodes and two DRAM-structured memory cells, the present embodiment 1 is configured to add plate lines 232 (PL-n; where "n" is the number of ROW lines) to the respective ROW lines and position the second ON electrode 235 (i.e., the electrode D) connected to the plate lines 232 close to the ON electrode 216.

In the case of each pixel unit 211 constituting the pixel array 210 according to the present embodiment, a memory cell on one side, the memory for controlling the mirror 212, is a simple DRAM-structured requiring only one transistor, and therefore, it is possible to suppress the structure of the memory cell from becoming large even with the addition of the plate line 232 and second ON electrode 235. Therefore a high definition projection image may be achieved by arraying a large number of pixel units 211 within a pixel array 210 of a more limited size.

Furthermore, as described below, a gray scale representation may be drastically expanded by the addition of the plate line 232 and second ON electrode 235.

In other words, image projection with a high definition and a high grade of gray scale may be achieved by applying a projection technique implemented with a spatial light modulator with a configuration and control process described according to the spatial light modulator 200.

Figure 9:
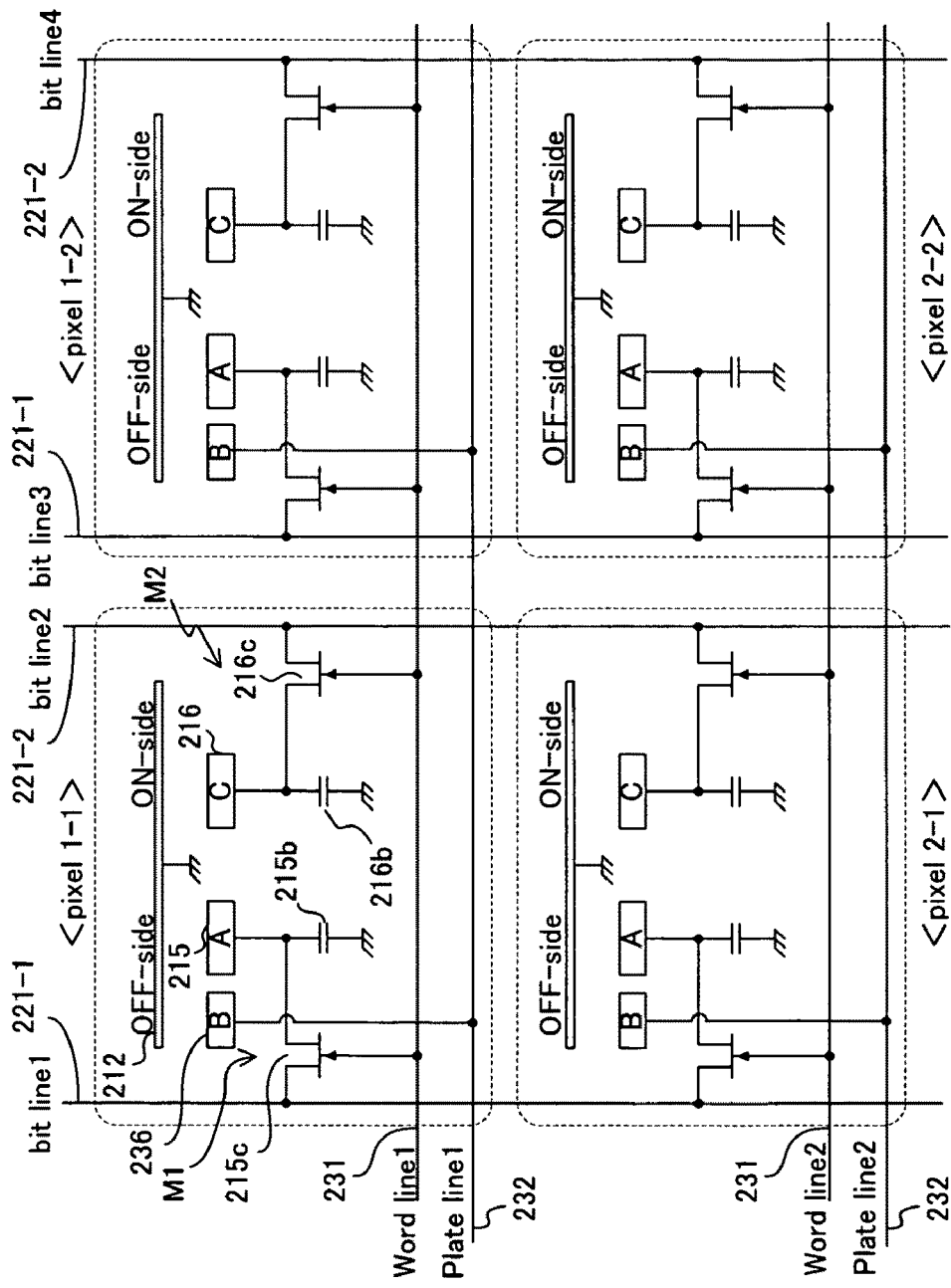
FIG. 9 is a functional circuit diagram showing an exemplary modification of the configuration of the pixel unit shown in FIG. 8.

FIG. 9 is a conceptual diagram showing an exemplary modification of the configuration of the pixel unit 211 shown in the above described FIG. 8. The configuration shown in FIG. 9 shows the case of placing a second OFF electrode 236 (i.e., an electrode B) on the side of the OFF electrode and connecting it to the plate line 232.

A spatial light modulator comprising the pixel unit configured as shown in FIG. 9 is not designed as a different type of the spatial light modulator from the configuration described in FIG. 8. It is possible to attain the same operation with the spatial light modulator configuration of FIG. 8 as that of the spatial light modulator configuration of FIG. 9 by changing the direction of incident light by 180 degrees in the horizontal plane of the mirror and by inverting the image to be displayed 180 degrees in the plane of the image.

As a result, the following operations using the configuration of FIG. 9 can also be achieved with the configuration of FIG. 8.

In this case, the ON electrode 216 (i.e., the electrode C), second ON electrode 235 (i.e., the electrode D) and OFF electrode 215, which are shown in FIG. 8, perform the operations corresponding to the respective operations of the OFF electrode 215, second OFF electrode 236 (i.e., the electrode B) and ON electrode 216. With this configuration, the electrode that is not connected to memory changes roles by temporarily retaining the mirror in order to increase the number of gray scale levels by controlling the direction of incident light and by generating an intermediate oscillation of the mirror.

Figure 10:
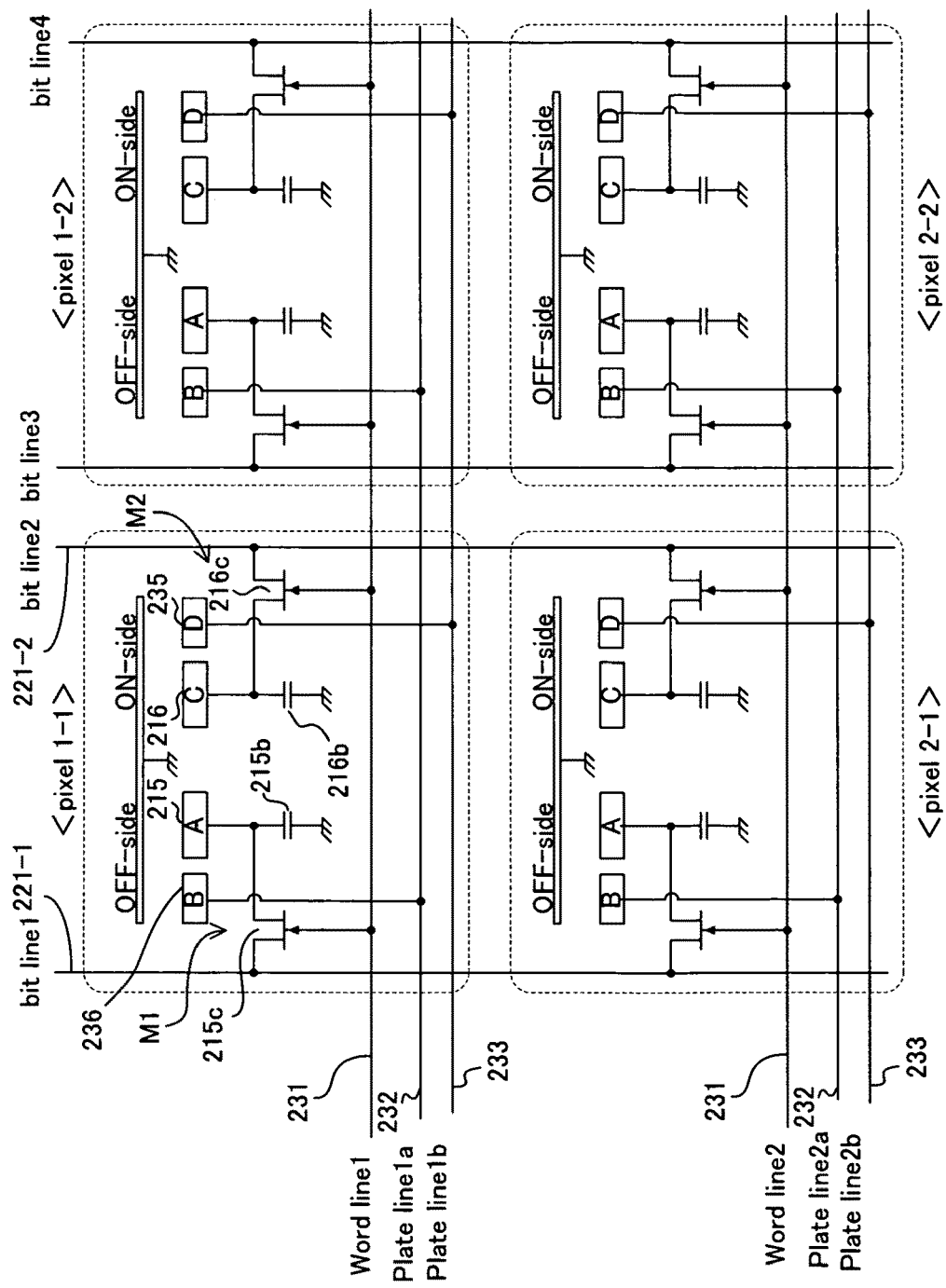
FIG. 10 is a functional circuit diagram showing another exemplary modification of the configuration of the pixel unit shown in FIG. 8.

FIG. 10 is a conceptual diagram showing another exemplary modification of the configuration of the pixel unit 11 shown in the above described FIG. 8.

The exemplary modification shown in FIG. 10 exemplifies the configuration of placing a second ON electrode 235 (i.e., the electrode D) and a second OFF electrode 236 (i.e., the electrode B) respectively on the ON side and OFF side of the mirror 212 and connecting them, respectively, to a plurality of second plate lines 233 and a plurality of plate lines 232.

Figure 11:
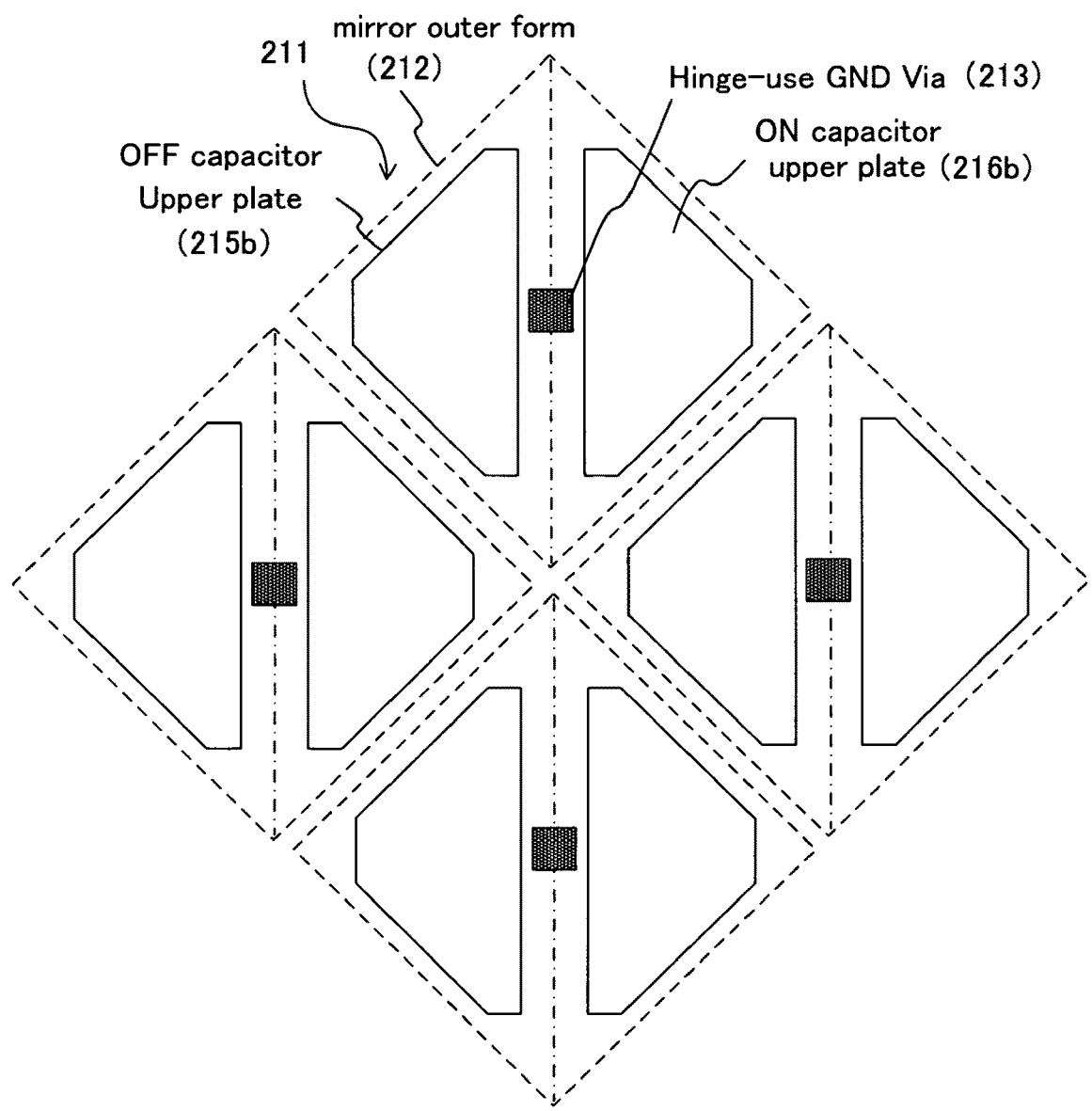
FIG. 11 is a top view diagram depicting the layout of the capacitor used in the exemplary modification of a pixel unit of a display system according to a preferred embodiment of the present invention.

FIG. 11 is a top view diagram showing an exemplary layout of the OFF capacitor 215b and ON capacitor 216b of the pixel unit 211 used in the exemplary configuration shown in FIG. 8. Specifically, FIG. 11 shows the formation of the layer of the OFF capacitor 215b and ON capacitor 216b as viewed from the top of the mirror 212.

The OFF capacitor 215b and ON capacitor 216b are positioned in the regions obtained by dividing the placement region of the rectangular pixel unit 211 into two parts in the diagonal direction.

Figure 12A:
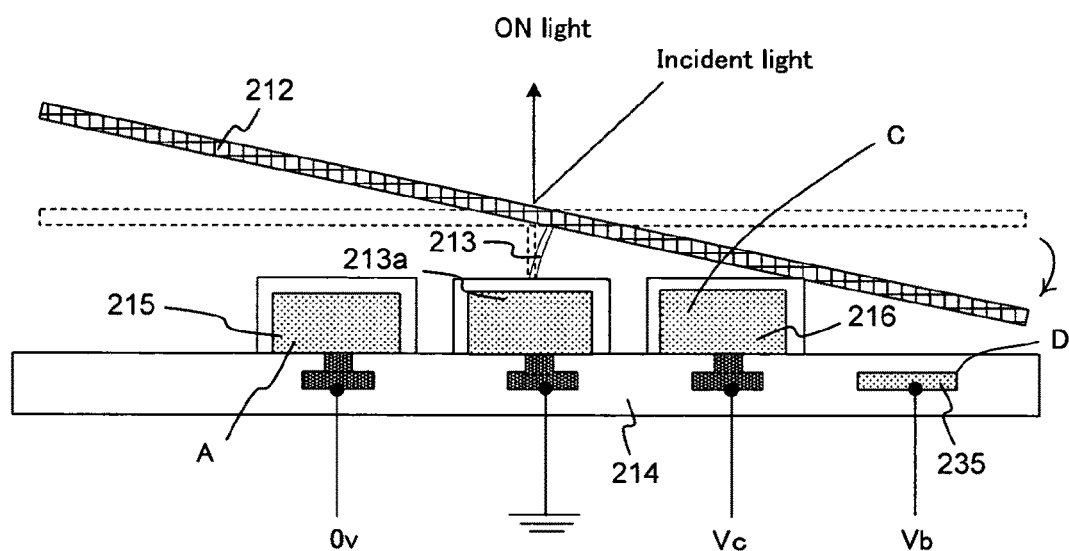
FIG. 12A is a cross-sectional diagram, in the ON state, of a pixel unit comprising two electrodes on the ON side, as shown in FIG. 8.
Figure 12B:
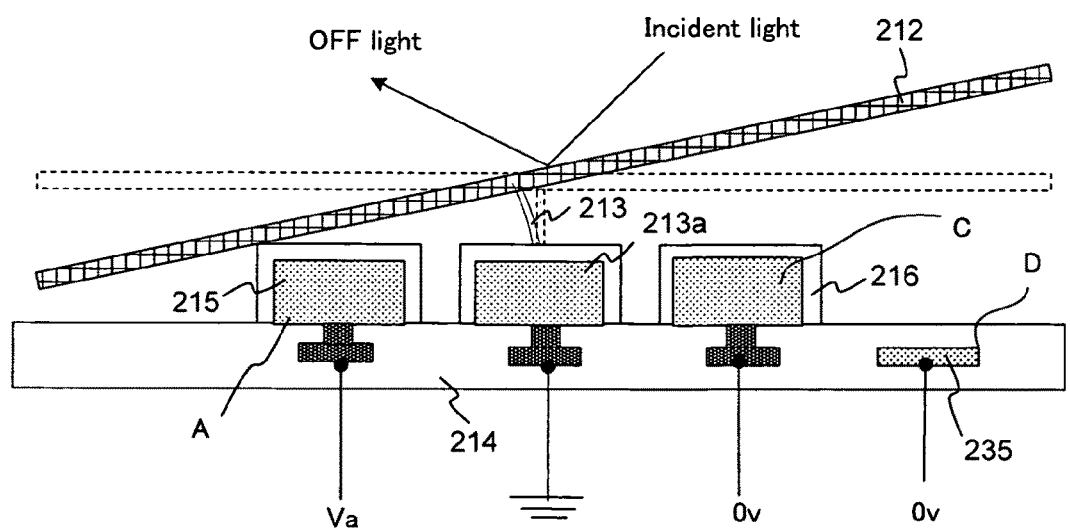
FIG. 12B is a cross-sectional diagram, in an OFF state, of a pixel unit comprising two electrodes on the ON side, as shown in FIG. 8.

FIGS. 12A and 12B are cross-sectional diagrams of an ON state and OFF state, respectively, which are related to the pixel unit 211, configured as shown in FIG. 8. The symbols assigned in FIGS. 12A and 12B follow the same conventions as that described in FIG. 8.

Figure 12C:
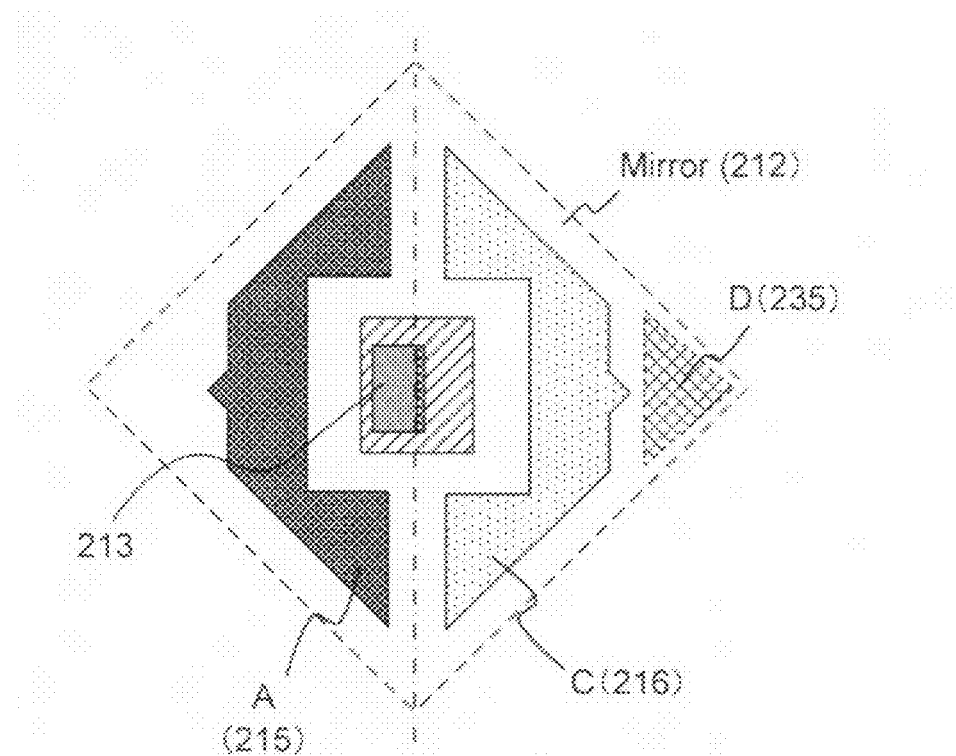
FIG. 12C is an illustrative top view diagram showing an exemplary layout of the second ON electrode that is added to the pixel unit, as shown in FIG. 8.
Figure 12D:
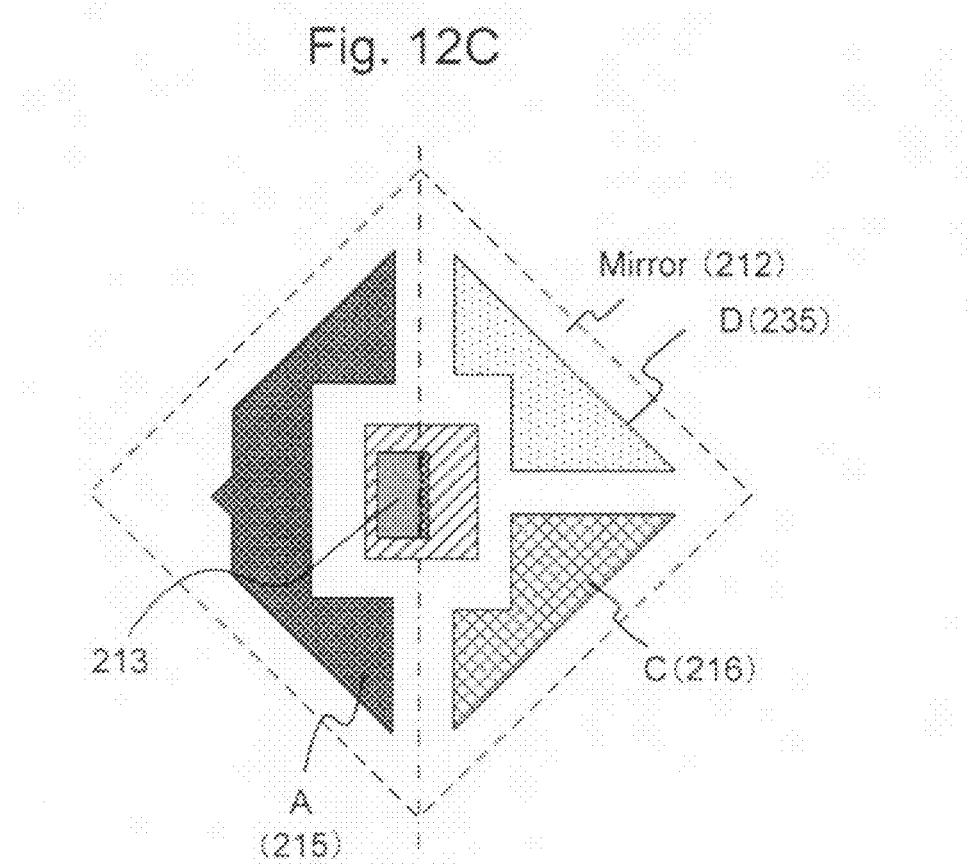
FIG. 12D is an illustrative top view diagram showing another exemplary layout of the second ON electrode that is added to the pixel unit, as shown in FIG. 8.

FIGS. 12C and 12D are illustrative top view diagrams showing an exemplary layout of the added second ON electrode 235.

FIG. 12C shows an exemplary configuration that positions the OFF electrode 215 (i.e., an electrode A) and ON electrode 216 (i.e., an electrode C) at approximately symmetrical positions, sandwiching a hinge 213 that is positioned on the diagonal line of the rectangular placement region of a pixel unit 211, and that positions a small triangular second ON electrode 235 (i.e., an electrode D) on the outside of the ON electrode 216.

Note that the pixel unit 211, according to the exemplary modification shown in FIG. 9, is configured so that the second OFF electrode 236 (i.e., the electrode B) would be positioned on the outside of the OFF electrode 215 (i.e., the electrode A) in a similar configuration to that shown in FIG. 12C.

FIG. 12D shows an exemplary configuration that divides the ON electrode 216, shown in FIG. 12C, into two parts, the aforementioned ON electrode 216 (i.e., the electrode C) and the second ON electrode 235 (i.e., an electrode D).

Note that the pixel unit 211, according to the exemplary modification shown in FIG. 10, is configured so that the placement region of the OFF electrode 215 would be divided into two parts and allocated to the OFF electrode 215 and second OFF electrode 236 shown in a similar configuration to that shown in FIG. 12D.

Figure 13:
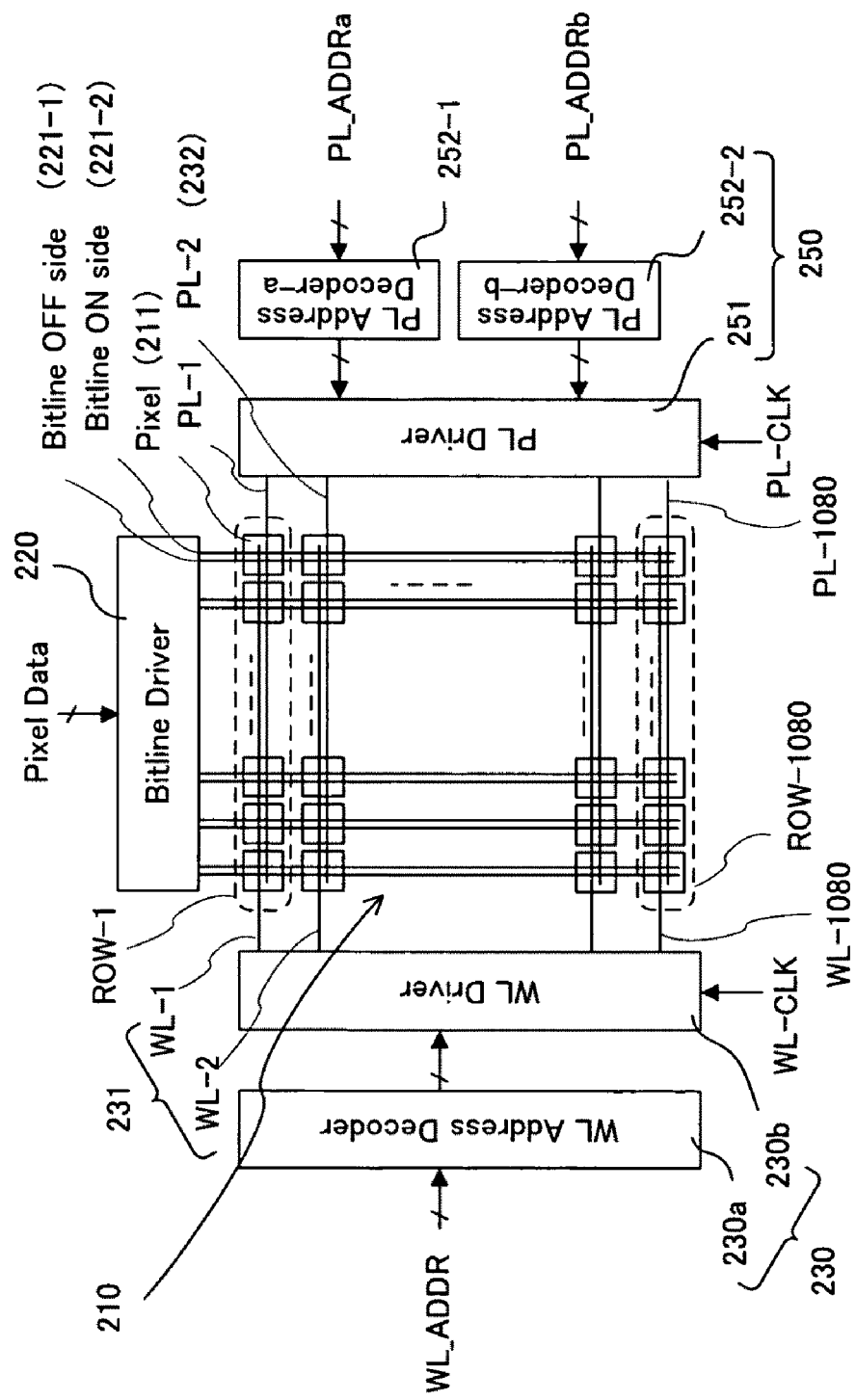
FIG. 13 is a functional circuit diagram showing an exemplary layout of the peripheral circuit of the pixel array used for a display system according to a preferred embodiment of the present invention.

FIG. 13 shows an exemplary layout of the control circuit of the pixel array 210 arraying the pixel unit 211 shown in FIG. 8.

Specifically, a plate line driver unit 250 used for controlling the plate line 232 (i.e., the second plate line 233) has been added to the configuration of the pixel array 210 shown in the above described FIG. 3.

Specifically, this embodiment is configured to add the plate line driver unit 250 in the surroundings of the pixel array 210, in addition to comprising the bit line driver unit 220 and word line driver unit 230.

The word line driver unit 230 is constituted by a first address decoder 230a and a word line driver 230b, which are used for selecting a word line 231 (WL).

The plate line driver unit 250 is constituted by a plate line driver 251, a plate line address decoders 252-1 and 252-2, all of which are used for selecting a plate line 232 (PL).

Each pixel unit 211 is connected to the bit lines 221-1 and 221-2 of the bit line driver unit 220 (Bitline driver) so that data is written to the pixel unit 211 belonging to the ROW line selected by the word line 231 (WL).

A signal produced by an external input data though a serial word line (WL_ADDR 1) connected in parallel to an address decoder 230a (WL Address Decoder). A word line driver 230b (WL Driver) converts the input data into a designated voltage and applies the voltage to the word line 231 (WL).

Furthermore, the plate line 232 (PL) controls the ON electrode 216 of each pixel unit 211 y separately from the word line 231 (WL).

A plate line driver 251 (PL driver) converts the external input data PL_ADDRa or PL_ADDRb through series data line into a predefined voltage and apply the voltage through parallel signal lines to the plate line address decoder 252-1 (PL Address Decoder-a) and plate line address decoder 252-2 (PL Address Decoder-b) for selectively applied the signals to the plate line 232 (PL).

Specifically, the number of ROW lines, constituted by a plurality of pixel units 211 lined up horizontally, may be configured to be, for example, at least 720 lines or more.

In such a case, a data signal input to the memory cells M1 and M2 from each of the bit lines 221-1 and 221-2 is transmitted to one ROW line memory at 23 nsec or lower speed.

That is, in order to process 720 ROW lines by dividing and assigning a display period into four colors red (R), green (G), blue (B) and white (W) at the rate of 60 frames per second, with each color in 256-bit gray scale, the transmission speed is as follows:

1/60 [sec]/4 [divisions]/256 [bit gray scale]/720 [lines]=22.6 nsec.

Further, in order to process 1080 ROW lines by dividing, and assigning, a display period into three colors R, G and B at the rate of 60 frames per second, with each color in 256-bit gray scale, the transmission speed is as follows:

1/60/3/256/1080=20 nsec.

Figure 14:
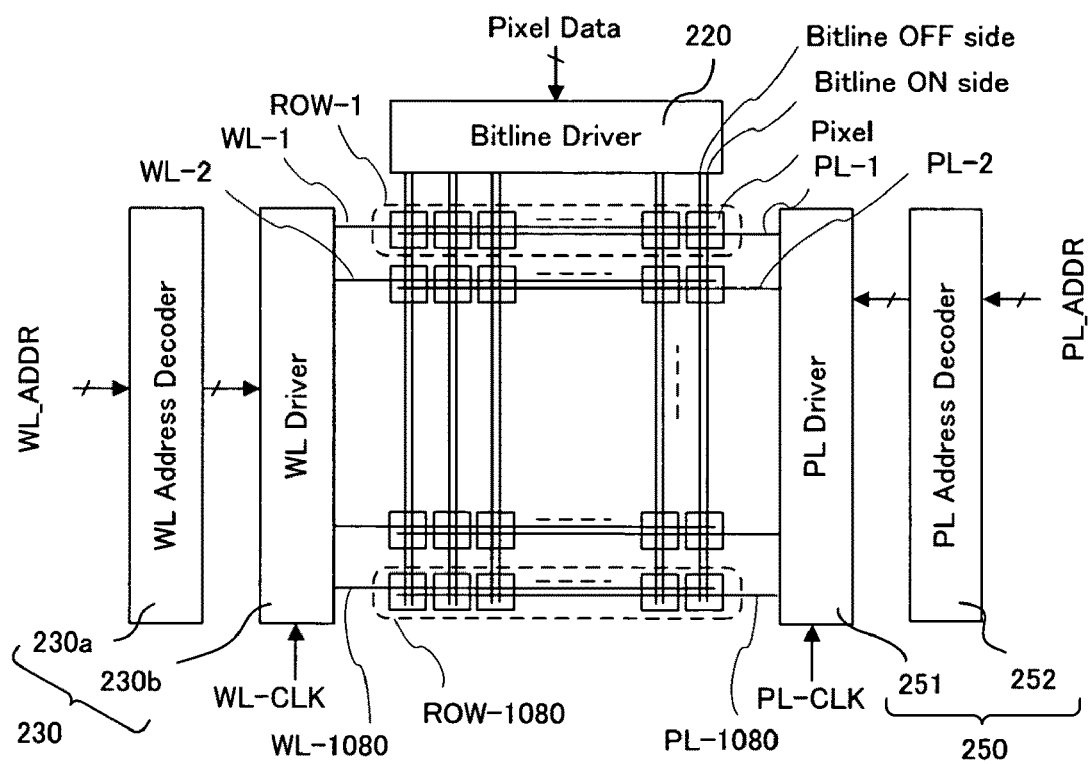
FIG. 14 is a functional circuit diagram showing an exemplary layout of the peripheral circuit describing the operation in accordance with the timing diagram showing the function of the pixel unit shown in FIG. 8.

FIG. 14 shows an example of the connecting relationship between the address decoder and bit line driver unit 220 (Bitline driver), which are used for selecting a word line 231 (WL) and a plate line 232 (PL) in the pixel array 210.

As shown in FIG. 14, it is simpler to connect one plate line address decoder 252-1 to the plate line driver 251 than to connect two plate line address decoders 252-1 and 252-2, as shown in FIG. 13

Figure 15A:
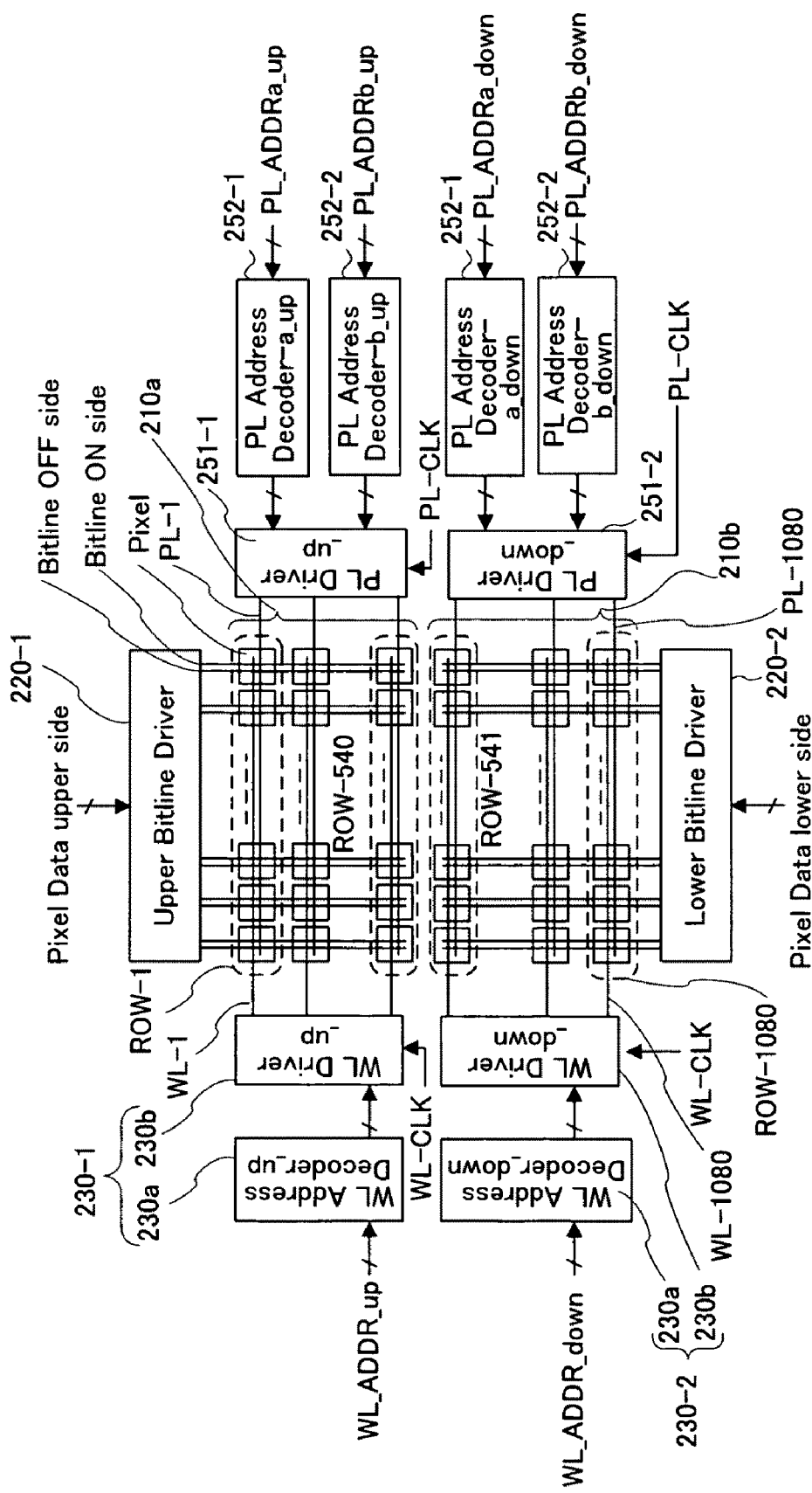
FIG. 15A is a functional circuit diagram showing an exemplary modification of the layout configuration of the peripheral circuit of a pixel array according to a preferred embodiment of the present invention.

FIG. 15A is a conceptual diagram showing an exemplary modification of the configuration of the pixel array 210 according to the present embodiment.

The configuration shown in FIG. 15A divides a plurality of ROW lines (ROW-1 through ROW-1080) into upper and lower groups (i.e., an upper row line area 210a and a lower row line area 210b), and comprises, for each group, an upper bit line driver part 220-1 and a lower bit line driver part 220-2 (Bitline Driver), a first address decoder 230a and a word line driver 230b (WL Address Decoder_up and WL Driver_up, WL Driver_down and WL Driver_down), a plate line driver 251-1 and a plate line address decoder 252-1, a plate line address decoder 252-2 (PL Address Decoder-a_up, b_up and PL Driver_up, PL Address Decoder-a_down, b_down and PL Driver_up, down).

That is, a plurality of row lines are divided into the upper row line area 210a, which is constituted by the row lines ROW-1 through ROW-540, and the lower row line area 210b, which is constituted by the row lines ROW-541 through ROW-1080.

In this case, the level change (i.e., the voltage Vd) of the plate line 232 is accomplished by changing the plate line address decoder 252-1 changing to H level and the plate line address decoder 252-2 to L level.

Figure 15B:
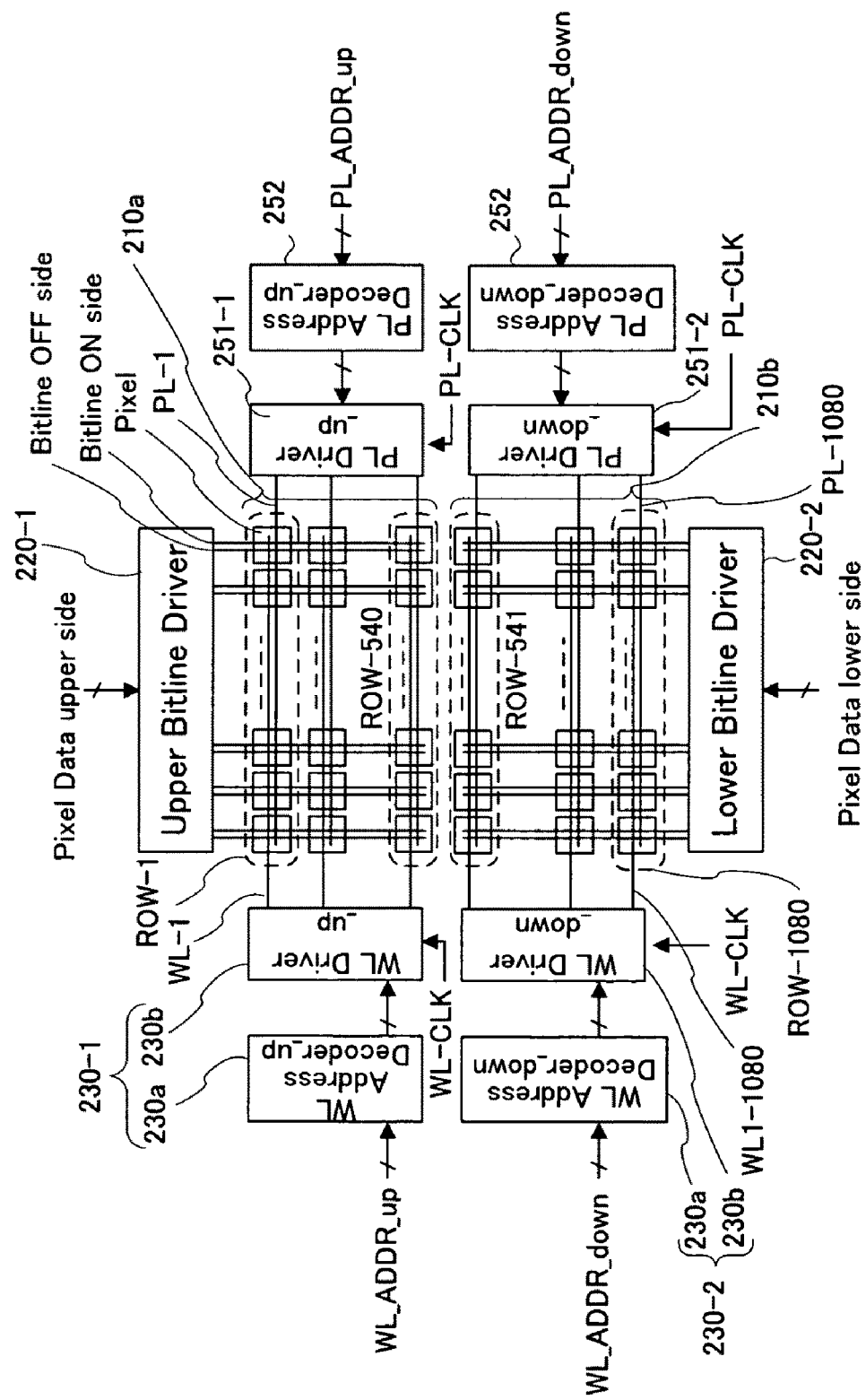
FIG. 15B is a functional circuit diagram showing an exemplary modification of the layout configuration of the peripheral circuit of a pixel array according to a preferred embodiment of the present invention.

FIG. 15B shows an exemplary configuration in which the plate line driver 251-1 (PL Driver_up) and plate line driver 251-2 (PL Driver_down) that are equipped, respectively, for the upper and lower ROW line groups is equipped with one plate line address decoder 252 (PL Address Decoder_up) and one plate line address decoder 252 (PL Address Decoder_down) in the comprisal of the pixel array 210 shown in the above described FIG. 15A.

In this case, the level change (i.e., the voltage Vd) of the plate line 232 (PL) is carried out by only the plate line 232 (PL).

Figure 15C:
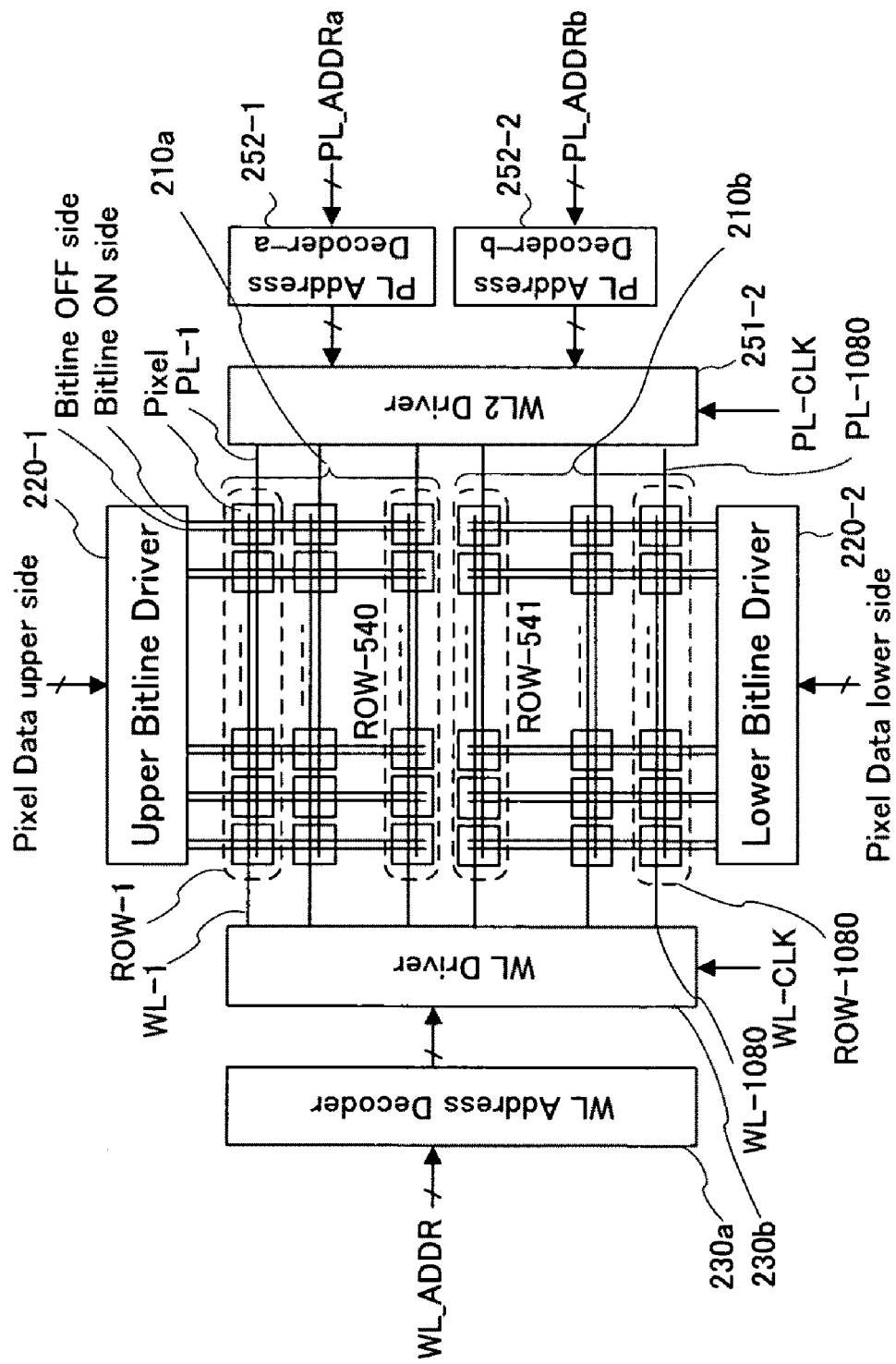
FIG. 15C is a functional circuit diagram showing an exemplary modification of the layout configuration of the peripheral circuit of a pixel array according to a preferred embodiment of the present invention.

FIG. 15C shows the configuration in which a first address decoder 230a and a word line driver 230b, a plate line driver 251 and a plate line address decoder 252-1 and a plate line address decoder 252-2 are equipped for each group in the configuration in which the ROW lines of a pixel array 210 is divided into the upper and lower groups, and each of the upper and lower ROW line groups is equipped with the upper bit line driver part 220-1 and lower bit line driver part 220-2.

In this case, for each group of the upper and lower ROW lines, the ROW lines applicable to the same address will be driven simultaneously; a combination of the respective ROW lines in the upper and lower groups to be simultaneously driven is determined by wirings.

For example, the ROW lines applicable to the same address (in the example of FIG. 15C, the first ROW-1 in the upper group and the first ROW-541 in the lower group) are simultaneously driven.

Figure 15D:
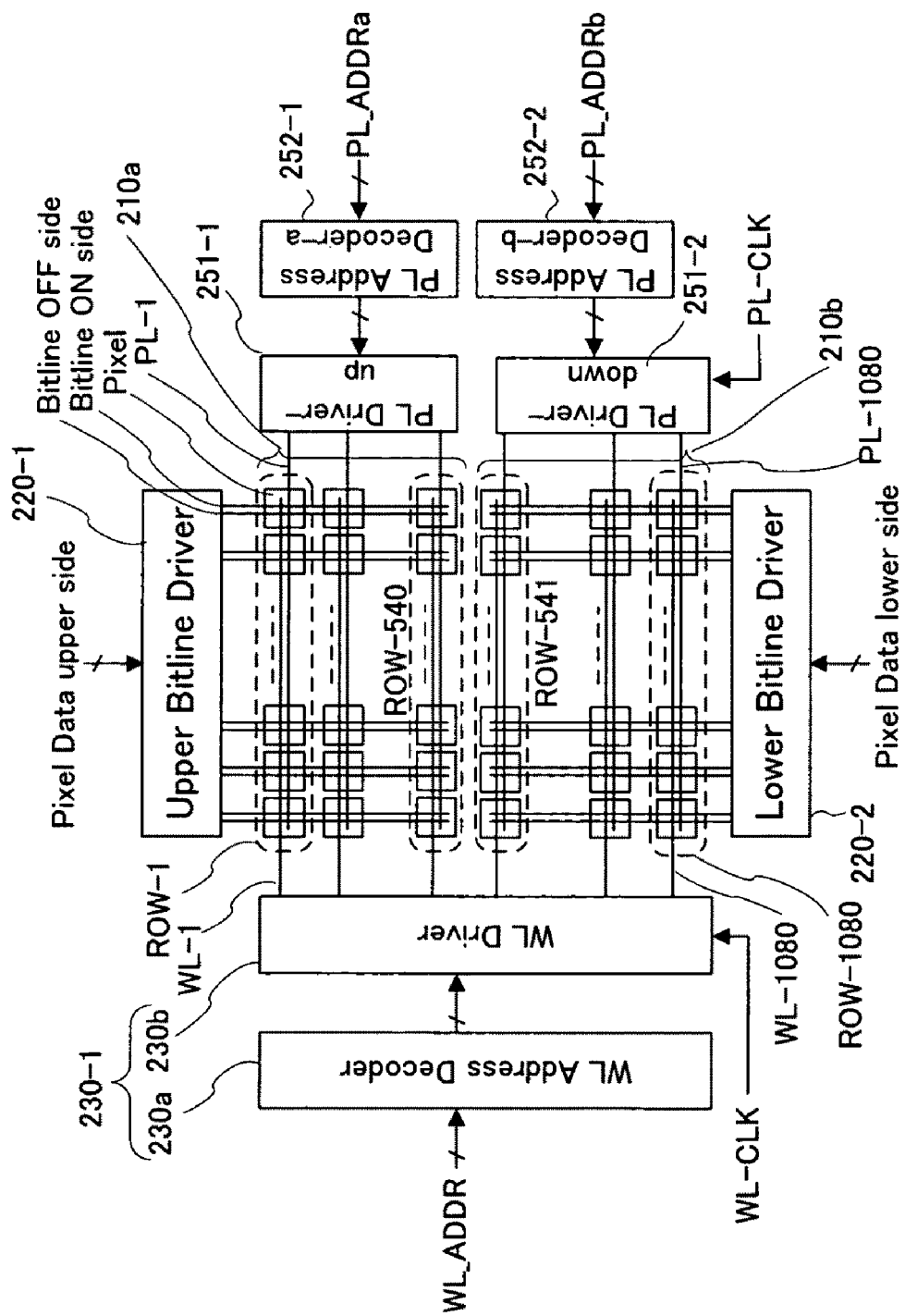
FIG. 15D is a functional circuit diagram showing an exemplary modification of the layout configuration of the peripheral circuit of a pixel array according to a preferred embodiment of the present invention.

FIG. 15D shows an exemplary configuration in which the plate line driver 251 commonly equipped in the upper and lower groups is separated into a plate line driver 251-1 (PL Driver_up) corresponding to the upper group and a plate line driver 251-2 (PL Driver_down) corresponding to the lower group, and the divided drivers are placed correspondingly to the respective groups.

In this case, the ROW lines belonging to the upper and lower groups are individually driven, unlike the configuration shown in FIG. 15C.

The following is a description of an exemplary operation of the pixel unit 211 configured as shown in FIG. 8.

FIG. 16 is a table showing the exemplary specifications of frame, subfield and time slot ts is in the following description. In the case of the present embodiment, for example, in a color sequential display, one frame is constituted by a plurality of fields corresponding to each of a plurality of colors, and the field of each color is further constituted by a plurality of subfields. The period of the field of each color do not necessarily have to be the same.

If one frame is 60 Hz (16.66667 msec.), the width of a subfield assigned to one color is between 5.00 msec (at the shortest) and 10.00 msec (at the longest).

Further, each subfield is constituted by a plurality of time slots ts, and the length of the time slot ts is different depending on the bit width of data used for a gray scale representation and on the length of the subfield.

For example, in the case of 8-bit (i.e., 255-level gray scale), the length of a time slot ts is 19.61 μsec if one subfield is 5.0 msec, and the length of a time slot ts is 39.22 μsec if one subfield is 10.0 msec, as shown in FIG. 16.

<Exemplary Operation—A>

Figure 17A:
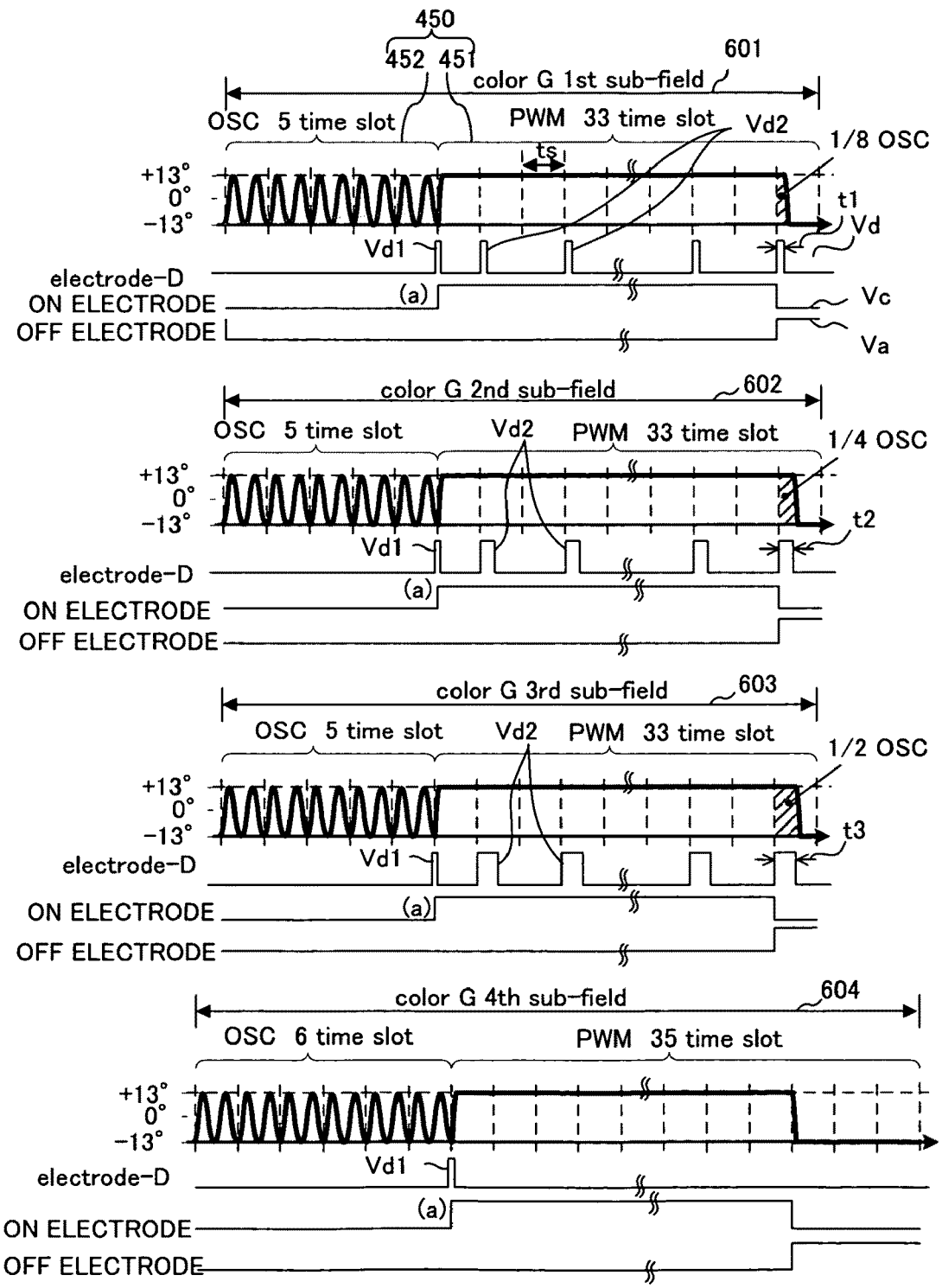
FIG. 17A is a timing diagram showing an exemplary function of a spatial light modulator according to a preferred embodiment of the present invention.
Figure 17B:
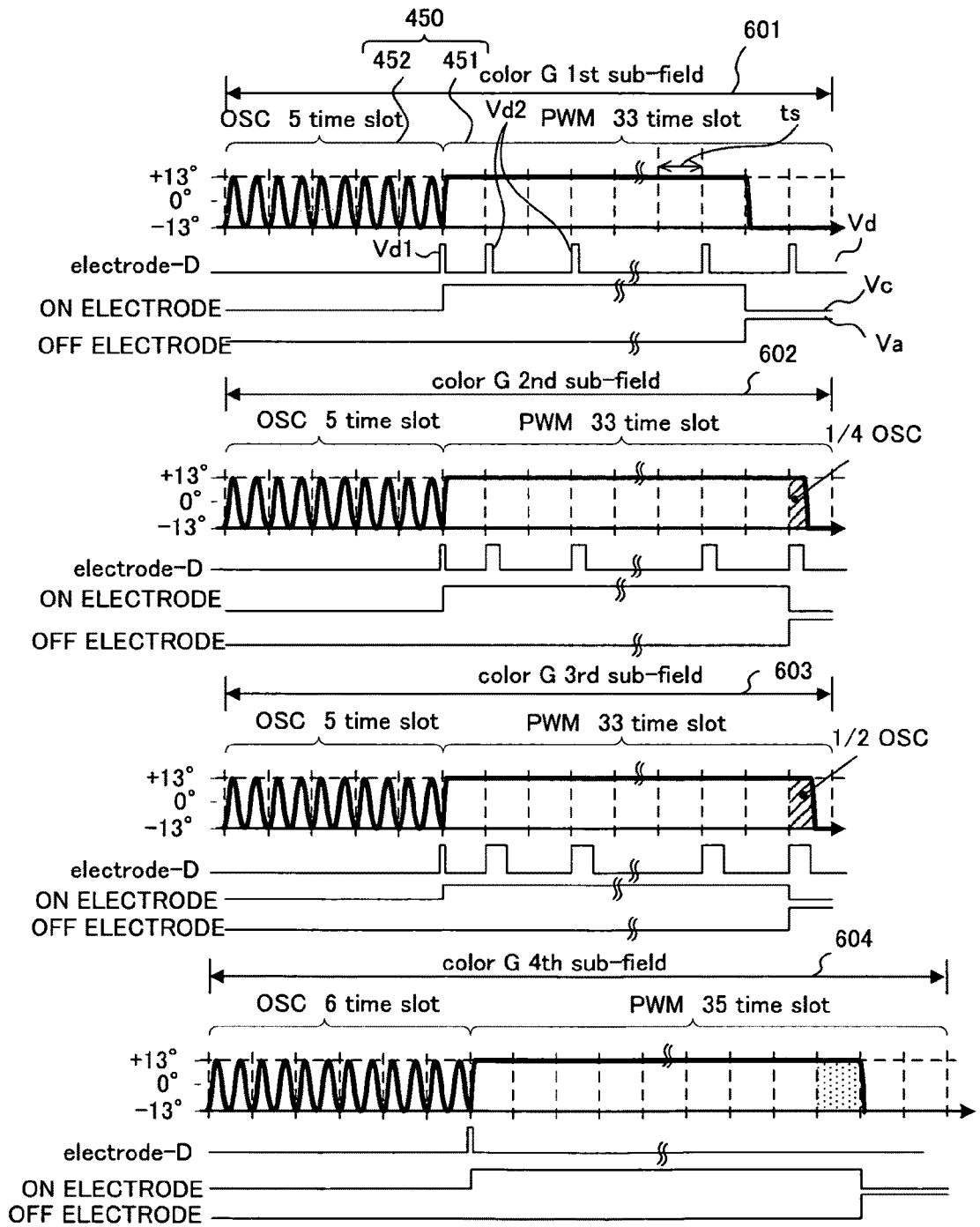
FIG. 17B is a timing diagram showing an exemplary function of a spatial light modulator according to a preferred embodiment of the present invention.

FIGS. 17A and 17B are timing diagrams showing an exemplary action of the present embodiment.

When a gray scale display is carried out with a control that is a combination between OSC and PWM using a mirror control profile 450 consisting of an ON/OFF control pattern 451 (PWM) and an oscillation control pattern 452 (OSC), a gray scale level is determined by the write cycle (i.e., the time slot cycle) to the memory cells M1 and M2.

Accordingly, the present embodiment is configured to use the second ON electrode 235 (i.e., the electrode D) in FIG. 8 connected to the plate line 232 for maintaining the state of the mirror 212 even if the data of the memory cells M1 and M2 are changed, and maintaining the state for a period shorter than a time slot ts, and thereby enabling a control of light intensity for a period shorter than the time slot ts.

The following is a description of a method for improving gray scale when using a mirror control profile 450 in the control that is a combination between OSC and PWM consisting of the oscillation control pattern 452 and ON/OFF control pattern 451, in the case of the present embodiment.

FIG. 17A exemplifies the case of structuring one frame (i.e., one screen) of each color with a plurality of subfield: the first subfield 601, second subfield 602, third subfield 603 and fourth subfield 604.

In the pixel unit 211, the ON state of the mirror 212 can be maintained for a predetermined period of time even when the OFF electrode 215 and ON electrode 216, which are connected to the memory cells M1 and M2, respectively, are shifted from (0, 1) to (1, 0), if a pulse Vd2 is given to the second ON electrode 235 (i.e., an electrode D, the plate line 232) that is placed on the ON side (refer to the circuit configuration shown in FIG. 8).

The intensity of light during the aforementioned period through the application of the pulse Vd2 is controlled to be lower than the intensity of light of the oscillation control pattern 452 (OSC) in one time-slot ts and is also controlled to differ in each subfield (i.e., the first subfield 601, second subfield 602, third subfield 603), and thereby projecting images with an increased gradations of gray scale levels.

That is, the width of the pulse Vd2 changes with each of the first subfield 601 through the third subfield 603 as follows:

pulse width t1<pulse width t2<pulse width t3

The pulse width t1 of the pulse Vd2 in the first subfield 601 is set at a value that is ⅛ the intensity of light (noted as "⅛ OSC" hereinafter) in one time-slot of the oscillation control pattern 452; the pulse width t2 of the second subfield 602 is set at ¼ OSC; the pulse width t3 of the third subfield is set at ½ OSC.

The interval of the pulse Vd2 is set so that the electrode D maintaining the state of the mirror 212 is carried out for every other time slot ts. In order to correct the gray scale for one subfield (i.e., the last subfield, the fourth subfield 604 in this case), the voltage Vd of the second ON electrode 235 is equipped with only a pulse Vd1, not a pulse Vd2, and the state of the mirror 212 is not maintained by the second ON electrode 235 (i.e., the electrode D). Instead, the number of time slots ts is adjusted as described later. In adjusting the number of time slots ts, the control process may prevent all the time slots from turning to the ON state in the fourth subfield 604 even if a video signal at a saturated level is inputted into the control apparatus 300.

FIG. 17B shows, as an example, the result of reducing the grades of gray scale equivalent to the intensity of light by ⅛ OSC from that of the example shown in FIG. 17A.

When a data loading of the ON/OFF control pattern 451 (PWM) for the first subfield 601 of FIG. 17A is shortened by the equivalent of one time-slot, the intensity of light is reduced by 1+⅛ OSC in the first subfield 601.

Accordingly, if a data loading for PWM for the fourth subfield 604 is extended by the equivalent of one time-slot, a reduction in the intensity of light by ⅛ OSC can be attained for the entirety of one frame.

With this control, a combination of a light intensity control by means of a pulse Vd2 in each of the first subfield 601 through the third subfield 603 makes it possible to attain a gray scale representation eight times (8×) the gray scale control achieved by means of the ON/OFF control pattern 451 or oscillation control pattern 452 in units of time slot ts.

Specifically, the mirror 212 is drawn to the ON side by the electrode D only for the period of the pulse Vd1 by turning on the electrode D at the time when the mirror is switched from the oscillation control pattern 452 (OSC) to the ON/OFF control pattern 451 (PWM) by controlling the voltage Vd of the second ON electrode 235 (i.e., an electrode D) for each of the first subfield 601 through the fourth subfield 604. The switch of operation occurs when the mirror 212 is operated in the oscillating state under the control of the oscillation control pattern 452 and the mirror is switched smoothly to the ON state on the ON/OFF control pattern 451 in a short time.

Application of the pulse Vd1 as described above is advantageous in that it lowers the voltage applied to the OFF electrode 215 and ON electrode 216, which are connected to the memory cells M1 and M2, respectively, and lowers the power consumption and also acts as a countermeasure to stiction.

Figure 51:
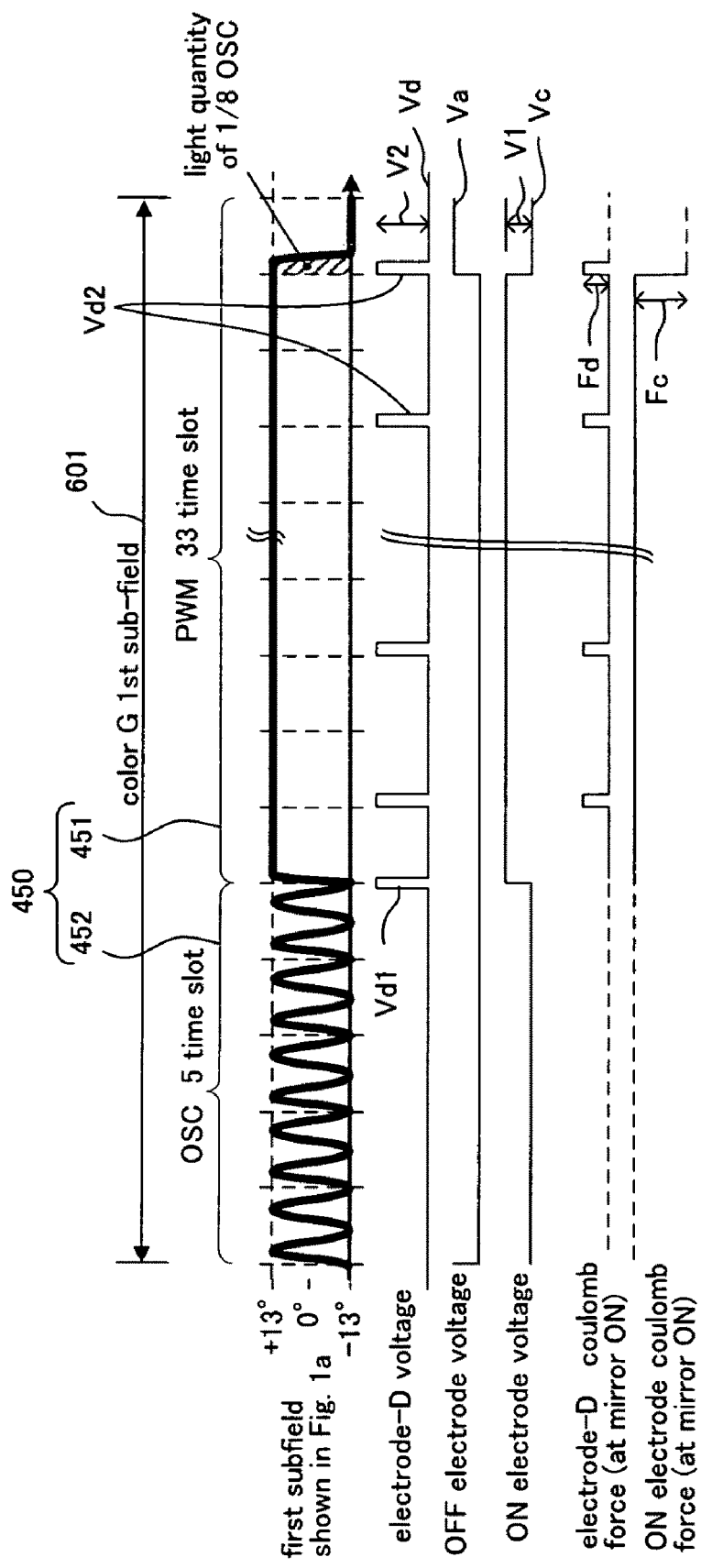
FIG. 51 is a timing diagram showing an exemplary modification of FIG. 17A.

The pulse Vd1 may also be applied to control a mirror 212 to switch from the horizontal state to an ON state immediately after turning on the power to a display element. For example, if a mirror 212 cannot be shifted from the horizontal state to the ON state even though the mirror 212 is successfully shifted from the OFF state to the ON state by only the ON electrode 216, to which 5 volts as the voltage Vc is applied, 10 volts can be applied as a pulse Vd1 to the electrode D simultaneously with the application of 5 volts (i.e., the voltage Vc) to the ON electrode 216 when the mirror 212 is in the horizontal state, and then the voltage Vd of the electrode D is returned to zero (0) volts after the elapse of time necessary for the mirror 212 to shift to the ON state. This operation eliminates the need to apply an unnecessarily high voltage for shifting the mirror 212 from the OFF state to the ON state and also reduces stiction. In this case, a voltage (i.e., a snap-in voltage or a pull-in voltage) necessary for shifting the mirror 212 from the horizontal state to the ON state is 5 volts plus 10 volts. The voltages at the electrode D and ON electrode 216 can be set independently, as shown in FIG. 51 (to be described later).

<Exemplary Operation—A'>

Figure 17C:
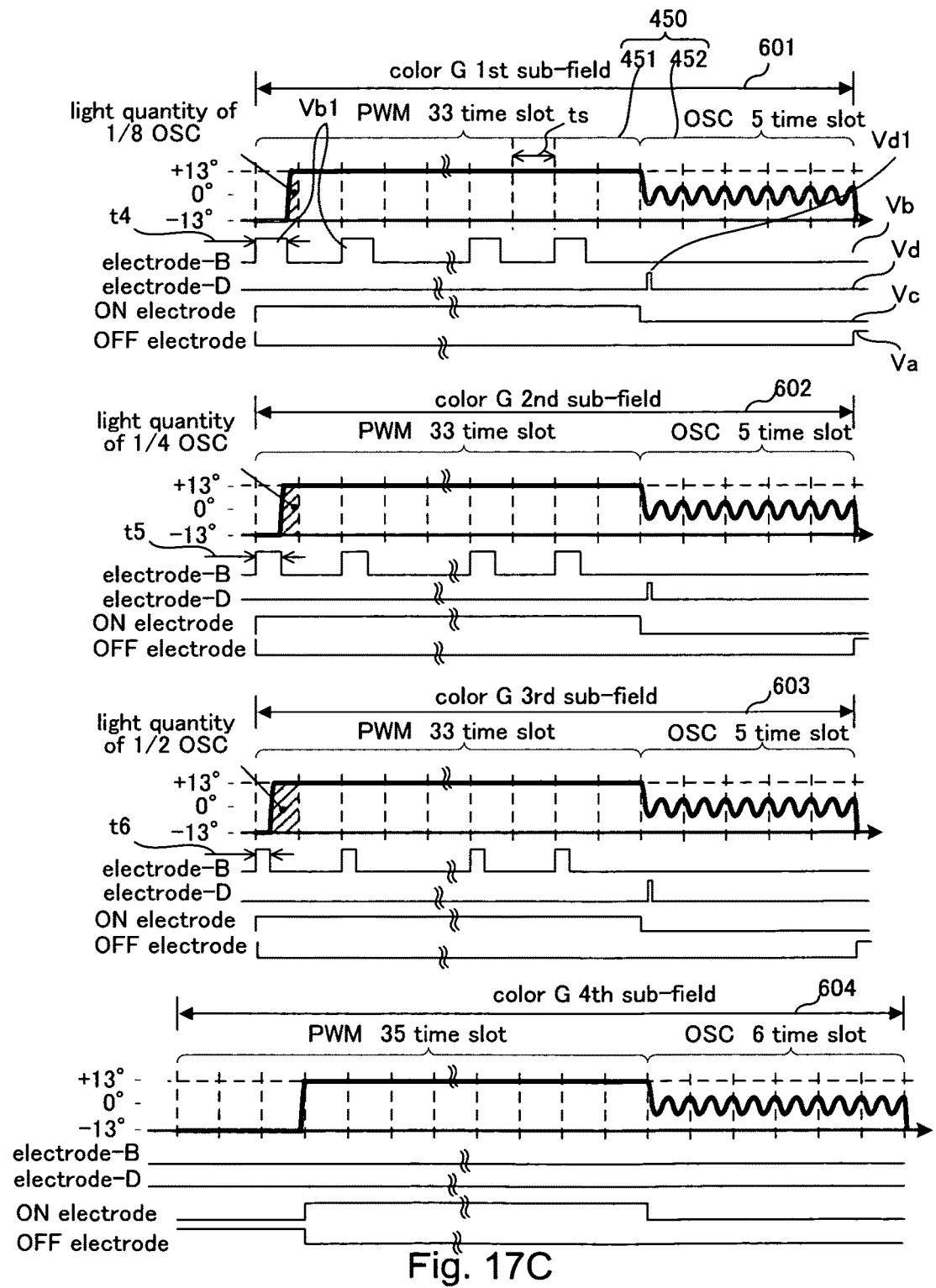
FIG. 17C is a timing diagram showing an exemplary modification of the timing diagram shown in FIG. 17A.

FIG. 17C is a timing diagram showing an exemplary modification of the above described Exemplary Operation A. FIG. 17C exemplifies the case in which the mirror 212 performs an intermediate oscillation under the control of the oscillation control pattern 452, shown in the above described FIG. 17A.

In this case, the pixel unit 211, as shown in FIG. 10, is configured so that the second OFF electrode 236 (i.e., the electrode B) is placed on the side where the OFF electrode 215 is placed, and the second ON electrode 235 (i.e., the electrode D) is placed on the side where the ON electrode 216 is placed, with the second OFF electrode 236 and second ON electrode 235 respectively connected to the plate line 232 and second plate line 233, which are independent of each other.

In the case of FIG. 17C, the mirror control profile 450 is assigned in order of the ON/OFF control pattern 451 (PWM) and oscillation control pattern 452 so that the OFF state of the mirror 212 is maintained for a predetermined period of time by means of the electrode B placed on the OFF side, and the intermediate oscillation of the mirror 212 is generated by means of the electrode D placed on the ON side. In this case, for a voltage Vb applied to the plate line 232 connected to the electrode B, a pulse Vb1 is applied during every other time slot ts during a period of the ON/OFF control pattern 451.

The width of the pulse Vb1 is differentiated for each of the first subfield 601 through third subfield 603 as follows:

pulse width t4>pulse width t5>pulse width t6

The pulse width t4 is set at a value for maintaining the mirror 212 in the OFF state only for the period during which the reflection light intensity of ⅛ OSC is obtained within one time-slot.

Likewise, the pulse width t5 is set at a value for maintaining the mirror 212 in the OFF state only for the period during which the reflection light intensity of ¼ OSC is obtained within one time-slot.

Likewise, the pulse width t6 is set at a value for maintaining the mirror 212 in the OFF state only for the period during which the reflection light intensity of ½ OSC is obtained within one time-slot.

This operation changes the timing of shifting from the OFF state to ON state by one time-slot in the ON/OFF control pattern 451, and thereby, it is possible to reduce the light intensity by "1−(⅛ OSC)" in the time slot ts corresponding to the pulse Vb1, for example, in the first subfield 601. A similar operation may also be applied to the other subfields, i.e., the second subfield 602 and third subfield 603.

Further, in the fourth subfield 604, an OFF period the length of three time slots is set at the beginning of the ON/OFF control pattern 451 so as to compensate for the equivalent of one time-slot for each of the first subfield 601 through third subfield 603.

This operation makes it possible to achieve a gray scale level eight times (8×) that of the control in units of time slot ts, similar to the case described in FIG. 17A.

Further, using a pulse Vd1 as the voltage Vd of the electrode on the ON side when shifting from the ON/OFF control pattern 451 to oscillation control pattern 452 attracts the mirror 212, which has just started to shift from the ON side to OFF side, in the direction returning to the ON side, thereby shifting the mirror 212 to an intermediate oscillation under the control of the oscillation control pattern 452.

<Exemplary Operation—B>

Figure 18:
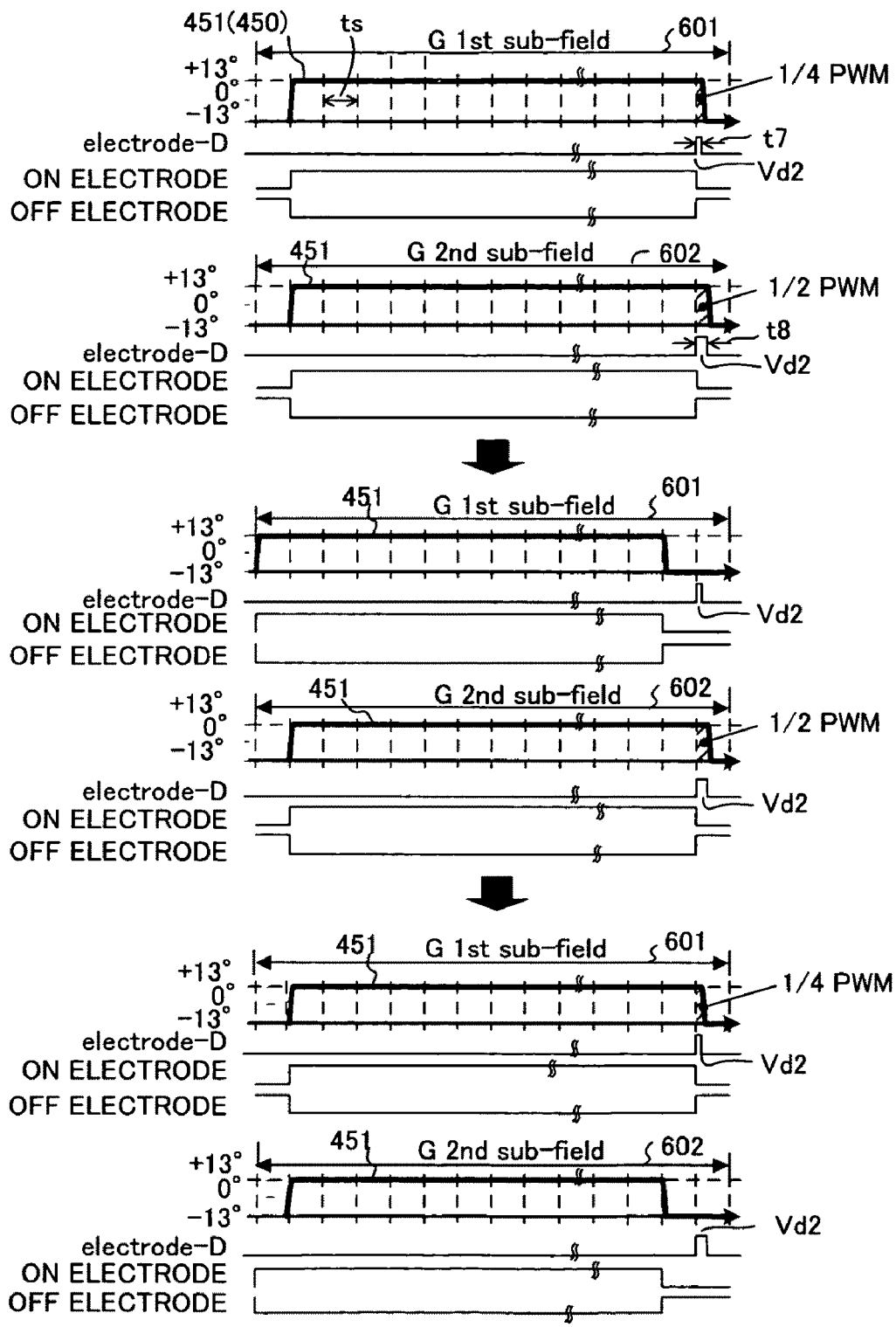
FIG. 18 is a timing diagram showing an exemplary method for improving the number of gray scale levels for a spatial light modulator according to a preferred embodiment of the present invention.

FIG. 18 is a timing diagram showing an exemplary method for improving the number of gray scale levels when using a non-binary PWM.

In this case, the circuit configuration of a pixel unit 211 uses a configuration that places the second ON electrode 235 (i.e., an electrode D) on the side where the ON electrode 216 (i.e., the electrode C) is placed, as shown in FIG. 8.

Further, one frame is constituted by two subfields, that is, the first subfield 601 and the second subfield 602.

In the case of non-binary PWM, the ON state of the mirror 212 is expressed by a bit string corresponding to the number of gray scale levels, and therefore a gray scale control is performed by setting a continuous ON state during an arbitrary period within a subfield.

In this event, the present embodiment is configured to control, for the pixel unit 211 in which the mirror 212 is in the ON state, the voltage Vd of a plate line 232 so as to maintain the ON state of the mirror 212 only for a predetermined period (i.e., during a pulse Vd2) by means of the electrode D placed on the ON side even when the OFF electrode 215 and ON electrode 216, which are connected to the memory M1 and M2, respectively, are changed from (0, 1) to (1, 0).

The intensity of light during the period of maintaining the pulse Vd2 is set to be lower than the intensity of light under the control of the ON/OFF control pattern 451 (i.e., a PWM control) for the length of one time-slot, and is set to be different for each of a plurality of subfields (in this case, the first subfield 601 and the second subfield 602), and thereby the number of gray scale levels can be increased.

In this case, for the first subfield 601, a pulse width t7 that is equivalent to a ¼ of the intensity of light (noted as "¼ PWM" hereinafter) of the ON state during one time-slot under a PWM control is set as a pulse Vd2 at a position corresponding to the time slot ts at the tail end of the ON/OFF control pattern 451.

Likewise, for the second subfield 602, a pulse width t8 that is equivalent to ½ of the intensity of light (noted as "½ PWM" hereinafter) of the ON state during one time-slot under a PWM control is set as a pulse Vd2 at a position corresponding to the time slot ts at the tail end.

As such, the ON state is maintained by means of the pulse Vd2 of the electrode D at the last time slot of each subfield. If the ON state is not maintained during this period, the PWM waveform of the ON/OFF control pattern 451 is moved to the start of the subfield so as to not use the last two time slots.

By combining the aforementioned control with the presence/absence of controlling the pulse Vd2 in the first subfield 601 and second subfield 602, an improvement in the gray scale representation four times (in this example), that of a simple gray scale control by means of an ON/OFF control in units of time slots ts is achieved.

As described above, the example shown in FIG. 18 has two subfields, that is, the first subfield 601 and second subfield 602, and operates the electrode D in the last time slot ts so as to enable a gray scale representation of ¼ PWM for the first subfield 601 and ½ PWM for the second subfield 602.

Specifically, the control processes switch the mirror from the ON/OFF control pattern 451 to turn on the time slot ts immediately before the pulse Vd2 in the case of turning on a light intensity control using the pulse Vd2 of the electrode D. The control processes switch the ON/OFF control pattern 451 toward the beginning of the subfield in the case to turn off the light intensity control.

Furthermore, FIG. 18 exemplifies the combination between the first subfield 601 and second subfield 602 when the gray scale representations are changed in increments of the light intensity of ¼ PWM starting from the top left.

Figure 18A:
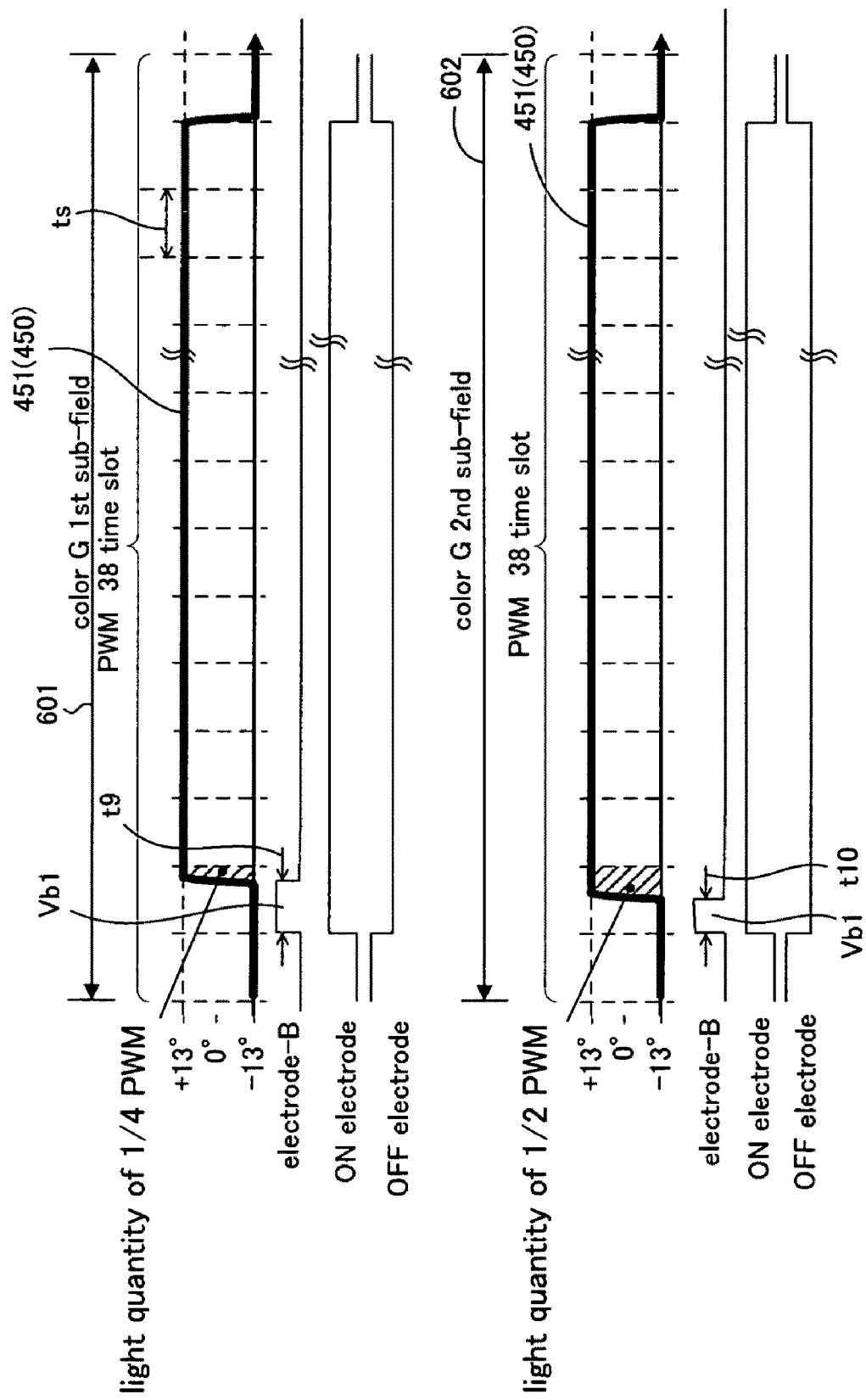
FIG. 18A is a timing diagram showing an exemplary modification of the timing diagram shown in FIG. 18.

FIG. 18A is a timing diagram showing an exemplary modification of the operation shown in FIG. 18. The operation of FIG. 18A is applicable to a pixel unit 211 configured to place an electrode B on the OFF side, as shown in FIG. 9.

Further, the operation of the electrode B is controlled in the first time slot of each subfield so as to maintain the OFF state of the mirror 212 when it starts to shift from the OFF state to ON state.

That is, in the control of the voltage Vb of the electrode B connected to the plate line 232, the pulse Vb1 by pulse widths t9 and t10 are set for the second time slot ts position at the start of the first subfield 601 and second subfield 602, respectively, and the operation of the electrode B is controlled so as to maintain the OFF state of the mirror 212 when it starts to shift from the OFF state to ON state, and thereby the control for obtaining the light intensity of ¼ PWM and ½ PWM is attained. Specifically, while the above description defines the controlled light intensity as ⅛ PWM, ¼ PWM, ½ PWM and ¹⁄₁ PWM, they may also be defined as ¼ PWM, ½ PWM, ¹⁄₁ PWM and ¹⁄₁ PWM, or as ½ PWM, ¹⁄₁ PWM, ¹⁄₁ PWM and ¹⁄₁ PWM.

As described above, this configuration makes it possible to control the mirror 212 with different resolutions for each subfield, thereby providing an image with a high level of gray scale without requiring high speed data transmission.

<Exemplary Operation—C>

Figure 19:
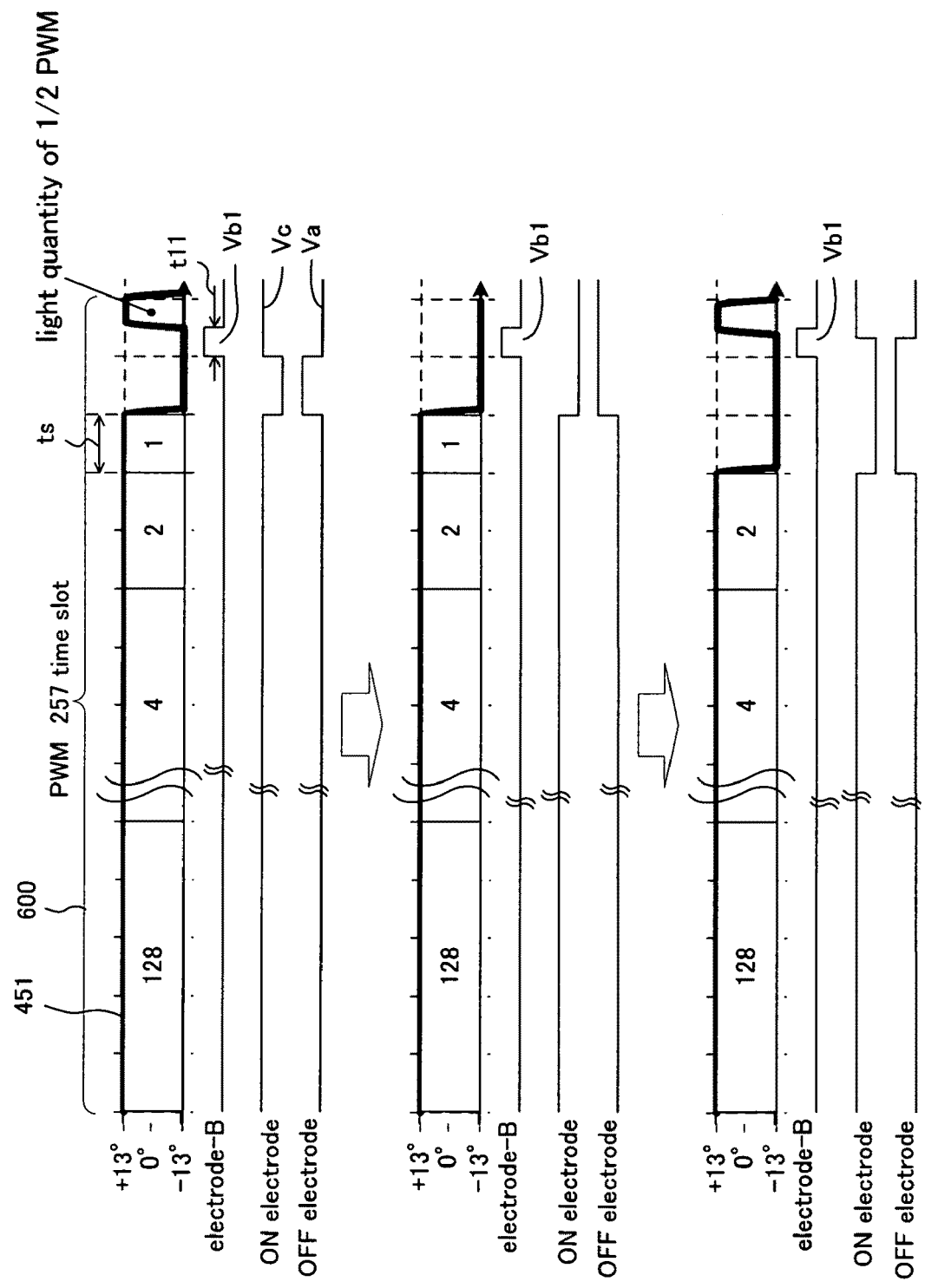
FIG. 19 is a timing diagram showing an exemplary operation of a pixel unit according to a preferred embodiment of the present invention.

FIG. 19 is a timing diagram showing Exemplary Operation C of the pixel unit 211 according to the present embodiment.

FIG. 19 exemplifies a method for improving the number of gray scale levels by means of a binary PWM control in a single field.

In this case, the circuit of the pixel unit 211 is configured to place a second OFF electrode 236 (i.e., an electrode B) on the OFF side, as shown in FIG. 9.

When the mirror 212 is in the OFF state, even if the OFF electrode 215 and ON electrode 216, which are respectively connected to the memory cells M1 and M2 are shifted from (1, 0) to (0, 1), the OFF state of the mirror 212 is maintained for a predetermined period of time by means of the pulse Vb1 of the electrode B placed on the OFF side, whereas when the pulse Vb1 of the electrode B is turned to L, the mirror 212 is shifted to the ON side.

It is possible to control gray scale to have more levels than the gray scale control in units of time slots ts by making the light intensity obtained during the period of maintaining the pulse Vb1 of the electrode B lower than the controlled light intensity by means of PWM for the length of one time-slot.

Specifically, in the example of FIG. 19, the OFF state is maintained in the last time slot in a single subfield 600 by means of the pulse Vb1 of the electrode B, whereas the last time-slot is set at (0, 1) when a ½ PWM gray scale representation is not carried out.

In order to represent the ½/PWM, the immediate prior time slot is turned OFF. In a binary PWM, a gray scale control is carried out by combining the ON state and OFF state of a continuous multiple time slots ts on the basis of the weighting of each bit of a bit string assigned to the gray scale control, whereas the present exemplary operation is configured to add one extra time slot ts to the tail end of the subfield 600 and to set the pulse Vb1 (i.e., the pulse width t11 corresponding to ½ PWM) of the electrode B at the position of the tail-end time slot ts.

Note that FIG. 19 exemplifies the subfield 600 in the case of decreasing the light intensity by an increment of ½ PWM starting from the top.

Specifically, in FIG. 19, while the state is maintained by means of the pulse Vb1 of the electrode B in the last time slot ts, the placement of pulse Vb1 in the subfield 600 is arbitrary.

As described above, Exemplary Operation C shown in FIG. 19 makes it possible to represent a gray scale twice the number of gray scale levels as in the case of controlling a gray scale in units of time slots ts.

Figure 19A:
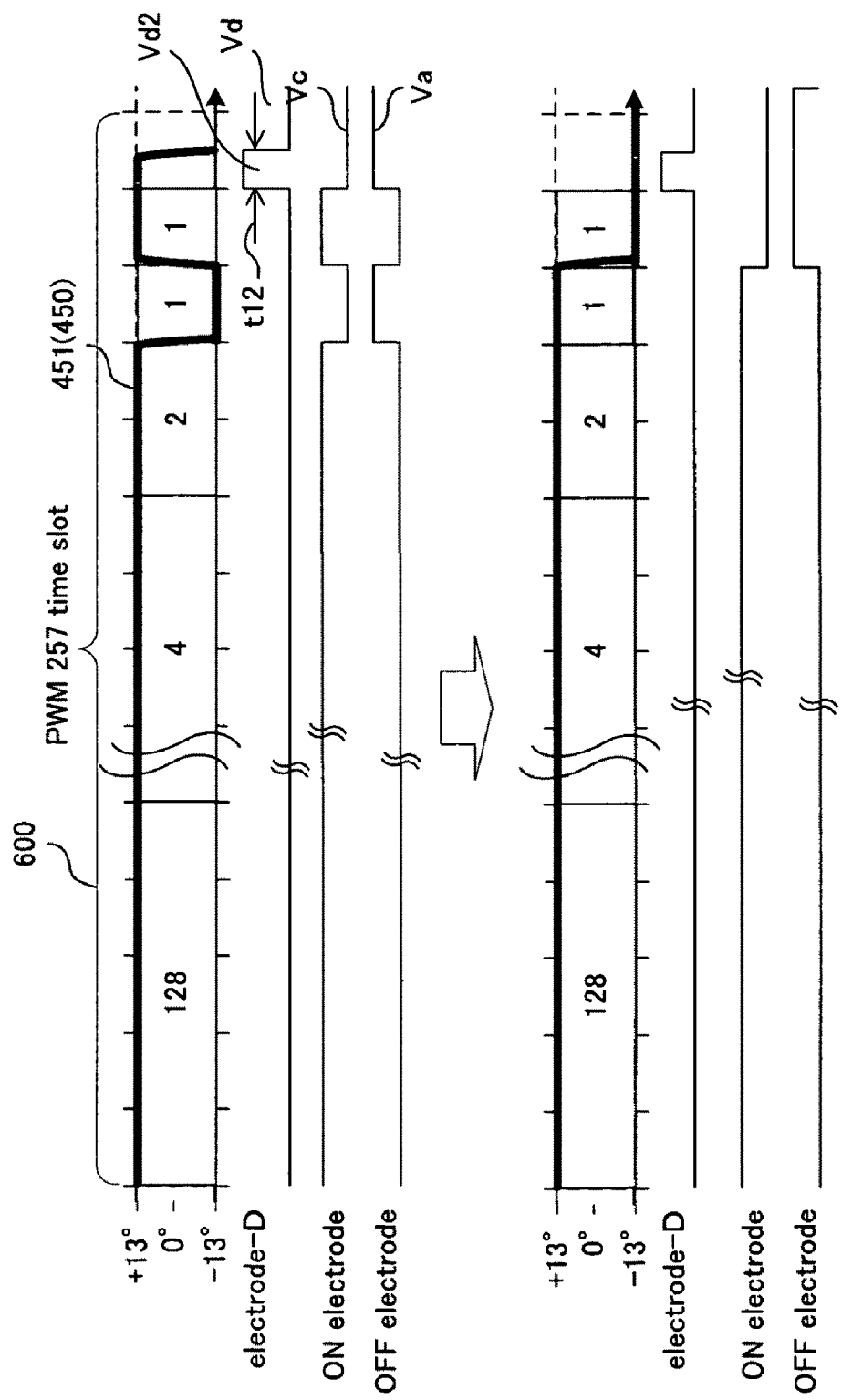
FIG. 19A is a timing diagram showing an exemplary modification of the exemplary operation shown in FIG. 19.

FIG. 19A is a timing diagram showing an exemplary modification of the exemplary operation shown in FIG. 19.

FIG. 19A exemplifies the case of using the circuit configuration of a pixel unit 211 that places an electrode D on the ON side, as shown in FIG. 8 and maintaining the ON state of the mirror 212, thereby controlling a gray scale in units of ½ PWM.

That is, the control is such as to set the pulse Vd2 of the electrode D in the last time slot ts of the subfield 600 and to maintain the mirror 212 in the ON state only for the period of the pulse width t12 of the pulse Vd2 when the mirror 212 is shifting from the ON state to OFF state.

In this case, the time slot ts immediately prior to a time slot ts to which the pulse Vd2 is set is controlled under the ON state.

<Exemplary Operation—C'>

Figure 20:
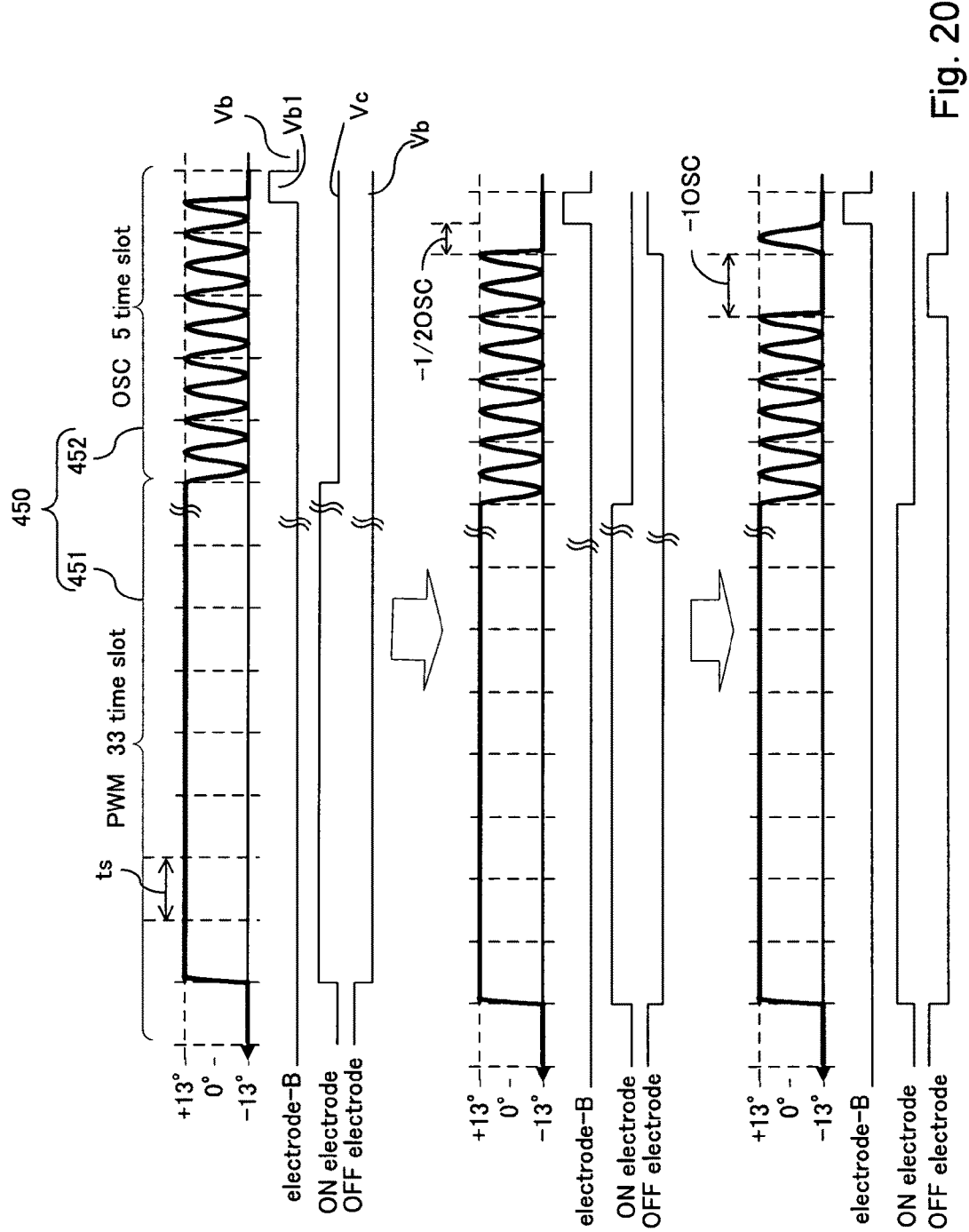
FIG. 20 is a timing diagram showing an exemplary method for improving a gray scale representation in a single subfield of the pixel unit of a spatial light modulator according to a preferred embodiment of the present invention.

FIG. 20 is a timing diagram showing an exemplary method of combining a non-binary PWM and an oscillation control for improving a gray scale representation in a single subfield.

The basic concept of the method is the same as that of the Exemplary Operation C shown in FIG. 19.

Further, the circuit of a pixel unit 211 uses the configuration shown in FIG. 9, in which the electrode B is placed on the OFF side.

In this case, when the mirror 212 is controlled under a mirror control profile 450 that combines an ON/OFF control pattern 451 (PWM) and an oscillation control pattern 452, a pulse Vb1 is set correspondingly to the tail end time slot ts of the oscillation control pattern 452 in a single subfield 600.

In the pixel unit in which the mirror 212 is in an oscillating state (OSC), the mirror 212 can be placed under the OFF state by setting a pulse Vb1 on the voltage Vb of the electrode B placed on the OFF side even when the OFF electrode 215 and ON electrode 216, which are respectively connected to the memory cells M1 and M2, are maintained to be (0, 0).

The number of gray scale levels can be increased by making the light intensity obtained while maintaining the pulse Vb1 lower than the OSC light intensity.

The example shown in FIG. 20 is configured to maintain the pulse Vb1 by means of the electrode B in the last time slot ts in one subfield 600, whereas the last time slot ts is maintained to be (0, 1) when a ½ OSC gray scale control is not used.

FIG. 20 exemplifies the case of increasing the light intensity in increments of ½ OSC in sequence, starting from the top.

Specifically, the example of FIG. 20 has been provided by exemplifying the case of shifting from the ON/OFF control pattern 451 (PWM) to the oscillation control pattern 452 (OSC) within a subfield 600; the same result can be obtained by using the mirror control profile 450 to shift from the oscillation control pattern 452 (OSC) to the ON/OFF control pattern 451 (PWM) and maintaining the electrode B by means of pulse Vb in the first time slot ts within the subfield 600.

<Exemplary Operation—D>

Figure 21:
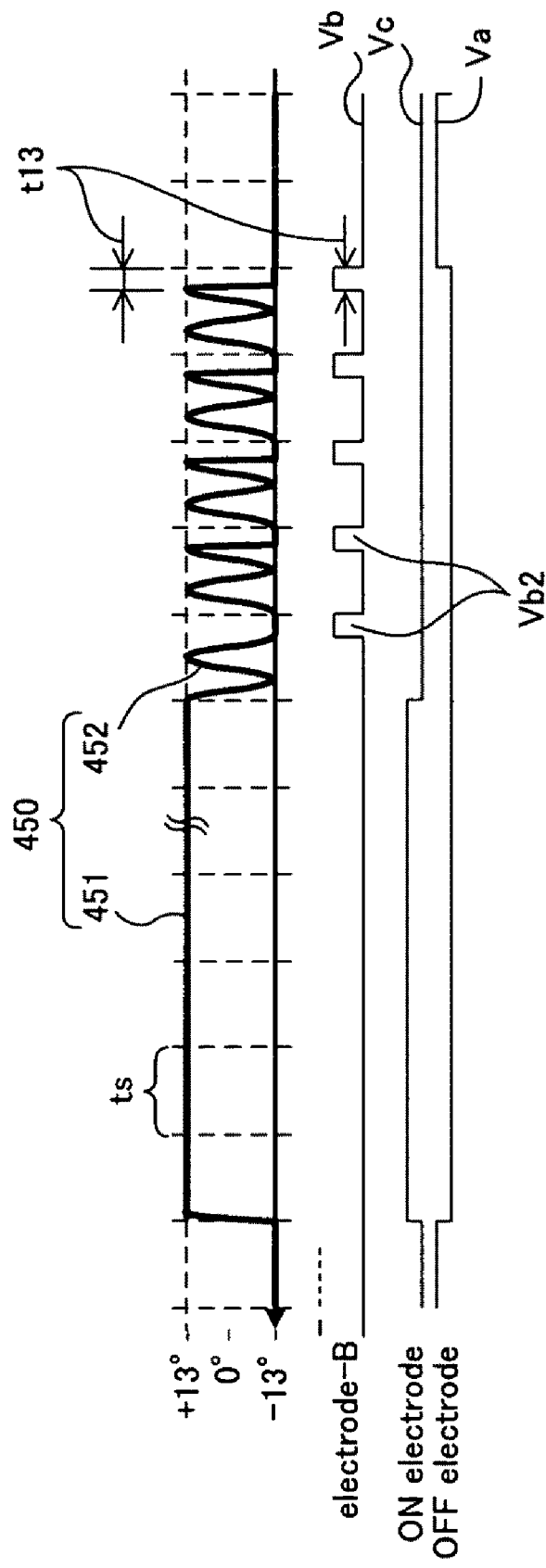
FIG. 21 is a timing diagram showing an exemplary operation of a spatial light modulator according to a preferred embodiment of the present invention.

FIG. 21 is a timing diagram showing an Exemplary Operation D according to the present embodiment, in which a method of light intensity control in the oscillating state (OSC) of a mirror 212 is described.

The circuit of a pixel unit 211 uses the configuration shown in FIG. 9, in which the electrode B is placed on the OFF side.

When a gray scale control is carried out using, for example, the mirror control profile 450 that combines the ON/OFF control pattern 451 and oscillation control pattern 452, and if the number of assigned time slots ts of the oscillation control pattern 452 (OSC) is seven (7), the light intensity in one time-slot of the oscillation control pattern 452 (OSC) is preferred to be 12.5% (i.e., 12.5[%]*(7+1)=100 [%]) of the light intensity that will be obtained in one time-slot ts of the ON/OFF control pattern 451 (PWM).

However, the light intensity may sometimes be more than 12.5% due to variations in the amplitude of the mirror 212 under the control of the oscillation control pattern 452 (OSC), variations in the optical system, or other variations. In such a case, the linearity of the gray scale represented by the mirror control profile 450 is damaged.

Accordingly, Exemplary Operation D is configured to provide a period, in which the mirror 212 is maintained on the OFF side by means of the pulse Vb2 (in a pulse width t13) on the voltage Vb that is applied to electrode B, in each time slot ts during the period of a oscillation control pattern 452 (OSC) so as to control the light intensity obtained by the OSC during the period at 12.5%. Alternatively, the light intensity may be controlled at values that are the products of 12.5% times an odd number (i.e., 37.5%, 62.5% and 87.5%) so as to make a corresponding gray scale when an externally inputted video signal is converted into a video signal to be sent to the spatial light modulator 200 (i.e., the display panel).

As described above, when the number of time slots ts of the oscillation control pattern 452 (OSC) is set at seven (7), the light intensity of one time-slot of the OSC is preferred to be 12.5% of the light intensity of one time-slot of the PWM. However, when the number of time slots ts of the OSC is three (3), the light intensity is preferred to be 25%, and to be 6.5% when the number of time slots ts of the OSC is fifteen (15). These numbers may also be multiplied by odd numbers. This is especially necessary if the light intensity of one time-slot of the OSC is set at 6.5% (when there are fifteen time slots ts of the OSC) since there will be a large loss in light intensity, and therefore, in this case, it is better to use a value obtained by multiplication with an odd number.

Specifically, FIG. 21 exemplifies the case of placing the pulse Vb2 of the electrode B in the last half of one time-slot of the oscillation control pattern 452 (OSC); alternatively, the pulse Vb2 may be placed in the first half.

Furthermore, while the example of FIG. 21 shows the ON/OFF control pattern 451 (PWM) followed by the oscillation control pattern 452 (OSC) in the mirror control profile 450; the operation will be the same if they are placed in reverse order, with the oscillation control pattern 452 (OSC) followed by the ON/OFF control pattern 451 (PWM).

The above described configuration makes it possible to attain a gray scale control with good linearity by appropriately setting both the position of the pulse Vb2 on a voltage Vb, which is applied to the electrode B, and a pulse width t13, even if there is non-linearity in the gray scale caused by a variation in the optical system or other causes. In other words, a gray scale control with good linearity can be attained without being affected by a variation in the production process for the pixel unit 211.

<Exemplary Operation—E>

Figure 22:
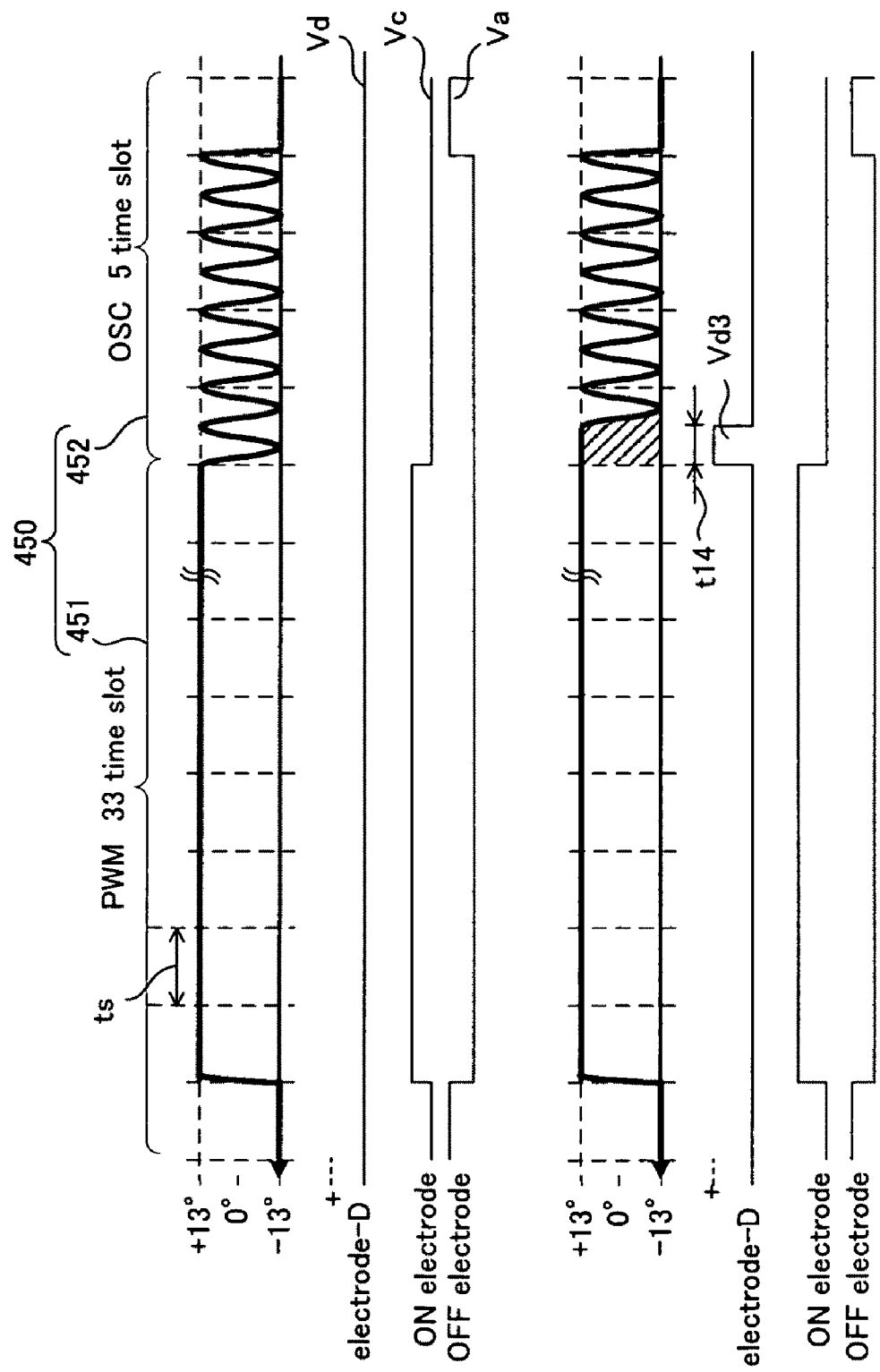
FIG. 22 is a timing diagram showing an exemplary operation of a spatial light modulator according to a preferred embodiment of the present invention.

FIG. 22 is a timing diagram showing Exemplary Operation E. The following description exemplifies a method for adjusting (i.e., offsetting) the intensity of light when using a mirror control profile that combines a non-binary PWM and an oscillation control (OSC).

Note that the circuit of a pixel unit 211 uses the configuration shown in FIG. 8, in which the second ON electrode 235 (i.e., the electrode D) connected to the plate line 232 is placed on the ON side.

At a timing of the time slot ts at the start of the oscillation control pattern 452, during the transition between the ON/OFF control pattern 451 and oscillation control pattern 452, a pulse Vd3 (in a pulse width t14) is applied to the electrode D, on an as-needed basis, in order to shift the start timing of the oscillation control pattern 452 (OSC) by the length of the pulse width t13, and thereby the period of the ON state of the preceding ON/OFF control pattern 451 is increased or decreased.

Specifically, in FIG. 22, the waveform on the upper half of the figure exemplifies the case in which an operation (by means of a pulse Vd3) performed by the electrode D is not carried out (i.e., the voltage Vd is flat), while the waveform on the lower half exemplifies the case in which the electrode D is turned to High (i.e., by applying a pulse Vd3) at the timing of starting the oscillation control pattern 452 (OSC) to extend the ON period of the mirror 212 by approximately the length of the pulse width t14 of the pulse Vd3.

Note that the example of FIG. 22 shows the ON/OFF control pattern 451 (PWM) followed by the oscillation control pattern 452 (OSC) in the configuration of the mirror control profile 450; while the operation will be the same if the oscillation control pattern 452 (OSC) and ON/OFF control pattern 451 (PWM) are applied in this reverse order.

<Exemplary Operation—E'>

Figure 23:
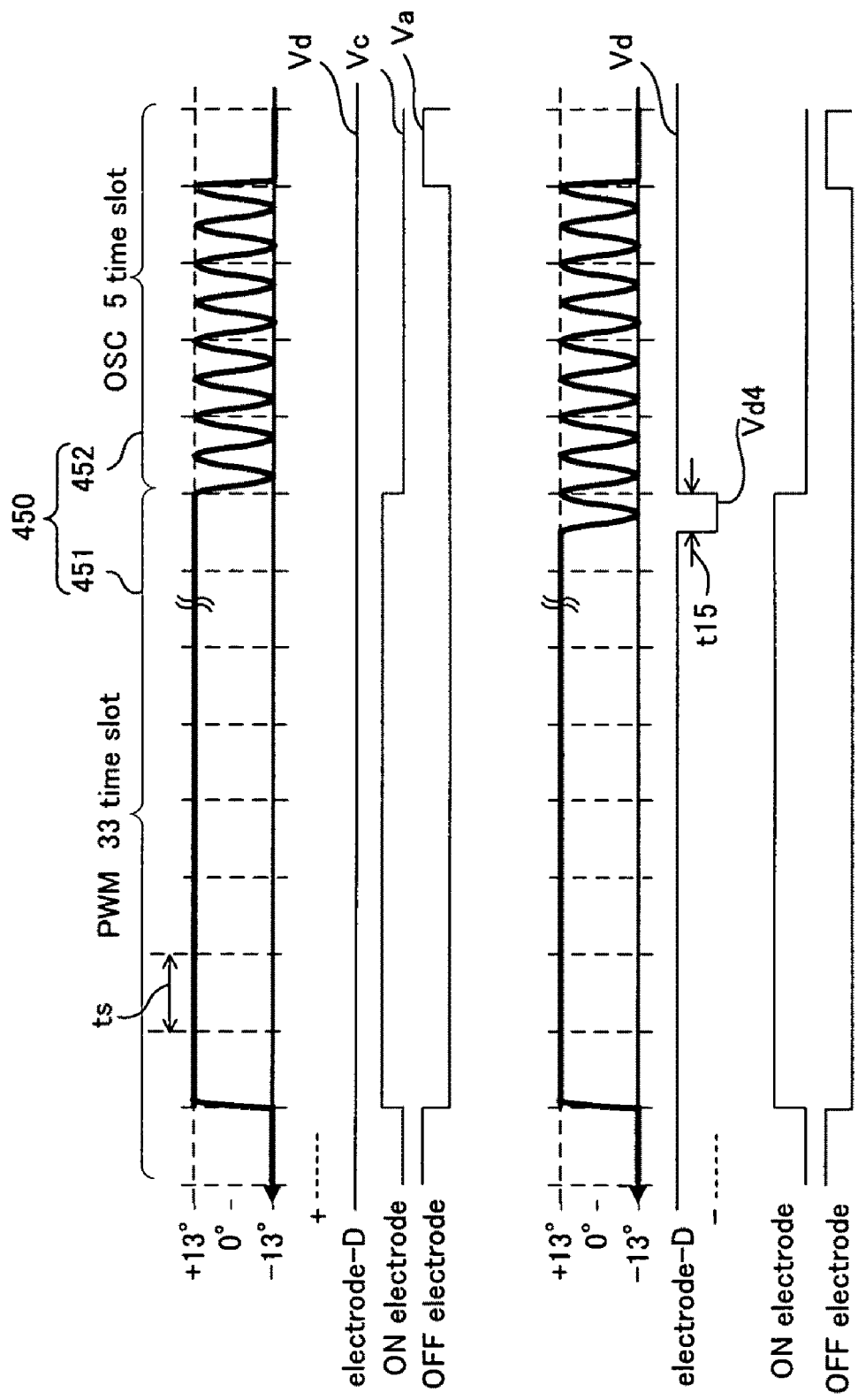
FIG. 23 is a timing diagram showing an exemplary operation of a spatial light modulator according to a preferred embodiment of the present invention.

FIG. 23 is a timing diagram showing Exemplary Operation E', an exemplary modification of the above described Exemplary Operation E. Specifically, Exemplary Operation E' shows the case in which a pulse Vd4 (in the pulse width t15), a voltage inverted from the pulse Vd3, is applied at the timing of the tail end time slot ts of the ON/OFF control pattern 451 in the pixel unit 211 configured as shown in FIG. 8, and thereby, the start timing of the oscillation control pattern 452 is advanced.

In FIG. 23, the waveform on the upper half of the figure exemplifies the case in which an operation (by means of a pulse Vd4) performed by the electrode D is not carried out, while the waveform on the lower half exemplifies the case in which a negative bias (by means of the pulse Vd4) is applied to the electrode D at a timing earlier than the start of an oscillation control (OSC) to advance a transition to the oscillation control (OSC) for the mirror 212.

Similar to the above described Exemplary Operation E, the operation is the same even if the sequence of the ON/OFF control pattern 451 and oscillation control pattern 452 is reversed.

The present Exemplary Operation E and Operation E' can also be used for improving a gray scale level as shown in the above described FIG. 17. When one frame is divided into a plurality of sub-frames for a display, the periods of the ON state or oscillation state of the mirror 212 may be changed for individual sub-frames by changing the timings and/or pulse widths of the pulse Vd4 or pulse Vd3 for each respective sub-frame.

<Exemplary Operation—F>

Figure 24:
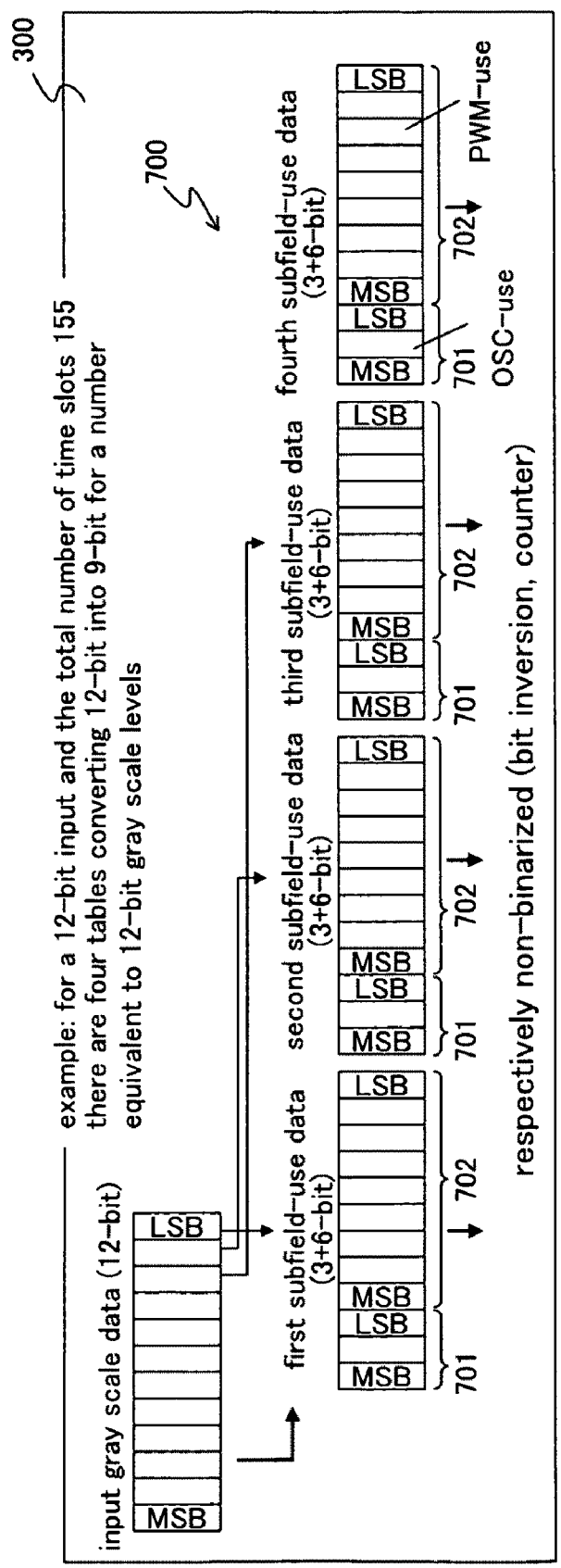
FIG. 24 is a bit-structure diagram showing an exemplary configuration of a gamma table provided for a spatial light modulator according to a preferred embodiment of the present invention.

FIG. 24 is a conceptual diagram showing an exemplary configuration of a gamma table according to the present exemplary operation.

The present exemplary operation shows an exemplary structure of a gamma table when an improvement in a gray scale performance is attained by combining an oscillation control (OSC) and a PWM control.

The above described individual exemplary operations dynamically changes the allocation of ON/OFF of time slots to the ON/OFF control pattern 451 and oscillation control pattern 452, thereby attaining a higher number of gray scale levels than that attained by the control of the memory cells M1 and M2 in units of time slots.

A description of Exemplary Operation F is provided for a gamma table 700 used for controlling a dynamic allocation of a time slot to the ON/OFF control pattern 451 and oscillation control pattern 452 for the above described Exemplary Operation A and so on.

The present embodiment is configured to attain an improvement in the gray scale by distributing data (i.e., an ON/OFF setup) to the time slots ts of each subfield of the first subfield 601 through fourth subfield 604, requiring a table corresponding to each subfield.

FIG. 24 exemplifies the case in which the input gray scale data is 12-bit and the total number of time slots ts of one field consisting of the first subfield 601 through fourth subfield 604 is "155".

The 12-bit input gray scale data consists of four regions corresponding to the first subfield 601 through fourth subfield 604, and a combination between OSC data 701, which corresponds to the ON/OFF control pattern 451, and PWM data 702, which corresponds to the oscillation control pattern 452, which is set to an individual region by a number equivalent to 12-bit gray scale levels.

In the example shown in FIG. 24, 3 bits are assigned to the OSC data 701 and 9 bits are assigned to the PWM data 702.

Figure 25:
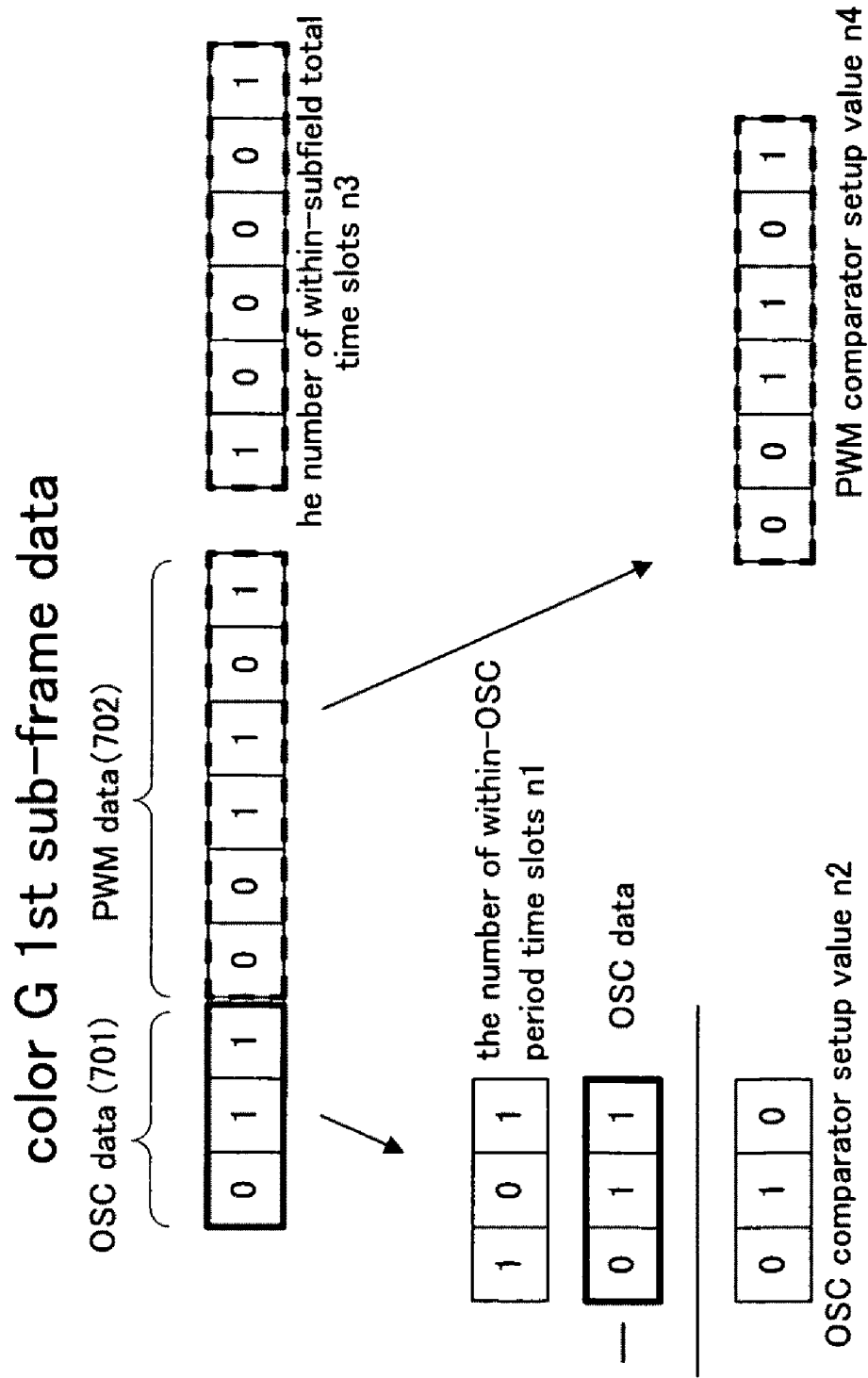
FIG. 25 is a bit-structure diagram showing an exemplary method for generating data for controlling the allocation of a time slot for a spatial light modulator according to a preferred embodiment of the present invention.

FIG. 25 is a conceptual diagram showing an exemplary method for generating data for controlling the allocation of time slots ts to the ON/OFF control pattern 451 and oscillation control pattern 452 using the setup data of gamma table 700.

FIG. 25 exemplifies the control for the first subfield 601. The control is the same for other subfields, i.e., the second subfield 602 through fourth subfield 604.

Defining the maximum number of time slots ts allocated to a predetermined oscillation control pattern 452 as "the number of within-OSC period time slots n1", a value (i.e., "011" in this case) obtained by subtracting the data of the ON/OFF control pattern 451 from the number of within-OSC period time slots n1 is set to an OSC comparator setup value n2.

The value of the OSC comparator setup value n2 indicates a predetermined period (i.e., the number of OFF time slots ts) of maintaining the OFF state at the start of the oscillation control pattern 452.

Further, the number of total time slots of the first subfield 601 is set to the number of within-subfield total time slots n3.

Further, the PWM data 702 ("001101" in this case) corresponding to the oscillation control pattern 452 is set to a PWM comparator setup value n4.

Figure 26:
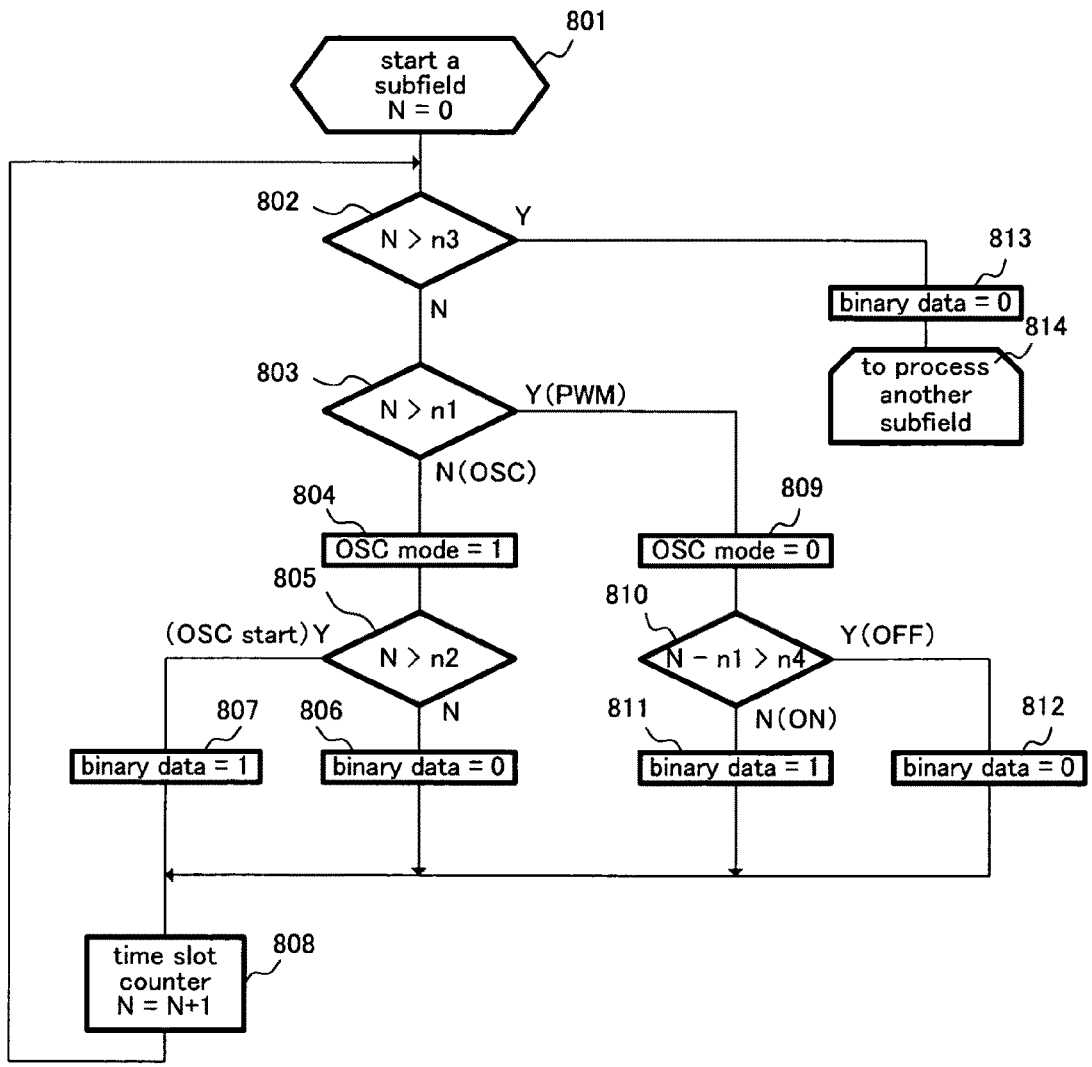
FIG. 26 is a flow chart showing an exemplary control for assigning a time slot, using a gamma table, for a spatial light modulator according to a preferred embodiment of the present invention.

FIG. 26 is a flow chart showing an exemplary control for assigning a time slot using the above described gamma table.

The following is a description of the operation under the control of mirror control profile 450 in which the ON/OFF control pattern 451 follows after the oscillation control pattern 452.

First, a control variable N indicating the position of a focused time slot ts within a subfield is initialized to "0" (step 801).

Then, it is determined in step 802 whether or not the control variable N has exceeded the number of within-subfield total time slots n3. If it has exceeded, the process for the present subfield is ended, the time slot ts is turned to OFF (i.e., the binary data=0) (step 813), and the process shifts to the processing of the next subfield (step 814).

In contrast, if it is determined in step 802 that the control variable N does not exceed the number n3, then it is determined in step 803 whether or not the control variable N has exceeded the number of within-OSC period time slots n1; that is, whether or not the processing of a time slot corresponding to the oscillation control pattern 452 has been completed.

If the control variable N is no larger than the number n1 (i.e., the result of step 803 is "No"), OSC mode=1 is set (step 804). Setting the "OSC mode=1" means that the mirror 212 is operated in the oscillation (OSC) mode by setting data (0, 0) to the memory cells M1 and M2 of the pixel unit 211 of the spatial light modulator 200.

In step 805, whether or not the control variable N has exceeded the OSC comparator setup value n2 is discerned. If not, (i.e., N≦n2), the time slot ts corresponding to the present control variable N is turned to OFF (i.e., the binary data=0) (step 806).

If in step 805, N is determined to have a value greater than n2 (i.e., N>n2), the time slot ts corresponding to the present control variable N is turned to ON (i.e., the binary data=1) (step 807).

On the other hand, if the result of the above described step 803 is "yes" (i.e., N>n1), it indicates a transition to the range of time slots ts corresponding to the succeeding ON/OFF control pattern 451, and therefore OSC mode=0 is set (step 809). The mirror 212 is operated in the ON/OFF mode by setting data (1, 0) or (0, 1) to the memory cells M1 and M2 of the pixel unit 211 of the spatial light modulator 200.

Then, it is determined in step 810 whether or not [N−n1] has exceeded the PWM comparator setup value n4. The ON/OFF control pattern 451 is turned on (i.e., the binary data=1) in step 811 as long as the [N−n1] does not exceed the value n4 (i.e., [N−n1] n4). If the [N−n1] value exceeds the value n4, then the ON/OFF control pattern 451 is turned off (i.e., the binary data=0) in step 812.

Then, following the above described steps 806, 807, 811 and 812, the control variable N is incremented (step 808), and the process returns to step 802.

The above described control makes it possible to dynamically set and control the ON/OFF of each time slot ts in the oscillation control pattern 452 and ON/OFF control pattern 451 for each of the first subfield 601 through fourth subfield 604 in accordance with the input gray scale data.

Figure 27B:
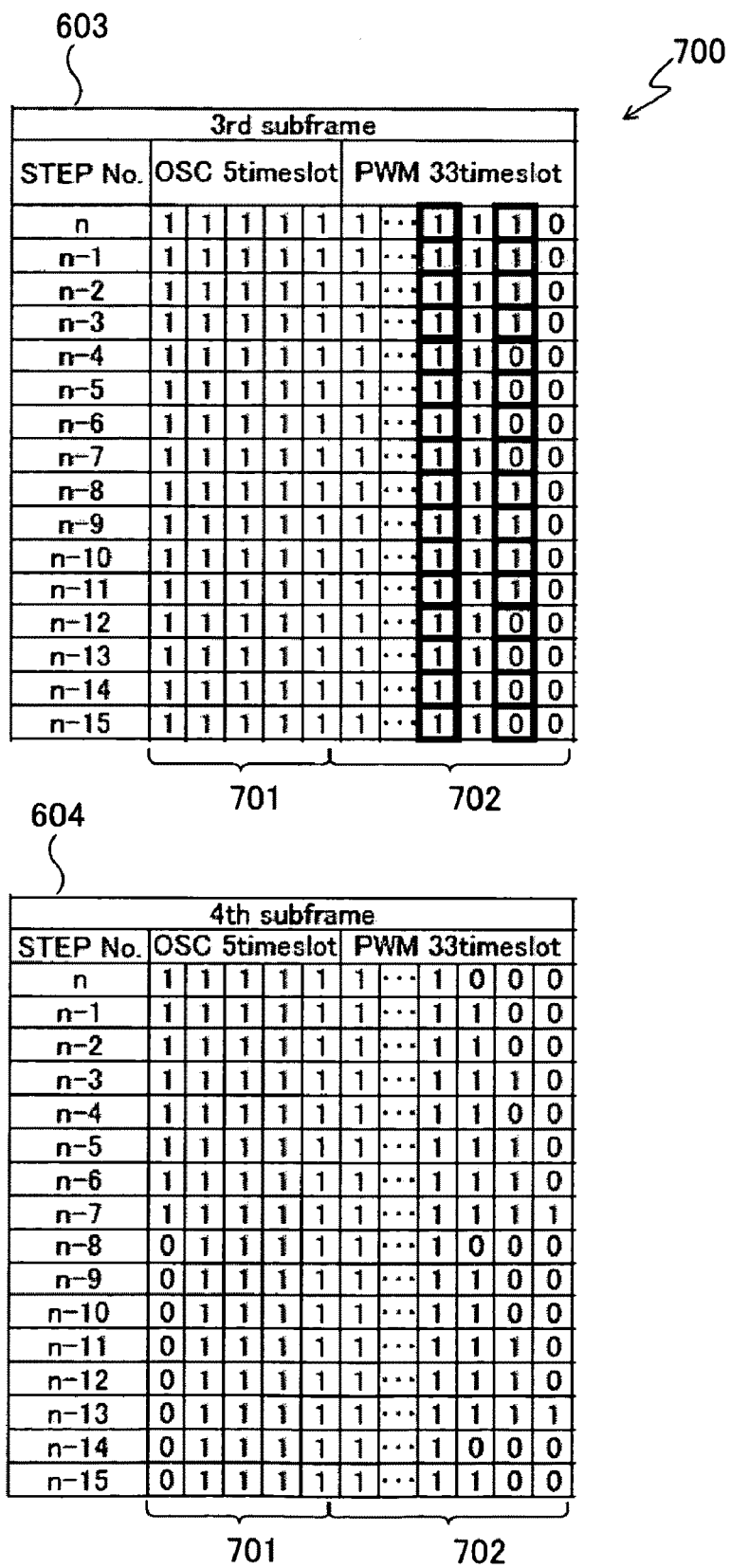
FIG. 27B is a diagram showing a specific exemplary setup of a gamma table used for a spatial light modulator according to a preferred embodiment of the present invention.

FIGS. 27A and 27B are diagrams showing a specific exemplary setup of the above described gamma table, with FIG. 27A showing the first sub-frame and second sub-frame, and FIG. 27B showing the third sub-frame and fourth sub-frame.

The gamma tables 700 shown in FIGS. 27A and 27B exemplify data structure used in the case of carrying out a control so as to reduce the reflection light intensity of a mirror 212 by ⅛ OSC for every step (i.e., row) from the top to the bottom of the table.

For example, if the solid line box is "1" bit, with the bit on the right being "0", in each piece of data in the first subfield 601 through third subfield 603 in the configuration of the pixel unit 211 comprised of the second OFF electrode 236 (i.e., the electrode B exemplified in FIG. 9), and X is controlled by the electrode B for applying the value of the bit in each sub-field of the first subfield 601 through third subfield 603.

In this case, even if the number of time slots in which the data is "1", a light intensity change to control the gray scale is carried out by setting the value of the bits in each time slot represented by ts.

For example, in the gamma table 700 shown in FIGS. 27A and 27B, although the number of time slots of which the data is "1" is equally 149 for the data in the first row and second row, the light intensities are different, e.g., the calculated values are 13073.438 and 13071.875 (not specifically shown in the table).

Figure 28B:
FIG. 28B is a diagram showing an exemplary modification of the structure of a gamma table used for a spatial light modulator according to a preferred embodiment of the present invention.
Figure 29:
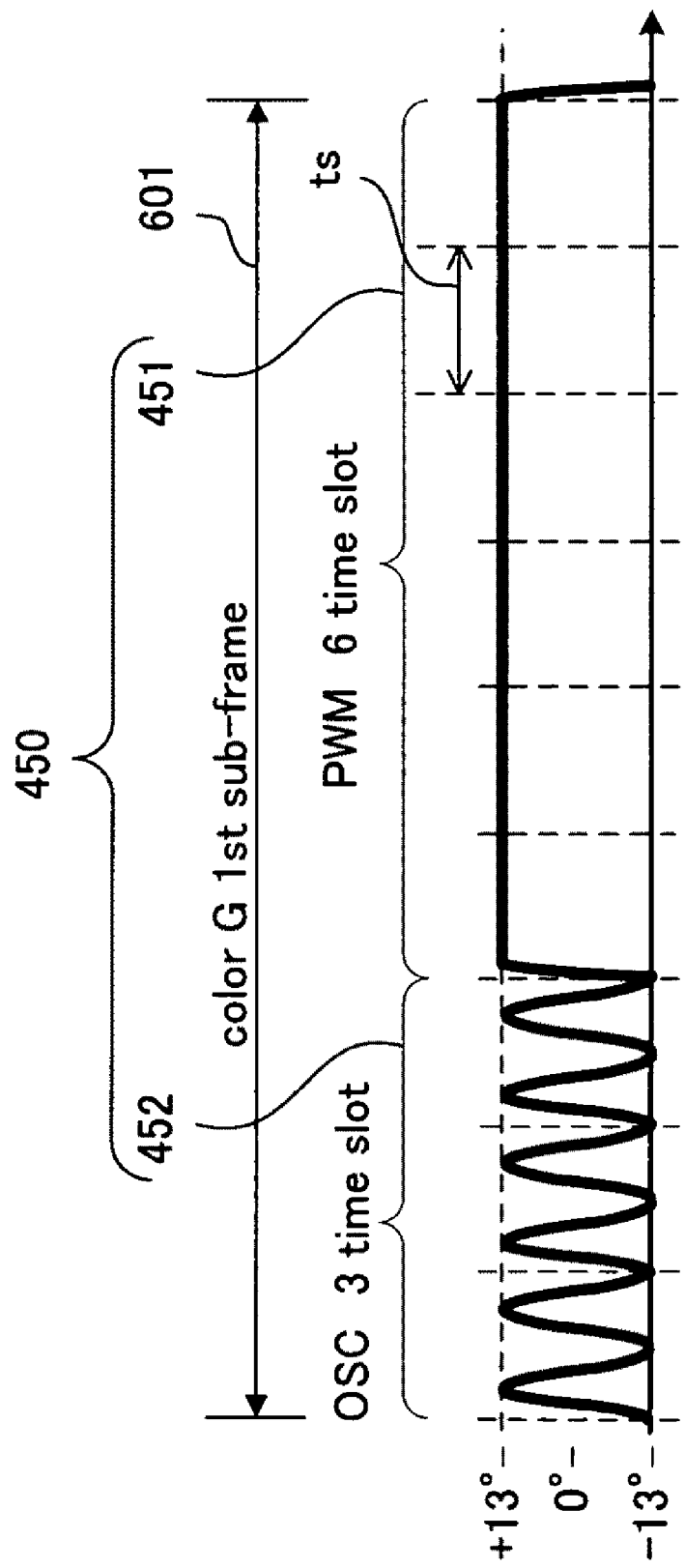
FIG. 29 is a timing diagram showing an exemplary setup of a mirror control profile in order to describe the exemplary modification shown in FIG. 28.

FIGS. 28A and 28B are diagrams showing an exemplary modification of the structure of a gamma table; and FIG. 29 is a timing diagram showing an exemplary setup of a mirror control profile for describing the exemplary modifications shown in FIGS. 28A and 28B.

As an example, consider the case shown in FIG. 29 of trying to attain a stepwise change in the gray scale on the basis of the number of ON time-slots ts in an oscillation control pattern 452, with the assumption that the light intensity obtained in one time-slot ts of the oscillation control pattern 452 is 25% of the light intensity obtained in one time-slot ts of the ON/OFF control pattern 451 and with three time-slots ts allocated to the oscillation control pattern 452, so that the number of gray scale levels increases by one level for every increase in the number of ON time-slots ts of the oscillation control pattern 452 by one, such as 0% (with the number of ON time-slots ts being "0"), 25% (with the number of ON time-slots ts being "1"), 50% (with the number of ON time-slots ts being "2") and 75% (with the number of ON time-slots ts being "3").

As such, if the OSC light intensity of one time-slot ts of the oscillation control pattern 452 is assumed to be 25% of the PWM light intensity of one time-slot ts of the ON/OFF control pattern 451, the OSC changes by one gray scale level for one time-slot, which translates as four gray scale levels in OSC equaling to one PWM.

In this event, if, for example, the light intensity obtained in one ON time-slot ts of the oscillation control pattern 452 is actually reduced to 40%, or less, of the light intensity obtained in one ON time-slot ts of the ON/OFF control pattern 451 (i.e., in the case of the gamma table 700A shown in FIG. 28A), a control in which the ON time-slot ts of the oscillation control pattern 452 is simply increased one by one generates a reversal in gray scale levels (i.e., the number of gray scale levels decreases with the number of pieces of ON time-slots ts), making it difficult to control the gray scale accurately.

In such a case, an accurate gray scale representation can be attained by setting the data of the gamma table 700A, in advance of a control, so as to interchange the part where the reversal of the change in the light intensity occurs, as seen in the gamma table 700B shown in FIG. 28B, in order to represent the gray scale correctly.

Specifically, by replacing the data, such as replacing the gamma table 700A with the gamma table 700B, an accurate gray scale representation can be attained without being influenced by a variation in the production process of the mirror 212. This scheme may be applied to the case in which the light intensity adjustment of the OSC is set at an odd number of times (except for "1") of a desired level in the above described Exemplary Operation—D <Exemplary Operation—J>

Figure 30:
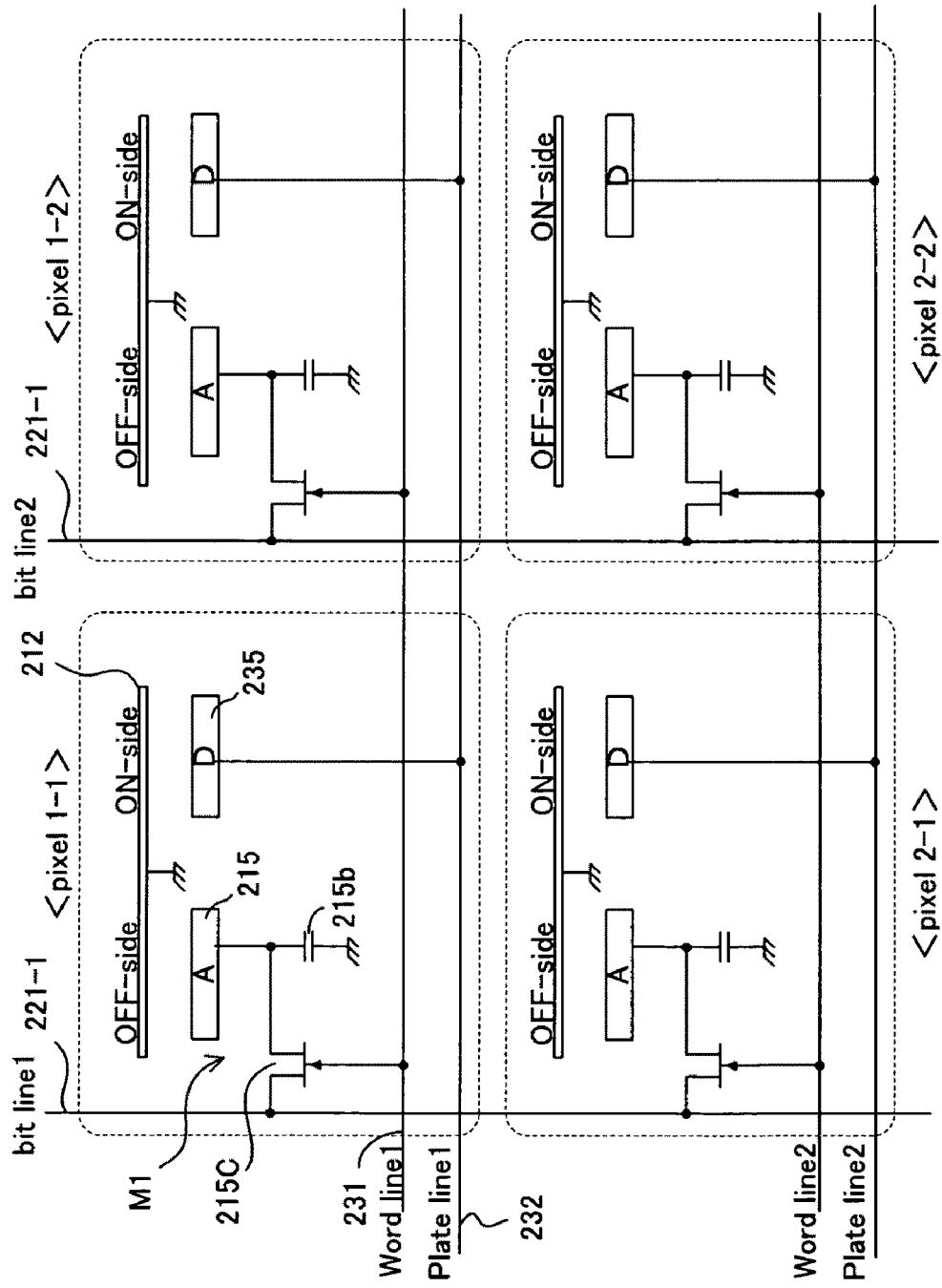
FIG. 30 is a functional circuit diagram showing an exemplary modification of the circuit configuration of the pixel unit shown in FIG. 10.

FIG. 30 is a conceptual diagram showing an exemplary modification of the circuit configuration of the pixel unit shown in FIG. 10.

The circuit of a pixel unit 211 according to the exemplary modification shown in FIG. 30 is configured such that the ON electrode 216 (i.e., the electrode C) and memory cell M2 are removed from the comprisal of FIG. 24 and such that the control for the ON side of the mirror 212 is carried out using the second ON electrode 235 (i.e., an electrode D) connected to the plate line 232.

Figure 31:
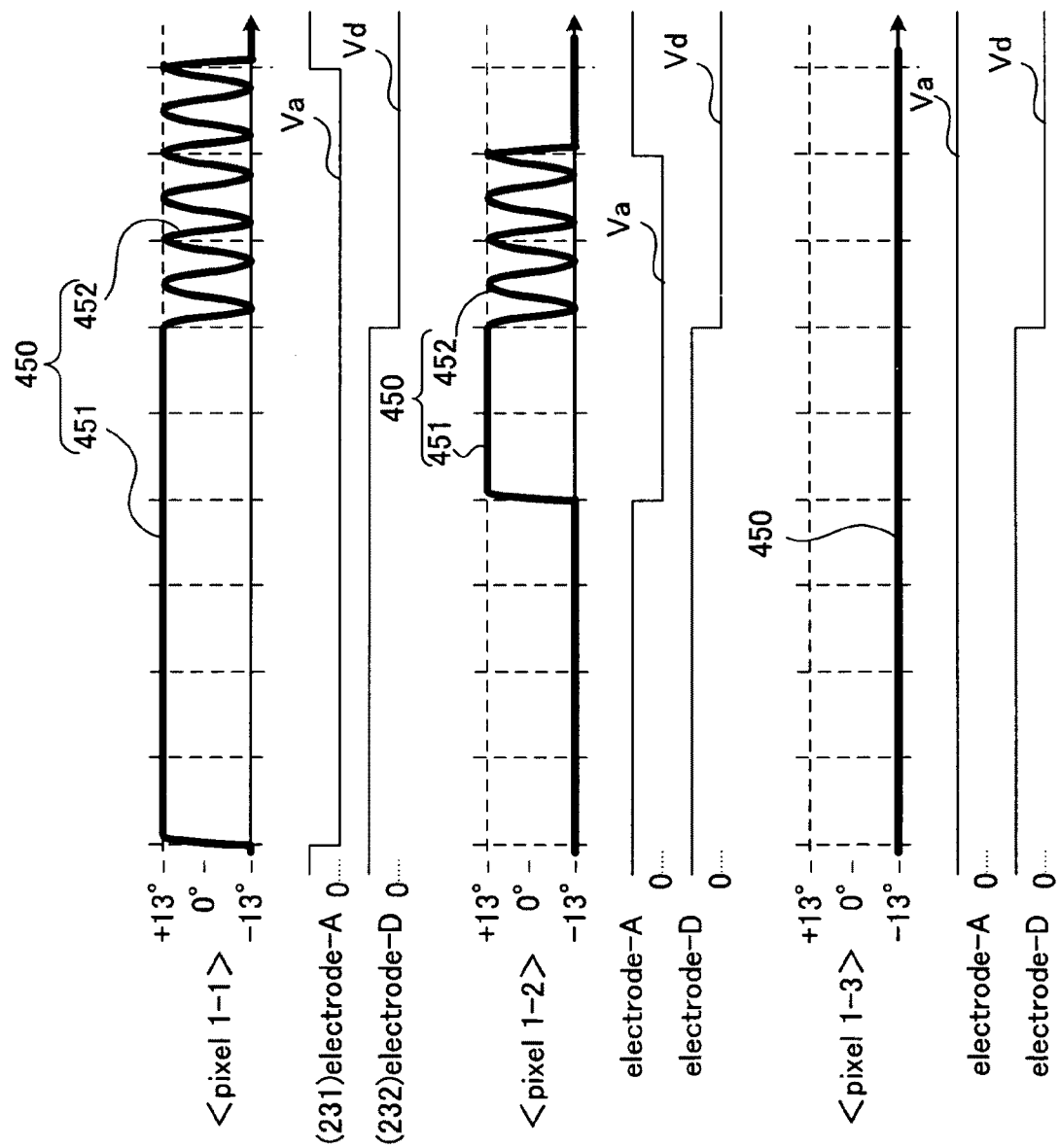
FIG. 31 is a timing diagram showing an exemplary control for the pixel unit configured as shown in FIG. 30.

FIG. 31 is a timing diagram showing an exemplary control of a pixel unit configured as shown in FIG. 30. The circuit requires only one OFF capacitor 215b that can be placed in the entire area under the mirror 212 to increase the capacitance of the capacitor. This configuration makes it possible to attain an element structure that is robust against a voltage drop due to leakage and against voltage fluctuations due to a photoelectric effect.

As shown in FIG. 31, starting from a state in which the mirror 212 is in the OFF state (i.e., the voltage Va of the electrode A is maintained at H ("1"), and the memory cell M1 is maintained at H ("1")) and in which the voltage Vd of the electrode D placed on the ON side is maintained at H ("1"), the value of the voltage Va of the electrode A is turned to L (i.e., the memory cell M1 is turned to L ("0")) at a timing of the time slot number corresponding to the number of gray scale levels to be displayed. The mirror 212 is then turned to the ON state because the voltage Vd of the electrode D placed on the ON side is maintained at H.

After entering the control period under the oscillation control pattern 452 (OSC), the voltage Vd of the electrode D is turned to L ("0") and the mirror 212 starts oscillating (OSC). If the oscillation (under the oscillation control pattern 452) of the mirror 212 needs to be ended, the value of the voltage Va of the electrode D is turned to H (i.e., the memory cell M1 is turned to H ("1")).

Further, if the voltage Va of the electrode A is maintained in the state of H ("1"), the mirror 212 is maintained in the OFF state regardless of a change in the voltages Vd of the electrode D. In the above description, the electrode D is commonly connected for each ROW in the exemplary configuration. It is, however, also possible to commonly connect the electrode D for all pixels and turn off the entirety in synch with the end of the ON state of the mirror 212. Further, it is also possible to fix the electrode D to a ground potential (GND) and apply a voltage only to the ON side of the mirror 212.

Figure 32:
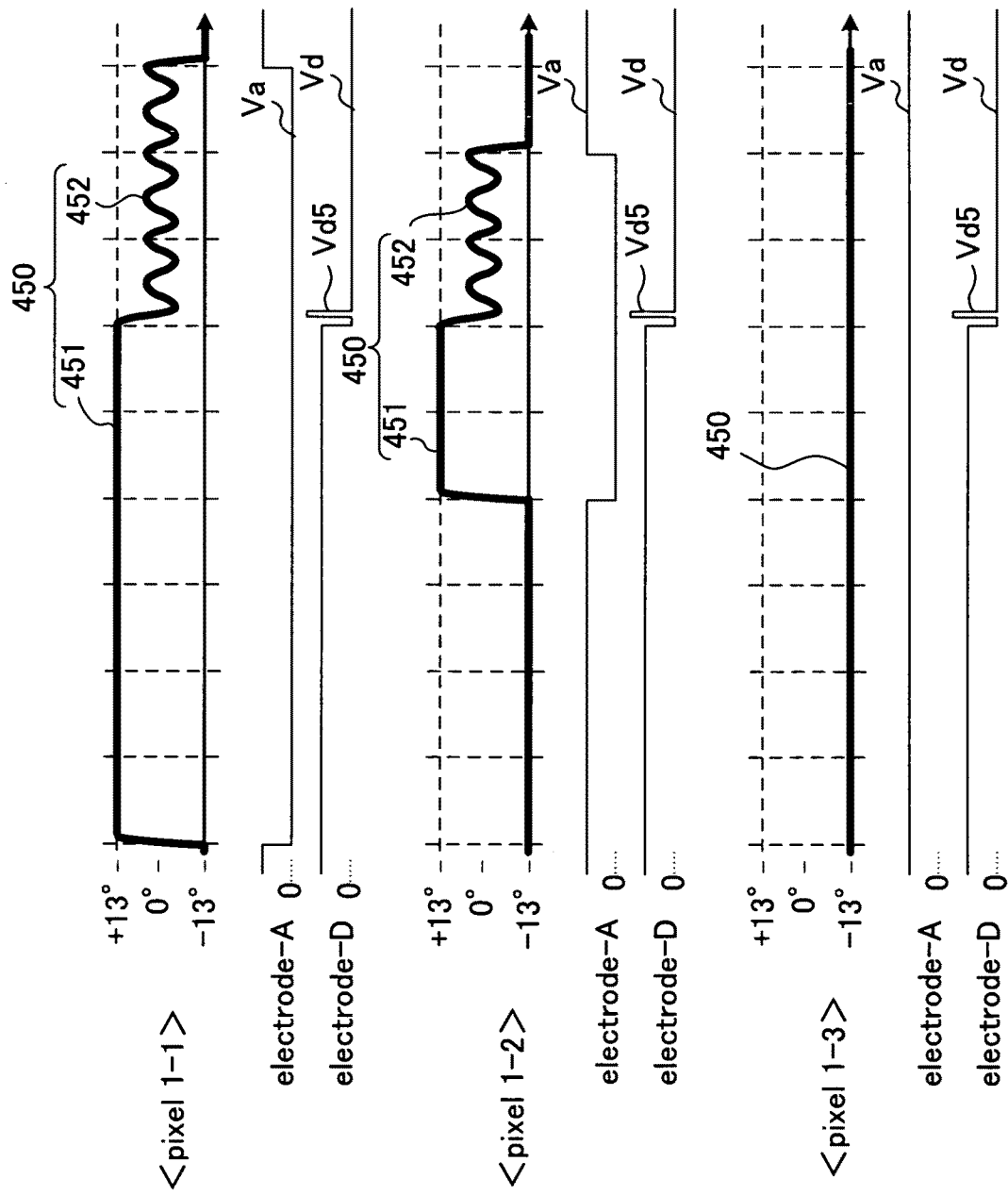
FIG. 32 is a timing diagram showing an exemplary modification of the operation of the pixel unit configured as shown in FIG. 30.

FIG. 32 is a timing diagram showing an exemplary modification of the operation of a pixel unit configured as shown in FIG. 30.

FIG. 32 shows the waveform of a mirror control profile 450 in the case of generating an intermediate oscillation using the electrode D.

Specifically, a mirror 212 shifting from the ON state to the OFF state is brought back to the ON side temporarily by applying a Vd5 to the voltage Vd of the electrode D immediately after the voltage Vd is turned to L ("0") for shifting from the ON/OFF control pattern 451 to the oscillation control pattern 452. Thereby, an oscillation control pattern 452 for an intermediate oscillation causing the mirror 212 to oscillate in a narrow amplitude is attained.

Further, by maintaining the voltage Va of the electrode A at H ("1"), the mirror 212 is maintained in the OFF state even if the voltage Vd of the electrode D is given a change, including a pulse Vd5.

Figure 33:
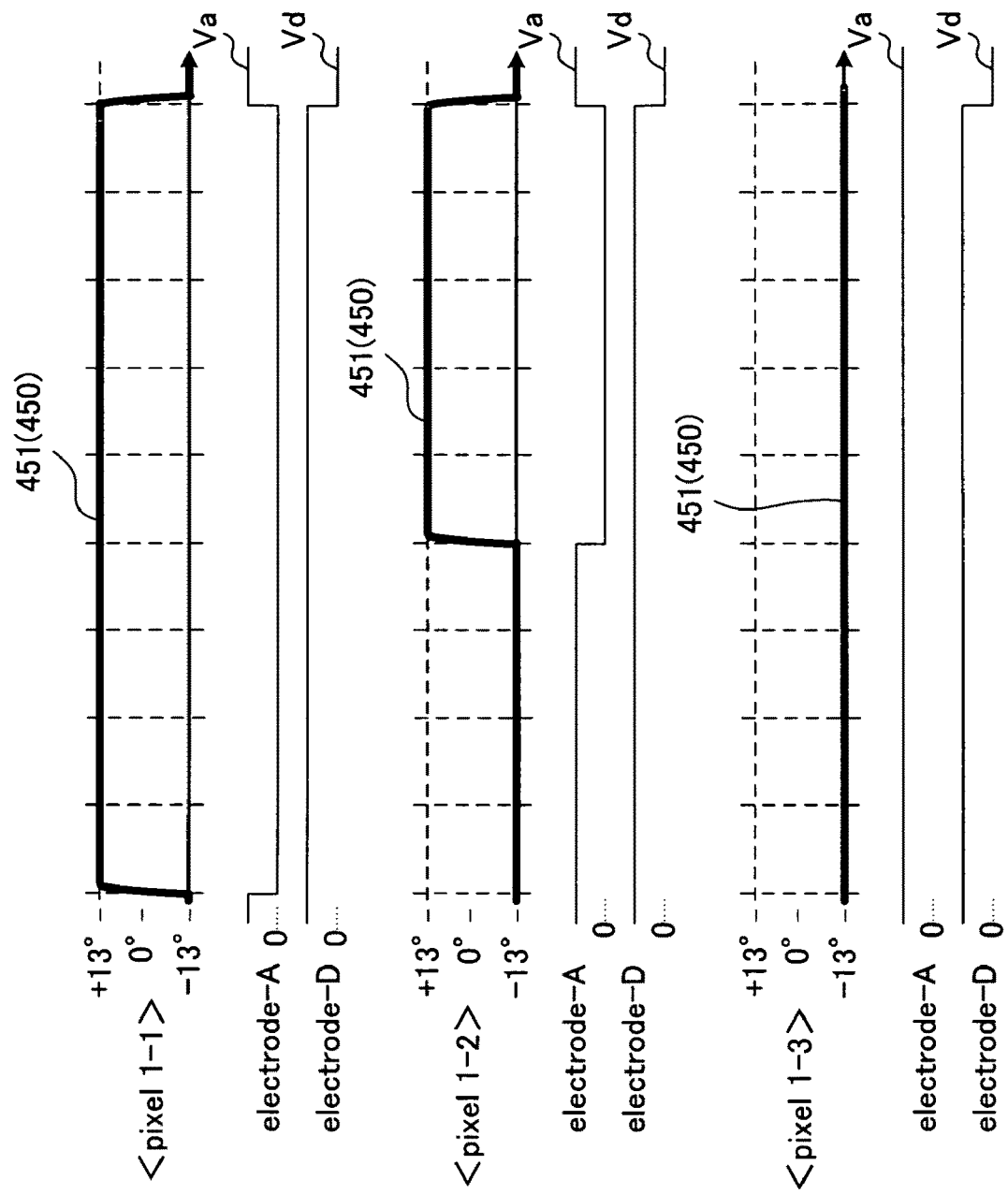
FIG. 33 is a timing diagram showing an exemplary modification of the operation of the pixel unit configured as shown in FIG. 30.

FIG. 33 is a timing diagram showing an exemplary modification of the operation of a pixel unit configured as shown in FIG. 30.

FIG. 33 exemplifies a waveform when a gray scale is represented by the mirror control profile 450 consisting of only the non-binary ON/OFF control pattern 451 (that is, not including an OSC, i.e., a full oscillation or intermediate oscillation of the mirror 212).

In the case of FIG. 33, the control is such that, within a subfield, either the voltage Va of the electrode A or the voltage Vd of the electrode D is turned to H ("1") and the other is turned to L ("0").

As such, the pixel unit 211 shown in FIG. 30 is configured to connect the electrode D on the ON side to the plate line 232 and to eliminate a memory cell M2 and ON electrode 216 (i.e., an electrode C), decreasing the number of circuit elements than a configuration in which the OFF side and ON side are furnished individually with the memory cells M1 and M2, respectively. Therefore, the production yield of pixel arrays 210 (i.e., the spatial light modulator 200) comprising a large number of pixel units 211 is improved.

Also, in order to reduce the size each pixel unit 211 so as to place a larger number of pixel units 211 within a pixel array 210 of a certain size, a transistor of the same size (that is, the same withstanding voltage), as a transistor constituting the memory cell M1 on the OFF side, can be used. Thereby the reliability of the operations of the pixel units 211 and spatial light modulator 200 can be maintained and improved.

Further, even for the same pixel size, it is possible to enlarge a gate transistor 216c, which improves the withstanding voltage. A high drive voltage enables high speed operation of the mirror 212 and the tilting of the mirror 212, even if the hinge 213 is strengthened as a countermeasure to stiction. Meanwhile, the number of masks used in the production process employing a photolithography process can be reduced by configuring the OFF capacitor 215b of the memory cell M1 using a poly-capacitor (i.e., a MOS capacitor) in place of the aluminum capacitor. Also, even for the same area size of poly-capacitor, a larger size lengthens the voltage support time of the memory cell M1, enabling a lower speed (i.e., a required speed is relaxed) write cycle of the memory cell M1.

<Exemplary Operation—J'>

Figure 34:
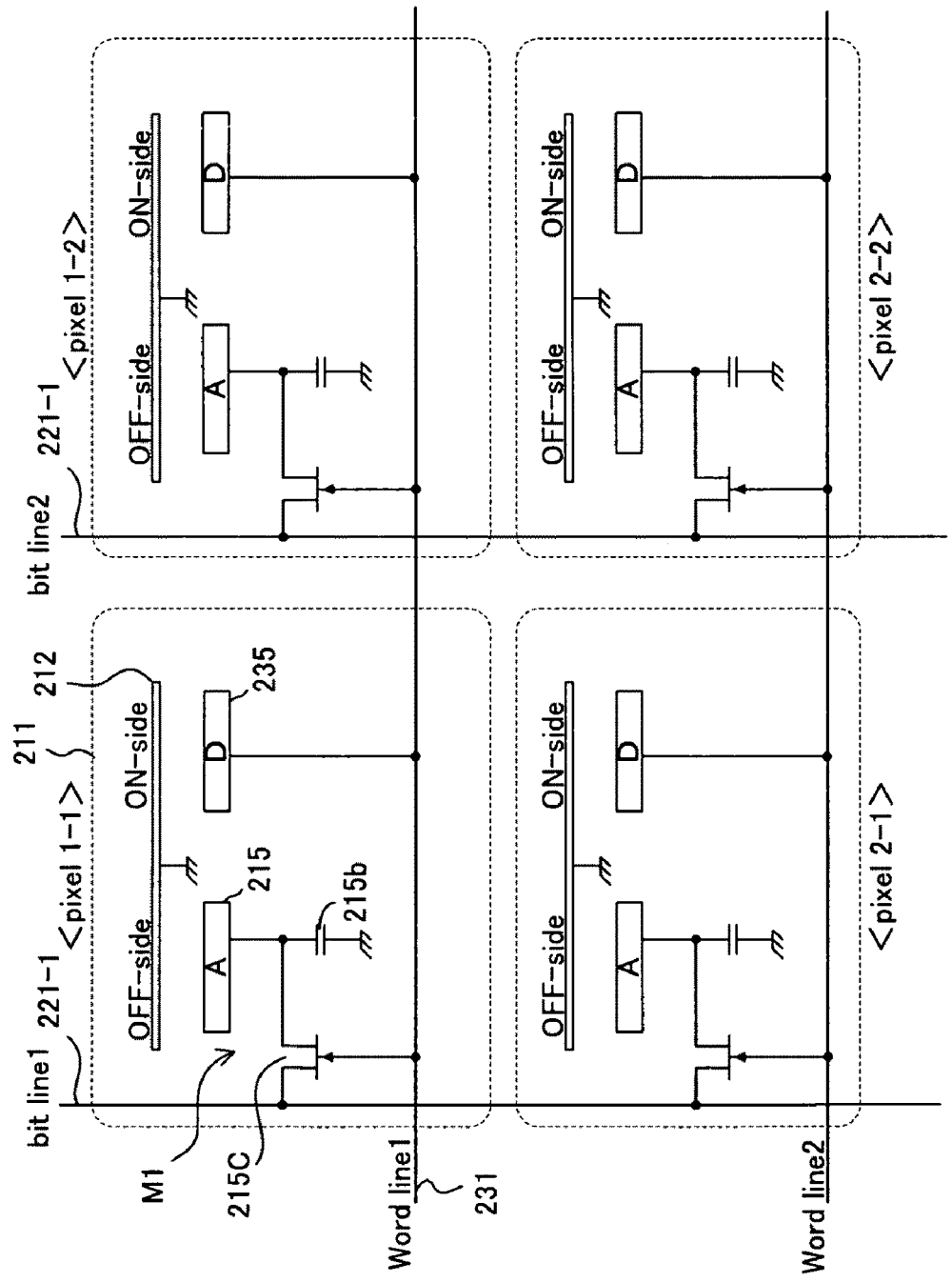
FIG. 34 is a functional circuit diagram showing an exemplary modification of the circuit configuration of the pixel unit shown in FIG. 30.

FIG. 34 is a conceptual diagram showing an exemplary modification of the circuit configuration of the pixel unit shown in FIG. 30.

The exemplary configuration of the pixel unit 211 shown in FIG. 34 is a configuration that combines the word line 231 and plate line 232, eliminating the latter.

Figure 35:
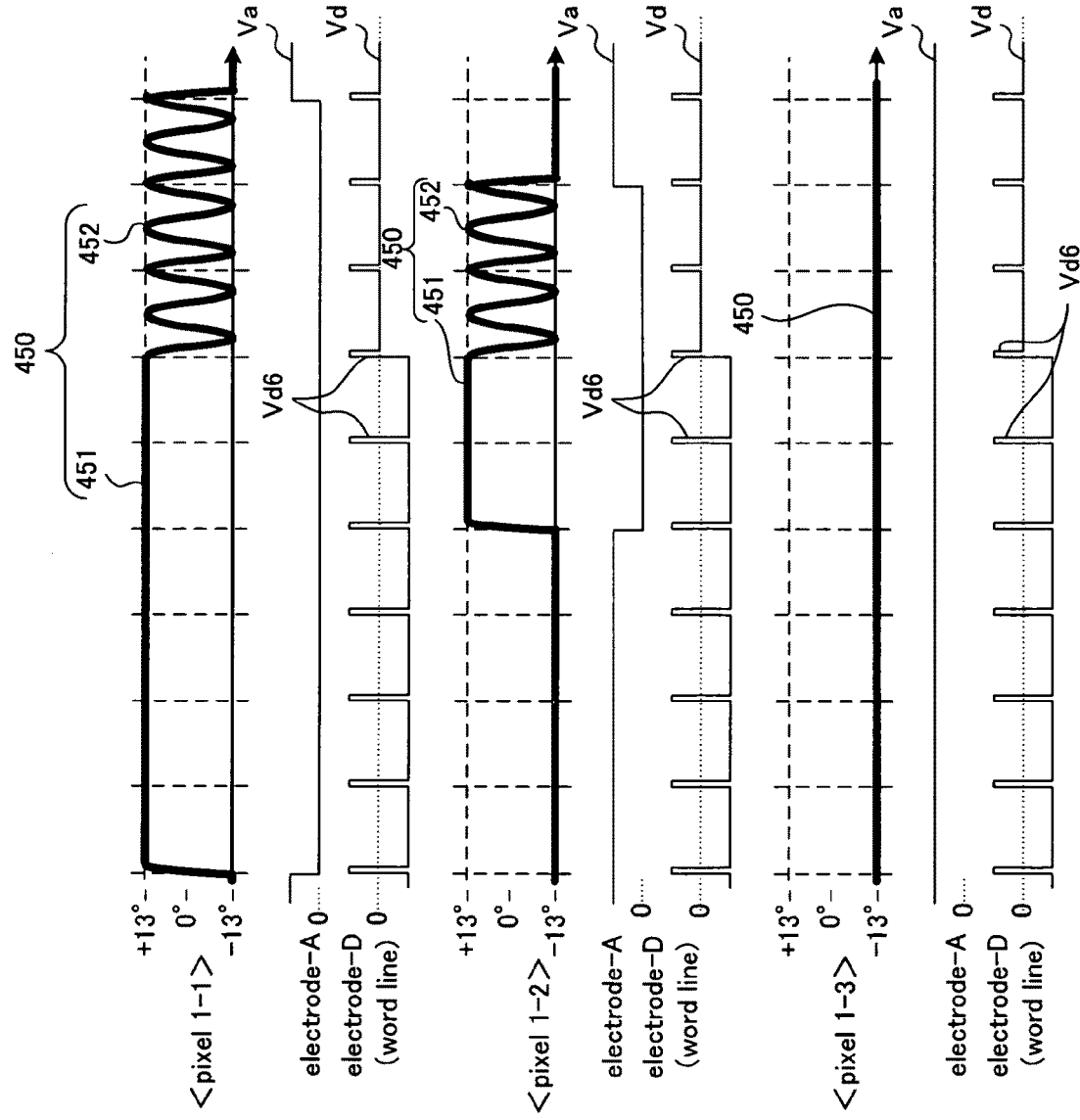
FIG. 35 is a timing diagram showing an exemplary operation of the pixel unit shown in FIG. 34.

FIG. 35 is a timing diagram showing an exemplary operation of the pixel unit 211 shown in FIG. 34. In this case, the ON/OFF control and oscillation control of the mirror 212 is the same as those for the configuration in FIG. 30. The difference in this case is in the control, where voltage Vd is a positive (+) level (i.e., a pulse Vd6) when the word line writes data to the memory cell M1, and where voltage Vd is switched to a negative (−) level during the period of attracting the mirror 212 to the ON side, and such that the voltage Vd is at zero potential during the period of an oscillation control (OSC).

Figure 36:
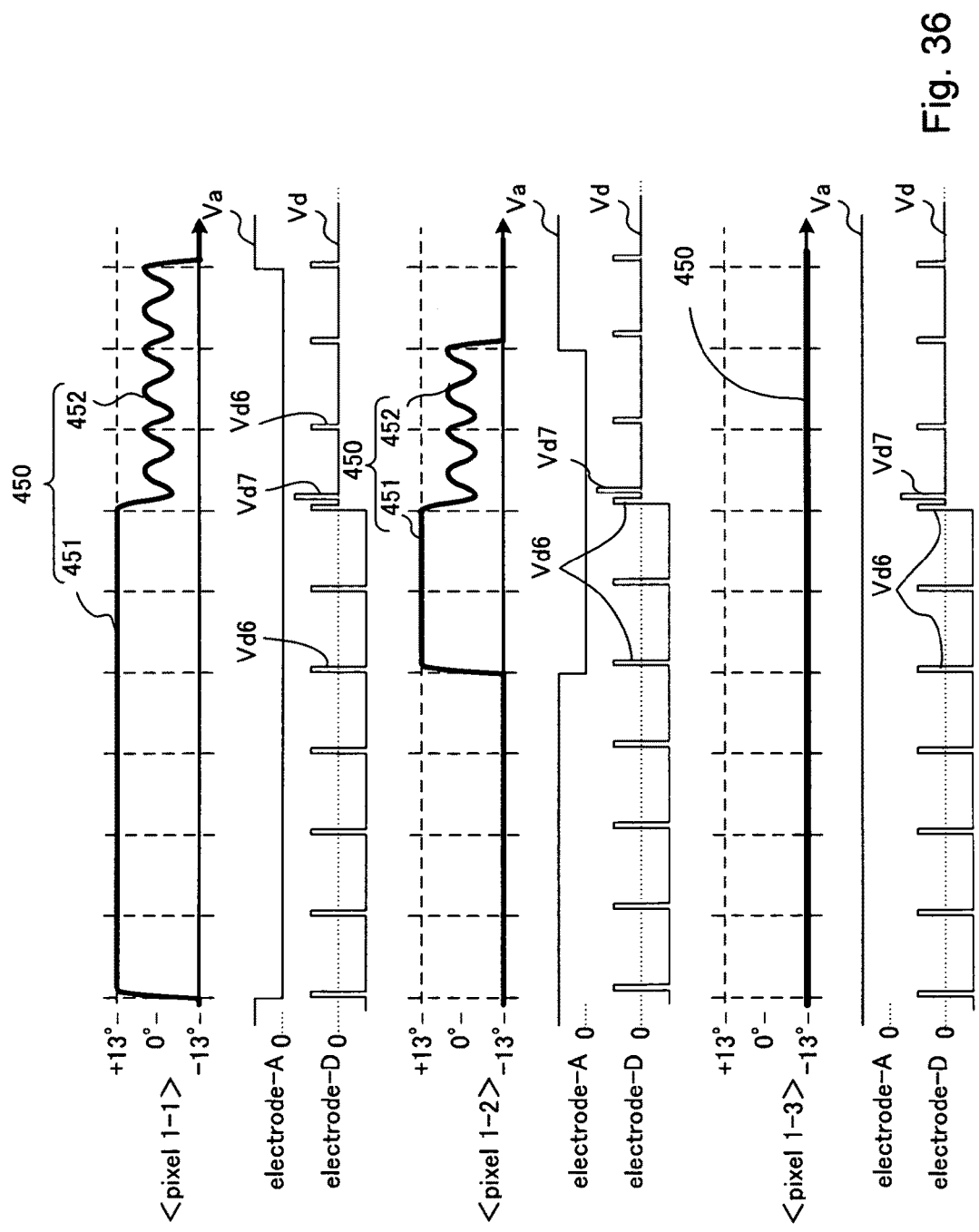
FIG. 36 is a timing diagram showing an exemplary modification of the control shown in FIG. 35.

FIG. 36 is a timing diagram showing an exemplary modification of the control shown in FIG. 35.

The mirror control profile 450 of FIG. 36 shows the waveform for generating an intermediate oscillation of the mirror 212 using the electrode D in the configuration shown in FIG. 34.

In this case, a pulse Vd7 is applied, as the voltage Vd of the electrode D, in order to attain the intermediate oscillation of the mirror 212 by temporarily returning the mirror 212 to the ON side when it shifts from the ON to OFF states. In addition, for each time slot, ts, a pulse Vd6 is applied for writing data to the memory cell M1.

Specifically, the gate transistor 215c driven by the word line 231 is not operated when the voltage Vd is in a negative bias and therefore the voltage Va of the electrode A is not changed. The electrodes A and D are controlled by utilizing the generation of Coulomb force in the electrode D, to which the voltage Vd is applied, even if the aforementioned voltage Vd is negative.

Figure 37:
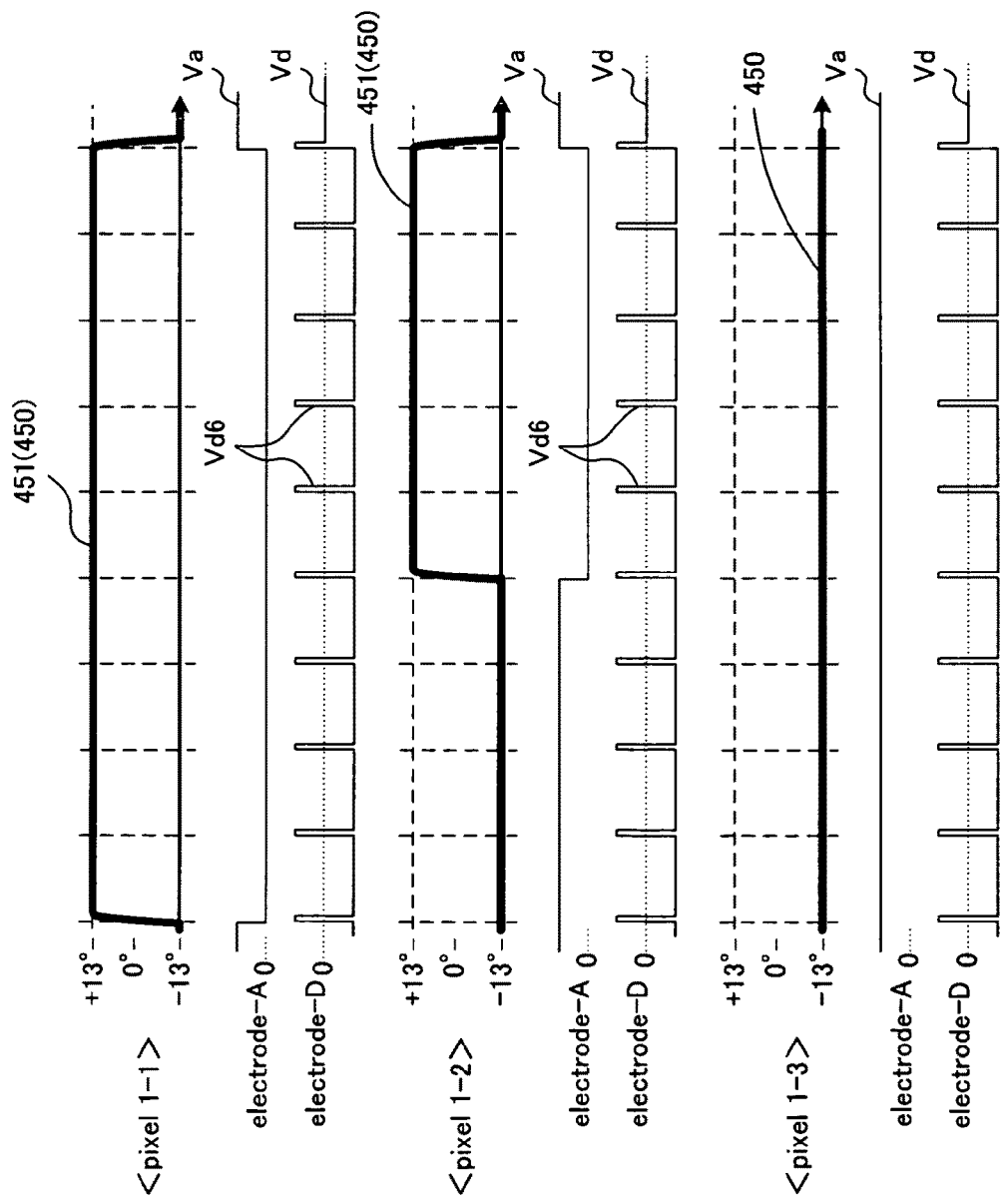
FIG. 37 is a timing diagram showing an exemplary modification of the control shown in FIG. 35.

FIG. 37 is a timing diagram showing an exemplary modification of the control shown in FIG. 35.

FIG. 37 shows the waveform of a mirror control profile 450 when a gray scale representation is carried out only by a non-binary ON/OFF control pattern 451 for the mirror 212.

In this case, the voltage Vd of the electrode D is maintained at negative (−) other than during pulse Vd6.

As such, the pixel unit 211 shown in FIG. 34 is configured to control the OFF electrode 215 (i.e., the electrode A) and second ON electrode 235 (i.e., the electrode D) using only the word line 231, leaving only one string of the word line 231 as the wiring along the ROW direction of the pixel unit 211 of the pixel array 210, thereby making it possible to increase the speed of driving the word line 231 because of the reduction of the stray capacitance of the wiring.

It is further possible to miniaturize the spatial light modulator 200 by eliminating a line driver (i.e., the word line driver 230b) used for driving the word line 231.

<Exemplary Operation—J">

Figure 38:
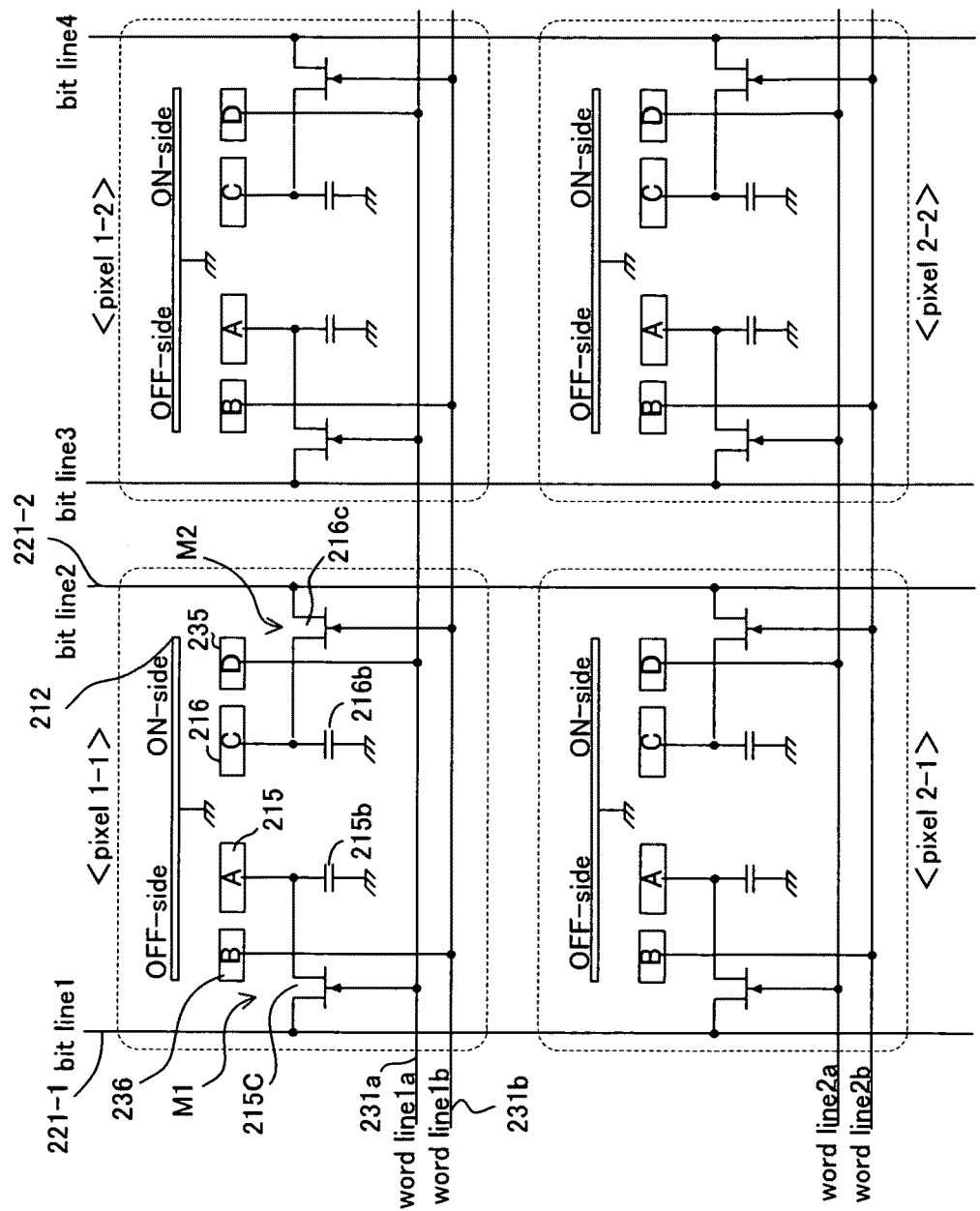
FIG. 38 is a functional circuit diagram showing an exemplary modification of the pixel unit shown in FIG. 34.

FIG. 38 is a conceptual diagram showing an exemplary modification of the pixel unit shown in FIG. 34. FIG. 38 is different from the configuration shown in FIG. 34 in that the ON side and OFF side are symmetrical.

The OFF electrode 215 (i.e., the electrode A and the memory cell M0 on the OFF side and the second ON electrode 235 (i.e., the electrode D) on the ON side are controlled by a common word line 231 a. Likewise, the ON electrode 216 (i.e., an electrode C and the memory cell M2) on the ON side and the second OFF electrode 236 (i.e., the electrode B) on the OFF side are controlled by a common word line 231b.

This configuration inversely controls the set of electrodes A and D using the word line 231a (and the bit line 221-1) and the set of electrodes C and B using the word line 231b (and the bit line 221-2), thereby making it possible to symmetrically change over the ON operation of the mirror 212 and the OFF operation.

For example, if the direction of a light 511 incident to a spatial light modulator 200 is completely reversed, the ON/OFF operation of a mirror 212 can be changed over in accordance with the incidence direction of the light 511 by controlling the word line 231a and word line 231b.

Figure 39:
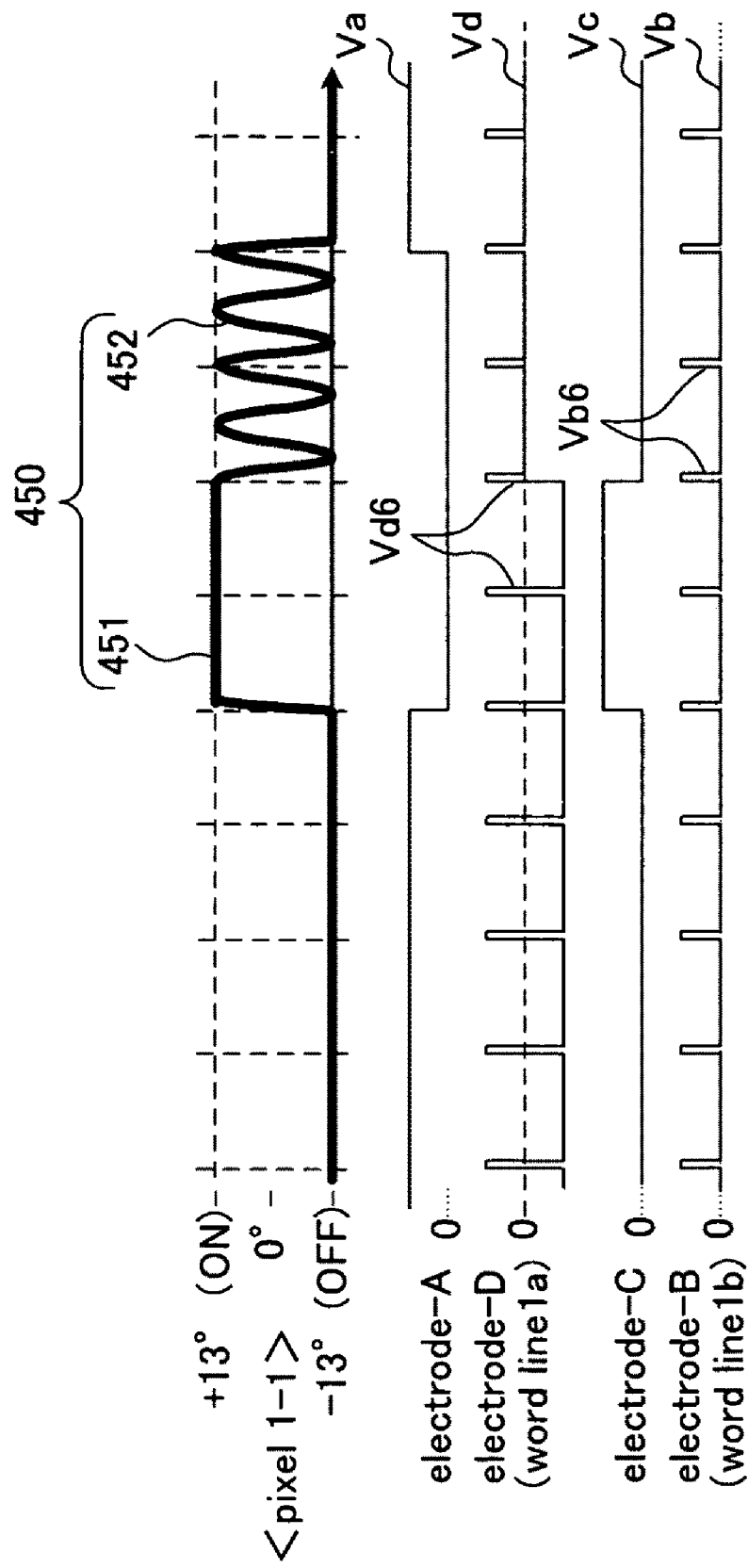
FIG. 39 is a timing diagram showing the control waveform of the mirror control profile used for the pixel unit in a symmetrical configuration as shown in FIG. 38.
Figure 40:
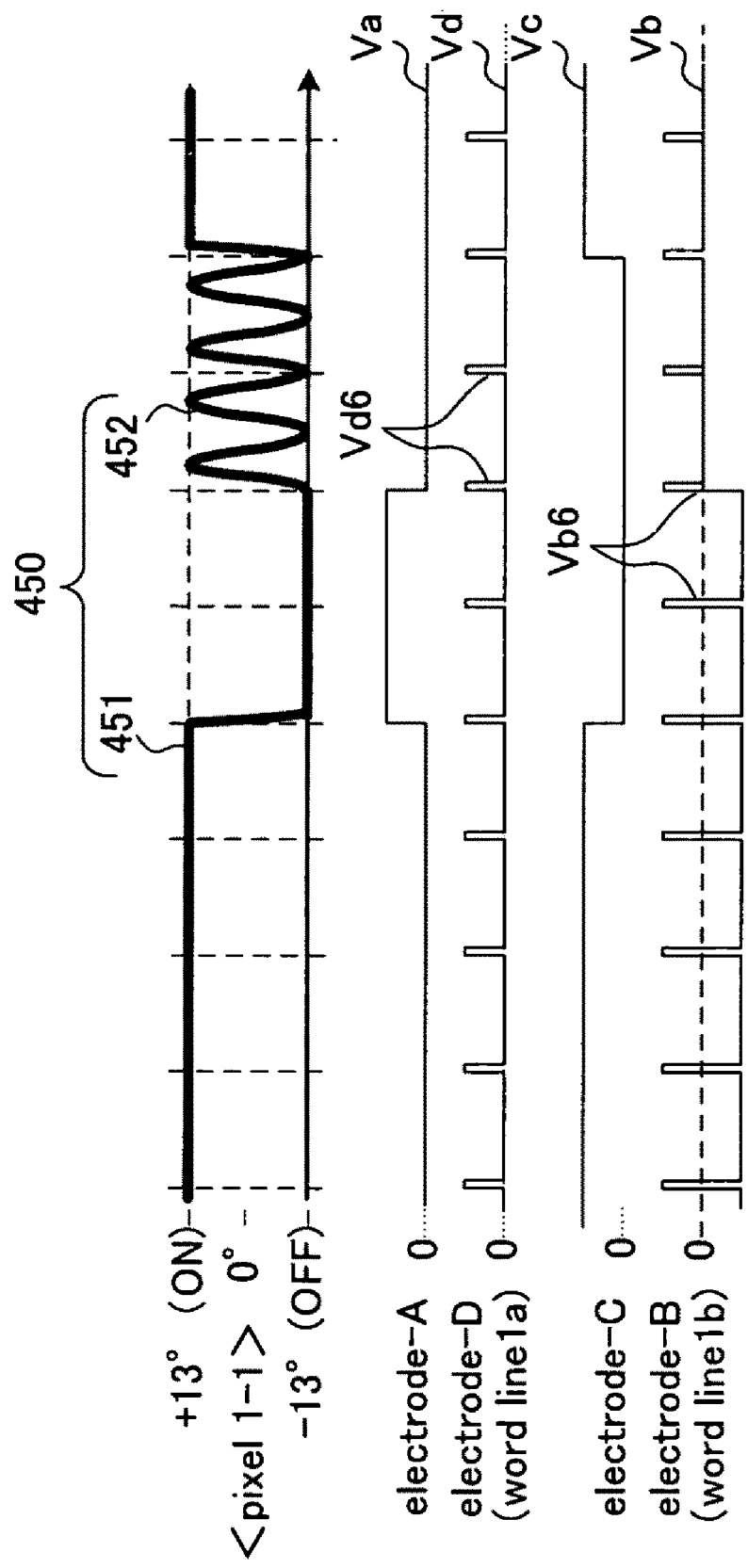
FIG. 40 is a timing diagram showing the control waveform of the mirror control profile used for the pixel unit in a symmetrical configuration as shown in FIG. 38.

FIGS. 39 and 40 are timing diagrams showing the control waveform of the mirror control profile used for the pixel unit in a symmetrical configuration, as shown in FIG. 38.

In FIGS. 39 and 40, the signal levels of all signal waveforms are symmetrical to each other.

Specifically, in FIG. 39, the control for the voltage Va of the electrode A and the voltage Vd of the electrode D, both of which are controlled by the word line 231a, is similar to the case of the above described FIG. 35.

In contrast, the electrode C (at the voltage Vc) and the electrode B (at the voltage Vb), both of which are controlled by the word line 231b, are supplied with a pulse Vb6 by the cycle of time slots is against the voltage Vb, while a data loading to the memory cell M2 (i.e., the ON side) from the bit line 221-2 is suppressed, and therefore the operation of the mirror 212 moving towards the ON side is carried out by the voltage Vc of the electrode C.

Meanwhile, in FIG. 40, in which the waveforms of the individual signals are symmetrical to those of FIG. 39, a reverse operation to the above description is carried out so that the OFF operation of the mirror 212 is carried out by the pulse Vb6 on the voltage Vb loading data onto the memory cell M2 (i.e., on the OFF side) using the bit line 221-2. While, in electrodes A and B, both of which are controlled to the ON side, a data loading onto the electrode A (i.e., the memory cell M1) using the bit line 221-1 is not carried out, and therefore the operation for attracting the mirror 212 to the ON side is controlled by the change in potentials (i.e., negative, zero and positive) of the voltage Vb (i.e., the pulse Vb6) of electrode B.

Figure 41:
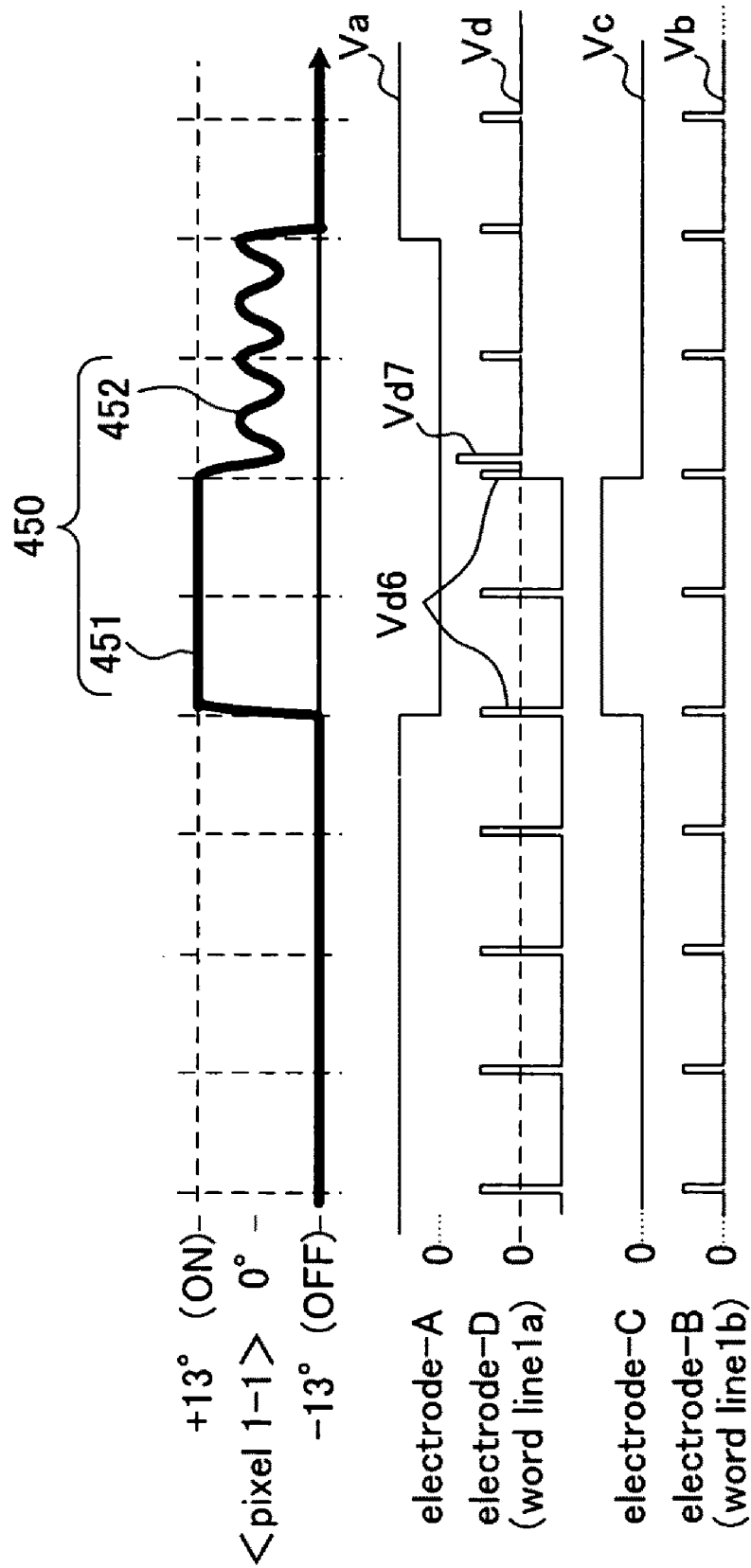
FIG. 41 is a timing diagram showing the waveform of a mirror control profile in order to attain an intermediate oscillation in the pixel unit configured as shown in FIG. 38.
Figure 42:
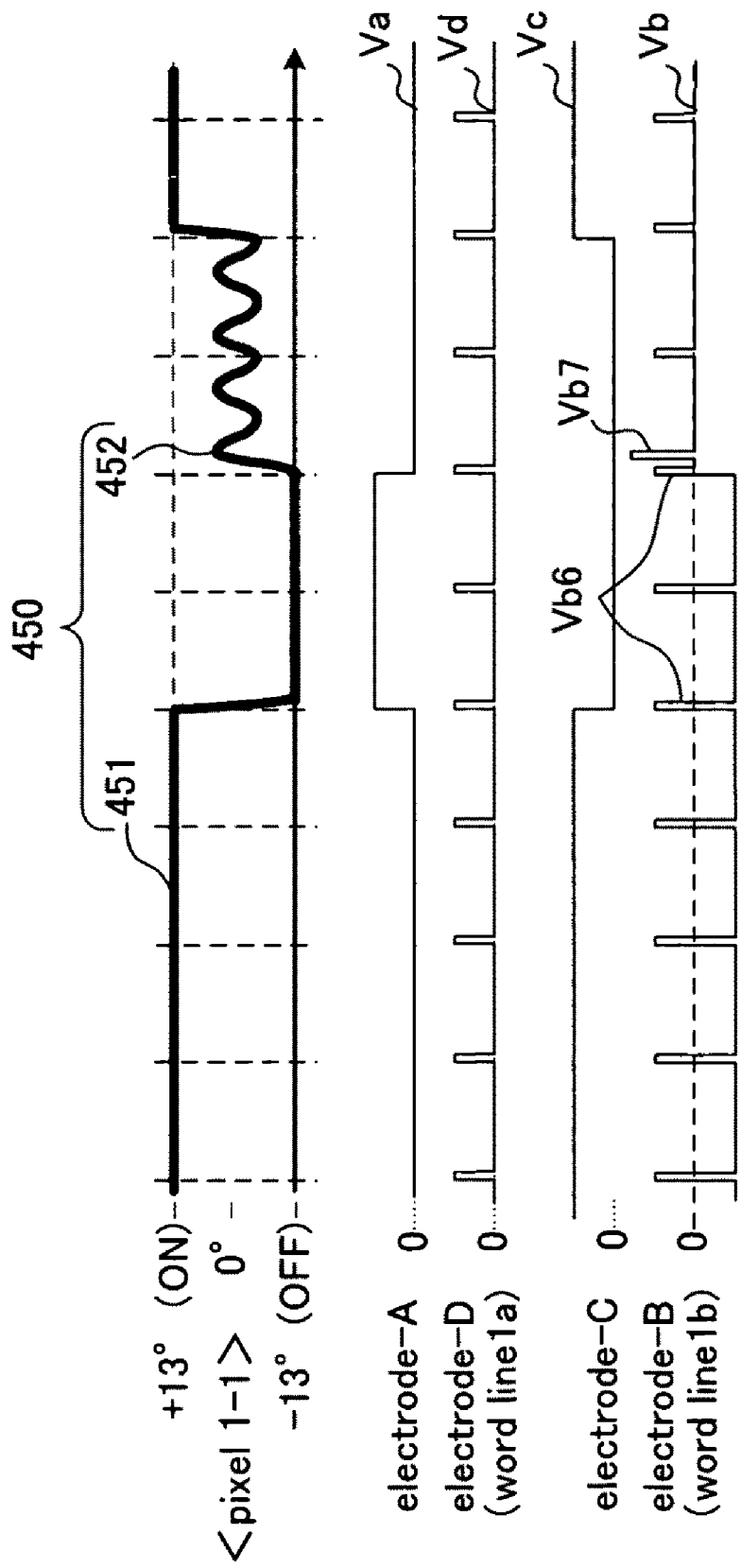
FIG. 42 is a timing diagram showing the waveform of a mirror control profile in order to attain an intermediate oscillation in the pixel unit configured as shown in FIG. 38.

FIGS. 41 and 42 are timing diagrams showing the waveform of a mirror control profile in order to attain an intermediate oscillation in the pixel unit configured as shown in FIG. 38.

FIG. 41 shows a waveform when operating the electrode B as the OFF side and the electrode D as the ON side. With the operation, the mirror is returned to the ON side to attain an intermediate oscillation by applying a pulse Vd7 to the voltage Vd of the electrode D when the mirror 212 is shifting from the ON to OFF states.

Meanwhile, FIG. 42 shows a waveform when operating the electrode B as the ON side and the electrode D as the OFF side. With the operation, an intermediate oscillation of the mirror 212 is attained by applying a pulse Vb7 to the voltage Vb of the electrode B.

Figure 43:
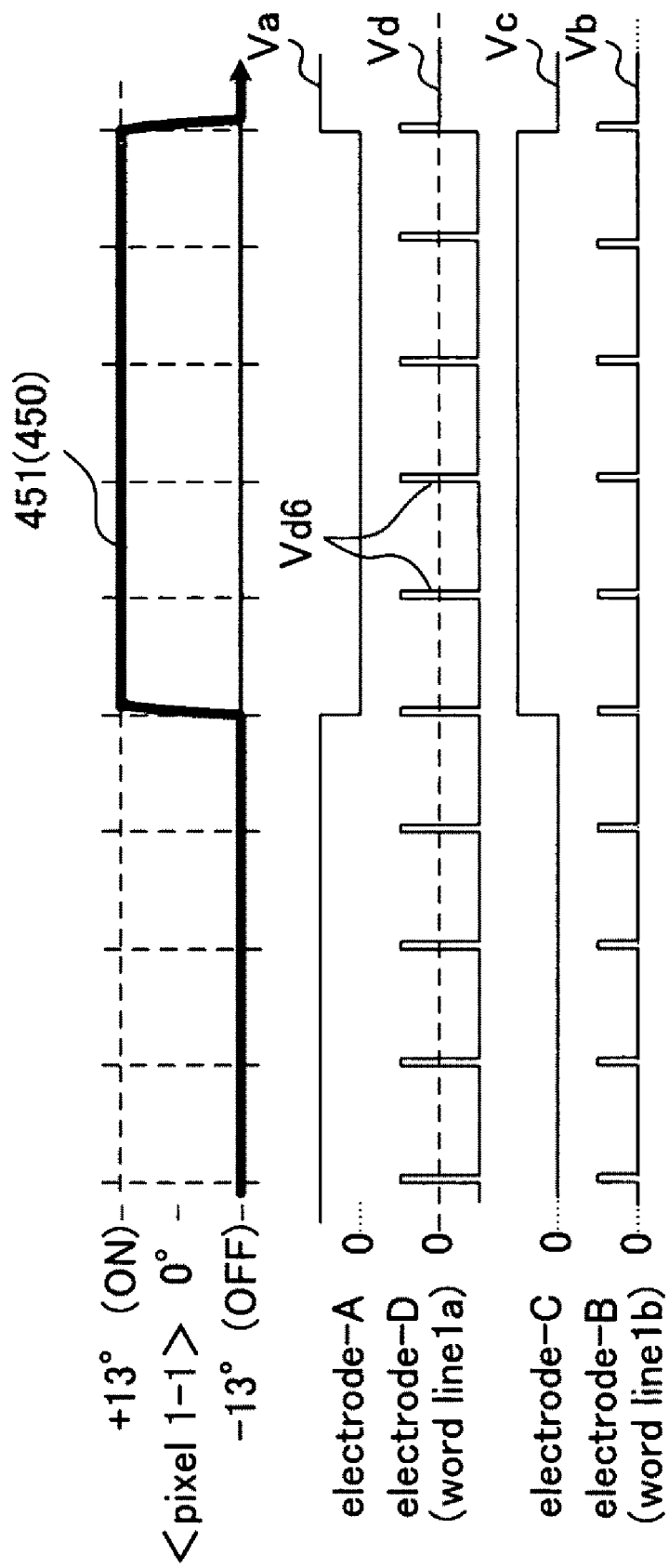
FIG. 43 is a timing diagram showing an exemplary waveform in the case of performing a gray scale representation by driving, with a non-binary ON/OFF control pattern not including an oscillation control, the pixel unit configured as shown in FIG. 38.
Figure 44:
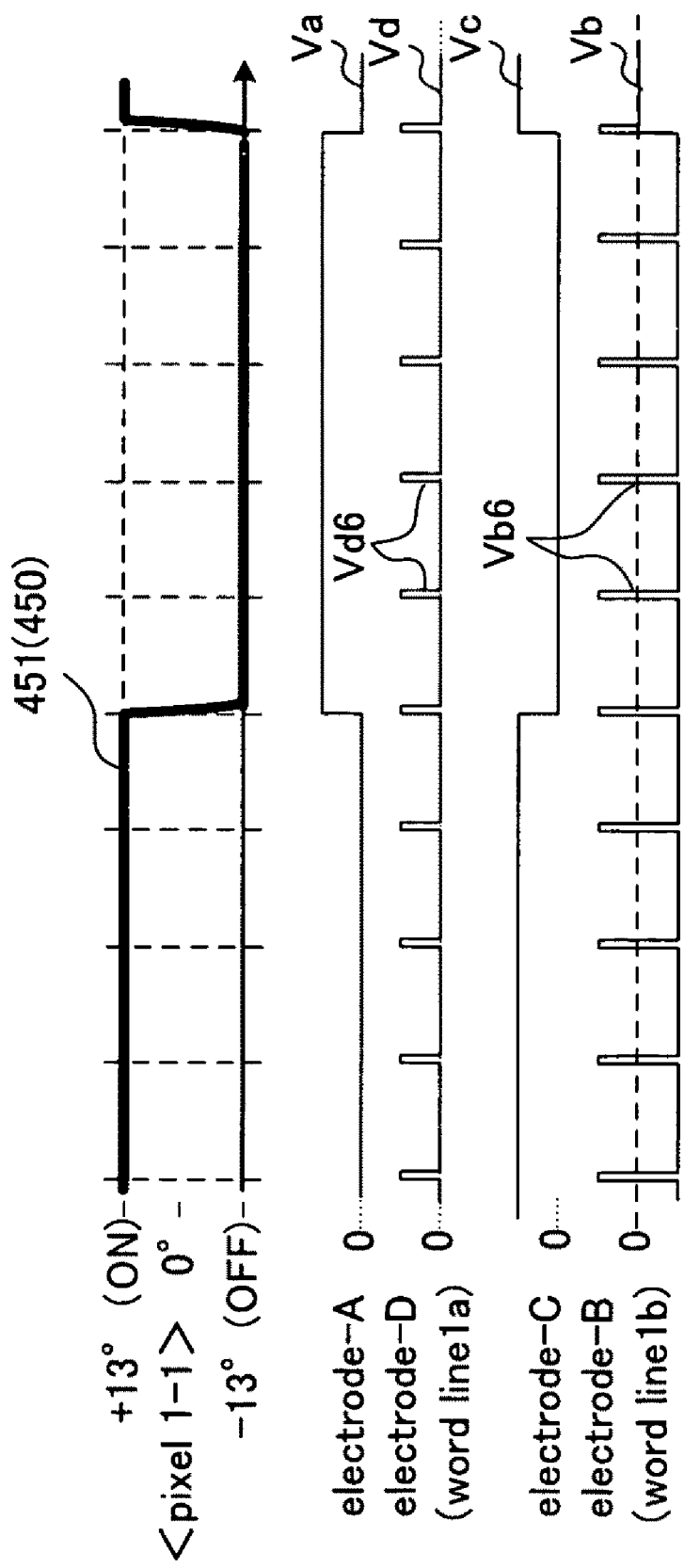
FIG. 44 is a timing diagram showing an exemplary waveform in the case of performing a gray scale representation by driving, with a non-binary ON/OFF control pattern not including an oscillation control, the pixel unit configured as shown in FIG. 38.

FIGS. 43 and 44 are timing diagrams showing an exemplary waveform in the case of performing a gray scale representation by driving the pixel unit configured as shown in FIG. 38 with a non-binary ON/OFF control pattern, not including an oscillation control.

Specifically, FIG. 43 shows an example of making the electrode A (or electrode B) function as the OFF side and making the electrode D (or electrode C) function as the ON side. In contrast, FIG. 44 shows an example of making the electrode A (or electrode B) function as the ON side and making the electrode D (or electrode C) functions as the OFF side.

A spatial light modulator 200 comprising the pixel unit 211, configured as shown in FIG. 38, in which the ON side and OFF side are symmetrically configured, may be placed among a plurality of light sources of varying colors The ON operation and OFF operation may be mutually reversed by means of controlling the word lines 231a and 231b when, for example, a color display is implemented by synthesizing a plurality of incident lights 511 using a plurality of spatial light modulators 200 assigned to the respective colors, thereby eliminating the need for a spatial light modulator 200 comprising pixel units 211 configured differently for the individual light sources with different incidence directions of the lights 511, and thus making it possible to manufacture a lower cost display apparatus carrying out a color display by means of a synthesis using an optical system comprising a plurality of spatial light modulators 200.

Figure 45:
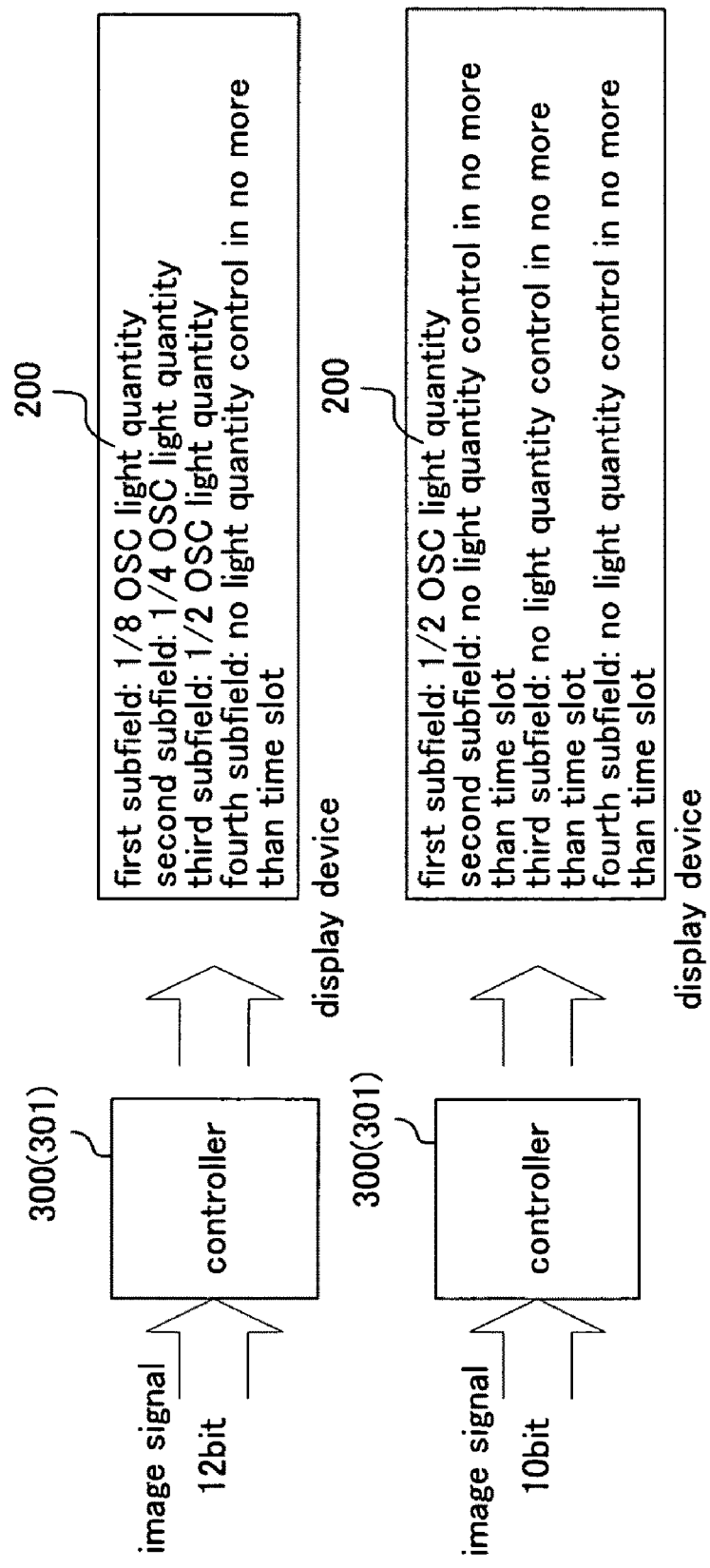
FIG. 45 is a functional block diagram showing an exemplary control function equipped in the control apparatus of a projection apparatus according to a preferred embodiment of the present invention.

FIG. 45 is a functional block diagram showing an exemplary control function equipped in the control apparatus of a projection apparatus according to the present embodiment.

The control apparatus 300 shown in FIG. 45 is equipped with a control logic 301 for determining whether or not to improve a gray scale representation by means of a light intensity control in the equivalence of a time slot ts, or less, with the signal width (i.e., 10-bit or 12-bit in this case) of a binary video signal 400 to the control apparatus 300 by placing the electrodes D and B, as described above in the preferred embodiments.

Further, as shown in the upper half of FIG. 45, when a 12-bit width binary video signal 400 is inputted to the control apparatus 300, the control logic 301 instructs the spatial light modulators 200 to carry out a light intensity control in no more than the time width of the time slot ts shown in FIG. 17A and other figures.

Meanwhile, as shown on the lower half of FIG. 45, when a 10-bit width binary video signal 400 is inputted to the control apparatus 300, the control logic 301 instructs the spatial light modulators 200 to carry out a light intensity control in no more than the time width of the time slot ts, shown in FIG. 17A and other figures, for only the first subfield 601 and not to carry it out for the rest of the subfields, i.e., the second subfield 602 through fourth subfield 604.

Figure 46:
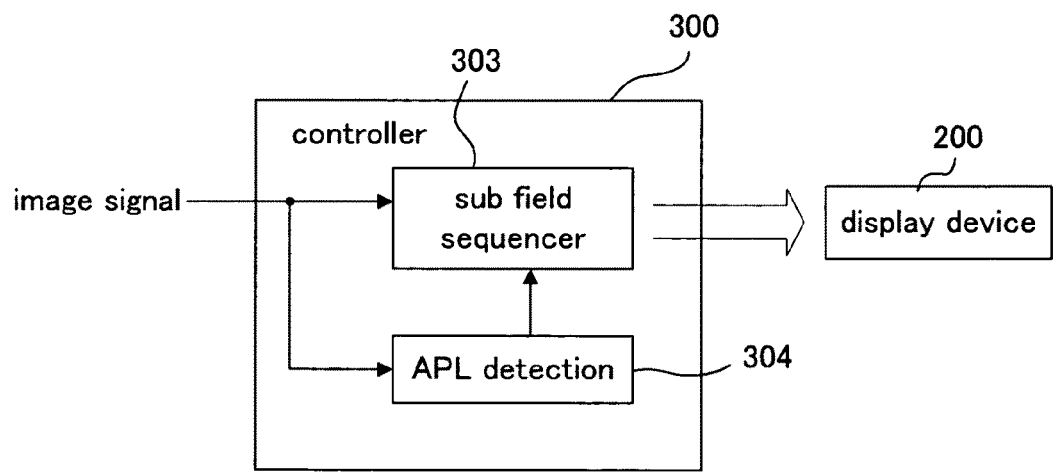
FIG. 46 is a functional block diagram showing an exemplary control function equipped in the control apparatus of a projection apparatus according to a preferred embodiment of the present invention.

FIG. 46 is a functional block diagram showing an exemplary control function equipped in the control apparatus of a projection apparatus according to the present embodiment.

FIG. 46 exemplifies the case of changing over light intensity controls in no more than the time width of a time slot ts for each subfield in accordance with the average picture level (APL) of a binary video signal 400 inputted to the control apparatus 300.

Specifically, the control apparatus 300 is equipped with a subfield sequencer 303 for changing over light intensity controls in no more than the time width of a time slot ts for each subfield and with an APL detector 304 for detecting the APL of the binary video signal 400.

Further, the subfield sequencer 303 performs a light intensity control in no more than the time width of a time slot ts in each of the first subfield 601 through fourth subfield 604, as described above in accordance with the value of the average picture level (APL) of the binary video signal 400 inputted from the APL detector 304. The necessary gray scale characteristic and gamma characteristic may be obtained by a configuration by means of the control in accordance with the APL.

Figure 47:
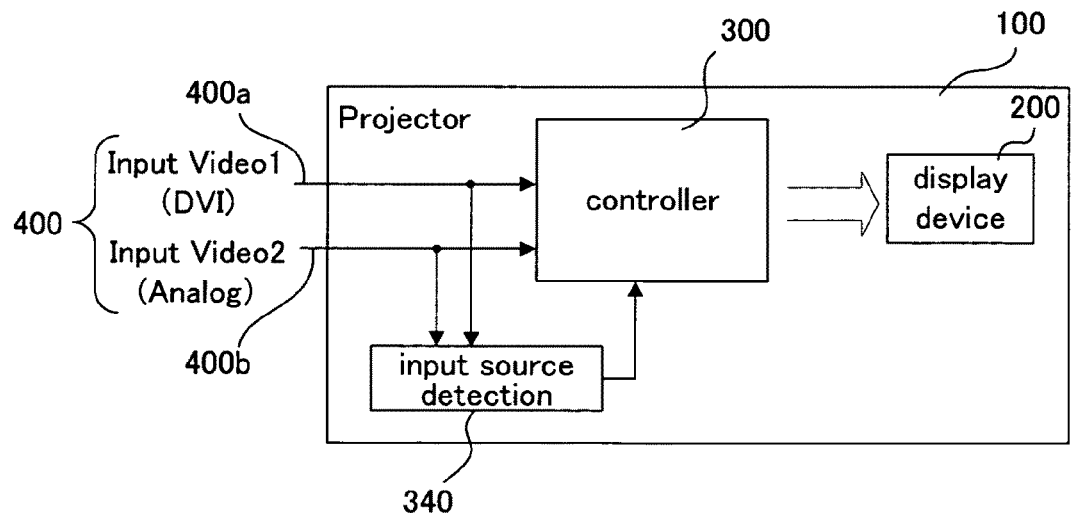
FIG. 47 is a functional block diagram showing an exemplary control function of a projection apparatus according to a preferred embodiment of the present invention.

FIG. 47 is a functional block diagram showing an exemplary control function of a projection apparatus according to the present embodiment.

In addition to being equipped with the control apparatus 300, the projection apparatus 100 shown in FIG. 47 is equipped with an input source detector 340 for discerning the category of an input binary video signal 400.

The input source detector 340 discerns, for example, whether a binary video signal 400 is a digital input video signal 400a such as a digital visual interface (DVI) or an analog input video signal 400b. It inputs the discernment result to the control apparatus 300 so that it instructs the spatial light modulator 200 to change over light intensity controls in no more than the time width of a time slot ts in accordance with the appropriate category of the video signal inputted from the input source detector 340.

Figure 48A:
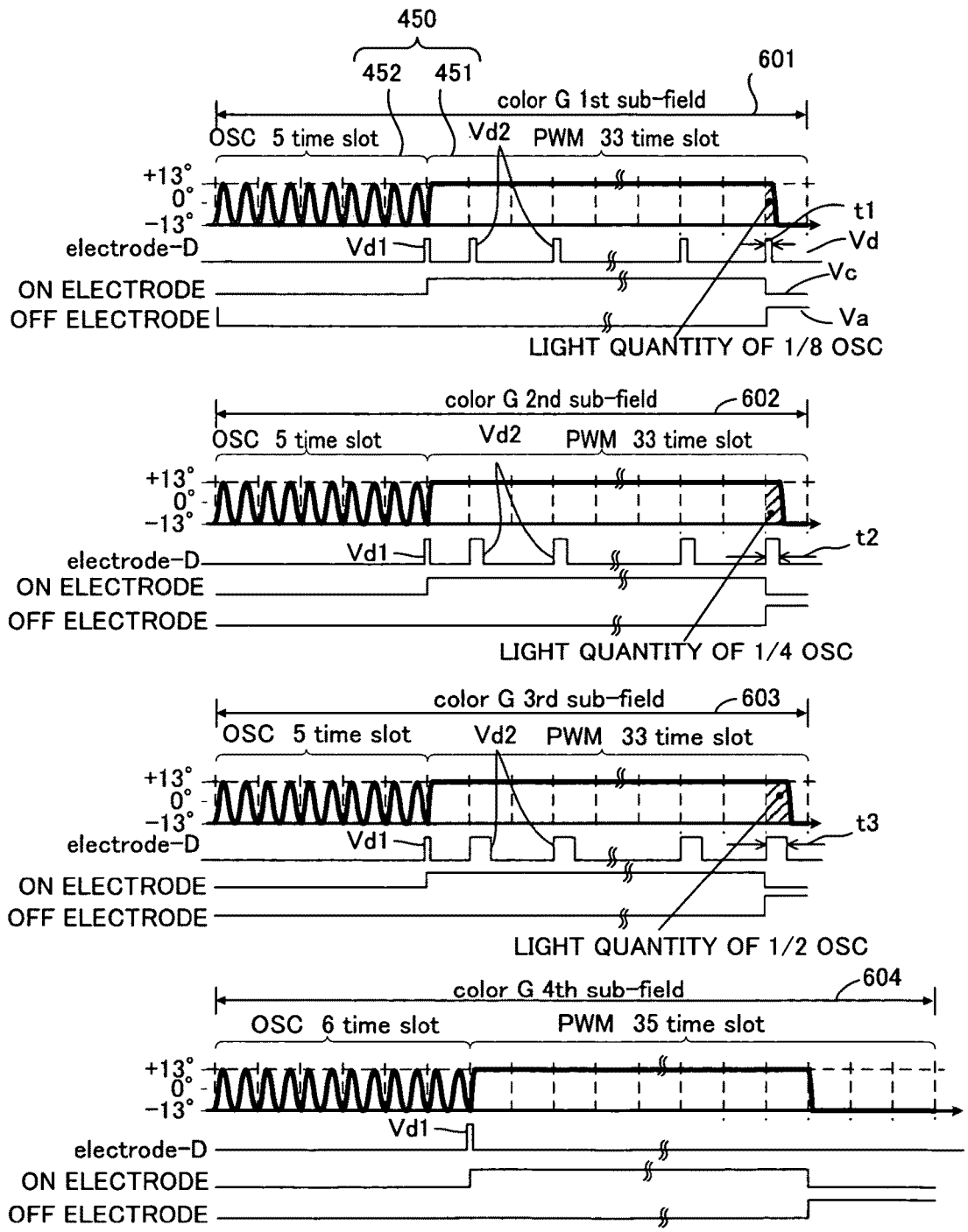
FIG. 48A is a timing diagram showing an exemplary waveform of a mirror control profile.
Figure 48B:
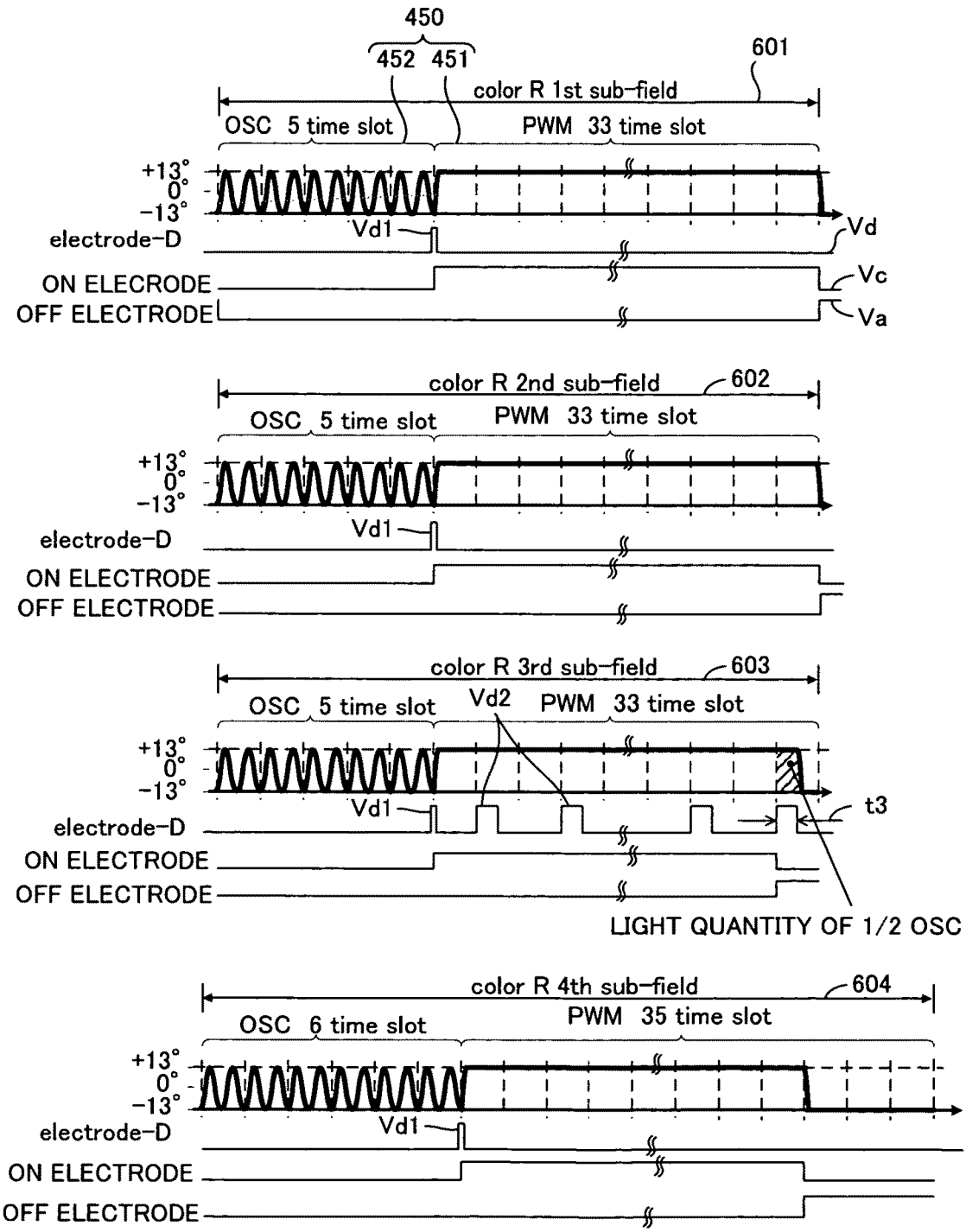
FIG. 48B is a timing diagram showing an exemplary waveform of a mirror control profile.

FIGS. 48A and 48B are timing diagrams showing an exemplary waveform of a mirror control profile.

FIGS. 48A and 48B exemplifies the case of changing over light intensity controls in no more than the time width of a time slot ts for each frame of a color sequence display (consisting of a plurality of subfields, i.e., the first subfield 601 through fourth subfield 604).

Specifically, FIG. 48A exemplifies the control waveforms for the first subfield 601 through fourth subfield 604 constituting the frame corresponding to green (G); FIG. 48B exemplifies the control waveforms for the first subfield 601 through fourth subfield 604 constituting the frame corresponding to red (R).

The frame of green shown in FIG. 48A exemplifies the case in which the light intensity controls of $1+\frac{1}{8}$ (OSC), $1+\frac{1}{4}$ (OSC) and $1+\frac{1}{2}$ (OSC) for the first subfield 601 through third subfield 603, totaling $3+\frac{7}{8}$ (OSC), are carried out, and the light intensity control of $-3$ for the fourth subfield 604 is carried out. As a result, light intensity is increased by the amount of $\frac{7}{8}$ (OSC) for the entirety of the green frame.

Meanwhile, the frame of red shown in FIG. 48B exemplifies the case in which the light intensity controls of $+1$, $+1$ and $1+\frac{1}{2}$ for first subfield 601 through third subfield 603, totaling $2+\frac{1}{2}$, are carried out, and the light intensity control of $-3$ for the fourth subfield 604 is carried out. As a result, the light intensity control of $-\frac{1}{2}$ (OSC) is carried out for the entirety of the red frame.

As such, the examples shown in FIGS. 48A and 48B are configured to perform the light intensity controls in which the time widths of a time slot ts are different for the green frame and red frame.

These controls improve the gradation of an image by, for example, making a change in gray scale levels large for the green frame with which the sensitivity of the human eye is high, while making a change in gray scale levels small for colors with which the sensitivity of human eye is low, such as red and blue.

FIG. 49 is a timing diagram showing an exemplary timing diagram shown in FIG. 17A, with a part of the chart enlarged.

With reference to FIG. 49, the relationship between the pulse Vd2, on the voltage Vd of the electrode D, and a pulse Vw1, on the voltage Vw of the word line 231, used for determining the timing of a data loading onto the memory cell M1 (and the memory cell M2) for each time slot ts will be examined.

The exemplary timing control (c) on the right side of FIG. 49 exemplifies the case of setting the start timing of the pulse Vd2 earlier than the start timing of the pulse Vw1 and also of setting the width of the pulse Vd2 wider than that of the pulse Vw1.

Under the exemplary timing control (c), the mirror 212 is stopped in the ON state by the Coulomb force generated by the ON electrode 216 (i.e., the electrode C). In this state, the Coulomb force generated by the electrode D (i.e., the second ON electrode 235) placed on the ON side is applied to the mirror 212, and thereby the mirror 212 is tilted onto the ON electrode 216. This operation makes it possible to maintain the mirror 212 stationary in the ON state.

In the exemplary timing control (c), however, there may be the possibility of stiction. That is, the mirror 212 may be stuck on the ON side.

Accordingly, the exemplary timing control (b) at the center of FIG. 49 is configured to set the timing so as to start the pulse Vd2 on the electrode D after the pulse Vw1 on the word line 231 and to turn ON the electrode D by giving the pulse Vd2 after the data of the memory cell M1 (and the memory cell M2) are exchanged by the pulse Vw1 on the word line 231. In this case, although there is no concern for a problem of stiction, the mirror 212 may start to freely move immediately depending on the state of data transition in the memory cell M1 (and the memory cell M2).

As an intermediate case between the above described exemplary timing controls (b) and (c), the exemplary timing control (a) on the left side of FIG. 49 is configured to set the start timing of the pulse Vw1 on the word line 231 and that of the pulse Vd2 on the electrode D to be simultaneous. By doing so, the control of the word line 231 and plate line 232 can be simplified.

Figure 50:
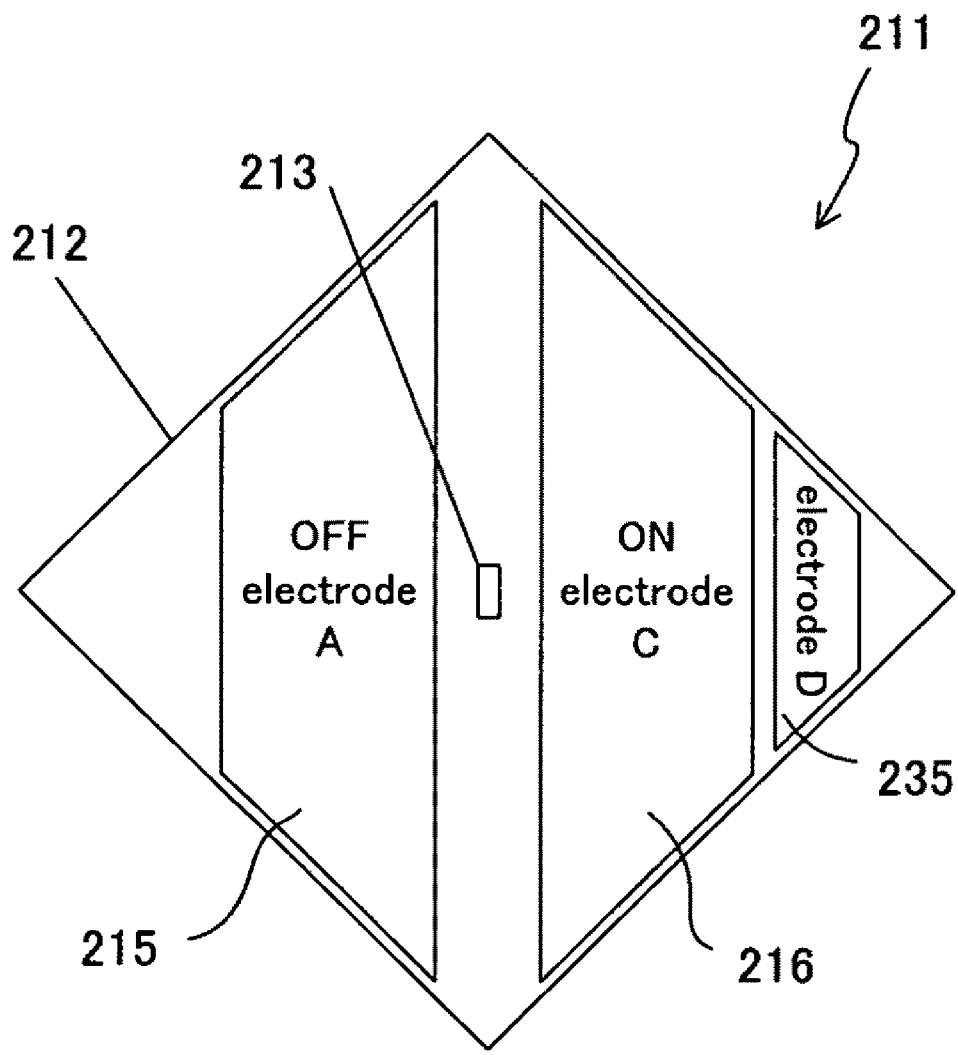
FIG. 50 is a top view diagram illustratively exemplifying the layout configuration of an electrode of the pixel unit shown in FIG. 8.

FIG. 50 is a top view diagram showing the layout configuration of an electrode of the pixel unit shown in FIG. 12C (and FIG. 8).

FIG. 51 is a timing diagram showing an exemplary modification of d FIG. 17.

As shown in FIG. 50, on the ON side of the pixel unit 211, the area size of the electrode C is larger than that of the electrode D.

Therefore, if the voltage Vc of the electrode C and the voltage Vd of the electrode D are the same, the Coulomb force Fc functioning between the electrode C and the mirror 212 is larger than the Coulomb force Fd functioning between the electrode D and the mirror 212.

The timing diagram shown in FIG. 51 exemplifies the setting of mutually different values between the voltage value V2 of the pulse Vd2 applied to the electrode D and voltage value V1 at H ("1") of the voltage Vc of the electrode C, thereby allowing for the discretionary adjustment of the magnitude between Coulomb forces Fd and Fc.

Figure 52:
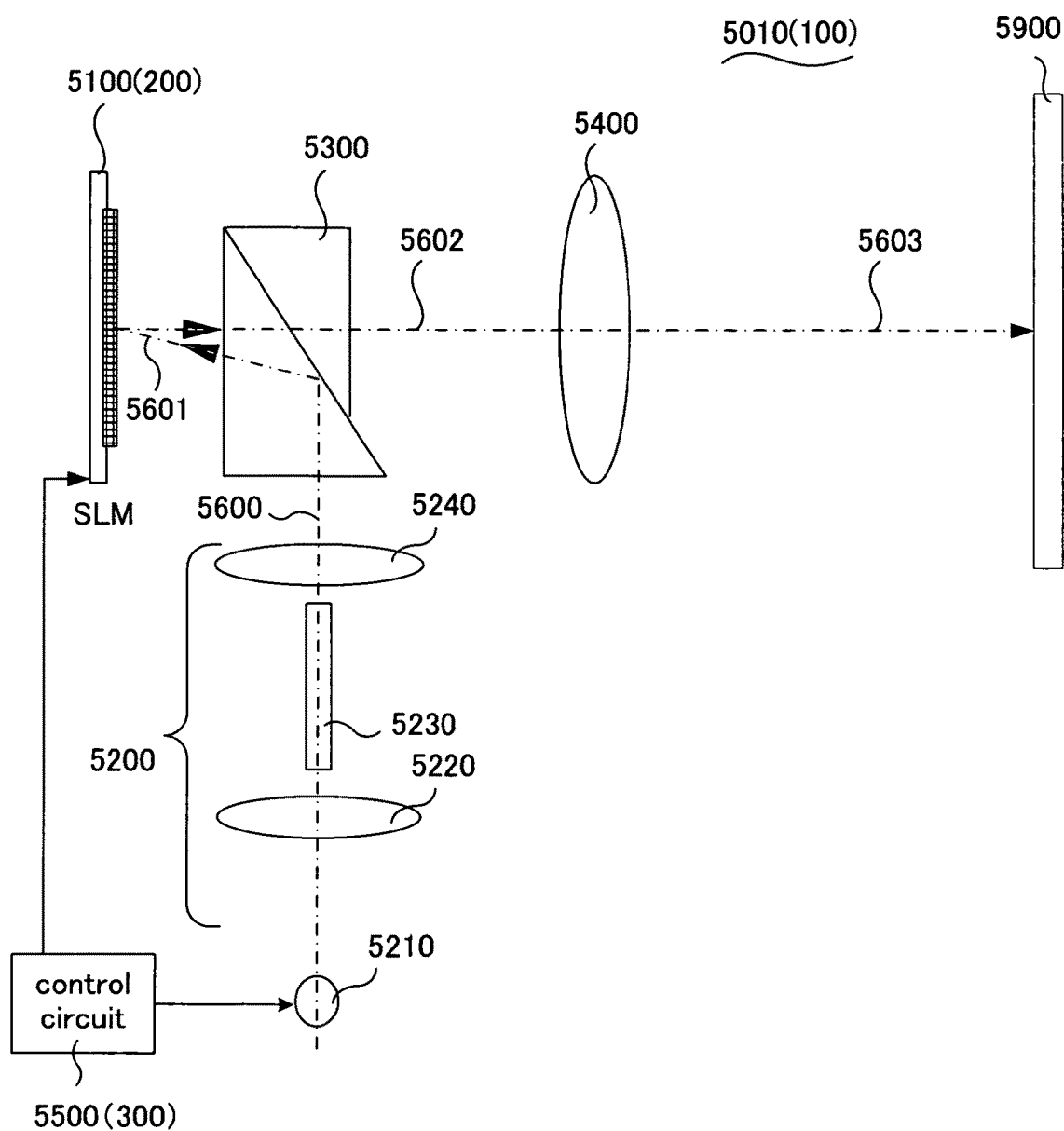
FIG. 52 is a functional block diagram showing the configuration of a projection apparatus according to a preferred embodiment of the present invention.

FIG. 52 is a conceptual diagram showing the configuration of a projection apparatus according to a preferred embodiment of the present invention.

The following is a description of an exemplary configuration of a projection apparatus 100 using, as a spatial light modulator 5100, the spatial light modulator 200 comprising the above described pixel unit 211 shown in FIGS. 8, 9 and 10, and further exemplary modification thereof.

As shown in FIG. 52, a projection apparatus 5010 according to the present embodiment comprises a single spatial light modulator (SLM) 5100 (i.e., the spatial light modulator 200), a control unit 5500 (i.e., the control apparatus 300), a Total Internal Reflection (TIR) prism 5300, a projection optical system 5400 and a light source optical system 5200.

The spatial light modulator 5100 is constituted by the above described spatial light modulator 200 comprising the plate line 232.

The projection apparatus 5010 is commonly referred to as a single-panel projection apparatus 5010 comprising a single spatial light modulator 5100.

The projection optical system 5400 is equipped with the spatial light modulator 5100 and TIR prism 5300 in the optical axis of the projection optical system 5400, and the light source optical system 5200, which is equipped in such a manner that the optical axis thereof matches that of the projection optical system 5400.

The TIR prism 5300 causes the illumination light 5600, incoming from the light source optical system 5200 placed onto the side, to enter the spatial light modulator 5100 at a prescribed inclination angle as incident light 5601 and causes a reflection light 5602, reflected by the spatial light modulator 5100, to transmit to the projection optical system 5400.

The projection optical system 5400 projects the reflection light 5602 as projection light 5603 to a screen 5900.

The light source optical system 5200 comprises a variable light source 5210 for generating the illumination light 5600, a condenser lens 5220 for focusing the illumination light 5600, a rod type condenser body 5230, and a condenser lens 5240, all of which are sequentially placed in the aforementioned order in the optical axis of the illumination light 5600, which is emitted from the variable light source 5210 and incident to the side face of the TIR prism 5300.

The projection apparatus 5010 employs a single spatial light modulator 5100 for implementing a color display on the screen 5900 by means of a sequential color display method.

Specifically, the variable light source 5210, comprising a red laser light source 5211, a green laser light source 5212 and a blue laser light source 5213 (which are not shown in the drawing), allows independent controls for the light emission states and divides one frame of display data into a plurality of sub-fields (i.e., three sub-fields, that is, red (R), green (G) and blue (B) in the present case). It further causes each of the red 5211, green 5212 and blue 5213 laser light sources to emit each respective light in a time series at the time band corresponding to the sub-field of each color, as described later.

Figure 53:
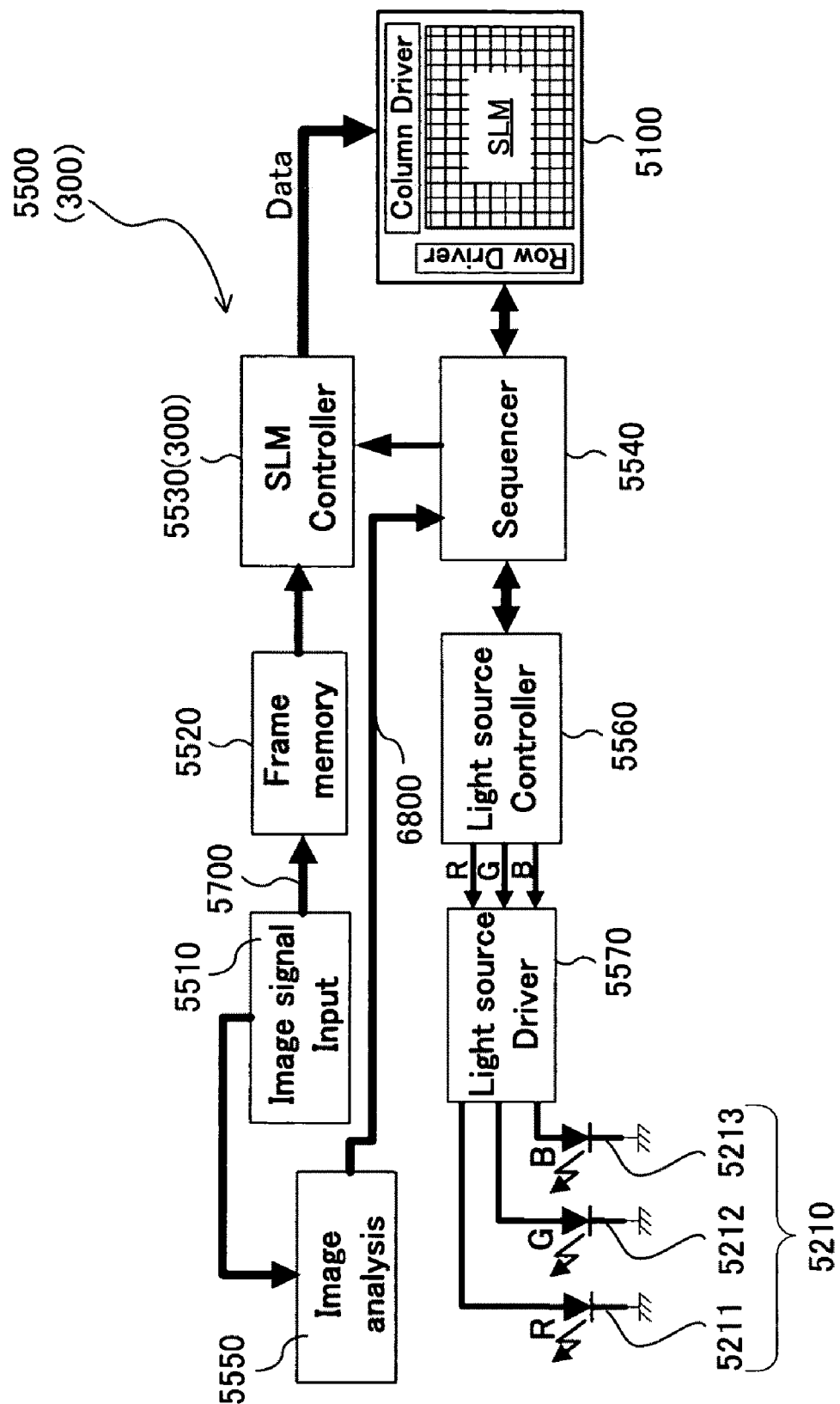
FIG. 53 is a functional block diagram showing an exemplary configuration of the control unit comprised in the projection apparatus shown in FIG. 52.

FIG. 53 is a functional block diagram for showing a configuration of the control unit 5500 implemented in the above described single-panel projection apparatus 5010. The control unit 5500 comprises a frame memory 5520, an SLM controller 5530, a sequencer 5540, a light source control unit 5560 and a light source drive circuit 5570.

The sequencer 5540 includes a microprocessor to control the operation timing of the entire control unit 5500 and the spatial light modulators 5100.

In one exemplary embodiment, the frame memory 5520 retains one frame of input digital video data 5700 received from an external device (not shown in the figure) connected to a video signal input unit 5510. The input digital video data 5700 is updated in real time whenever the display of one frame is completed.

The SLM controller 5530 processes the input digital video data 5700 read from the frame memory 5520, as described later. The SLM controller separates the data, read from the memory 5520, into a plurality of sub-fields according to detailed descriptions below. The SLM controller outputs the data subdivided into subfields to the spatial light modulators 5100 as binary data 5704 and non-binary data 5705, which are used for implementing an the ON/OFF control and oscillation control (which are described later) of a mirror 5112 of the spatial light modulator 5100.

The sequencer 5540 outputs a timing signal to the spatial light modulators 5100 in sync with the generation of the binary data 5704 and non-binary data 5705 at the SLM controller 5530.

The video image analysis unit 5550 outputs a image analysis signal 5800 used for generating various light source pulse patterns (which are described later) corresponding to the input digital video data 5700 inputted from the video signal input unit 5510.

The light source control unit 5560 controls, by way of the light source drive circuit 5570, the operation of the variable light source 5210 emitting the illumination light 5600 on the basis of the video image analysis signal 6800 obtained from the video image analysis unit 5550, by way of the sequencer 5540.

The light source drive circuit 5570 drives the red laser light source 5211, green laser light source 5212 and blue laser light source 5213 of the variable light source 5210 to emit light on the basis of instruction from the light source control unit 5560.

Figure 54:
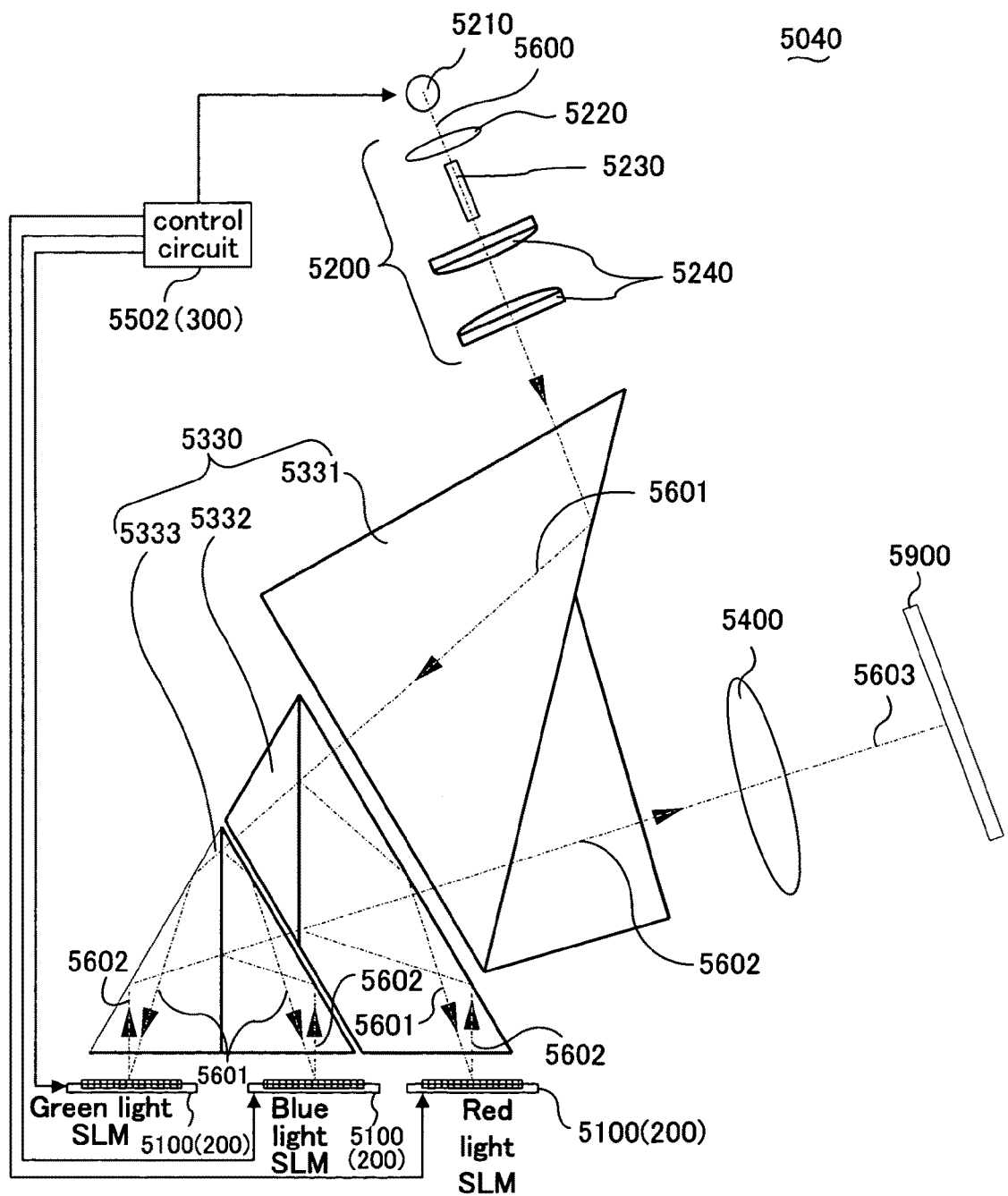
FIG. 54 is a functional block diagram showing another exemplary modification of a multi-panel projection apparatus according to a preferred embodiment of the present invention.

FIG. 54 is a conceptual diagram showing another exemplary modification of a multi-panel projection apparatus according to the present embodiment.

The projection apparatus 5040 is configured to position, so as to be adjacent to one another in the same plane, a plurality of spatial light modulators 5100 (i.e., the spatial light modulators 200) corresponding to the three colors R, G and B on one side of a light separation/synthesis optical system 5330.

This configuration makes it possible to consolidate a plurality of spatial light modulators 5100 into the same packaging unit, for example, a package 201, thereby saving space.

The light separation/synthesis optical system 5330 comprises a TIR prism 5331, a TIR prism 5332 and a TIR prism 5333.

The TIR prism 5331 has the function of guiding illumination light 5600, incident in the lateral direction of the optical axis of the projection optical system 5400, to the spatial light modulators 5100 as incident light 5601.

The TIR prism 5332 has the functions of separating red light from the incident light 5601 and guiding it to the red color-use spatial light modulator 5100 and also of capturing the reflection light 5602 of the separated incident light and guiding it to the projection optical system 5400.

Likewise, the TIR prism 5333 has the functions of separating the incident green and blue lights from the incident light 5601, making them incident to the individual spatial light modulators 5100 equipped correspondently to the each color, and of capturing the reflection lights 5602 of the respective colors to guide them to the projection optical system 5400.

Figure 55:
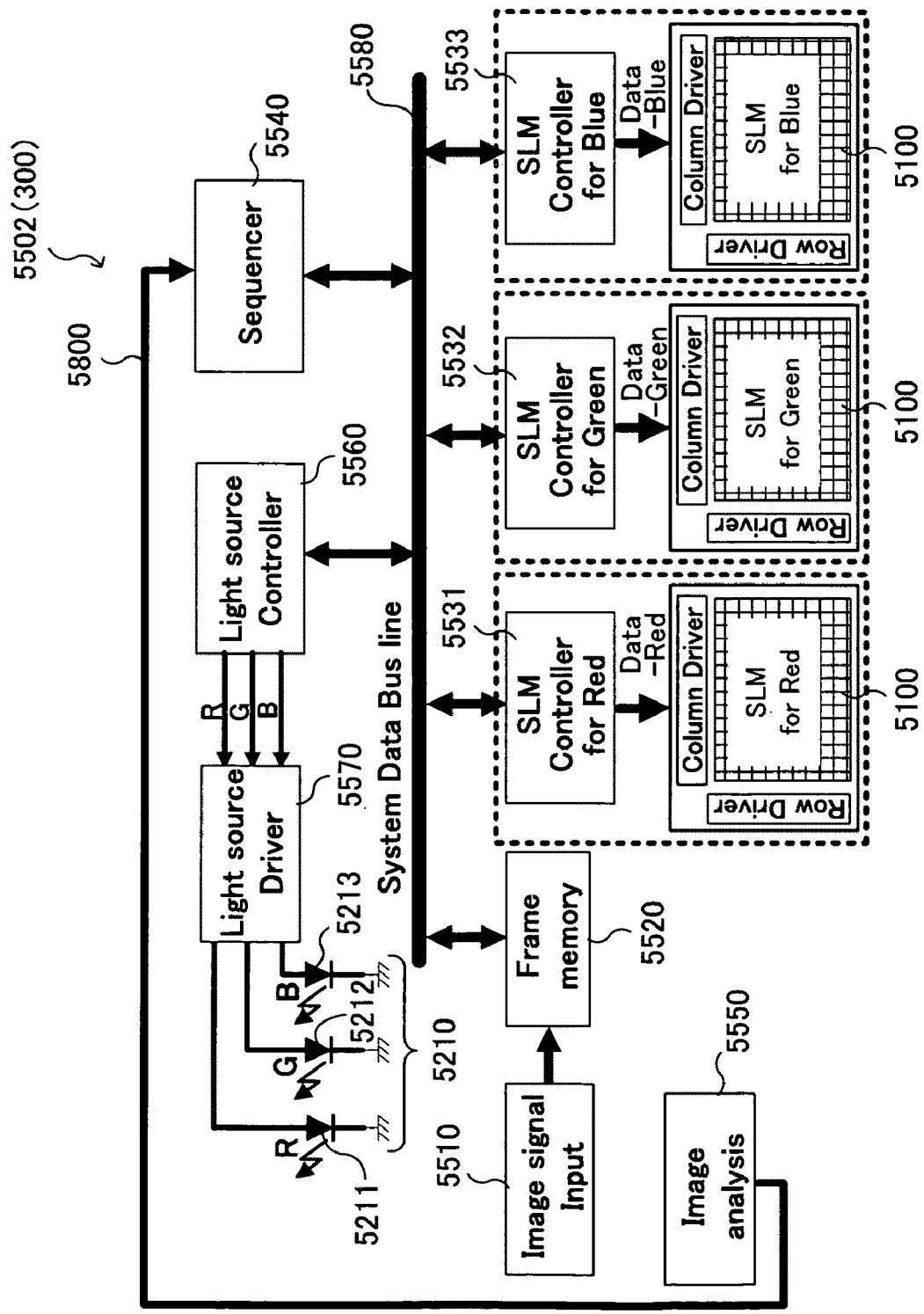
FIG. 55 is a functional block diagram showing an exemplary configuration of the control unit of a multi-panel projection apparatus according to a preferred embodiment of the present invention.

FIG. 55 is a block diagram showing an exemplary configuration of the control unit of a multi-panel projection apparatus according to the present embodiment.

The control unit 5502 comprises a plurality of SLM controllers 5531, 5532 and 5533 used for controlling each of the spatial light modulators 5100 equipped for the respective colors R, G and B, and the configuration of the controllers is the main difference from the above described control unit 5500.

Specifically, each of the SLM controller 5531, SLM controller 5532 and SLM controller 5533, is implemented to process the modulation of a specific color, Red, Green, and Blue. Each modulator is supported on the same substrate as those of the other spatial light modulators 5100. This configuration makes it possible to place the individual spatial light modulators 5100 and the corresponding SLM controller 5531, SLM controller 5532 and SLM controller 5533 close to each other, thereby enabling a high speed data transfer rate.

Further, a system bus 5580 is used to connect the frame memory 5520, light source control unit 5560, sequencer 5540 and SLM controllers 5531 through 5533, in order to speed up and simplify the connection path of each connecting element.

Figure 56:
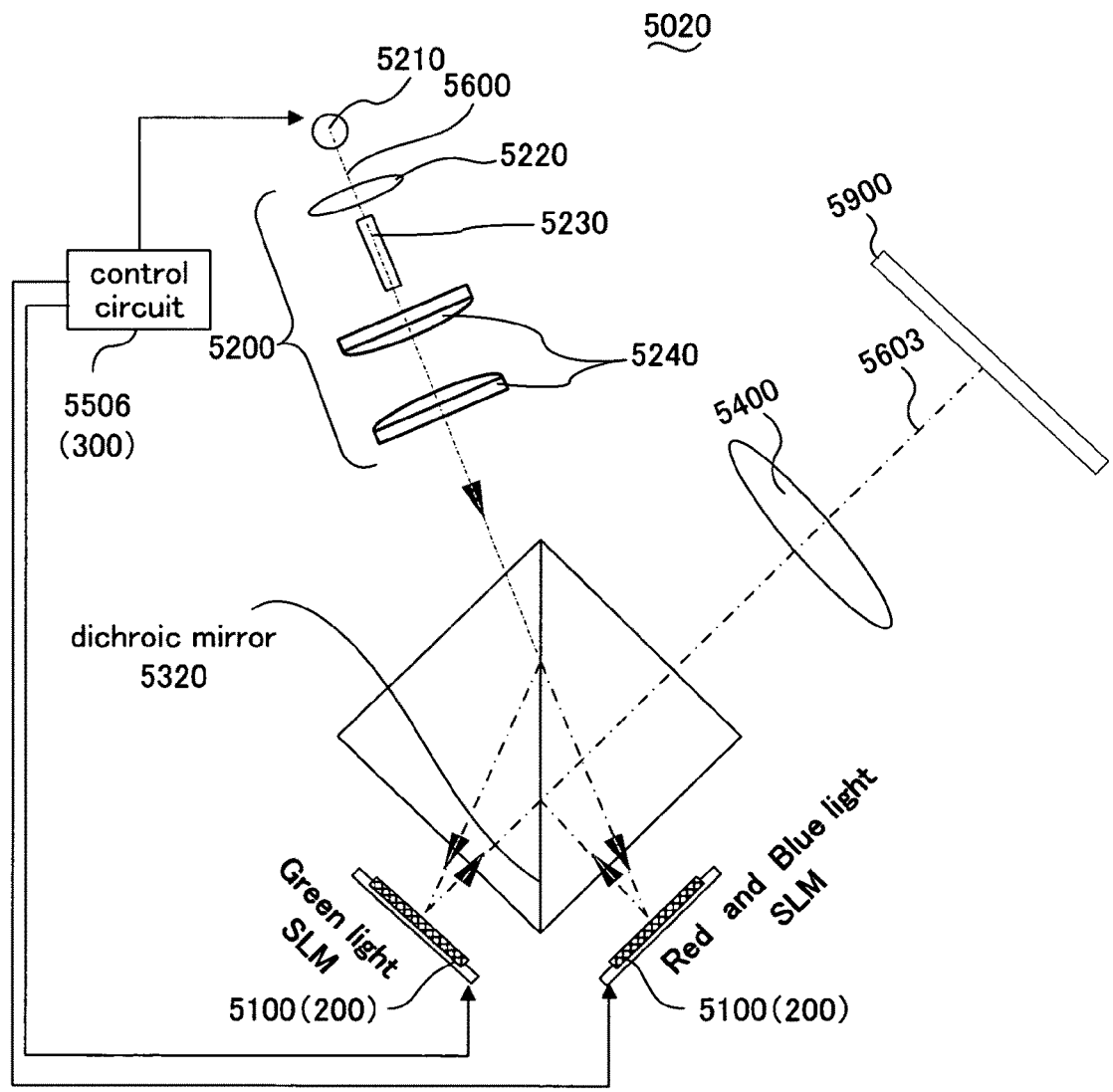
FIG. 56 is a functional block diagram showing an exemplary modification of a multi-panel projection apparatus according to anther preferred embodiment of the present invention.

FIG. 56 is a conceptual diagram showing an exemplary modification of a multi-panel projection apparatus according to another preferred embodiment of the present invention.

An exemplary case of the projection apparatus 5020 shown in FIG. 56 is equipped with two spatial light modulators 5100 (i.e., the spatial light modulators 200), each of which comprises the above described plate line 232. One spatial light modulator 200 modulates the green light, while the other spatial light modulator 200 modulates the red and blue lights.

The projection apparatus 5020 comprises a dichroic mirror 5320 as a light separation/synthesis optical system. The dichroic mirror 5320 separates the wavelength component of green light and the wavelength components of red and blue lights from the incident light 5601 from the light source optical system 5200, causing them to branch into the two spatial light modulators 200, respectively. The dichroic mirror 5320 further synthesizes the reflection lights 5602 of the green light with the reflection lights of the red and blue light, each reflected (i.e., modulated) by the corresponding spatial light modulators 200, to guide the synthesized light to the optical axis of the projection optical system 5400, which projects the synthesized light onto a screen 5900 as projection light 5603.

Figure 57:
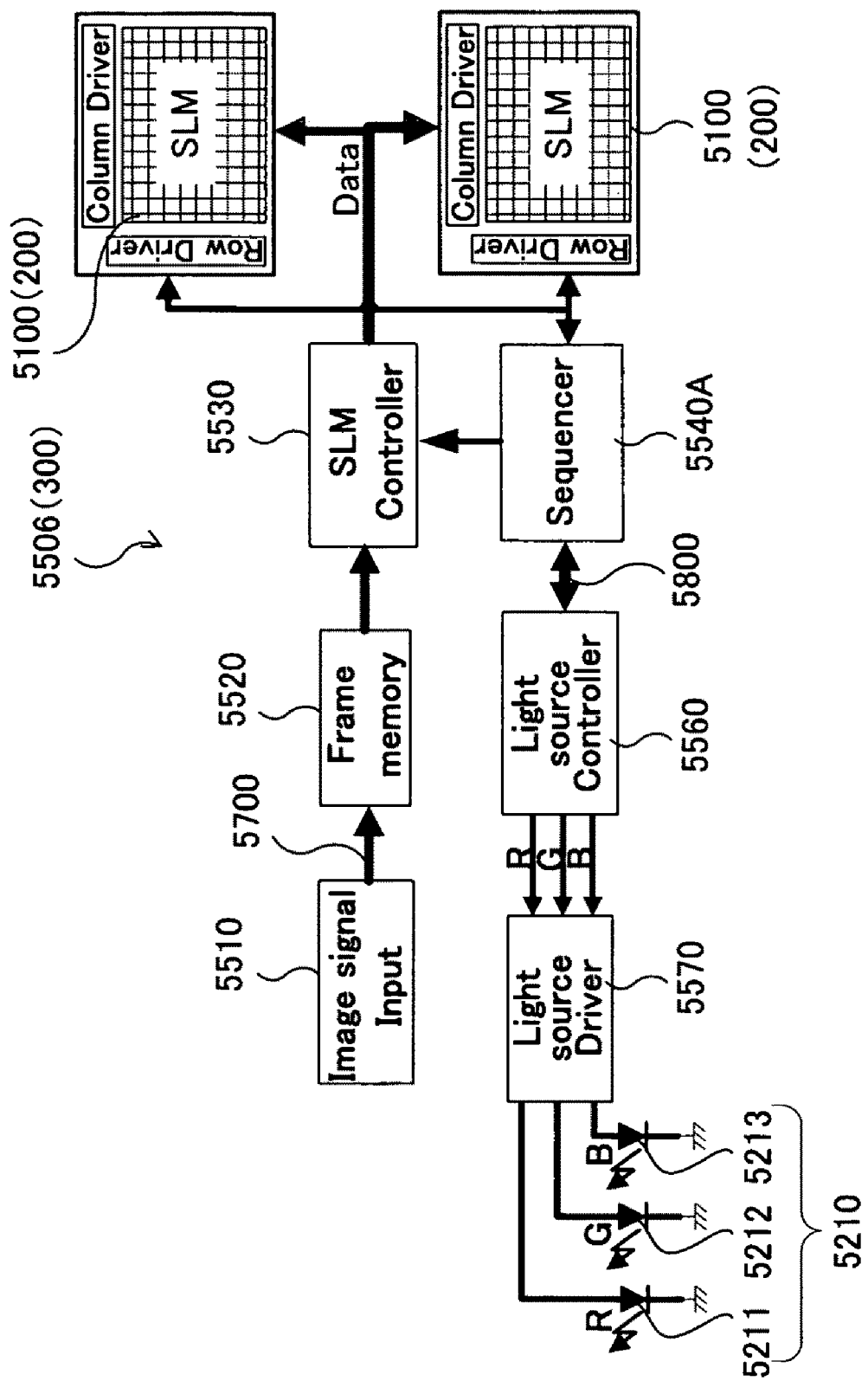
FIG. 57 is a functional block diagram showing an exemplary configuration of a control unit comprised in the projection apparatus shown in FIG. 56.

FIG. 57 is a functional block diagram showing an exemplary configuration of a control unit 5506 equipped in the projection apparatus 5020 comprising the above described two spatial light modulators 200. In this case, the SLM controller 5530 controls two spatial light modulators 5100 (i.e., the spatial light modulators 200), which is the only difference from the configuration shown in FIG. 53.

Figure 58:
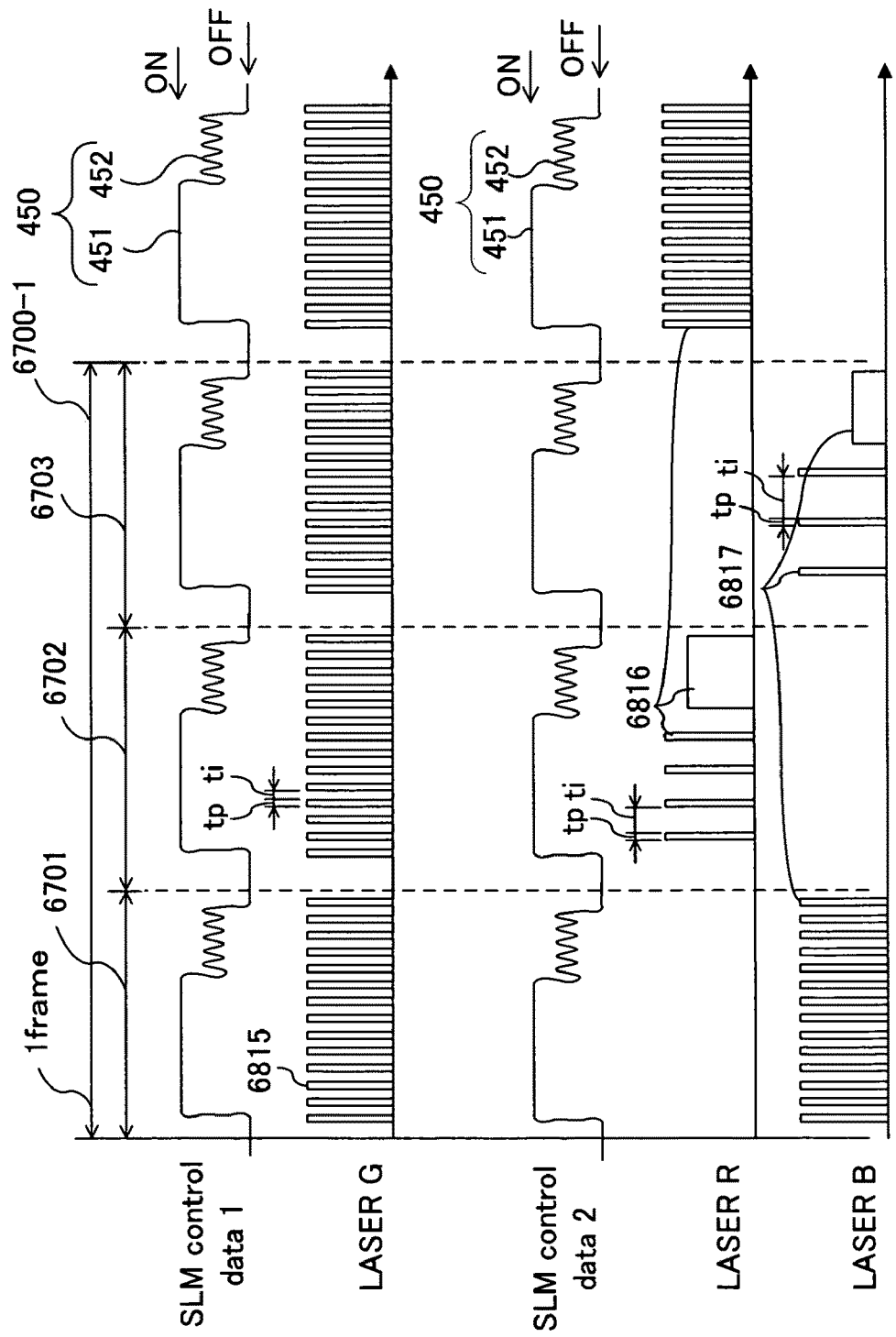
FIG. 58 is a timing diagram showing the waveform of a control signal of the projection apparatus shown in FIG. 56.

FIG. 58 is a chart showing the waveform of a control signal of the projection apparatus according to the present embodiment.

A drive signal (i.e., a mirror control profile 450 shown in FIG. 58) generated by the SLM controller 5530 drives a plurality of spatial light modulators 5100.

The light source control unit 5560 generates a light source profile control signal 5800 corresponding to the mirror control profile 450, a signal for driving an individual spatial light modulators 5100, and inputs the generated signal to the light source drive circuit 5570, which then adjusts the intensity of the laser light (i.e., the illumination light 5600) emitted from each of the red 5211, green 5212 and blue 5213 laser light source.

The control unit 5506 comprised in the projection apparatus 5020 is configured such that a single SLM controller 5530 drives the plurality of spatial light modulators 5100, thereby enabling the irradiation of the illumination light 5600 on the respective spatial light modulators 5100 with the optimal intensity of light without the need to comprise a light source control unit 5560 or light source drive circuit 5570 for each spatial light modulator 5100. This configuration simplifies the circuit configuration of the control unit 5506.

As shown in FIG. 58, the light source control unit 5560 and light source drive circuit 5570 drives the red 5211, green 5212 and blue 5213 laser light source so as to adjust the intensities of individual lasers (i.e., illumination light 5600) of the colors R, G and B in synch with the respective SLM drive signals (i.e., the mirror control profile 450) that is generated by the SLM controller 5530.

In this case, two colors R and B share one spatial light modulator 5100, and therefore, the control is a color sequential method.

Specifically, one frame is constituted by a plurality of subfields, that is, subfields 6701, 6702 and 6703, and the same light source pulse pattern 6815 is repeated in each subfield in one spatial light modulator 5100 corresponding to green (G).

Meanwhile, for the red (R) and blue (B) lights that share one spatial light modulator 5100, the pulse emission of the red laser light source 5211 and blue laser light source 5213 are respectively controlled so that the subfields, that is, subfields 6701 through 6703, are alternately used in a time series as indicated by the light source pulse pattern 6816 and light source pulse pattern 6817.

Further, in this case, the emission pulse intervals ti and emission pulse widths tp can be changed in each of the light source pulse pattern 6815 of the green laser, the light source pulse pattern 6816 of the red laser, and the light source pulse pattern 6817 of the blue laser.

The present embodiment makes it possible to improve the number of gray scale levels for each of the colors R, G and B. Combined with the above described method of mirror control achieving a higher number of gray scale levels, it is possible to attain an extremely high grade gray scale up to 12-bit, 14-bit, 16-bit, 18-bit and higher without a need to change the low image transfer rate, as in the conventional 6- to 8-bit gray scale. Furthermore, this capability makes it possible to freely set the grayscale characteristic.

<Exemplary Operation—K>

The following exemplifies a technique for reducing the drive voltage of a mirror 212 as a countermeasure to stiction of the mirror 212, jumping of the mirror 212 after shifting to an address electrode, and other similar problems.

The following exemplifies the above described countermeasures by means of the one electrode described above (i.e., the second ON electrode 235 or the second OFF electrode 236), equipped separately from the address electrodes, such as the OFF electrode 215 and ON electrode 216.

As in the case of the pixel unit 211 exemplified in the above described embodiment, a mirror device tilting the mirror 212 to the ON direction and OFF direction by means of address electrodes (such as the second ON electrode 235 and second OFF electrode 236) placed on both sides of a hinge 213, requires a voltage (i.e., an initiating Coulomb force) to shift the mirror 212 from the horizontal state to the ON state or OFF state, a voltage higher than the voltage applied to the address electrode to shift the mirror 212 between the ON state and OFF state. This is because when the mirror 212 is shifted between the ON and OFF states, elastic energy, which has accumulated in the hinge 213 deflected by the tilting operation of the mirror 212, in the latter operation. Further, the voltage required to shift the mirror 212 from the oscillation state to the ON/OFF state is similar to the voltage required to shift the mirror 212 from the horizontal state to the ON or OFF state.

Therefore, if no countermeasure is devised, the mirror 212 is actually controlled by a high applied voltage, such as the voltage used to shift the mirror 212 from the horizontal state to the ON or OFF state. Hence, the stiction phenomenon, in which the mirror 212 is stuck to an address electrode, and/or the jumping phenomenon, in which the mirror 212 abuts the address electrode (i.e., the stopper), may occur.

As a countermeasure to these problems, the following embodiment exemplifies the case of controlling the magnitude and timing of a voltage to be applied to the second ON electrode 235 or second OFF electrode 236, both of which are equipped separately from the OFF electrode 215 and ON electrode 216, in order to apply the lowest possible address voltage Vad to the address electrode, thereby suppressing the jumping of the mirror 212 by shifting and retaining the mirror 212 and reducing a speed with which the mirror 212 contacts the stopper of the address electrode.

Figure 59:
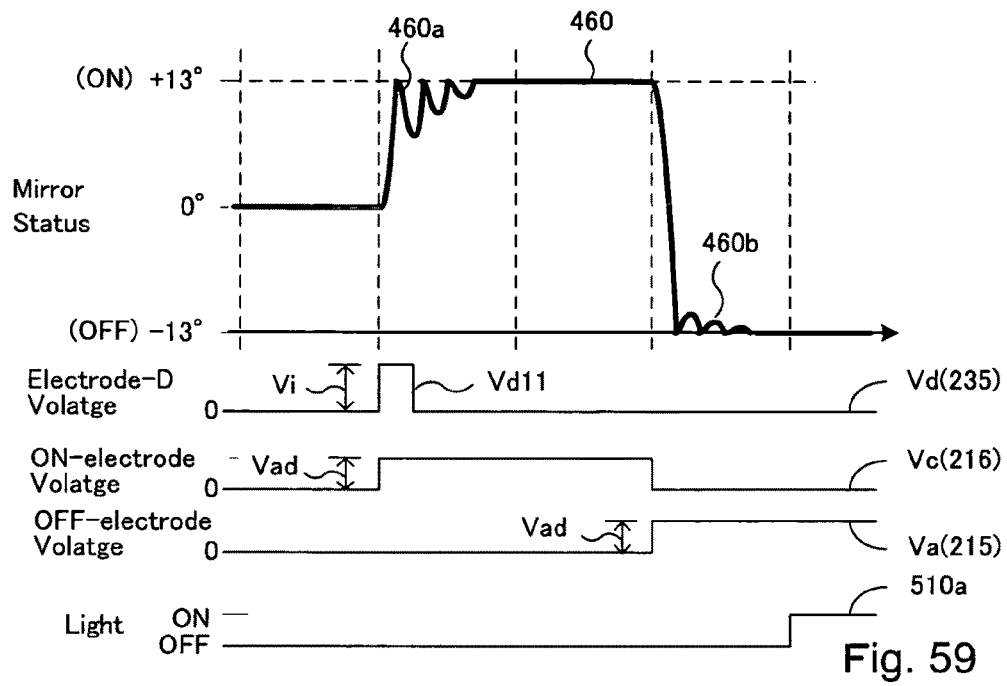
FIG. 59 is a timing diagram showing an exemplary method for controlling an initiating operation used for a spatial light modulator (SLM) according to a preferred embodiment of the present invention, with the SLM comprising a pixel unit configured to place a second ON electrode on the ON side.

FIG. 59 is a timing diagram showing an exemplary method for controlling an initiating operation used for a spatial light modulator 200 comprising a pixel unit 211 configured to place a second ON electrode (i.e., an electrode D) on the ON side, as exemplified in FIGS. 8 and 30.

The timing diagram exemplified in FIG. 59 shows the initiating operation of the mirror 212 in a process in which all the mirrors 212 in the horizontal stationary state are simultaneously shifted to the ON state temporarily, and then are shifted to the OFF state, to be readied for a modulating operation as, for example, in the event of turning on the power to the spatial light modulator.

Specifically, the voltage applied as voltages Va and Vc, set respectively to the OFF electrode 215 and ON electrode 216, is an address voltage Vad, a relatively low voltage required to turn the mirror 212 ON and OFF with a help of the elastic energy of the hinge 213, as exemplified in FIG. 59.

Further, a rectangular initiation pulse Vd11 (at an initiation pulse voltage Vi) required for shifting the mirror 212 from the horizontal stationary state to the ON state is applied to the voltage Vd of the second ON electrode 235, which is equipped separately from the OFF electrode 215 and ON electrode 216.

In an examination of the magnitude between the initiation pulse voltage Vi and address voltage Vad, with the area size Sa of the ON electrode 216 and the area size Sp of the second ON electrode 235 in the relation of:

$$Sa > Sp,$$

as exemplified in FIG. 12C, the setup of the voltages is such that the voltages are in the relation of:

$$|Vad| < |Vi|,$$

thereby making the Coulomb force Ci acting from the second ON electrode 235 on the mirror 212 larger than the Coulomb force acting from the ON electrode 216 on the mirror 212.

Furthermore, the initiating control according to the present embodiment is configured to use the initiation pulse voltage Vi of the second ON electrode 235 to shift the mirror 212 from the horizontal stationary state to the ON side, with a light source control signal 510a set to OFF, so as to keep the light source 510 off.

Specifically, as seen in the initiation mirror control profile 460 shown in FIG. 59, an address voltage Vad is applied to the voltage Vc of the ON electrode 216 at the same time as the initiation pulse voltage Vi is applied to the voltage Vd of the second ON electrode 235, and the horizontal stationary state is shifted to the ON state, in which the mirror 212 tilts towards the ON electrode 216.

Then, the voltage Vc of the ON electrode 216 is changed over to "0", and the voltage Va of the OFF electrode 215 is turned to the address voltage Vad, and thereby the mirror 212 is shifted to the OFF side in a standby state, and the light source control signal 510a is turned ON to turn on the light source 510.

As described above, by applying the initiation pulse voltage Vi as the voltage Vd of the second ON electrode 235 at the initiating operation, the mirror 212 shifts from the horizontal stationary state to the OFF state, to be in standby in the OFF state. Thus, the elastic energy of the hinge 213 can be utilized, thereby eliminating the need to apply an unnecessarily high address voltage Vad as the voltage Va and voltage Vc to the address electrodes (e.g., the OFF electrode 215 and ON electrode 216) in a normal operation. Instead, the ON/OFF control for the mirror 212 is enabled just by applying the lowest possible address voltage Vad, and therefore, the problem of stiction of the mirror 212 caused by unnecessarily increasing the address voltage Vad for the initiating control is alleviated.

Further, the gate transistors 215c and 216c used for controlling the application of the voltage (i.e., the address voltage Vad) to the OFF electrode 215 and ON electrode 216, respectively, will have lower insulation withstanding voltage resulting from a reduced size in association with the reduced size of the pixel unit 211. Therefore, the reduction in the address voltage Vad contributes to a reduction in the size of the pixel unit and an increase in the number of pixel units 211 within a certain mounting area. As a result, it also contributes to an increase in the definition of a projection image.

Since only a transitory initiation pulse voltage Vi is applied to the second ON electrode 235, it is possible to suppress the moving speed of the mirror 212 and also to minimize the jumping (at the jumping oscillation 460b) that occurs when the mirror 212 completes its shift to the OFF side, compared with a conventional technique in which a high voltage such as the initiation pulse voltage Vi is applied as an address voltage Vad.

Figure 60:
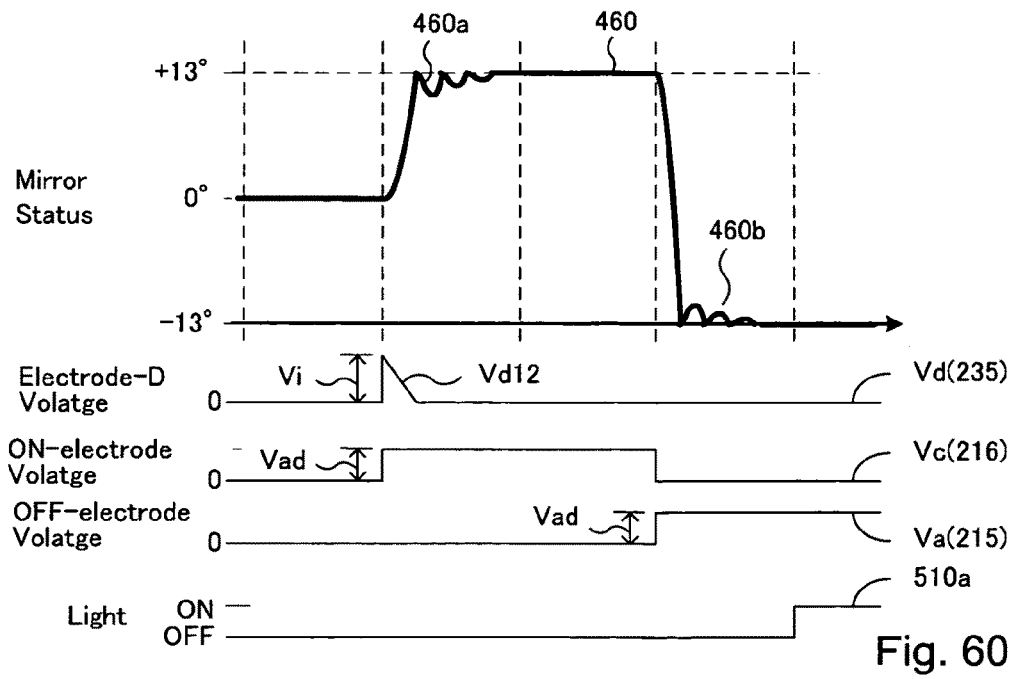
FIG. 60 is a timing diagram showing an exemplary modification of the method for controlling an initiating operation exemplified in FIG. 59.

Here, the method for applying the initiation pulse voltage Vi as the voltage Vd to the second ON electrode 235 is not limited to the method of using a rectangular wave such as the initiation pulse Vd11. Alternately an initiation pulse Vd12, which possesses a ramp waveform in which the maximum voltage is an initiation pulse voltage Vi, may be used, as exemplified in FIG. 60.

As described above, when a ramp waveform is used as the initiation pulse voltage Vi, a Coulomb force Ci generated by the initiation pulse voltage Vi is gradually reduced, and therefore the speed of the mirror 212 is further reduced' when it moves from the horizontal stationary state towards the stopper of the ON electrode, and thereby the jumping of the mirror 212 (in the jumping oscillation 460a) can be minimized. Otherwise the control is similar to the case described in FIG. 59.

The second ON electrode 235 (i.e., the electrode D) is used in shifting the mirror 212 from the horizontal stationary state to the ON side during the initializing process of the spatial light modulator 200, as described above, and then plays the role described below during the normal modulating operation.

Figure 61:
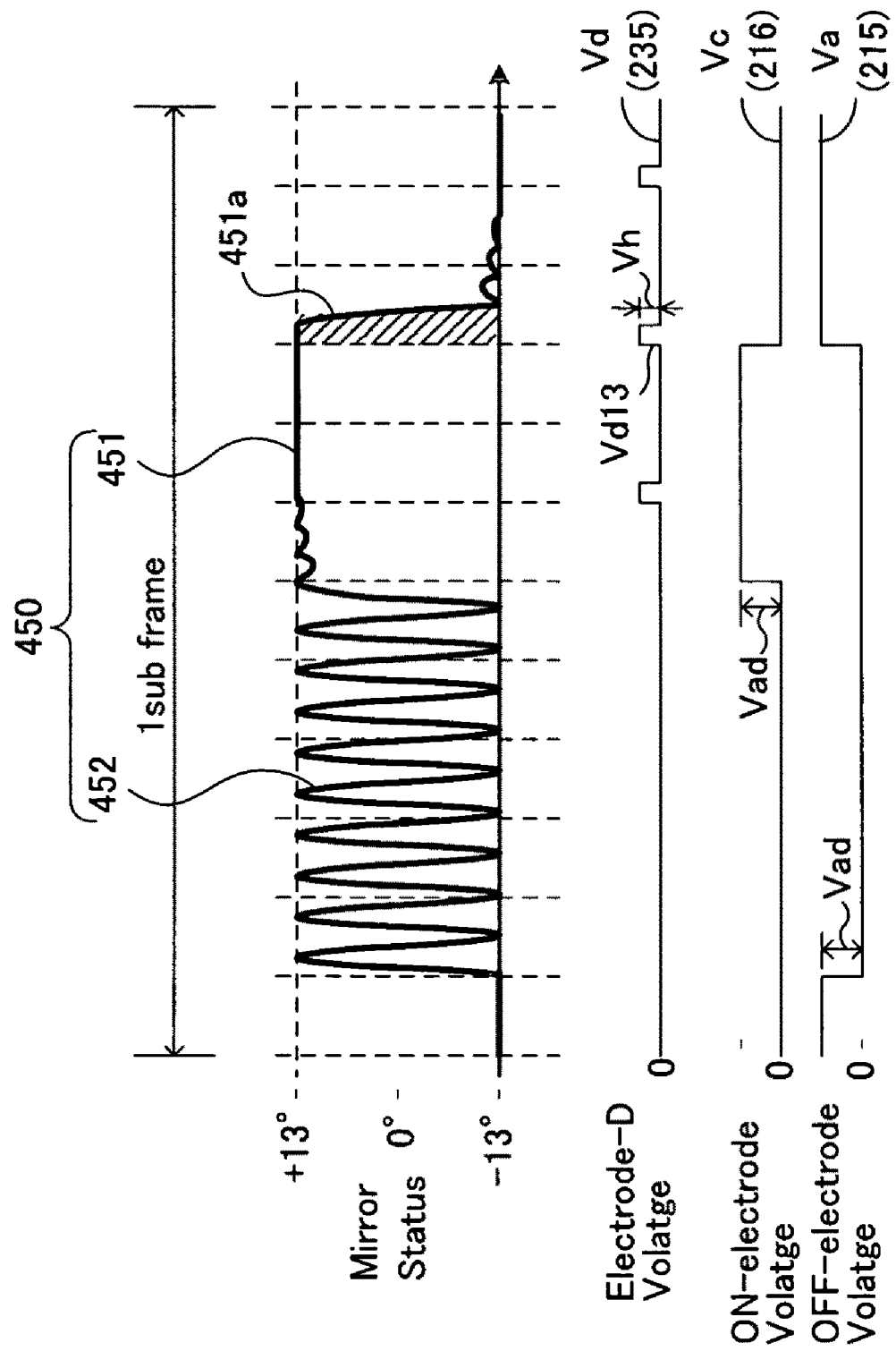
FIG. 61 is a timing diagram showing an exemplary case of utilizing a second ON electrode for increasing the number of gray scale levels in a PWM control used for a modulation control for a mirror by means of a combination between the PWM control and oscillation control used for a spatial light modulator according to a preferred embodiment of the present invention.

FIG. 61 is a timing diagram showing an exemplary case of utilizing the second ON electrode for increasing the number of gray scale levels in a PWM control used for a modulation control of a mirror by means of a combination between the PWM control and oscillation control.

Specifically, when the modulation operation of the mirror 212 is controlled by the mirror control profile 450, obtained by combining oscillation control pattern 452 in a full oscillation and ON/OFF control pattern 451 employing PWM, as exemplified in FIG. 61, a mirror retention pulse Vd13 (i.e., a mirror retention voltage Vh) is applied as the voltage Vd of the second ON electrode 235, at the tail end of the ON/OFF control pattern 451 employing the PWM (i.e., when the address voltage Vad applied to the ON electrode 216 is switched of Thus, the period for retaining the mirror 212 in the ON state is extended to enable increasing/decreasing the light intensity only in the ON extension part 451a (where the hatching is applied in FIG. 61), and a high grade gray scale control is attained on the basis of the ON/OFF control pattern 451 employing the PWM.

In this case, the mirror retention pulse Vd13 applied as the voltage Vd of the second ON electrode 235 merely retains the mirror 212 on the ON side, and therefore, the voltage may be lower than the address voltage Vad to be applied to the address electrode (i.e., the ON electrode 216).

In an examination of the relationship between the mirror retention voltage Vh and address voltage Vad:

$|Vad| \geq |Vh|$, where the relationship between the area Sa of the ON electrode 216 and the area Sp of the second ON electrode 235 is:

$Sa > Sp$, as exemplified in FIG. 12C.

Figure 62:
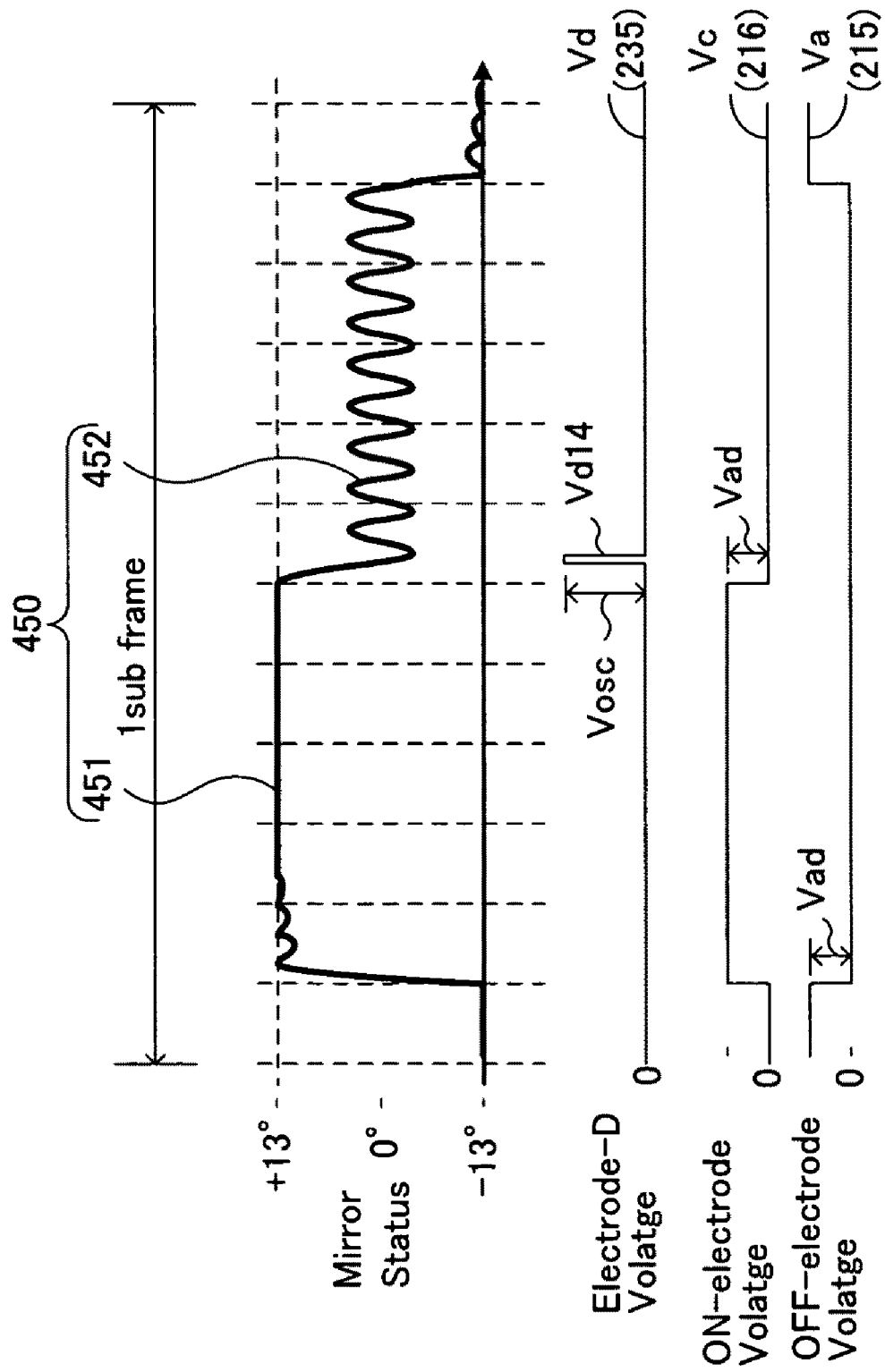
FIG. 62 is a timing diagram showing an exemplary case of utilizing a second ON electrode for controlling a transition from the PWM control to oscillation control in a modulation control for a mirror by means of a combination between the PWM control and oscillation control used for a spatial light modulator according to a preferred embodiment of the present invention.

FIG. 62 is a timing diagram showing an exemplary case of utilizing the second ON electrode for controlling a transition from the PWM control to oscillation control in a modulation control of a mirror by means of a combination between the PWM control and oscillation control.

Specifically, when a mirror is controlled in under a mirror control profile 450, obtained by combining the ON/OFF control pattern 451 and oscillation control pattern 452, an oscillation pull-in pulse Vd14 at the oscillation pull-in voltage Vosc is applied as the voltage Vd of the second ON electrode 235 when the mirror 212 is shifted from the ON state towards the OFF state by turning the address voltage Vad of the ON electrode 216 off, as exemplified in FIG. 62.

With this operation, the mirror 212, in the midst of shifting from the ON side to OFF side, is pulled back to the ON side to be controlled under an oscillation control pattern 452 that generates an intermediate oscillation with smaller amplitude than the full oscillation.

The oscillation pull-in voltage Vosc applied to the second ON electrode 235, in this case, pulls back the shifting mirror 212, and therefore tends to be higher than the address voltage generated at an address electrode.

In an examination of the relationship between the area Sa of the ON electrode 216 and the area Sp of the second ON electrode 235:

$Sa > Sp$, and therefore the relationship between the address voltage Vad and oscillation pull-in voltage Vosc, the relationship is:

$|Vad| < |Vosc|$, as exemplified in FIG. 12C.

Next is a description of an example of controlling the electric potential (also simply "potential" hereinafter) of a second OFF electrode 236 (i.e., an electrode B) in the configuration in which the second OFF electrode 236 is placed on the same side as the OFF electrode 215, as exemplified in FIG. 9.

In this case, when the mirror 212 is shifted from the horizontal stationary state to the OFF state and to standby, the state is the same as the case in which the second ON electrode 235 is placed on the same side as the ON electrode 216.

In this case, the second OFF electrode 236 is used for shifting the mirror 212 from the horizontal stationary state to the OFF side, as described above in the initiation control, and plays the role, as described below, in the normal modulation operation.

Figure 63:
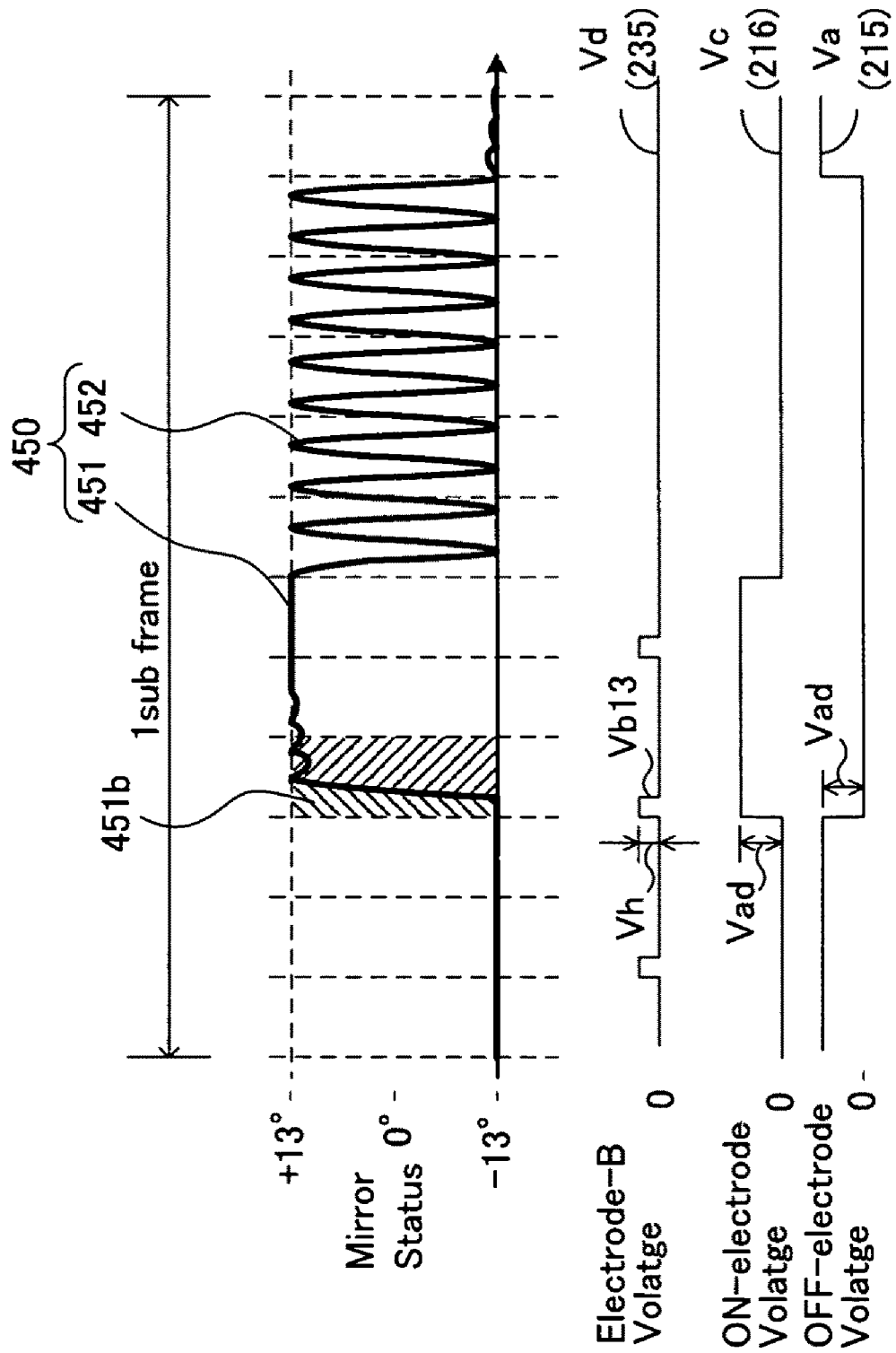
FIG. 63 is a timing diagram showing an exemplary case of using a second OFF electrode for a high grade gray scale control at the beginning of a PWM control used for a spatial light modulator according to a preferred embodiment of the present invention.

FIG. 63 is a timing diagram showing an exemplary case of using the second OFF electrode for a high grade gray scale control at the beginning of a PWM control.

This diagram exemplifies the case of applying a mirror control profile 450, obtained by combining the ON/OFF control pattern 451 and oscillation control pattern 452, at the center of one sub-frame in a modulation control for the mirror 212.

Further, in the mirror control profile 450, a mirror retention pulse Vb13 at a mirror retention voltage Vh is applied to the voltage Vd of the second OFF electrode 236 at the same time as the voltage Va of the OFF electrode 215 is switched off and the voltage Vc of the ON electrode 116 (i.e., the address voltage Vad) is switched on, when the mirror 212 is shifted from the OFF to the ON side at the beginning of the control, on the basis of the ON/OFF control pattern 451.

With this operation, the mirror 212 is retained on the OFF side for a predetermined period (i.e., an OFF extension period 451b) in accordance with the pulse width of the mirror retention pulse Vb13, even after the voltage Va of the OFF electrode 215 is turned off. As a result, the light intensity obtained on the basis of the ON/OFF control pattern 451 is reduced so that the light intensity controlled on the basis of the ON/OFF control pattern 451 can be minutely increased or decreased by the presence or absence of the OFF extension period 451b, and thus a larger number of gray scale levels is attained.

In this case, the mirror retention voltage Vh of the mirror retention pulse Vb13 that is applied to the voltage Vb of the second OFF electrode 236 is only for retaining the mirror 212 on the OFF side, and therefore is lower than the address voltage Vad applied to the address electrode.

Figure 64:
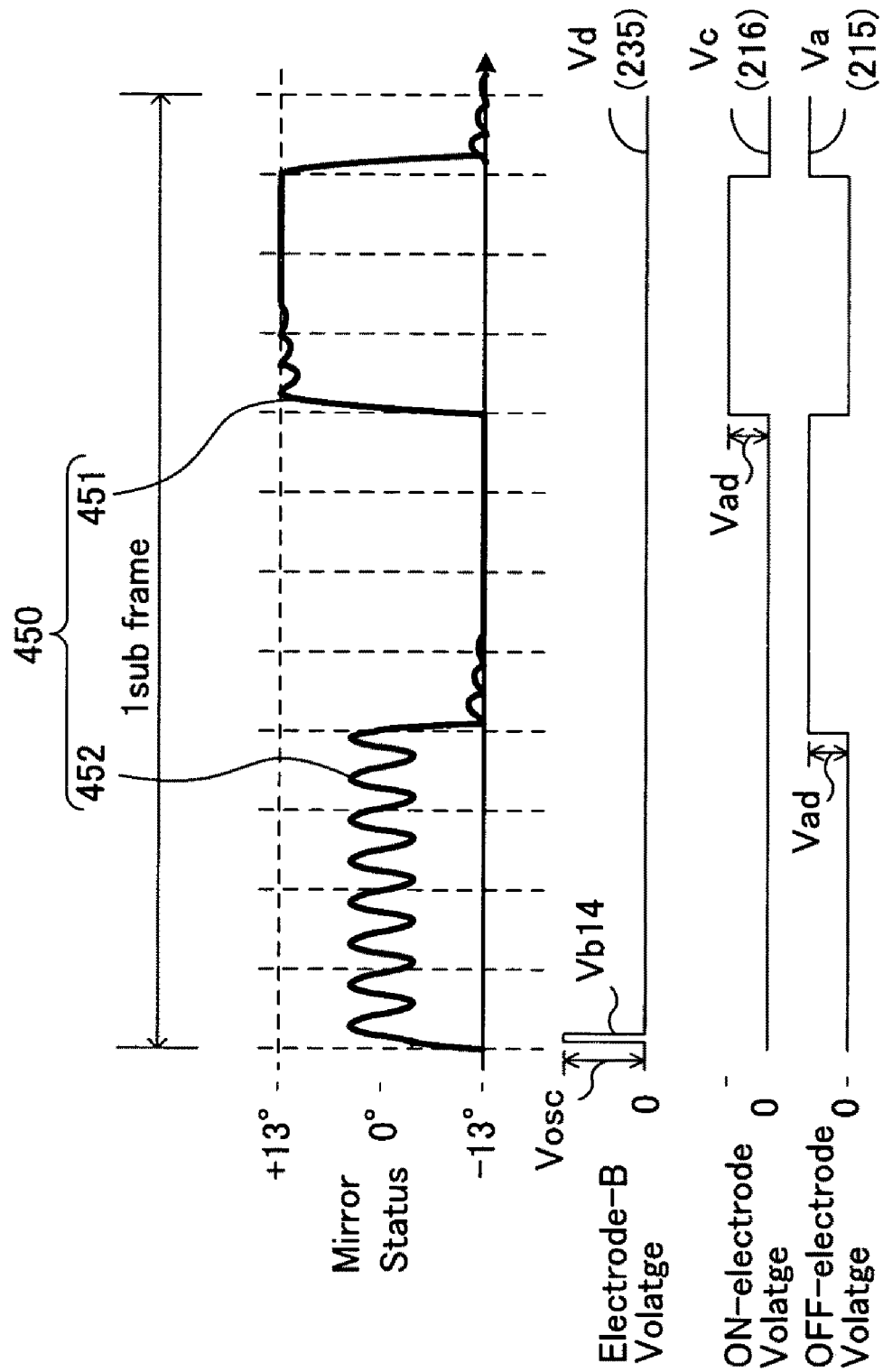
FIG. 64 is a timing diagram showing the use of a mirror control profile obtained by combining an intermediate oscillation and a PWM in the case of placing the intermediate oscillation at an end of a sub-frame in controlling a spatial light modulator according to a preferred embodiment of the present invention.

FIG. 64 is a timing diagram when using a mirror control profile, obtained by combining an intermediate oscillation and a PWM in a pixel unit configured as exemplified in FIG. 9.

This case shows an example of placing the oscillation control pattern 452 and ON/OFF control pattern 451, respectively, on either end of one sub-frame in the mirror control profile 450, obtained by combining the oscillation control pattern 452 and ON/OFF control pattern 451.

Further, the mirror 212, which has been in the stationary state on the OFF side at the start of the sub-frame, is released by turning the voltage Va of the OFF electrode 215 to "0" and starts shifting to the ON side by means of the elastic energy of the hinge 213. At the same time as the release, the present example is configured to apply an oscillation pull-in pulse Vb14 (at an oscillation pull-in voltage Vosc) as the voltage Vb of the second OFF electrode 236.

With this operation, the mirror 212, in the midst of moving towards the ON side, is attracted by the Coulomb force from the second OFF electrode 236 and thereby performs an intermediate oscillation with a relatively small amplitude, with the horizontal position of the mirror 212 at the center of the amplitude, as represented by the oscillation control pattern 452.

Note that the oscillation pull-in voltage Vosc applied to the second OFF electrode 236 as the oscillation pull-in pulse Vb14 tends to be higher than the address voltage Vad that is applied to the address electrode, in order to pull back the mirror 212 in the midst of the shift.

Then, by applying an address voltage Vad to the voltage Va of the OFF electrode 215 at a predetermined timing, the mirror 212 is attracted to the OFF side and is stationary of that side.

Next, turning the voltage Va of the OFF electrode 215 to "0" at a predetermined timing and, simultaneously, applying an address voltage Vad to the ON electrode 216 as a voltage Vc causes the mirror 212, which has been stationary on the OFF side, to shift to the ON side.

In this event, the address voltage Vad applied to the ON electrode 216 as the voltage Vc is actually lower because of the elastic energy of the hinge 213.

What follows is a description of an example of utilizing the second ON electrode 235 or second OFF electrode 236 for the purpose of reducing the speed with which the mirror 212, shifting between the ON state and OFF state, contacts the stopper of the OFF electrode 215 or ON electrode 216.

Note that the following description exemplifies the case of using the second ON electrode 235 (i.e., the electrode D) when the mirror 212 is shifting from the OFF side to ON side; the operation is similar when the shifting direction is reversed, and the second OFF electrode 236 (i.e., the electrode B) on the OFF side is used.

Figure 65:
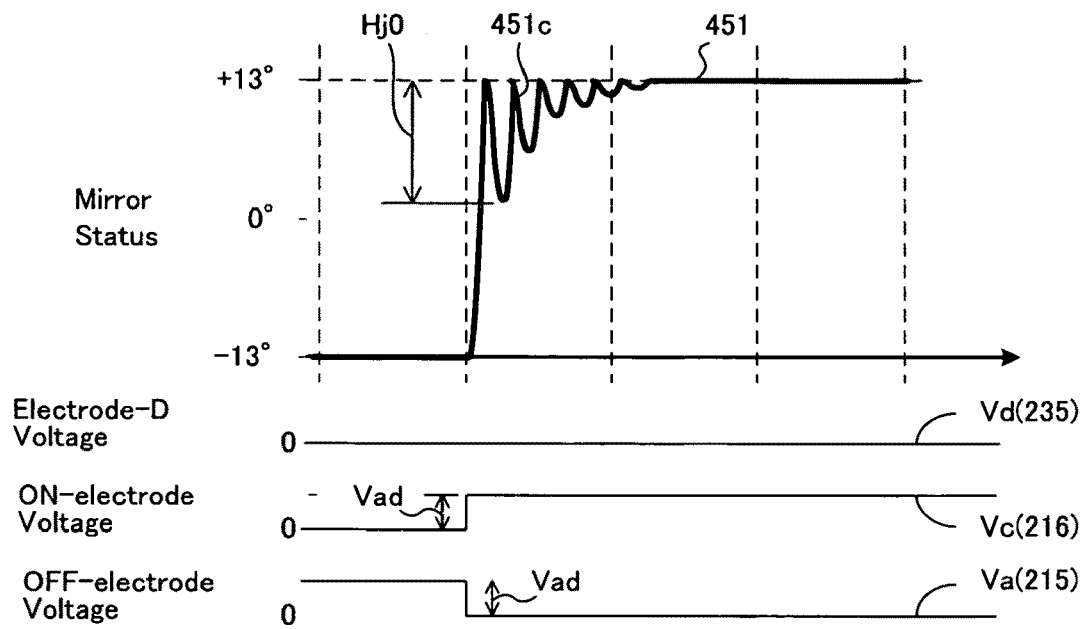
FIG. 65 is a timing diagram showing the state of a mirror jumping when the second ON electrode equipped on the ON side is not made to function, as in the case of a conventional configuration.
Figure 66:
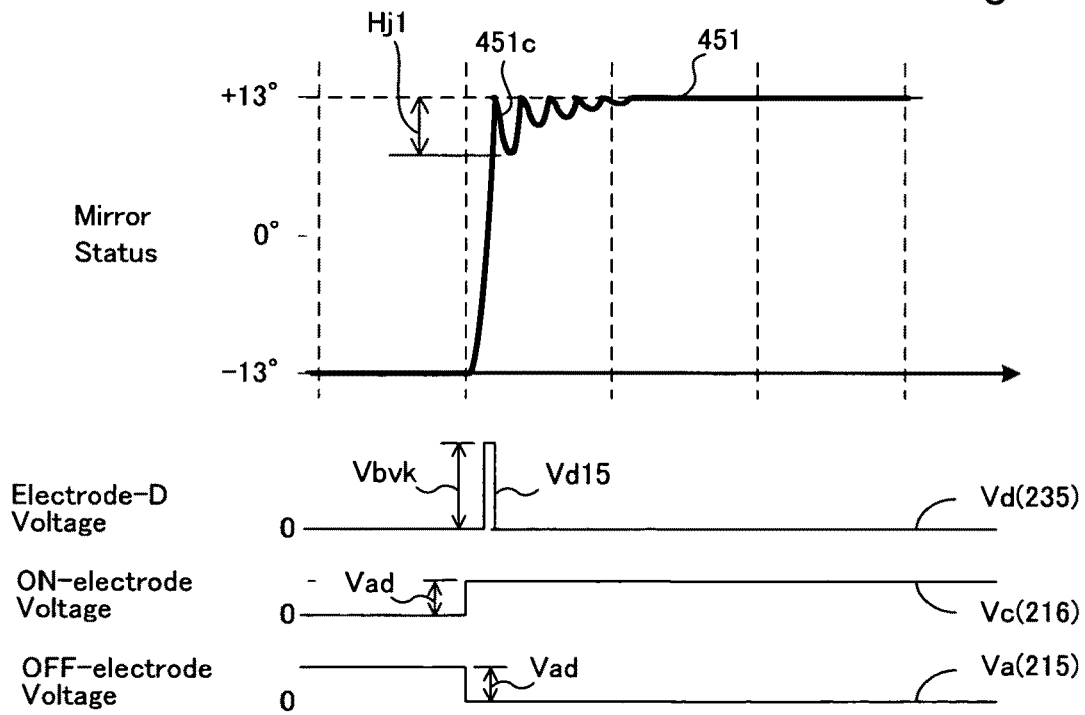
FIG. 66 is a timing diagram showing the case of suppressing a mirror jumping on the ON side when the second ON electrode equipped on the ON side is made to function in a spatial light modulator according to a preferred embodiment of the present invention.

FIG. 65 is a timing diagram showing the state of a mirror jumping when the second ON electrode equipped on the ON side is not made to function, as in the case of a conventional configuration;

FIG. 66 is a timing diagram in the case of suppressing a mirror jumping on the ON side when the second ON electrode equipped on the ON side is made to function.

When applying an address voltage Vad to an address electrode (i.e., the OFF electrode 215 or ON electrode 216) to shift the mirror 212 to the OFF/ON state from the horizontal stationary state or oscillation state, there is a possibility that the mirror 212 may jump after contacting the stopper of the address electrode (e.g., the insulation film covering the address electrode).

FIG. 65 shows the occurrence of a large jumping oscillation 451c with a height of Hj0 on the ON side when the mirror 212 is shifted from the stationary state on the OFF side to a stationary state on the ON side by controlling only the address voltage Vad of an address electrode (i.e., the OFF electrode 215 or ON electrode 216), as in the conventional control.

Accordingly, the conventional technique has disclosed countermeasures for jumping, such as reducing the voltage of the address electrode in the midst of a mirror 212 shifting and generating a voltage at the address electrode on the opposite side for a short period of time. However, if the address electrode is connected to memory (i.e., the memory cells M1 and M2), changing the potentials of the address electrode during the period of the mirror 212 shifting requires a high speed memory access, making it increasingly difficult to control the voltage of the address electrode as the number of pixels (i.e., the number of pixel units 211) increases.

The present example is accordingly configured to apply a breaking pulse Vd15 (at a breaking voltage Vbrk) to the voltage Vd of the second ON electrode 235, not connected to the memory cell M2, which is placed opposite (i.e., the ON side in this case) to the shifting direction of the mirror 212 (i.e., the direction of heading from OFF to ON in this case), as the mirror 212 contacts the ON electrode 216, thereby reducing the speed of the mirror 212 jumping. Thus, in FIG. 66, the mirror 212 only jumps to a height of Hj1 which is smaller than the jumping height Hj0, as shown in FIG. 65.

Figure 67:
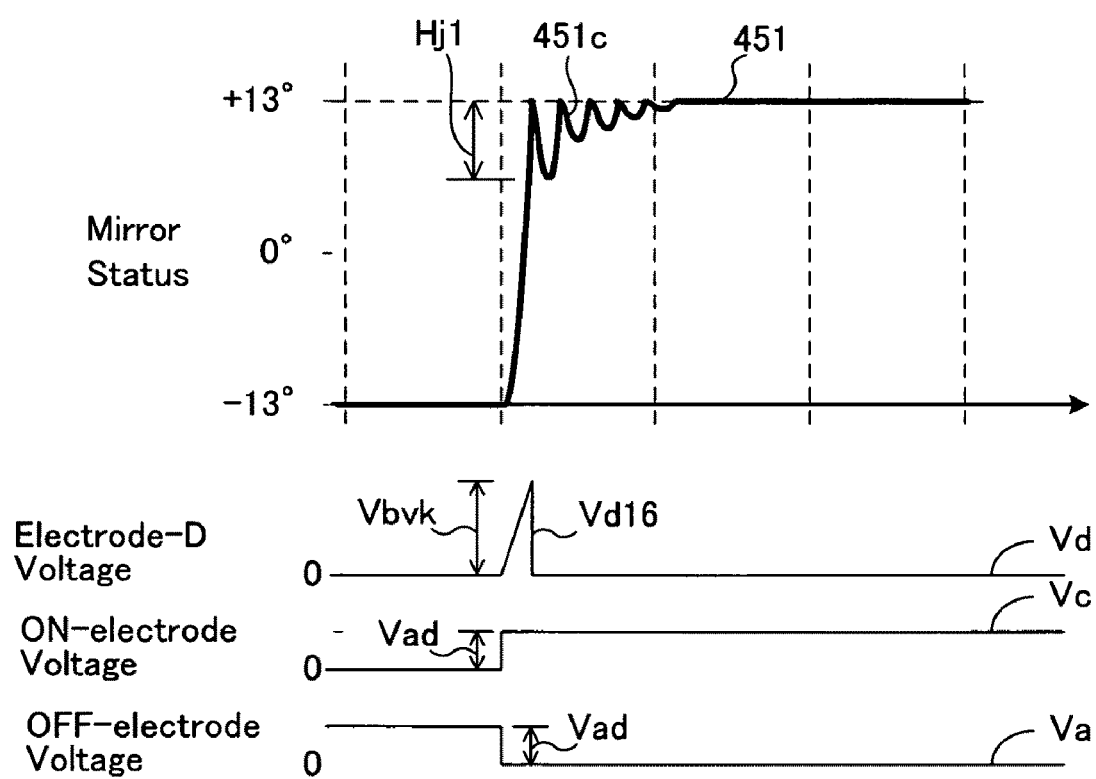
FIG. 67 is a timing diagram showing an exemplary modification of the control shown in FIG. 66.

The example shown in FIG. 66 shows the case of using a rectangular wave for the breaking pulse Vd15; alternatively, a breaking pulse Vd16 (at a breaking voltage Vbrk) with a ramp waveform may be applied, as exemplified in FIG. 67.

As shown in FIG. 8, the potential (i.e., the potential Vd) of the second ON electrode 235 is common to a plurality of pixel units 211, and therefore there is no need to control separately by equipping each pixel unit 211 with a memory structure.

The above description deals with the configuration of placing the second ON electrode 235 or second OFF electrode 236 on either the ON side or OFF side; such a configuration is arbitrary, and the configuration is applicable to the spatial light modulator 200 comprising the pixel unit 211 configured to place a second ON electrode 235 and second OFF electrode 236, which are connected to the plate line, on both the ON side and OFF side, as shown in FIGS. 10 and 38.

The relationship in magnitudes among the voltage Va and voltage Vc of the respective address electrodes (i.e., the OFF electrode 215 and ON electrode 216) and the voltage Vd and voltage Vb of the respective plate electrodes (i.e., the second ON electrode 235 and second OFF electrode 236) in the above description is premised on the configuration exemplified in FIG. 12C.

The following describes an example of reversing the layout and the relation of magnitude of the address electrodes (i.e., the OFF electrode 215 and ON electrode 216) and plate electrodes (i.e., the second ON electrode 235 and second OFF electrode 236) from those of the configuration exemplified in FIG. 12C.

Figure 68:
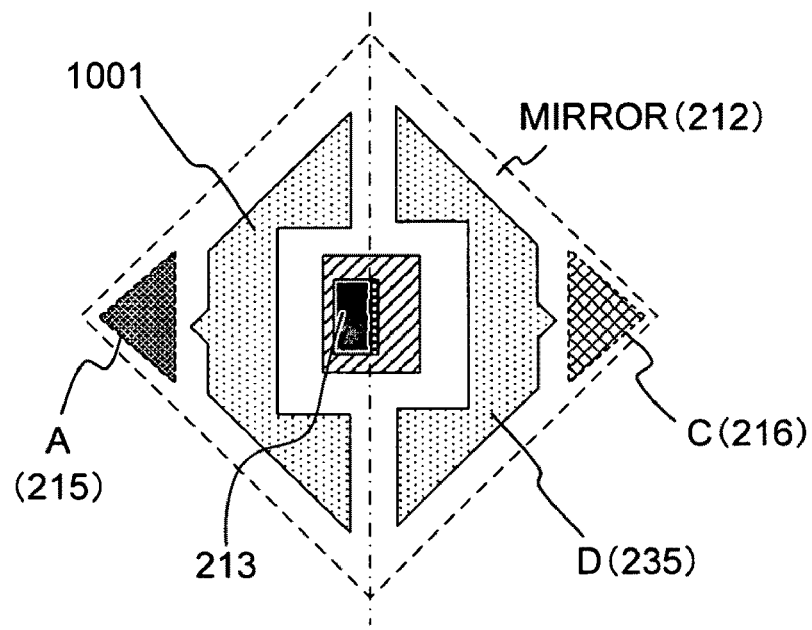
FIG. 68 is a top view diagram showing the layout of electrodes in a pixel unit constituting spatial light modulator according to a preferred embodiment of the present invention.
Figure 69:
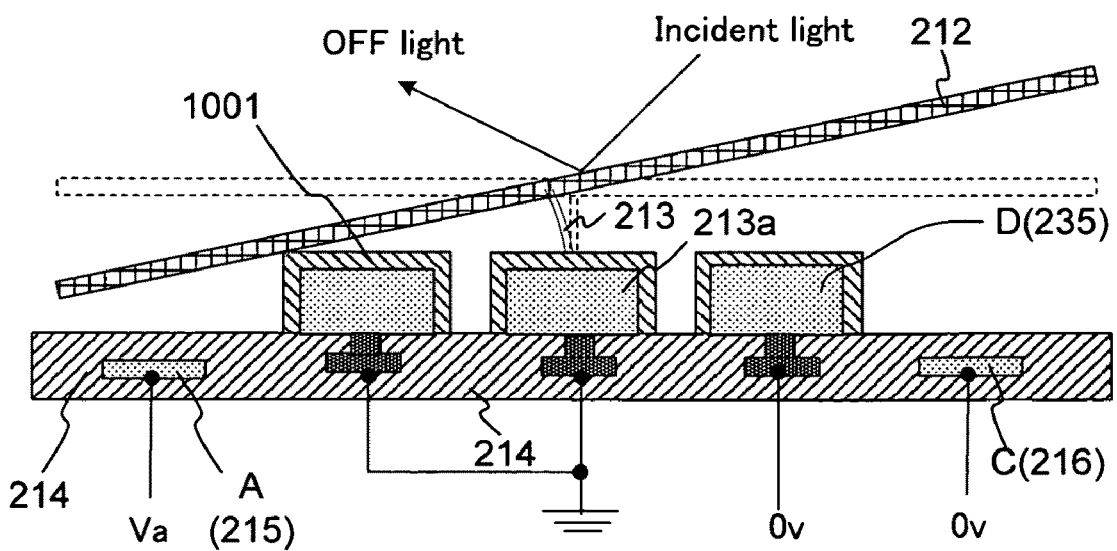
FIG. 69 is a cross-sectional diagram of a pixel unit constituting a spatial light modulator according to a preferred embodiment of the present invention.

FIG. 68 is a top view diagram showing the layout of electrodes in a pixel unit; FIG. 69 is a cross-sectional diagram of the layout shown in FIG. 68.

In this case, a rectangular pixel unit 211 is divided into two parts in the diagonal direction, and a hinge 213 is equipped at the center. In the proximity of the hinge 213, the second ON electrode 235 (i.e., the electrode D) and stopper 1001 are symmetrically placed in such a manner as to surround the hinge 213.

Furthermore, the OFF electrode 215 (i.e., the electrode A) and ON electrode 216 (i.e., the electrode C) are symmetrically placed on the outside of the stopper 1001 and the second ON electrode 235, respectively. The second ON electrode 235 and stopper 1001 are formed in the same production process as the hinge electrode 213a and are configured such that the conductor made of aluminum, or other similar material, formed in a desired pattern is covered with an insulation film.

The stopper 1001 determines the maximum tilting angle of the mirror 212 on the OFF side and is made of the same material, and in the same form, as the second ON electrode 235 that is placed on the other side of the hinge 213. If the stopper 1001 internally comprises a conductor such as an aluminum layer, the stopper 1001 is preferably connected to the ground (GND) together with the hinge electrode 213a.

Compared with the configuration exemplified in FIG. 12C, the pixel unit exemplified in FIGS. 68 and 69 is configured such that the positions and the relationship in area (i.e., the area on the substrate 214) of the address electrodes (i.e., the OFF electrode 215 and ON electrode 216) and plate electrodes (i.e., the second ON electrode 235 and second OFF electrode 236) are reversed.

Specifically, the relationship between the area Sa of the ON electrode 216 and the area Sp of the second ON electrode 235 is:

$$Sa < Sp$$

Further, in an examination of the magnitudes of the initiation pulse voltage Vi and address voltage Vad:

$$|Vad| > |Vi|$$

because of the relationship of the areas:

$$Sa < Sp$$

Since Sa<Sp:

$$Ca < Ci,$$

and therefore, due to the effect of the above described pulse voltage Vi in the initiating operation of the mirror 212, the address voltage Vad can be set lower than in the conventional technique.

Further, examining the relationship in magnitudes between the address voltage Vad and oscillation pull-in voltage Vosc:

$$|Vad| > |Vosc|,$$

because of:

$$Sa < Sp$$

Further, examining the relationship in magnitudes between the mirror retention voltage Vh and address voltage Vad:

$$|Vad| < |Vh|$$

in the case of:

$$Sa < Sp$$

As described above, the present embodiment uses the second ON electrode 235 (or the second OFF electrode 236) equipped separately from the address electrode (i.e., the OFF electrode 215 and ON electrode 216), thereby making it possible to reduce the address voltage Vad used for driving the mirror 212, prevent the stiction of the mirror 212, and prevent the phenomenon of the mirror 212 jumping on the address electrode when the mirror 212 shifts thereto.

Note that the present invention may of course be modified and/or improved in various manners possible within the scope and spirit of the present invention, and is not limited to the configurations put forth in the above described embodiments.

The present invention makes it possible to reduce the initiation voltage of a mirror, prevent the stiction thereof and prevent the jumping thereof, without complicating the control of an address electrode voltage or the structure of a pixel.

What is claimed is:

1. An image projection system comprising:
a spatial light modulator (SLM) comprises a plurality of pixel elements, wherein each of the pixel elements further comprises a deflectable mirror, each of said pixel elements comprises a first electrode for controlling said deflectable mirror to deflect to different tilt angles to reflect and modulate an illumination light for displaying an image; and a second electrode connected to a common signal line shared among a plurality of pixel elements; and
a controller for applying a voltage to the second electrode wherein said voltage applied in an initial operation period before an image display period is different from said voltage applied in the image display period.

2. The image projection system according to claim 1, wherein:
said deflectable mirror is configured to deflect along an oscillation axis and the second electrode is disposed farther away from the oscillation axis than the first electrode.

3. The image projection system according to claim 1, wherein:
the second electrode is disposed farther away from the deflectable mirror than the first electrode when the deflectable mirror is operated at a horizontal angular position.

4. The image projection system according to claim 1, wherein:
the controller applying said voltage to the second electrode according to an equation:
$|Vi| > |Va|$, where "Vi" is the voltage applied during the initial operation period of the deflectable mirror and "Va" is the voltage applied during the image display period.

5. The image projection system according to claim 1, wherein:
the controller further controls a period for applying said voltage to the second electrode according to an equation:
$|Ti| > |Ta|$, where "Ti" is the initial operation period of the deflectable mirror and "Ta" is the image display period of the deflectable mirror.

6. The image projection system according to claim 1, wherein:
the controller further applies said voltage with a ramp waveform to the second electrode.

7. The image projection system according to claim 1, wherein:
the controller further applies said voltages to said first and second electrodes according to following equations:

$$|V1| < |V2|, \text{ if } S1 > S2, \text{ while}$$

$$|V1| > |V2|, \text{ if } S1 < S2,$$

where "S1" is an area size of the first electrode, "S2" is an area size of the second electrode, "V1" is a voltage applied to the first electrode and "V2" is a voltage applied to the second electrode during the initial operation period.

8. The image projection system according to claim 1, wherein:

the controller applies said voltages to said first and second electrodes to generate Coulomb forces applied to the deflectable mirror according to an equation: C1<C2, where "C1" is the Coulomb force generated from the first electrode to the deflectable mirror when said first electrode is operated at a horizontal position and "C2" is the Coulomb force generated from the second electrode to the deflectable mirror when said deflectable mirror is operated at said horizontal position during the initial operation period.

9. The image projection system according to claim 1, further comprising:
a light source to emit an illuminating light to the spatial light modulator, wherein the light source is controlled to not emit said illumination light during the initial operation period.

10. The image projection system according to claim 1, wherein:
the first electrode is connected to a memory, and the second electrode connected to the common signal line shared among a plurality of pixel elements is not connected to the memory.

11. An image projection system comprising:
a spatial light modulator (SLM) comprises a plurality of pixel elements, wherein each pixel comprises a deflectable mirror,
each of said pixel elements further comprises a first electrode for controlling said deflectable mirror to deflect to different tilt angles to reflect and modulate an illumination light for displaying an image; and a second electrode connected to a common signal line shared among a plurality of pixel elements; and
a controller for applying a voltage to the second electrode through the common signal line wherein said controller applies a different voltage when said deflectable mirror is operated at a stationary state and when the mirror is operated at a transition state.

12. The image projection system according to claim 11, wherein:
said deflectable mirror is configured to deflect along an oscillation axis and the second electrode is disposed farther away from the oscillation axis than the first electrode.

13. The image projection system according to claim 11, wherein:
the second electrode is disposed farther away from the deflectable mirror than the first electrode when the deflectable mirror is operated at a horizontal angular position.

14. The image projection system according to claim 11, wherein:
the controller applying said voltage to the second electrode according to an equation:
|Vt|>|Vs|, where "Vs" is the voltage applied when the mirror is in the stationary tilting state and "Vt" is the voltage applied when the mirror is in the transition state.

15. The image projection system according to claim 11, wherein:
the controller further applies said voltage with a ramp waveform to the second electrode when the deflectable mirror is operated in the transition state.

16. The image projection system according to claim 11, wherein:
the controller applies said voltage to the second electrode when the deflectable mirror is operated in the transition state to control a length of time of operating said deflectable mirror in the transition state.

17. The image projection system according to claim 11, wherein:
the controller further applies said voltage to the second electrode when the deflectable mirror is operated in the stationary state to control the deflectable mirror wherein said voltage applied to the second electrode is independent from a voltage applied to the first electrode.

18. The image projection system according to claim 11, wherein:
the controller applies said voltages to said first and second electrodes according to the following equations:

|V1|<|Vosc| if S1>S2, and

|V1|>|Vosc| if i S1<S2, where "S1" is an area size of the first electrode, "S2" is an area size of the second electrode, "V1" is the voltage applied to the first electrode, and "Vosc" is the voltage applied to the second electrode for operating said deflectable mirror in an intermediate oscillation state.

19. The image projection system according to claim 11, wherein:
the controller applies said voltages to said first and second electrodes according to the following equations:

|V1|≧|Vh| if S1>S2, and

|V1|<|Vh| if S1<S2, where "S 1" is an area size of the first electrode, "S2" is an area size of the second electrode, "V1" is the voltage applied to the first electrode, and "Vh" is the voltage applied to the second electrode to control the deflectable mirror to operate in the stationary state independent from the voltage applied to the first electrode.

20. The image projection system according to claim 11, wherein:
the first electrode is connected to a memory, and the second electrode connected to the common signal line shared among a plurality of pixel elements is not connected to the memory.

21. An image projection system comprising:
a spatial light modulator (SLM) comprises a plurality of pixel elements, wherein each pixel comprises a deflectable mirror,
each of said pixel elements further comprises a first electrode for controlling said deflectable mirror to deflect to different tilt angles to reflect and modulate an illumination light for displaying an image; and a second electrode connected to a common signal line shared among a plurality of pixel elements; and
a controller for applying a voltage to the first and second electrodes to generate a greater Coulomb force from the second electrode than the Coulomb force from the first electrode.

22. The image projection system according to claim 21, wherein:
said deflectable mirror is configured to deflect along an oscillation axis and the second electrode is disposed farther away from the oscillation axis than the first electrode.

23. The image projection system according to claim 21, wherein:
the second electrode is disposed farther away from the deflectable mirror than the first electrode when the deflectable mirror is operated at a horizontal angular position.

24. The image projection system according to claim 21, wherein:
the controller applies said voltage to the second electrode when the deflectable mirror is operated in the transition state to control a length of time of operating said deflectable mirror in the transition state.

25. The image projection system according to claim 21, wherein:
the controller further applies said voltage with a ramp waveform to the second electrode.

26. The image projection system according to claim 21, wherein:
the first electrode is connected to a memory, and the second electrode connected to the common signal line shared among a plurality of pixel elements is not connected to the memory.

* * * * *